US011772504B2

(12) United States Patent
Sasu

(10) Patent No.: US 11,772,504 B2
(45) Date of Patent: Oct. 3, 2023

(54) FAST RECHARGEABLE BATTERY ASSEMBLY AND RECHARGING EQUIPMENT

(71) Applicant: Ioan Sasu, Brossard (CA)

(72) Inventor: Ioan Sasu, Brossard (CA)

( * ) Notice: Subject to any disclaimer, the term of this patent is extended or adjusted under 35 U.S.C. 154(b) by 184 days.

(21) Appl. No.: 16/548,749

(22) Filed: Aug. 22, 2019

(65) Prior Publication Data

US 2020/0044464 A1 Feb. 6, 2020

(51) Int. Cl.

*H02J 7/00* (2006.01)
*B60L 53/53* (2019.01)
*H02J 1/10* (2006.01)

(52) U.S. Cl.

CPC ............ *H02J 7/0027* (2013.01); *B60L 53/53* (2019.02); *H02J 1/10* (2013.01); *H02J 7/0024* (2013.01)

(58) Field of Classification Search

CPC .......... H02J 7/0027; H02J 7/0024; H02J 1/10; B60L 53/60; B60L 53/67; B60L 53/16; B60L 53/53

USPC .......................................................... 320/109

See application file for complete search history.

(56) References Cited

U.S. PATENT DOCUMENTS 4,232,260 A * 11/1980 Lambkin .............. H02J 7/0003 320/110
5,187,422 A * 2/1993 Izenbaard ............ H02J 7/0024 320/125
5,202,617 A * 4/1993 Nor ..................... H02J 7/00036 320/130
5,451,755 A * 9/1995 Duval ..................... B60L 53/64 235/381
5,583,418 A * 12/1996 Honda .................... B60L 53/14 320/109
5,612,606 A * 3/1997 Guimarin ................ B60K 1/04 320/109
6,323,623 B1 * 11/2001 Someya ................ H02J 7/0019 320/166
7,339,353 B1 * 3/2008 Masias ................ H02J 2207/40 320/138
7,516,726 B2 * 4/2009 Esaka .................. H02J 7/0024 123/179.3
7,993,155 B2 * 8/2011 Heichal .................. B60L 53/80 439/374
8,006,793 B2 * 8/2011 Heichal .................... B60K 1/04 180/68.5

(Continued)

FOREIGN PATENT DOCUMENTS

CN 103107580 A * 11/2011
JP 2019161977 A * 9/2019

*Primary Examiner* — John T Trischler

(57) ABSTRACT

A fast rechargeable battery assembly and a battery recharging equipment configured to recharge a battery in a very short period of time, by using a plurality of independent power supply units which recharge simultaneously a battery split in a plurality of independent battery modules, each one of these having a plurality of battery cells connected to a pair of module independent terminals positive and negative, which are direct connected to an independent power supply unit—in recharging mode, and in supplying mode all of these being connected to a battery main terminal. This functionality is realized for on-board recharging by using a contact plate and a plurality of switches, changeover witches and command switches, and for off-board recharging by using a recharging and a supplying contact plate.

7 Claims, 139 Drawing Sheets

(56) References Cited

U.S. PATENT DOCUMENTS 8,013,571 B2* 9/2011 Agassi .................... B60L 50/51 320/109
8,164,300 B2* 4/2012 Agassi .................... B60L 50/66 320/104
8,324,859 B2* 12/2012 Rossi .................. B60L 11/1824 320/109
8,482,155 B2* 7/2013 Choi ....................... H02J 3/382 307/71
8,517,132 B2* 8/2013 Heichal ................... B60L 50/64 180/68.5
8,575,780 B2* 11/2013 Moon ..................... H02J 3/382 307/66
8,680,812 B2* 3/2014 Vukojevic ................. H02J 7/00 320/108
8,686,687 B2* 4/2014 Rossi ...................... B60L 55/00 320/109
8,860,371 B2* 10/2014 Yang ................... H02J 2207/40 320/116
8,872,379 B2* 10/2014 Ruiz ................. H02J 13/00002 307/66
9,024,572 B2* 5/2015 Nishihara ........... H01M 10/482 320/107
9,033,084 B2* 5/2015 Joye ........................ B23P 11/00 180/68.5
9,168,841 B2* 10/2015 Kawai ..................... B60L 53/20
9,187,000 B2* 11/2015 Kuwano ................. B60L 58/22
9,300,153 B2* 3/2016 Fujiyama .................. H02J 7/00
9,457,672 B2* 10/2016 Chang ..................... B60L 53/31
9,461,341 B2* 10/2016 Momo .................. H02J 7/0068
9,496,750 B2* 11/2016 Hayashigawa ......... B60L 53/11
9,505,318 B2* 11/2016 Hendrix .................. B60L 53/66
9,564,767 B2* 2/2017 Takahashi .............. H01G 11/10
9,566,954 B2* 2/2017 Moskowitz ............. B60L 58/12
9,577,446 B2* 2/2017 Yamazaki ............... H02J 7/007
9,595,842 B2* 3/2017 Takeda ................. G01R 31/382
9,597,973 B2* 3/2017 Penilla .................... G06F 3/167
9,597,976 B2* 3/2017 Dickinson ........... H01M 10/625
9,731,609 B2* 8/2017 Ambrosio ............... H02J 7/345
9,834,183 B2* 12/2017 Moskowitz ............. B60L 58/12
9,912,015 B2* 3/2018 O'Hora ............ H01M 10/6556
9,912,178 B2* 3/2018 Nysen ................. H01M 10/052
9,997,933 B2* 6/2018 Huang .................. H02J 7/0029
10,014,701 B2* 7/2018 Toya ......................... H02J 7/34
10,033,204 B2* 7/2018 Huang .................. H02J 7/0071
10,040,363 B2* 8/2018 Beaston ................ H02J 7/0027
10,056,764 B2* 8/2018 Nysen ................... H02J 7/0016
10,079,496 B2* 9/2018 Huang .................. H02J 7/0071
10,110,061 B2* 10/2018 Hinterberger ........... H02M 7/68
10,150,380 B2* 12/2018 Vaughan ................ B60L 53/68
10,173,544 B2* 1/2019 Hendrix .................. B60L 53/62
10,180,460 B1* 1/2019 Castelaz ................. B60L 58/15
10,181,749 B2* 1/2019 Izu .......................... H02J 7/007
10,189,362 B2* 1/2019 Cun ........................ B60L 53/64
10,252,629 B2* 4/2019 Gebhart .................. B60L 53/24
10,252,633 B2* 4/2019 Baxter .................... B60L 53/65
10,348,102 B2* 7/2019 Davis .................... H02J 7/0019
10,367,215 B2* 7/2019 Pmswsv ............ H01M 8/04888
10,406,927 B2* 9/2019 Baba ....................... H02J 3/381
10,446,809 B1* 10/2019 Roddy .................. H01M 10/48
10,464,434 B2* 11/2019 Homma .................. H02J 7/042
10,471,836 B2* 11/2019 Yabuuchi .............. H01M 10/48
10,483,770 B2* 11/2019 Cun ...................... H02J 7/0063
10,498,148 B2* 12/2019 Mergener ............ H01M 10/482
10,538,153 B2* 1/2020 Jensen .................... B60L 50/60
10,549,729 B2* 2/2020 Moskowitz ............. B60L 53/50
10,615,613 B2* 4/2020 Calhoun ................. H02J 50/80
10,744,883 B2* 8/2020 Quattrini, Jr. ........... B60L 53/65
10,749,430 B2* 8/2020 Gao ...................... H02J 7/0063
10,752,118 B2* 8/2020 Chang ................ B60L 11/1811
10,897,145 B2* 1/2021 De Breucker ........ H02J 7/0021
10,903,661 B2* 1/2021 Nysen ..................... H02J 7/342
10,971,941 B2* 4/2021 Krieg ........................ H02J 7/36
2003/0209375 A1* 11/2003 Suzuki ...................... H02J 7/00 180/65.22
2004/0130292 A1* 7/2004 Buchanan ............... B60L 53/53 320/116
2006/0071641 A1* 4/2006 Ward .................... H02J 7/0042 320/116
2007/0090810 A1* 4/2007 Dickinson ........... B66F 9/07595 320/150
2008/0072859 A1* 3/2008 Esaka .................. H02J 7/0024 123/179.3
2008/0238356 A1* 10/2008 Batson .................. H02J 7/0047 320/103
2008/0238367 A1* 10/2008 Guderzo ............... H02J 7/1407 320/117
2010/0106631 A1* 4/2010 Kurayama ............. B60L 53/11 705/34
2010/0141206 A1* 6/2010 Agassi .................... B60L 53/80 320/109
2010/0228405 A1* 9/2010 Morgal ................. B60L 53/305 701/2
2011/0106329 A1* 5/2011 Donnelly ................ B60L 53/64 700/291
2011/0109266 A1* 5/2011 Rossi ...................... B60L 50/40 320/109
2011/0204720 A1* 8/2011 Ruiz ....................... B60L 1/003 307/66
2011/0221383 A1* 9/2011 Uehashi .................... H02J 7/35 320/101
2011/0285345 A1* 11/2011 Kawai ..................... B60L 53/11 320/107
2011/0291611 A1* 12/2011 Manor ...................... H02J 7/02 320/107
2012/0013305 A1* 1/2012 Yang .................... H02J 7/0045 320/134
2012/0019061 A1* 1/2012 Nishihara ............ H01M 2/206 307/10.1
2012/0091955 A1* 4/2012 Gao ........................ B60L 53/80 320/109
2012/0105001 A1* 5/2012 Gallegos ............... H02J 7/0027 320/109
2012/0229082 A1* 9/2012 Vukojevic ............ H02J 7/0027 320/108
2012/0249071 A1* 10/2012 Yang ....................... H02J 7/342 320/110
2012/0299544 A1* 11/2012 Prosser ................... B60L 50/66 320/109
2012/0303213 A1* 11/2012 Prosser ................... B60L 53/80 701/36
2012/0326668 A1* 12/2012 Ballatine ................. B60L 53/20 320/109
2012/0330494 A1* 12/2012 Hendrix .............. B60L 11/1838 701/29.3
2013/0002197 A1* 1/2013 Hernandez ............. B60L 53/24 320/109
2013/0009599 A1* 1/2013 Yukizane ............ B60L 11/1816 320/109
2013/0049689 A1* 2/2013 Hayashigawa ......... B60L 58/40 320/109
2013/0110337 A1* 5/2013 Kondoh .................. B60L 15/00 701/22
2013/0141043 A1* 6/2013 Rossi ...................... B60L 50/40 320/109
2013/0192913 A1* 8/2013 Joye ........................ B60L 50/64 180/68.5
2014/0015469 A1* 1/2014 Beaston ................ H02J 7/0068 320/101
2014/0015488 A1* 1/2014 Despesse ................ B60L 58/12 320/122
2014/0127566 A1* 5/2014 Kuriki .................... H01G 11/28 429/211
2014/0173300 A1* 6/2014 Yamazaki ............... H02J 7/007 713/300
2014/0176043 A1* 6/2014 Fujiyama .................. H02J 7/00 320/101
2014/0184162 A1* 7/2014 Takahashi ........... H01M 10/441 320/128
2014/0300311 A1* 10/2014 Caren ................. H01M 10/425 320/103

(56) References Cited

U.S. PATENT DOCUMENTS

2014/0312841 A1* 10/2014 Baba ........................ H02J 3/381 320/109
2014/0361740 A1* 12/2014 Suzuki .................. H02J 7/0044 320/108
2015/0115890 A1* 4/2015 Dickinson ............... B60L 53/11 320/109
2015/0130281 A1* 5/2015 Sabripour ............... H02J 3/383 307/66
2015/0178034 A1* 6/2015 Penilla .................... B60L 50/66 345/1.1
2015/0202973 A1* 7/2015 Chang ................... H02J 7/0077 320/101
2015/0326040 A1* 11/2015 Kawai ................... B60L 53/305 320/162
2015/0333550 A1* 11/2015 Takeda ................. G01R 31/382 320/134
2015/0356498 A1* 12/2015 Casanova .............. G07B 15/02 705/13
2016/0001748 A1* 1/2016 Moskowitz ............. B60L 53/80 701/22
2016/0064962 A1* 3/2016 Huang .................. H02J 7/0045 320/114
2016/0064963 A1* 3/2016 Huang .................. H02J 7/0071 320/114
2016/0064979 A1* 3/2016 Huang .................. H02J 7/0029 320/114
2016/0149417 A1* 5/2016 Davis ...................... H02J 7/008 320/162
2016/0178678 A1* 6/2016 Pelletier .................. H02J 3/386 705/39
2016/0268822 A1* 9/2016 Toya ..................... H02J 7/0068
2016/0303990 A1* 10/2016 Penilla .................... G06F 3/048
2017/0033337 A1* 2/2017 O'Hora ............... H01M 10/441
2017/0033338 A1* 2/2017 O'Hora ................. H01M 2/206
2017/0033408 A1* 2/2017 O'Hora ................... B60L 58/26
2017/0063152 A1* 3/2017 Hinterberger ........... H02M 7/68
2017/0106764 A1* 4/2017 Beaston ................ H02J 7/0027
2017/0113661 A1* 4/2017 Moskowitz ............. B60L 50/66
2017/0149253 A1* 5/2017 Takahashi .............. H01G 11/06
2017/0170671 A1* 6/2017 Mergener .............. H02J 7/0042
2017/0236648 A1* 8/2017 Lazarev .................... H02J 7/35 320/166
2017/0237274 A1* 8/2017 Lazarev ................ H02J 7/0026 320/166
2017/0246961 A1* 8/2017 Lee ......................... B60L 53/67
2017/0274792 A1* 9/2017 Vaughan ................. B60L 53/14
2017/0302107 A1* 10/2017 Saussele ................... H02J 5/00
2017/0338502 A1* 11/2017 Pmsvvsv ........... H01M 8/04365
2017/0349039 A1* 12/2017 Rayner .................. B62K 27/14
2017/0349050 A1* 12/2017 Ambrosio ............... B60L 50/11
2017/0361717 A1* 12/2017 Qin ........................... H02J 7/35
2017/0373515 A1* 12/2017 Friday-Skoda ........ A45D 20/12
2018/0043789 A1* 2/2018 Goetz ................. B60L 11/1879
2018/0083478 A1* 3/2018 Izu ........................ H02J 7/0036
2018/0102706 A1* 4/2018 Gao ........................ H02M 3/02
2018/0118174 A1* 5/2018 Moskowitz ............. B60L 53/80
2018/0131201 A1* 5/2018 Calhoun ................. H02J 50/12
2018/0215278 A1* 8/2018 Yabuuchi .............. H01M 10/44
2018/0229617 A1* 8/2018 Hendrix .................. B60L 53/62
2018/0254658 A1* 9/2018 Koerner ................ H02J 7/0016
2018/0345807 A1* 12/2018 Cun ........................ B60L 53/62
2018/0345808 A1* 12/2018 Cun ........................ B60L 53/31
2019/0013681 A1* 1/2019 De Breucker ........ H02J 7/0021
2019/0118669 A1* 4/2019 Jensen .................... B60L 53/80
2019/0143828 A1* 5/2019 Sawada ............. G01C 21/3438 340/934
2019/0217718 A1* 7/2019 Arregui Torres ....... B60L 53/65
2019/0259985 A1* 8/2019 Hanawa .............. H01M 50/213
2019/0280495 A1* 9/2019 Mergener ............ H01M 10/482
2019/0283611 A1* 9/2019 Conlon ................. B60L 3/0046
2019/0326778 A1* 10/2019 Kondo ................... G01R 31/40
2019/0366871 A1* 12/2019 Baba ....................... B60L 55/00
2019/0375308 A1* 12/2019 Vaughan ................. B60L 53/63
2020/0052521 A1* 2/2020 Ding ....................... B60L 53/62
2020/0122596 A1* 4/2020 Rasmussen ............. B60L 53/62
2020/0139842 A1* 5/2020 Logvinov ............... B60L 53/68
2020/0148073 A1* 5/2020 Sasu ....................... B60L 53/66
2020/0231063 A1* 7/2020 Sadano ............. H02J 13/00002
2020/0235440 A1* 7/2020 Hao .................... H01M 10/425
2020/0254898 A1* 8/2020 Singhal ................... B60L 50/66
2020/0274370 A1* 8/2020 Krieg .................... B60L 53/122
2020/0412243 A1* 12/2020 Gao ...................... H02J 7/0063

* cited by examiner

Detail D1

Detail D2

View A

View A

View A

View B

View A

View A

View A

View B

View B

View B

FAST RECHARGEABLE BATTERY ASSEMBLY AND RECHARGING EQUIPMENT

TECHNICAL FIELD

The present invention relates generally to a new design of a fast rechargeable battery assembly and a battery recharging equipment characterized by a very short battery recharging time, due to a battery assembly comprising a plurality of batteries, each battery being split in a plurality of independent battery modules, each module having a plurality of battery cells, all these independent battery modules being configured to be recharged simultaneously by a plurality of independent power supply units using a plurality of independent multi-contact chargers of the same independent recharging terminal. This design may be used in any technical field, especially where a fast battery recharging is required. The invention provides solutions for on-board recharging and for off-board recharging of a battery assembly. The invention may be applied as following: in automotive industry for electric vehicles, for electric golf cars, for electric bikes, for electric motorcycles, and for cordless powered tools or equipment, etc.

BACKGROUND OF THE ART

The actual recharging terminals for electric vehicles (EV) use only one power supply unit of one or three phase AC or one DC power supply unit. With all progress made up to now, the recharging time is still long—minimum 40 minutes/EV. Therefore, one recharging terminal maximum capacity is about 1.3 EV per Hr, which is unsatisfactory, because when the number of EV's will increase, the recharging terminals productivity is too low and the required space for the recharging stations (including a plurality of recharging terminals) becomes huge. For a recharging terminal it takes minimum 15 $m^2$. For example, to recharge only 13 EV's per Hr, are required 10 terminals per recharging station which takes about 150 $m^2$. This is impossible in the big cities, because this space is not available.

For example, Tesla Model S using the Supercharger at 480V takes 40 minute to 80% recharge on the original 85 Kwh battery comprising 7104 battery cells and Ford Focus 2017 for its 33.5 Kwh battery, having 430 cells arranged in 86 series and 5 parallel (86S5P) takes 5.5 hours for a charger of 240V and 6.6 Kw. It is a similar situation for the batteries used in other applications like electric golf cars, electric bikes, electric motorcycles, all cordless powered tools, etc.

TECHNICAL ISSUES

The main issue related to the actual batteries and their recharging equipment is the long requested recharging time and the space taken by the recharging stations, which has a negative impact on the vehicles autonomy. For cordless powered tools, the issue is related to the number of batteries per kit, which increases their price. At this time each producer uses its own design for batteries and chargers, therefore it is not possible to recharge the electric vehicle battery to any recharging station.

SUMMARY OF THE INVENTION

The invention provides a fast rechargeable battery assemble and a battery recharging equipment comprising a plurality of rechargeable batteries, configured to recharge a battery in a very short period of time, by using a plurality of independent power supply units which recharge simultaneously, (via an independent multi-contacts charger and a contact plate), a battery split in a plurality of independent battery modules, each one of these independent battery modules having a plurality of battery cells connected to a pair of positive and negative independent module terminals, which are direct connected to an independent power supply unit—in battery recharging mode, and in supplying mode all these independent module terminals being connected to a main battery terminal with a single pair of positive and negative terminals. The fast rechargeable battery assembly and the battery recharging equipment is configured for on-board and for off-board battery recharging. For on-board battery recharging is used a unique battery set-up on the consumer for battery recharging and supplying mode. For each battery is used a unique contact plate for recharging and for supplying mode, comprising a plurality of contacts in touch with the battery independent module terminals and a main battery terminal. In order to separate the independent battery modules during the recharging time and to connect all of them to the main battery terminal, in supplying time, is used a battery control equipment and a plurality of command switches. For off-board battery recharging, it takes two different battery set-ups and two different contact plates: one supplying contact plate installed on the consumer and one recharging contact plate installed outside of the consumer on the battery recharging equipment, each one configured to do the right function. Depending on the application, this principle may be applied for on-board battery recharging in case of big batteries (electric vehicles, electric golf cars, etc.) or off-board battery recharging for small batteries (electric bikes, electric motorcycles, cordless powered tools or equipment, etc.), where integrated solutions may be applied. For on-board vehicle battery recharging, an industrial or a domestic power station may be used. For industrial battery recharging, an industrial recharging station is used, comprising a plurality of independent terminals, a plurality of three phase AC independent power supply units, a plurality of independent multi-contacts chargers, and a plurality of communication screens. When a three phase AC independent power supply units are used, each phase is connected to an independent battery module, so an independent power supply unit recharges simultaneously three independent battery modules—one triplet. The independent multi-contacts chargers outlet and the multi-contacts equipment battery inlet are mistake-prove configured, having a trapezoidal shape, ensuring that the battery modules are always correct connected to the independent power supply units, via the independent multi-contacts charger. Bigger the number of independent power supply units charging simultaneously the same battery, shorter is the battery recharging time and smaller the area of the recharging station. For example, for electric vehicles with a battery having 15 independent battery modules, (5 triplets) using 5 independent three phase AC power supply units of 3-phase AC at 380V and 50 Kw per recharging terminal, the required recharging time and required land area are reduced by a factor of 15. So, for an actual EV requiring 40 minutes, to recharge the battery will be necessary only 2.66 minutes, and for an actual EV requiring 4 hours to recharge the battery, will be necessary only 16 minutes, using 5 independent three phase AC power supply units per recharging terminal. A single recharging terminal will be able to cover 15 times more EV's per day, equivalent of 15 actual recharging terminals. Therefore, the recharging time and in the same time the area occupied by the recharging station and its price is drastically reduced. With this reduction of the battery recharging time, the unlimited autonomy of the electric vehicle is possible to achieve, which is a huge change for the massive use of electric transportation. Similar effect will be obtained for electric golf cars, electric bikes, electric motorcycles, cordless powered tools or equipment, etc.

DESCRIPTION OF THE DRAWINGS

In order that this invention may be readily understood, a plurality of embodiments are illustrated by way of examples, with reference to the accompanying drawings, in which:

FIG. 119 shows a wiring diagram for recharging mode of an electric vehicle battery composed by two (6TP,3×6MP) batteries connected in parallel, each battery having a 20 contacts universal vehicle inlet, using a domestic slow recharging terminal with one single mono phase AC at 120V and 2.7 Kw independent power supply unit;

Figure 120:
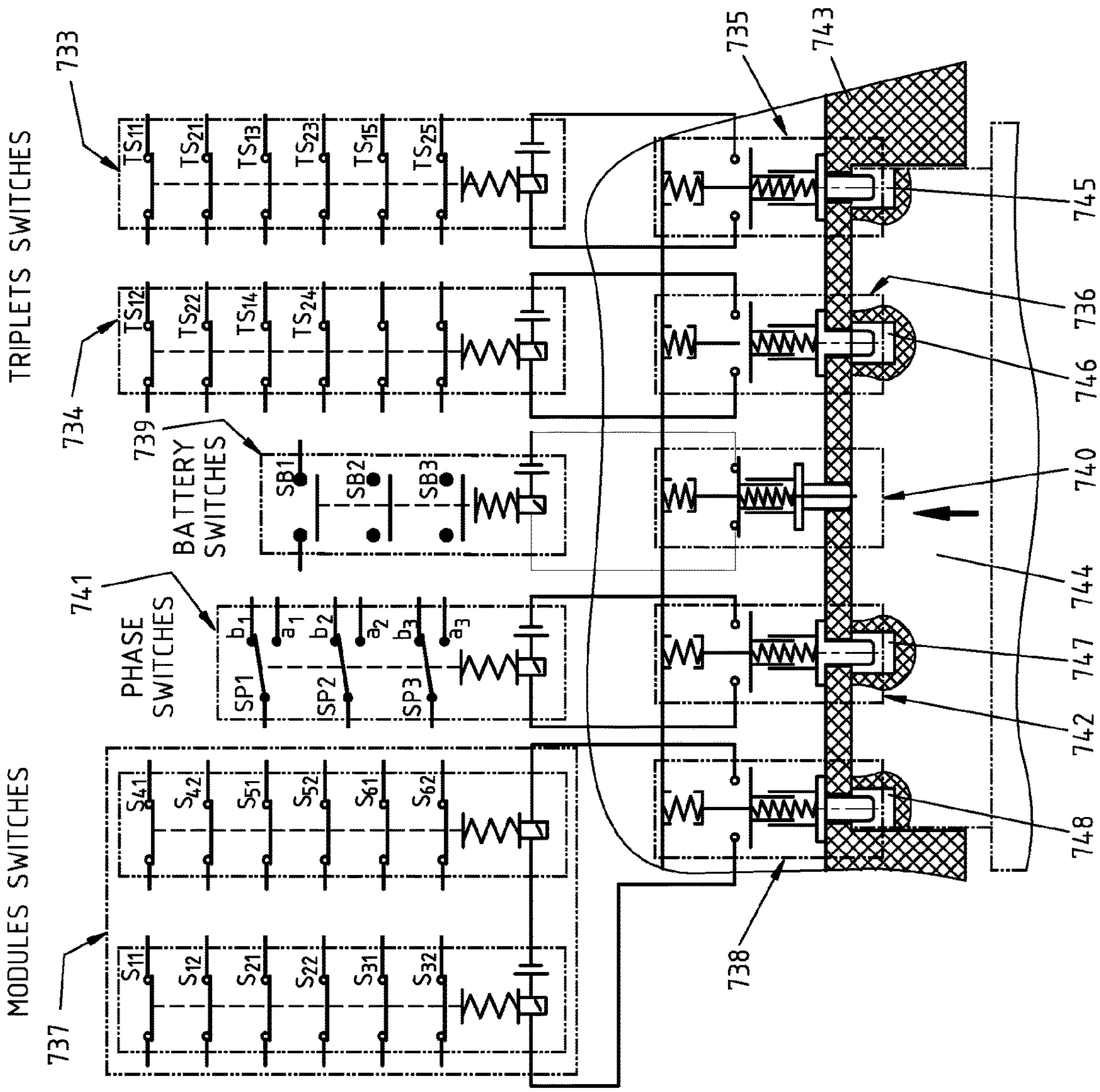
Figure 121:
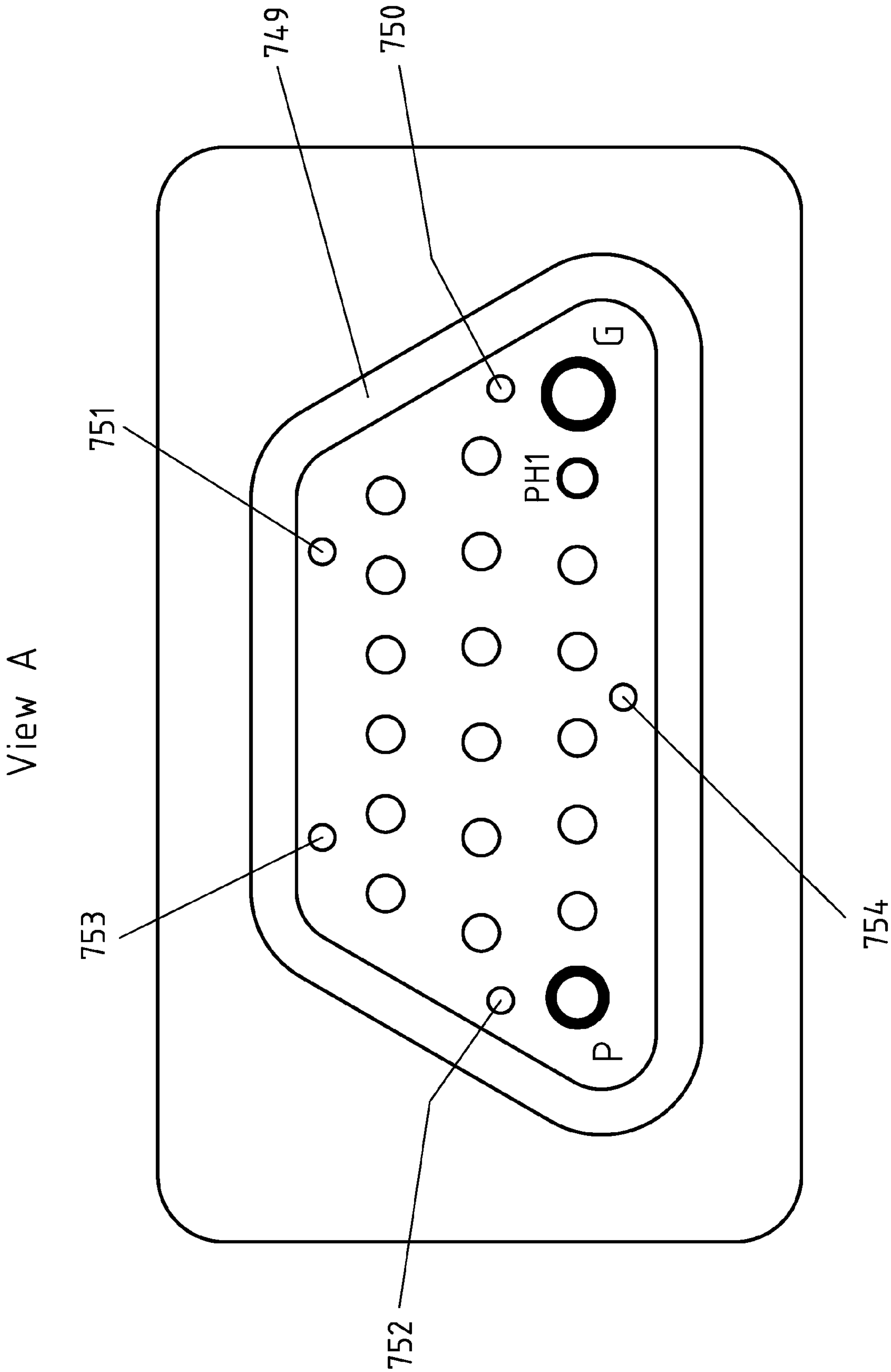
Figure 122:
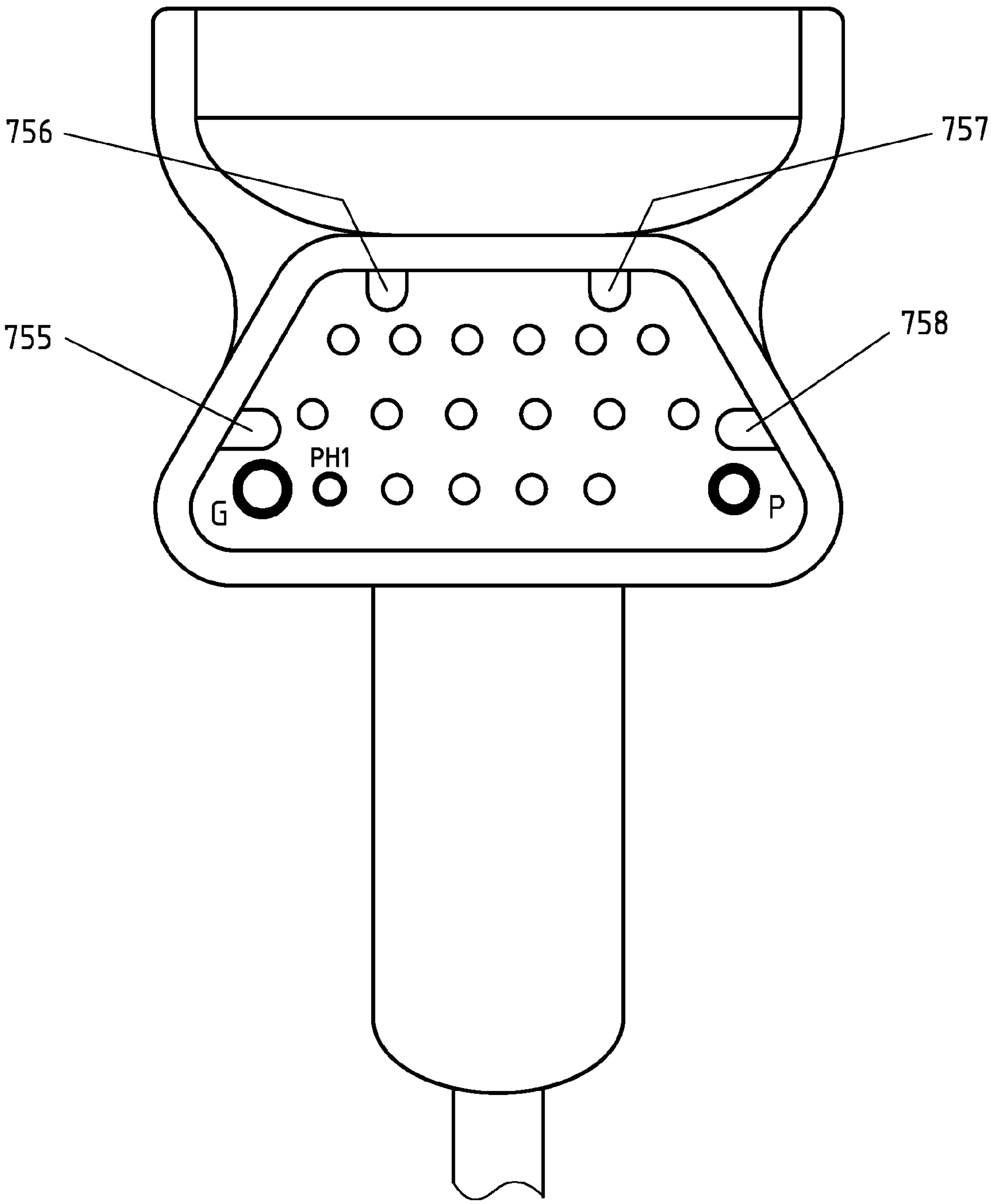
Figure 123:
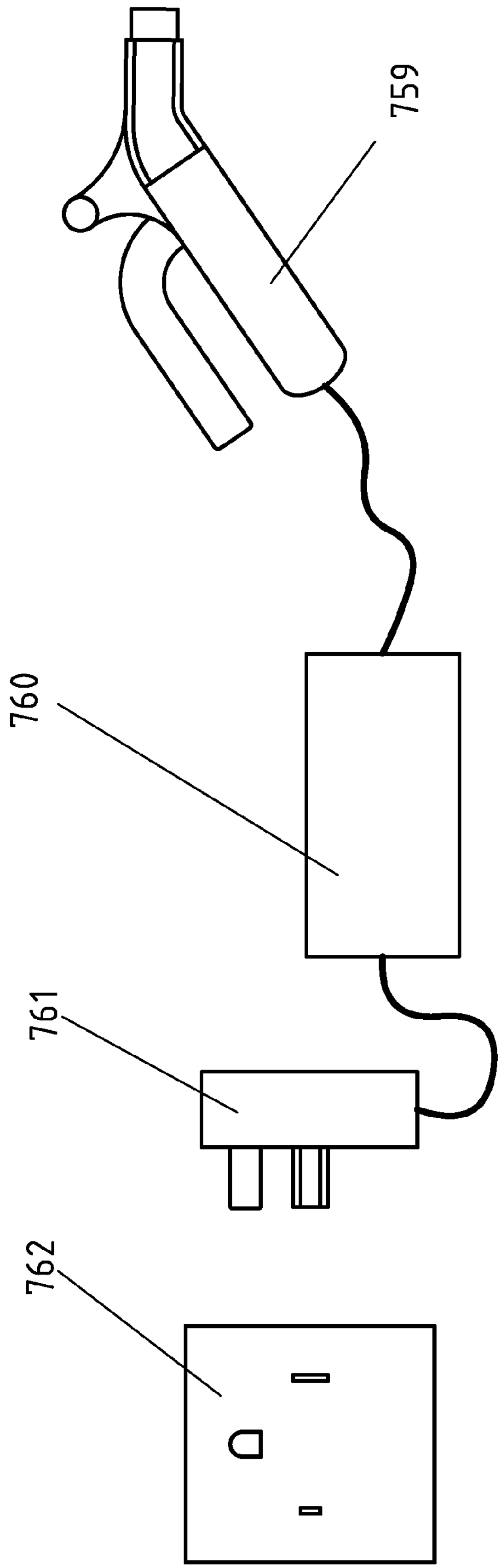

FIG. 120 shows the wiring diagram of an embodiment of an electric vehicle battery composed by two (6TP,3×6MP) batteries connected in parallel, each battery having a 20 contacts universal vehicle inlet, using a domestic slow recharging terminal with one single mono phase AC at 120V and 2.7 Kw independent power supply unit where are illustrated as well the triplets switches, the modules switches, the battery switches and the phase switches with their command switches;

FIG. 121 presents a universal vehicle inlet having only 3 active contacts and the 5 plungers of the command switches;

FIG. 122 shows an independent multi-contacts charger with its 3 active contacts and the four recesses;

FIG. 123 shows a slow battery recharging equipment with its charger connected to an independent power supply unit, plugged into a 120V outlet.

Figure 124:
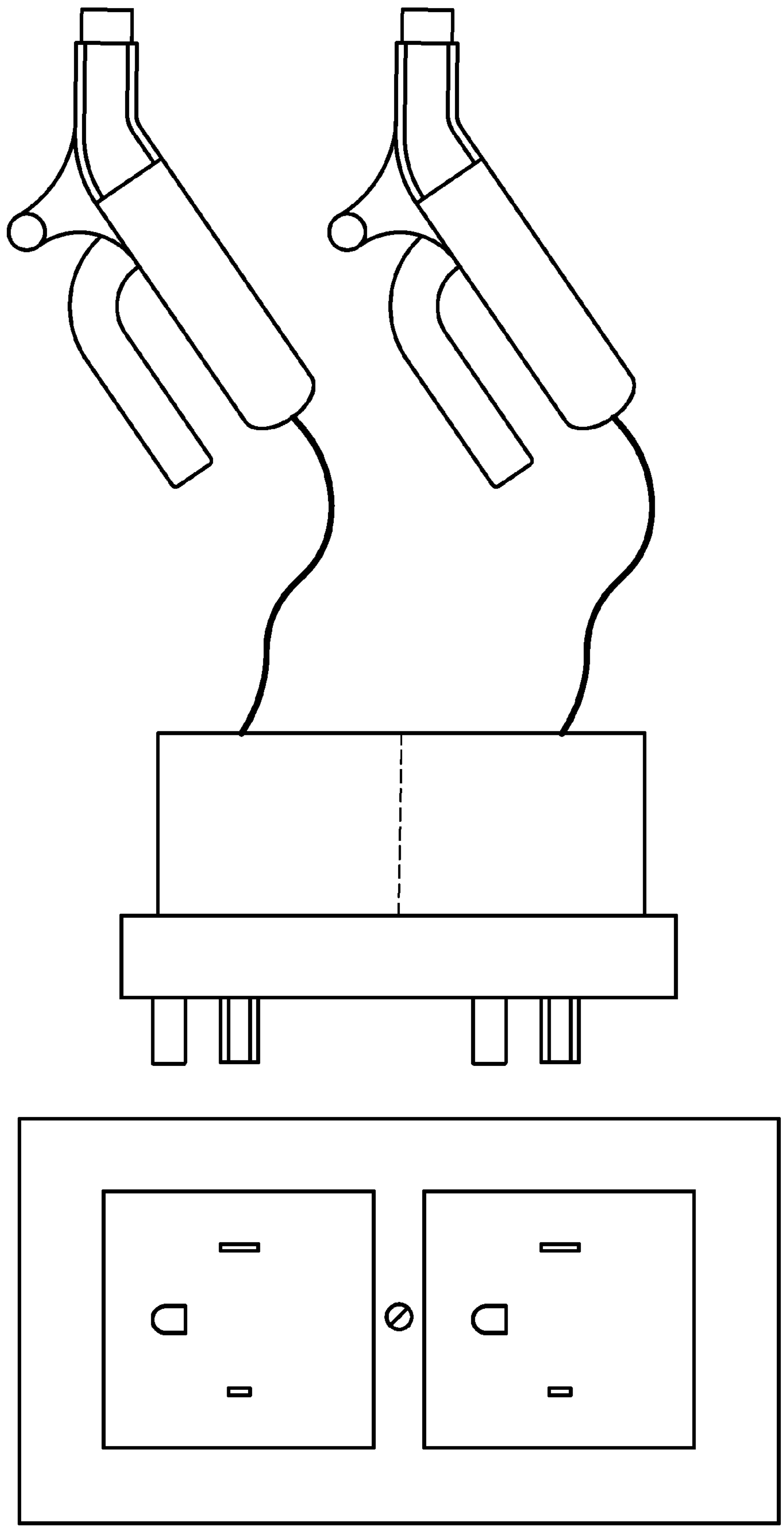
Figure 125:
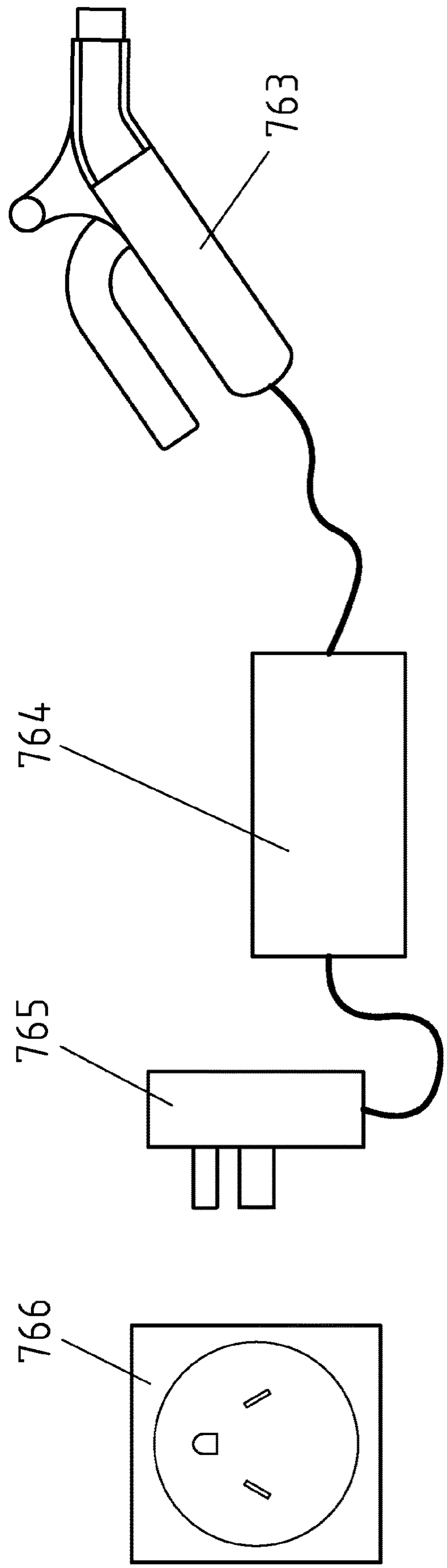
Figure 126:
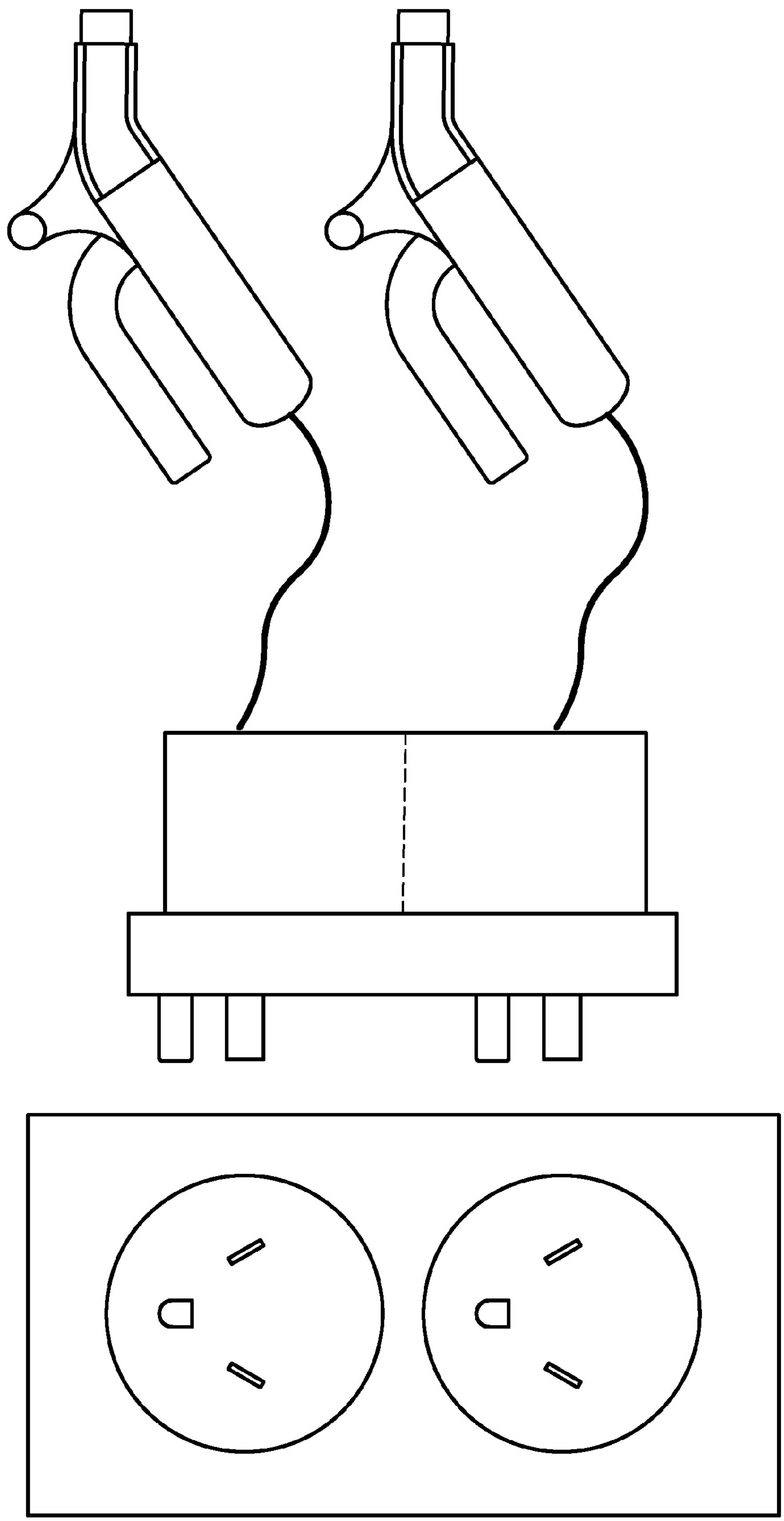
Figure 127:
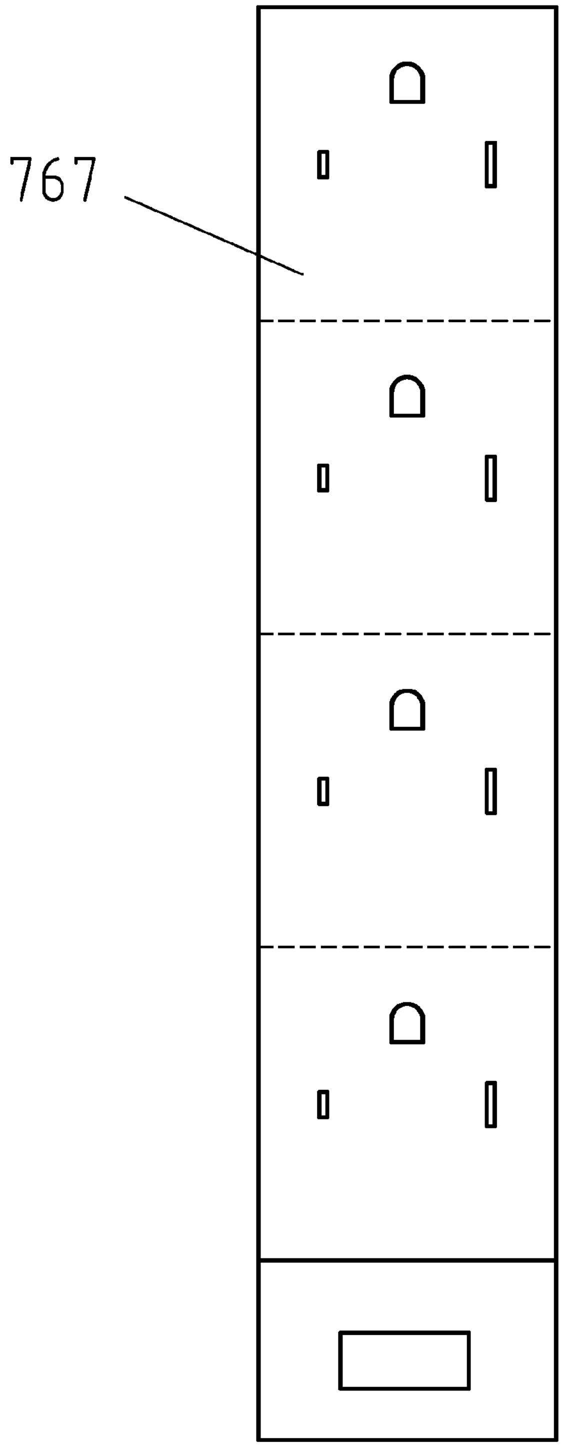
Figure 128:
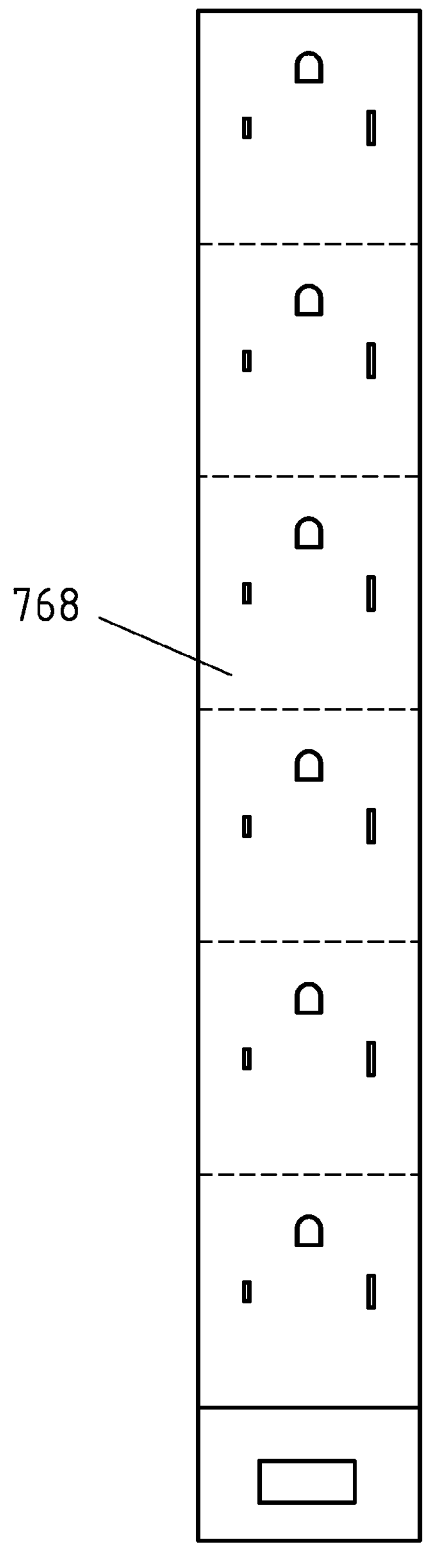
Figure 129:
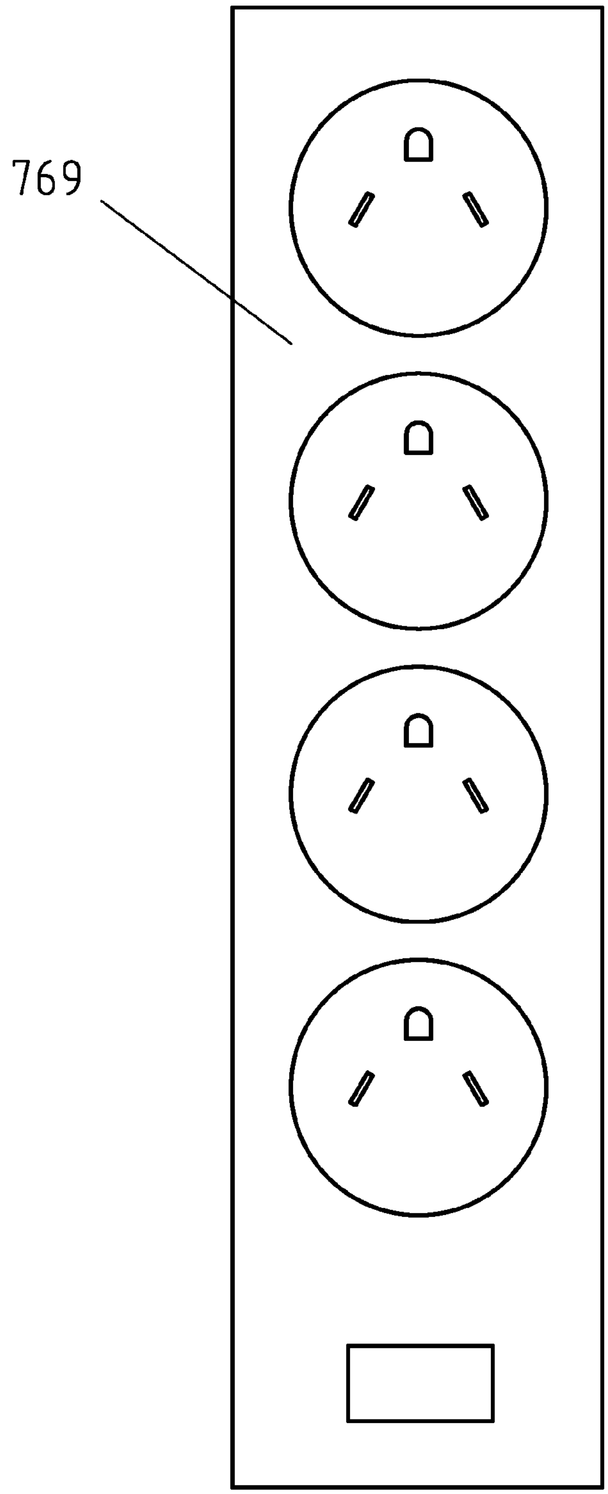
Figure 130:
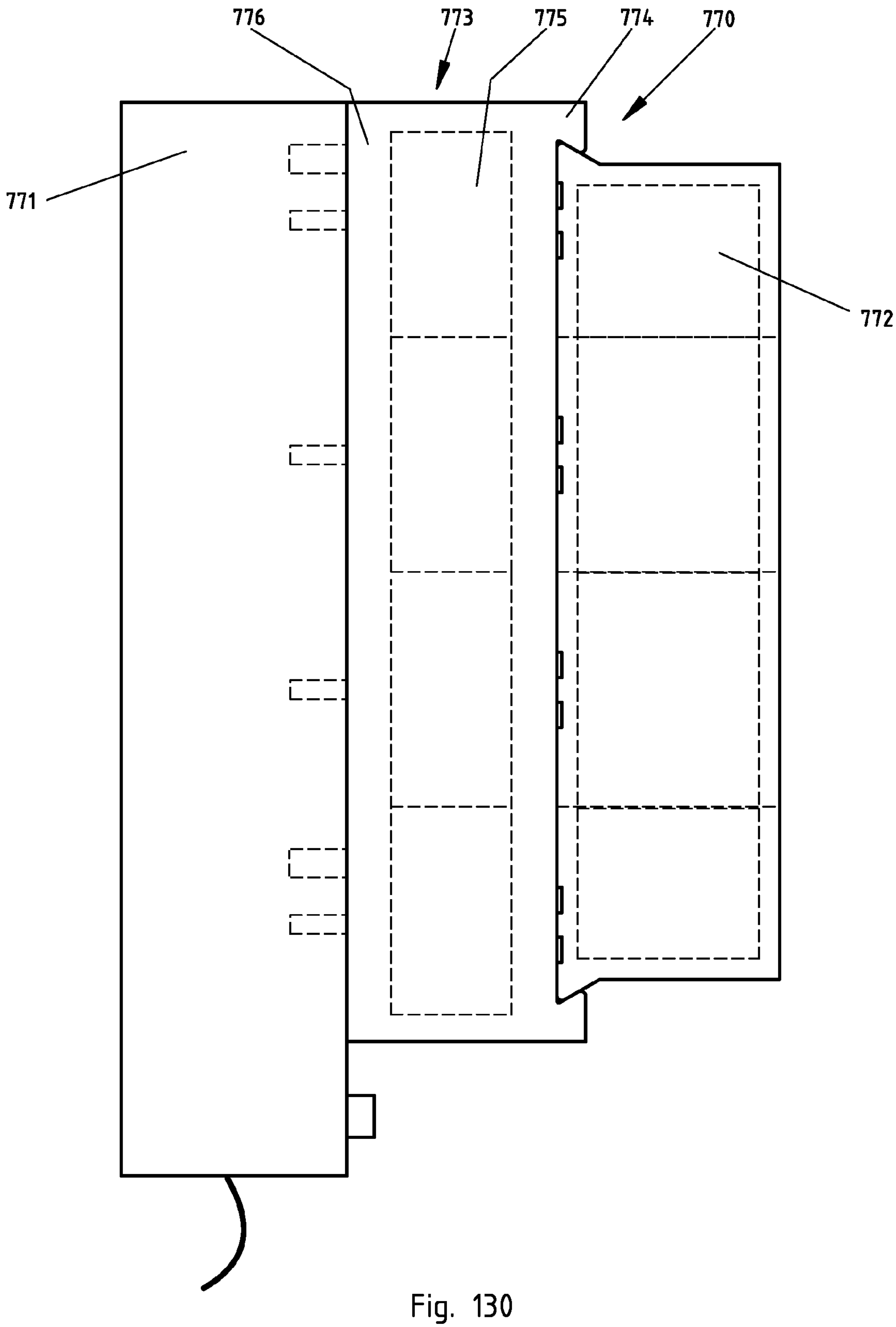
Figure 131:
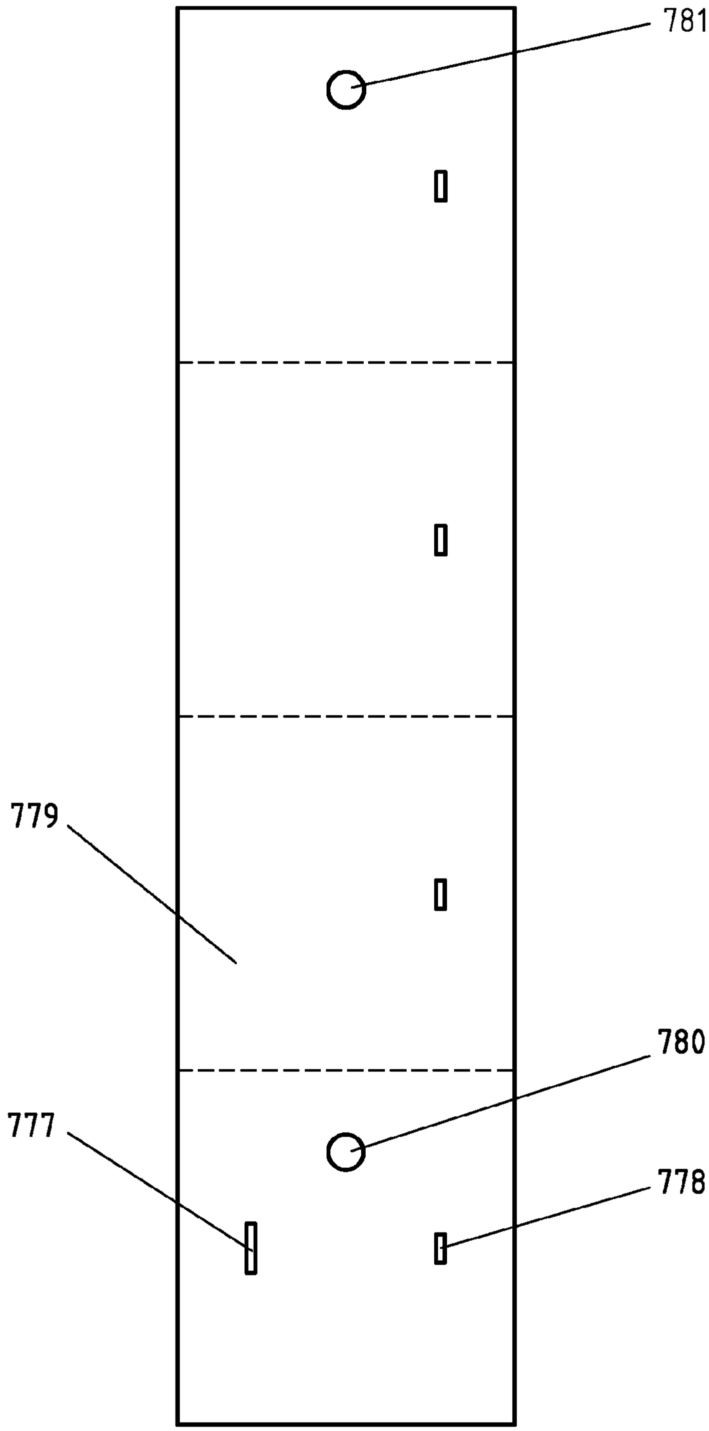
Figure 132:
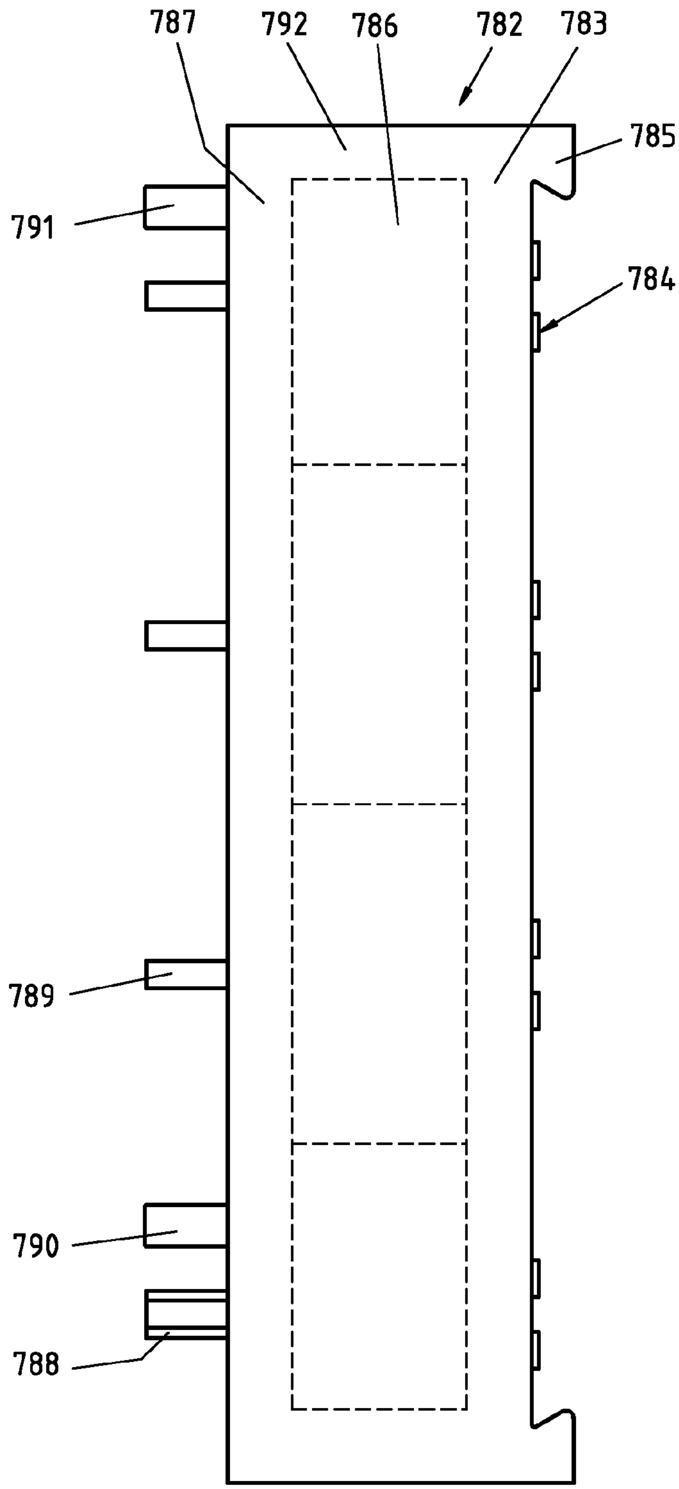
Figure 133:
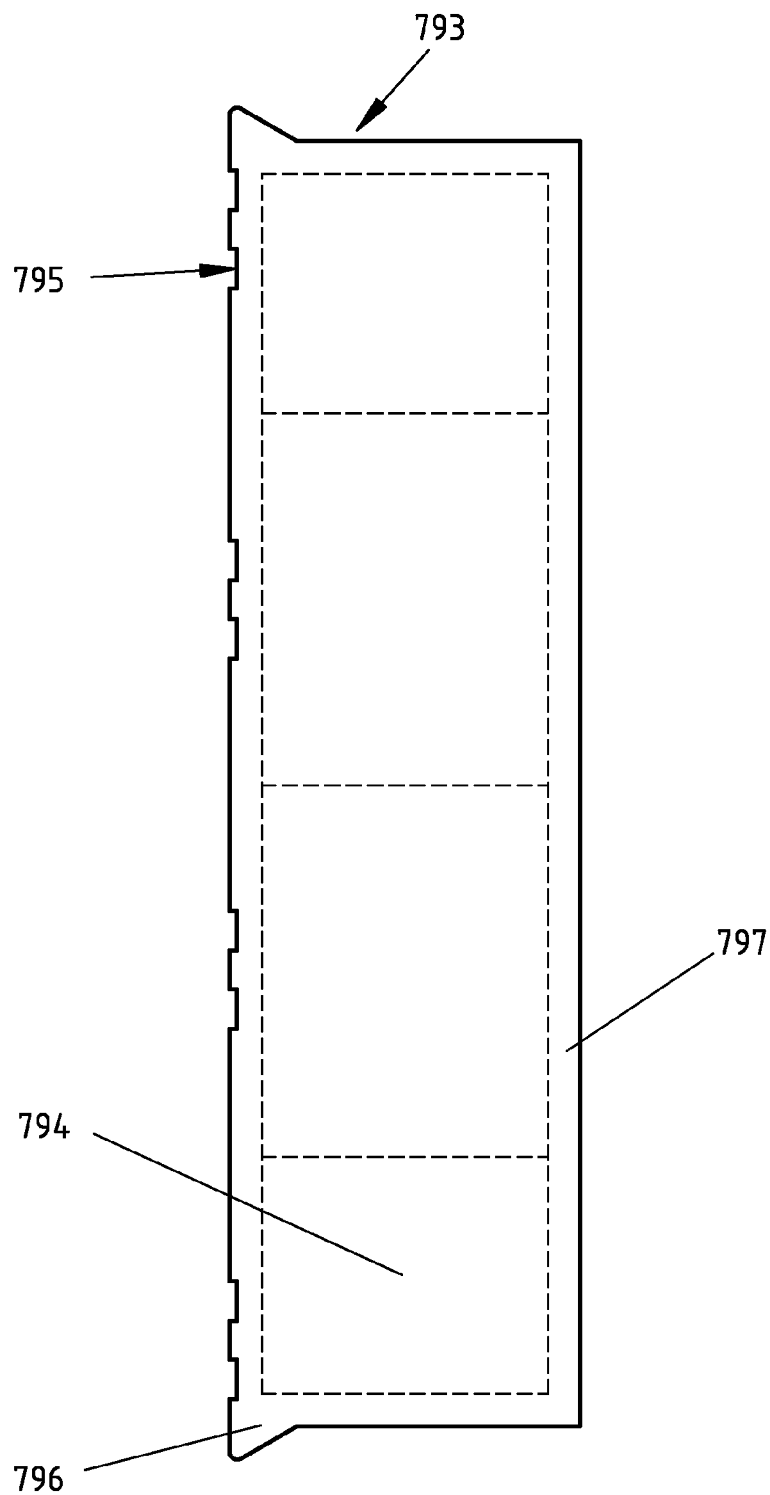
Figure 134:
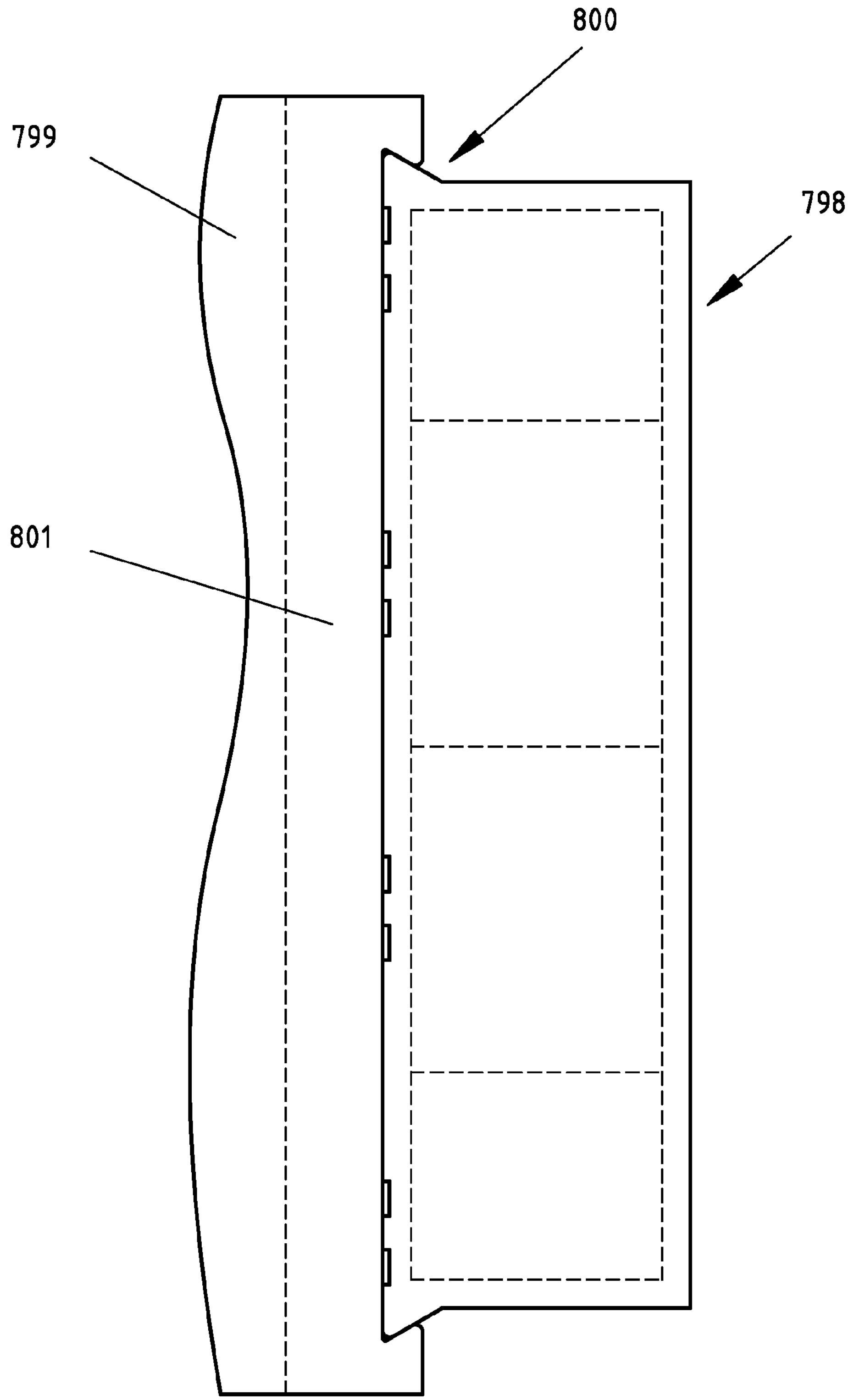
Figure 135:
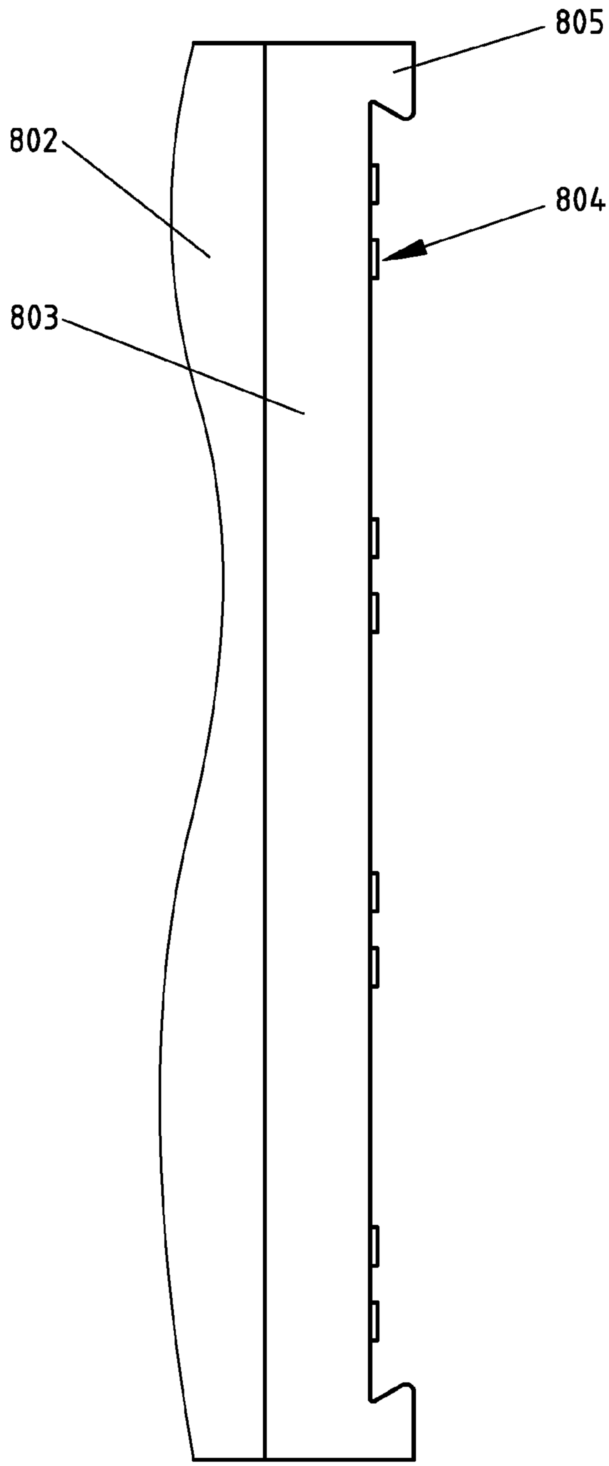
Figure 136:
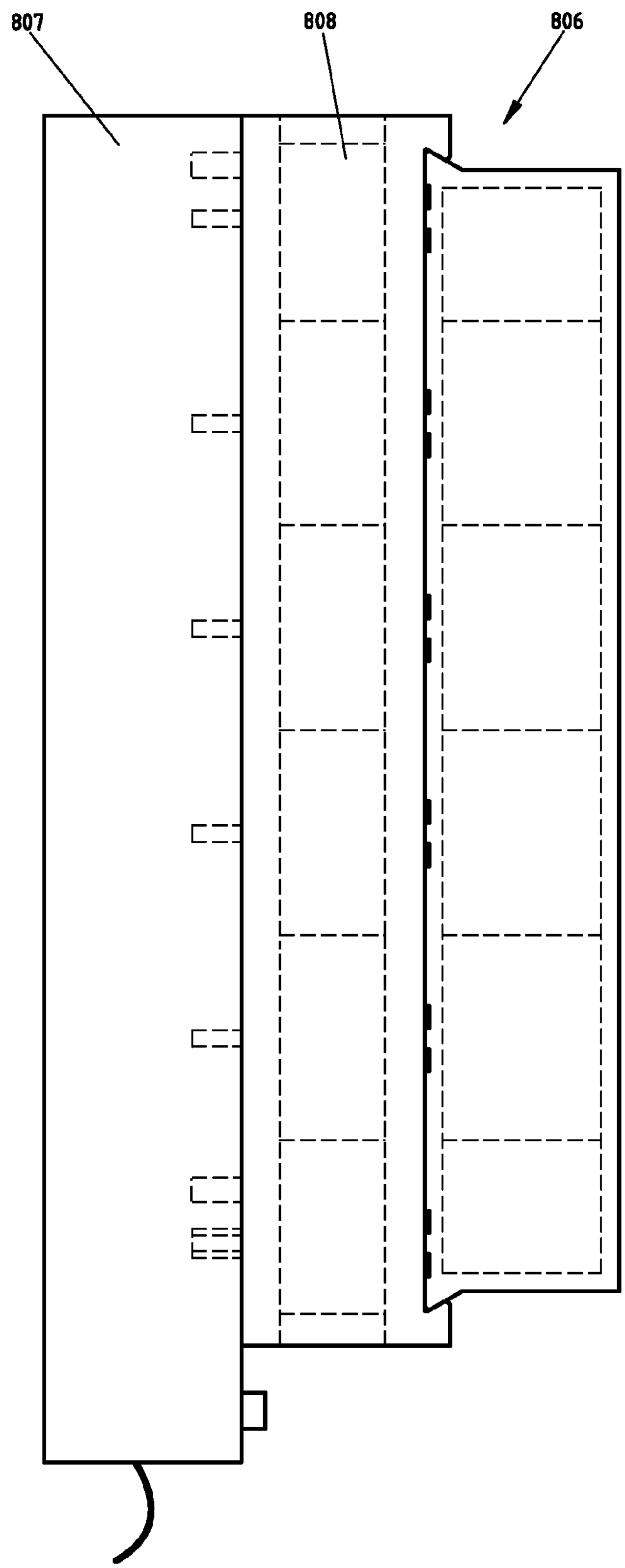
Figure 137:
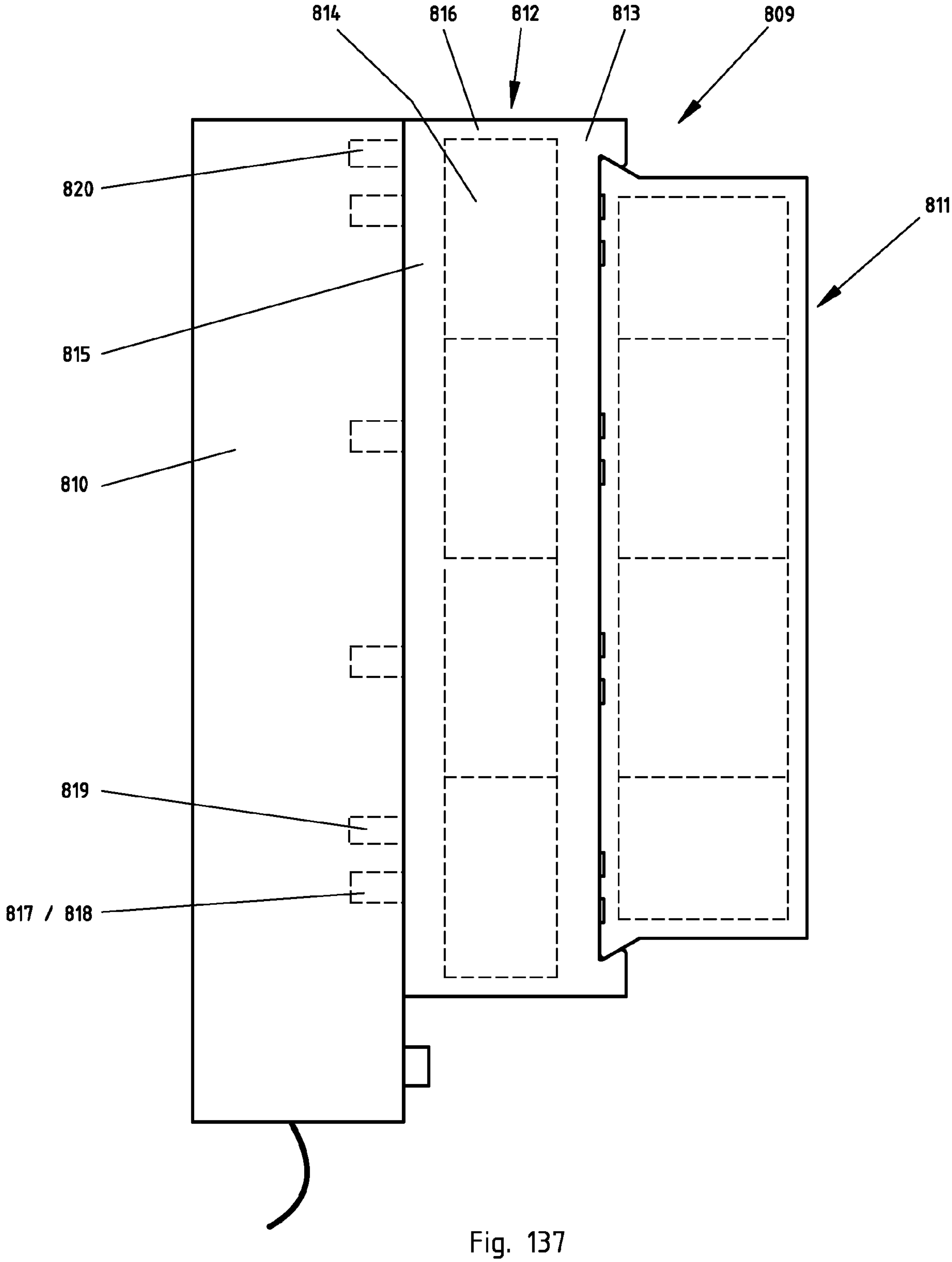
Figure 138:
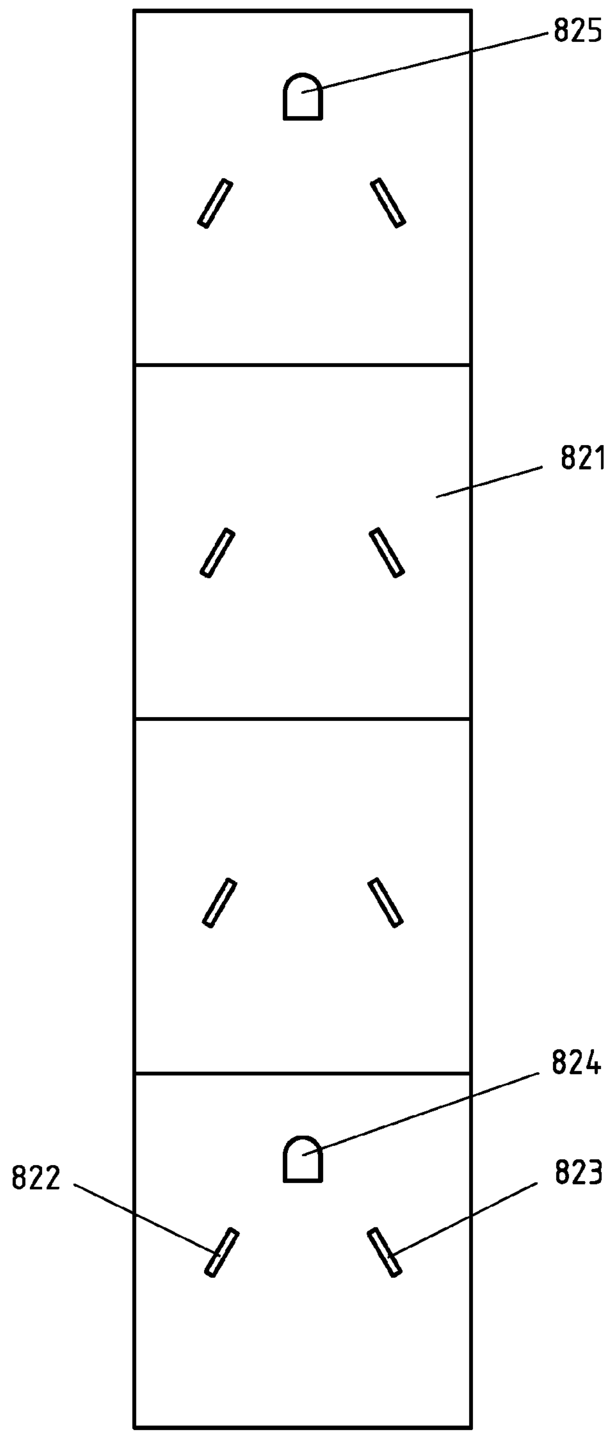
Figure 139:
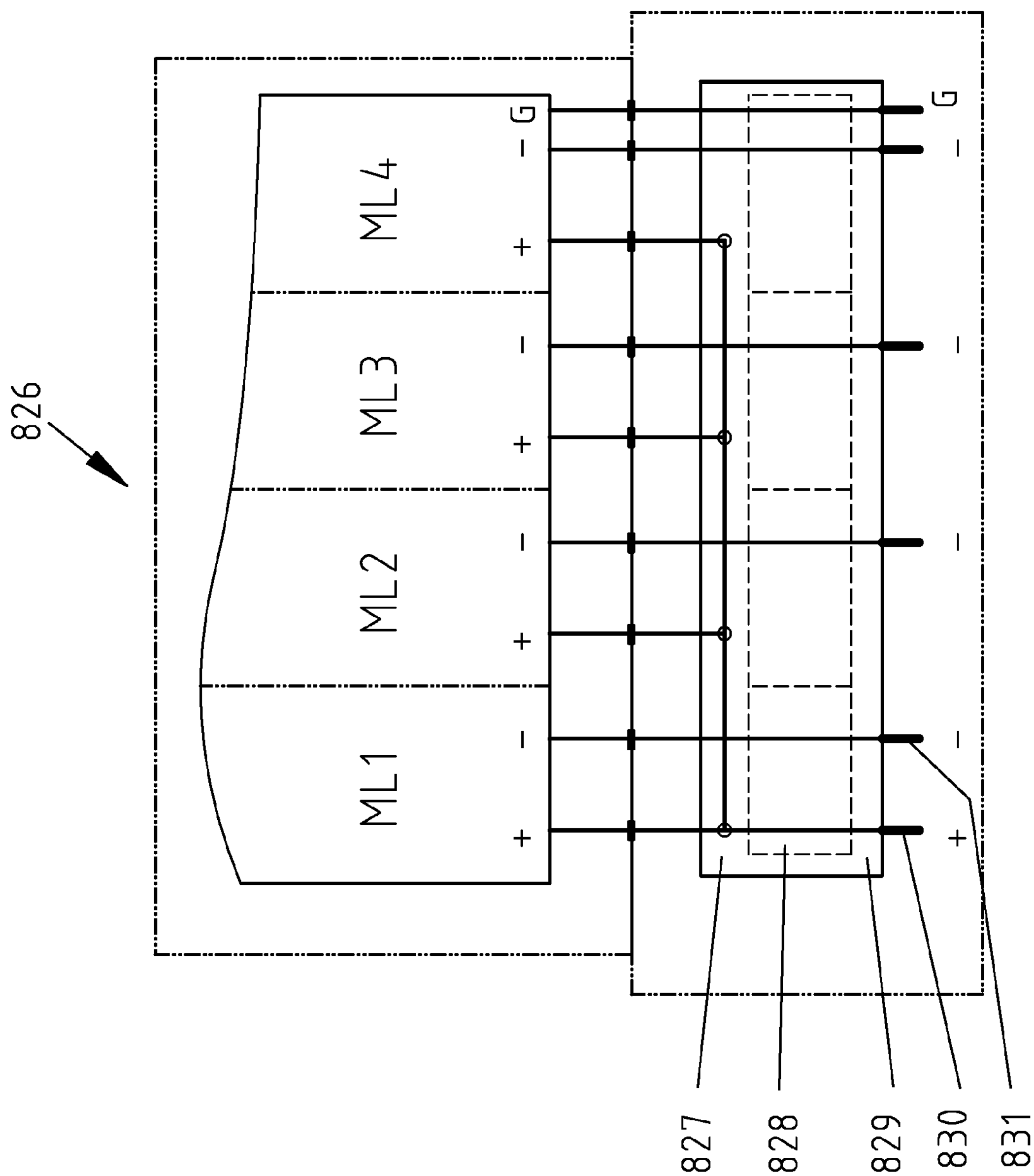
Figure 140:
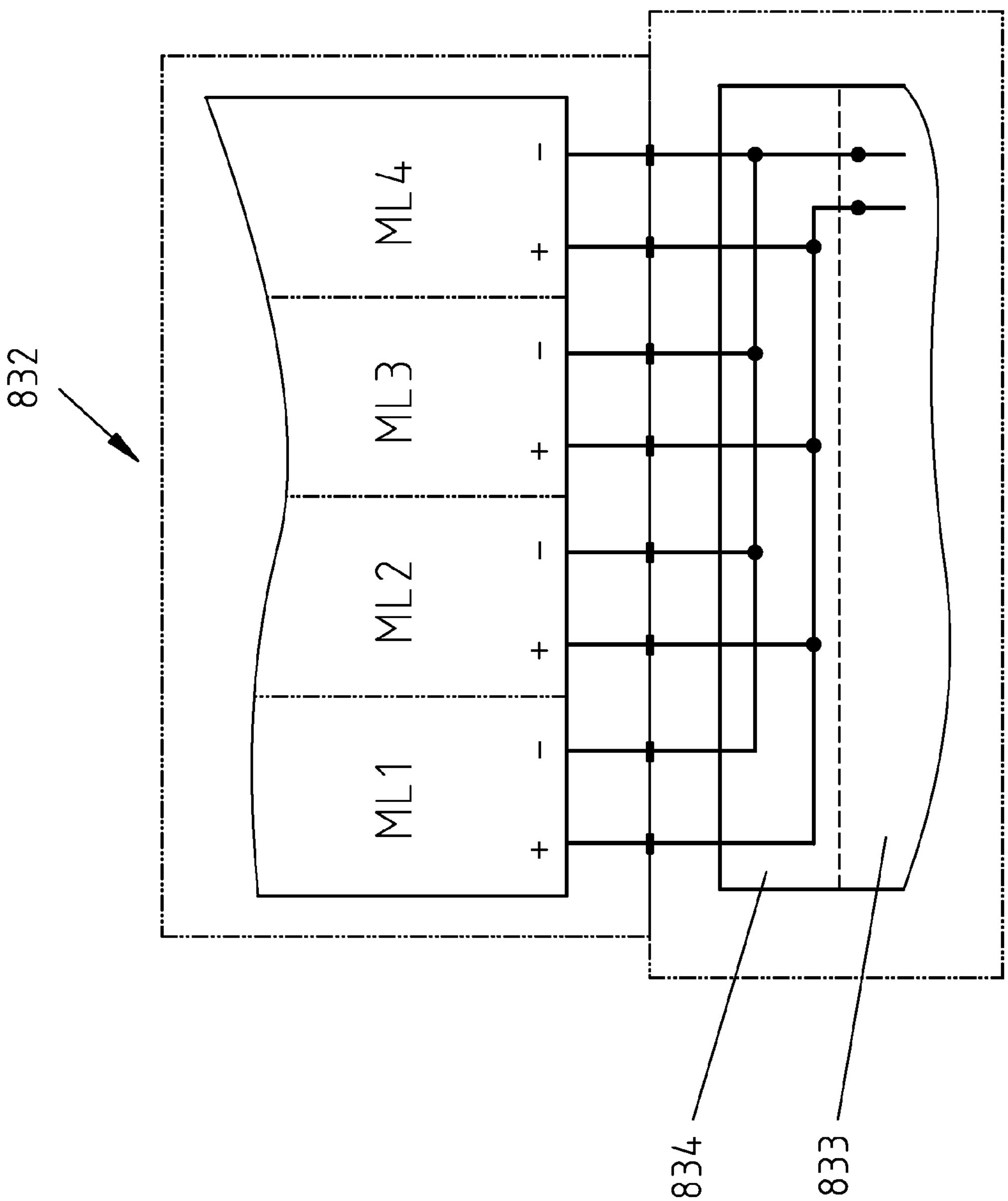
Figure 141:
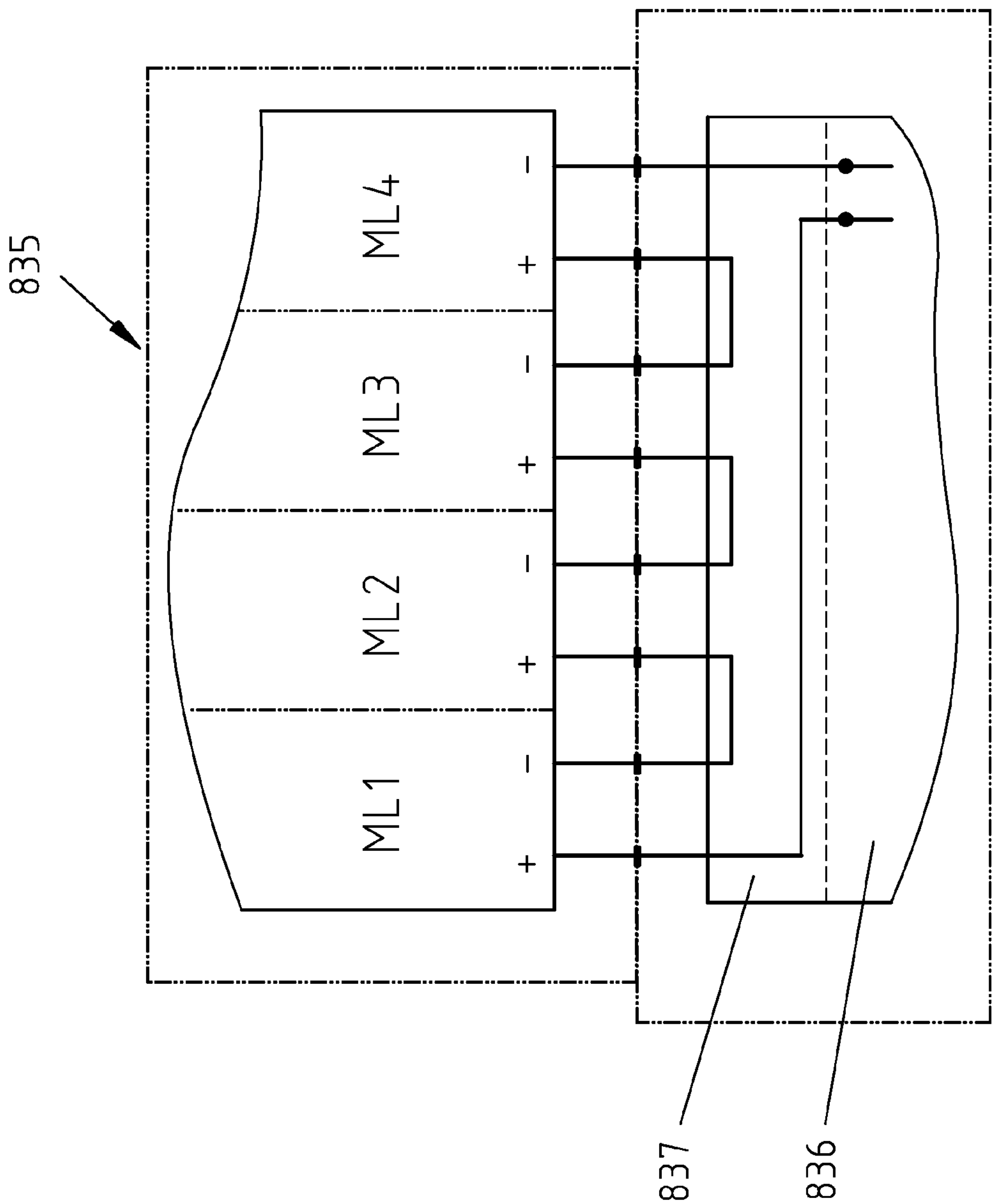
Figure 142:
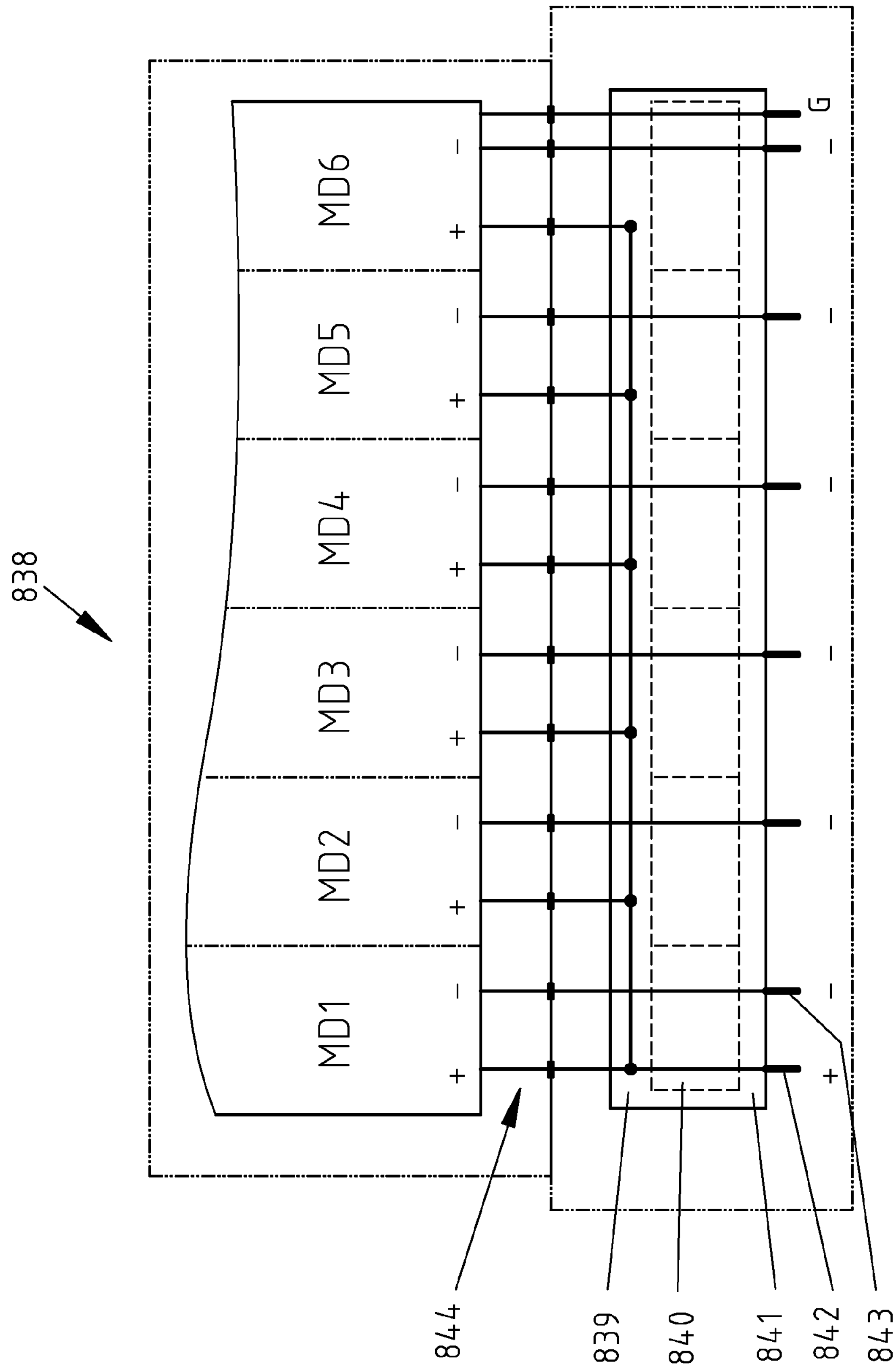
Figure 143:
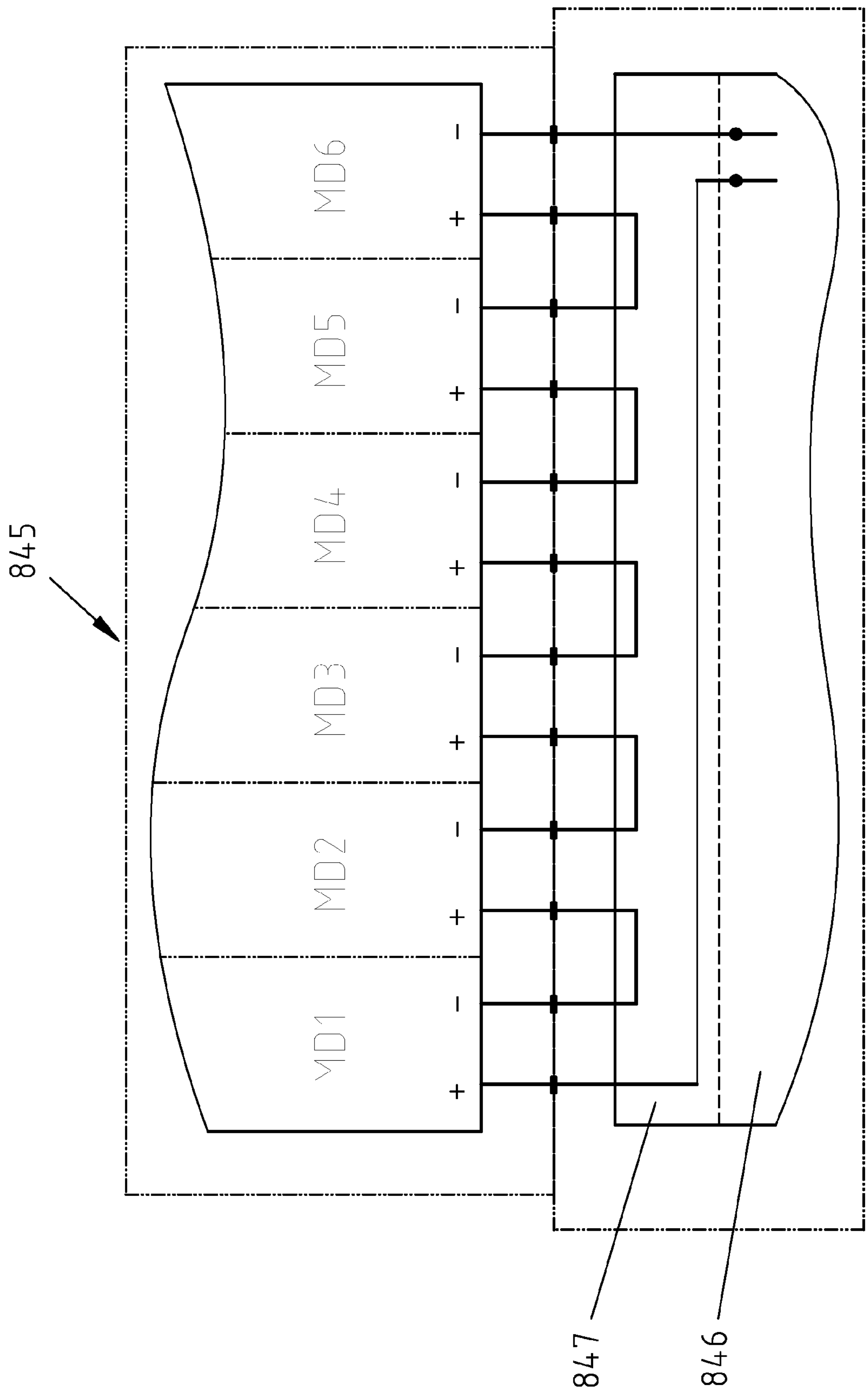

FIG. 124 shows two multi-contacts chargers, charging simultaneously an electric vehicle having double inlet and plugging in the two plugs of the recharging terminal in a double 120V outlet;

FIG. 125 presents a fast battery recharging equipment, where the charger is connected to an independent power supply unit, which supplies 240V at 7 Kw, being plugged into an AC 2 phase 240V outlet;

FIG. 126 shows two multi-contact chargers, charging simultaneously an electric vehicle having double inlet and plugging in the two plugs of the recharging terminal in a double 240V outlet;

FIG. 127 shows a four contacts bar of AC 1 Phase 120V, used to plug in a battery recharging terminal;

FIG. 128 shows a six contacts bar of AC 1 Phase 120V, used to plug in a battery recharging terminal;

FIG. 129 shows a four contacts bar of AC 2 Phase 240V, used to plug in a battery recharging terminal;

FIG. 130 shows an embodiment of the integrated battery recharging system ensemble in recharging mode, for four AC 1 phase 120V independent power supply units, connected to a four contacts electrical bar;

FIG. 131 is the power station inlet view of a four contacts bar of AC 1 Phase 120V;

FIG. 132 shows the integrated recharging terminal of a four independent power supply units assembly of AC 1 Phase 120 Vh;

FIG. 133 shows a battery assembly comprising four modules, four pairs of electrical contacts, attaching elements and a battery box;

FIG. 134 shows an embodiment of a battery assembly in supplying mode, where the battery assembly is attached to an equipment via an attaching system and a supplying contact plate;

FIG. 135 shows an embodiment of an equipment integrated with a supplying contact plate with its elastic contacts and a battery attachment element;

FIG. 136 shows an embodiment of an integrated battery recharging system ensemble, in recharging mode, for six AC 1 phase 120V independent power supply units, powered by four contacts electrical bar, via an integrated supplying terminal: station;

FIG. 137 shows an embodiment of an integrated battery recharging system ensemble in recharging mode, for four AC 2 phase 240V units, connected to a four contacts electrical bar;

FIG. 138 is the power station inlet view, showing the four pairs of plugs for phase 1 and for phase 2, of the four AC 2 phase 240V independent power supply units;

FIG. 139 is a wiring diagram of a four modules off-board battery assembly connected in parallel, shown in recharging mode, using a recharging contact plate, four independent power supply units, each one connected directly to a AC 1 phase 120V independent power supply unit;

FIG. 140 shows the four modules off-board battery assembly, in supplying mode, being connected in parallel and connected to an equipment via a supplying contact plate;

FIG. 141 shows the four modules off-board battery assembly, in supplying mode, being connected in series and connected to an equipment via a supplying contact plate;

FIG. 142 is a wiring diagram of a six modules off-board battery assembly in recharging mode, connected in parallel, using a recharging contact plate 835, six independent power supply units, each independent module being connected directly to a AC 1 phase 120V independent power supply unit;

FIG. 143 shows a six modules off-board battery assembly, in supplying mode, being connected in series and connected to an equipment via a supplying contact plate.

DETAILED DESCRIPTION OF PREFERRED EMBODIMENTS

The present invention relates to a fast rechargeable battery assemble and a recharging equipment configured to recharge a battery in a very short period of time. This new design comprises a battery split in a plurality of independent battery modules, each module having a plurality of battery cells, a battery recharging stations equipped with a plurality of independent recharging terminals, each independent recharging terminal comprising a plurality of independent power supply units, recharging simultaneously the same battery (each output of the independent power supply units being connected to a single independent battery module), a plurality of multi-contacts equipment battery inlets and a plurality of independent multi-contacts chargers, each one connected to the plurality of independent power supply units, fitting to the multi-contacts equipment battery inlets. The advantage consists in a drastic reduction of the total battery recharging time, increasing the performance of each recharging terminal of the battery recharging station in the same proportion. This invention may be applied to any kind of electric vehicles like electric bikes, electric motorcycles, electric cars, electric SUV's, electric light trucks, electric trucks, electric heavy electric trucks, electric buses, etc. It is possible to be applied to cordless powered tools and equipment as well. By a superior efficiency of the battery recharging station, the number of the vehicles served per day increases and in the same time the area of the land occupied by the recharging station is reduced proportionally. Bigger the number of independent power supply units per recharging terminal, shorter is the battery recharging time and smaller the area of the recharging station. For the same efficiency, (same number of vehicles recharged per day) the price of the recharging station will be drastically reduced. For example, using 15 independent battery modules per battery connected to 15 independent power supply units of −1 phase AC or DC or to 5 independent power supply units of 3 phase AC), the required recharging time and space are reduced by a factor of 15. So, for example, for an EV requiring 40 minutes to recharge the battery with the actual equipment, it will be necessary only 2.66 minutes for full recharge using the new equipment. Also, a single recharging station will be able to cover 15 times more EV's per day, equivalent of 15 actual recharging stations, occupying a land 15 times smaller, which is a great advantage in the big cities where the space is very precious. Depending on which kind of independent power supply units are used, DC or AC, the number of the independent power supply units may be different for the same performance of the recharging station. A three phase AC independent power supply unit is approximately equivalent with three DC independent power supply units or 3 one phase AC independent power supply units. Therefore, taking the same example, in order to cover 15 outputs (for 15 inputs of the battery modules) will be necessary 15 DC or 15 one phase AC independent power supply units or only 5 of three phase AC independent power supply units per recharging terminal. Each charger is an independent multi-contacts chargers and each battery inlet is an independent multi-contacts equipment battery inlet having one single null (positive) terminal, one protective earth terminal, and 15 negative terminals, for a total of 17 terminals.

Figure 1:
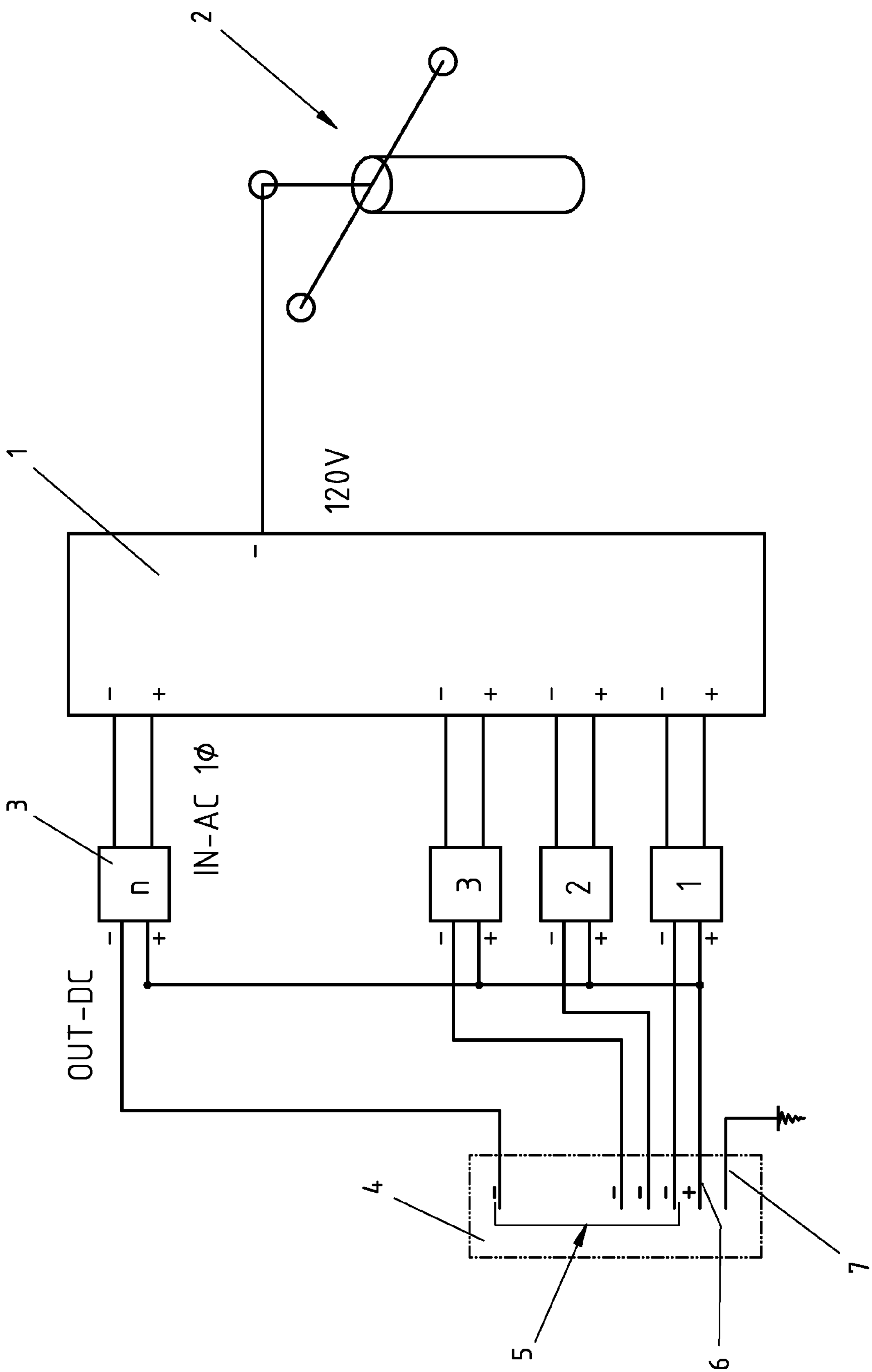
FIG. 1 is a wiring diagram of a recharging terminal using a plurality of DC independent power supply units.
Figure 2:
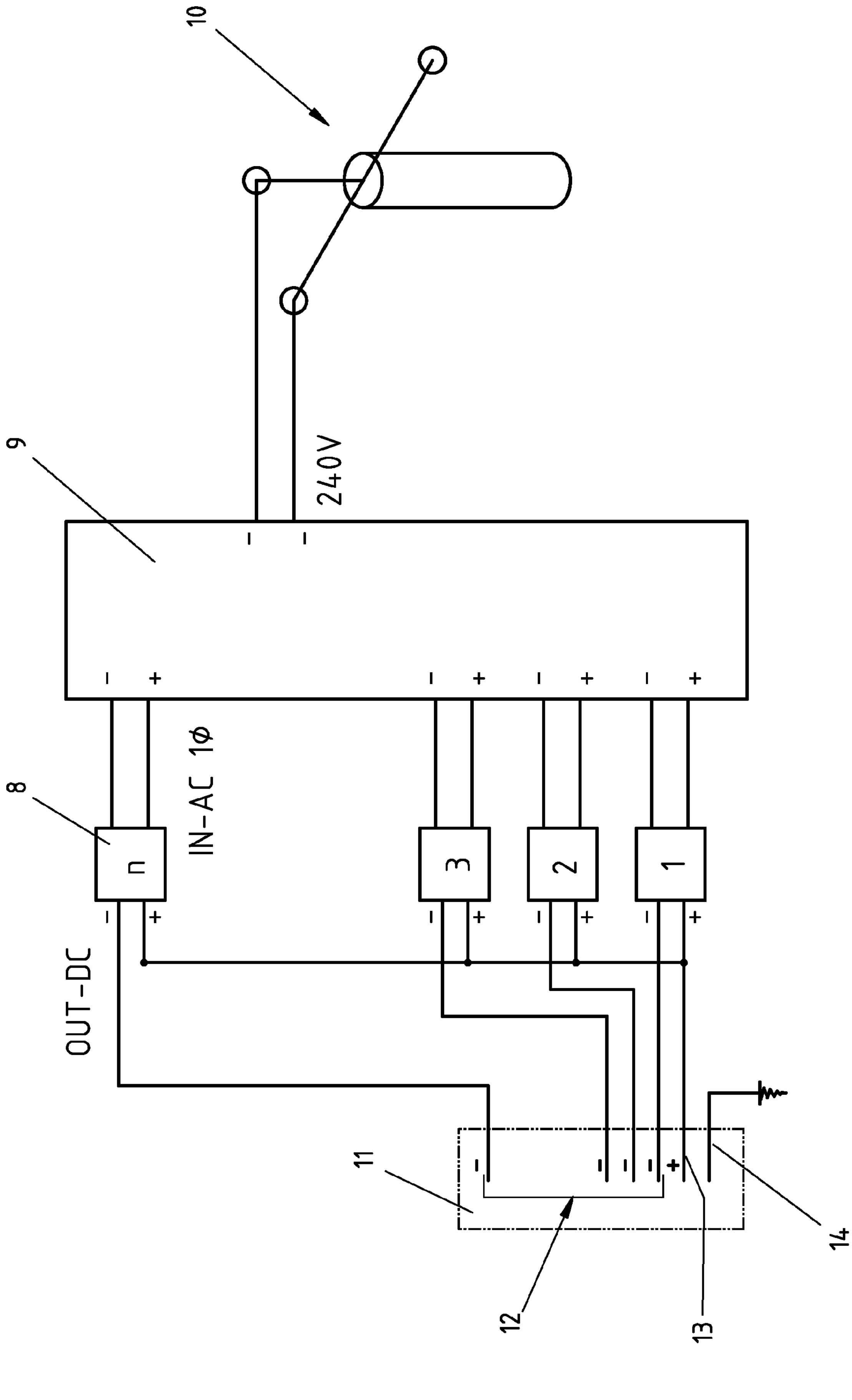
FIG. 2 is a wiring diagram of a recharging terminal using a plurality of one phase AC power supply units.
Figure 3:
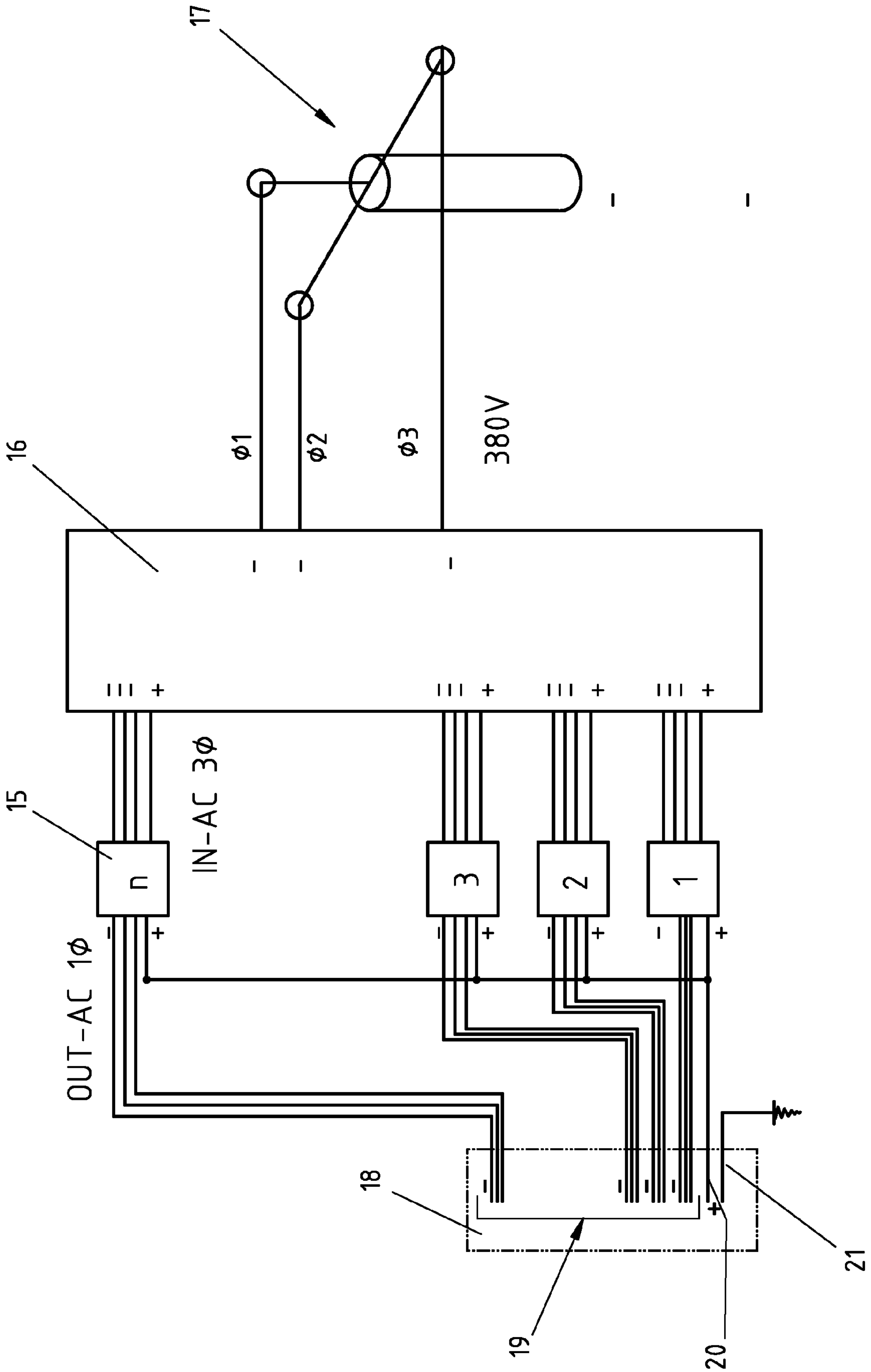
FIG. 3 is a wiring diagram of a recharging terminal using a plurality of three phase AC power supply units.
Figure 4:
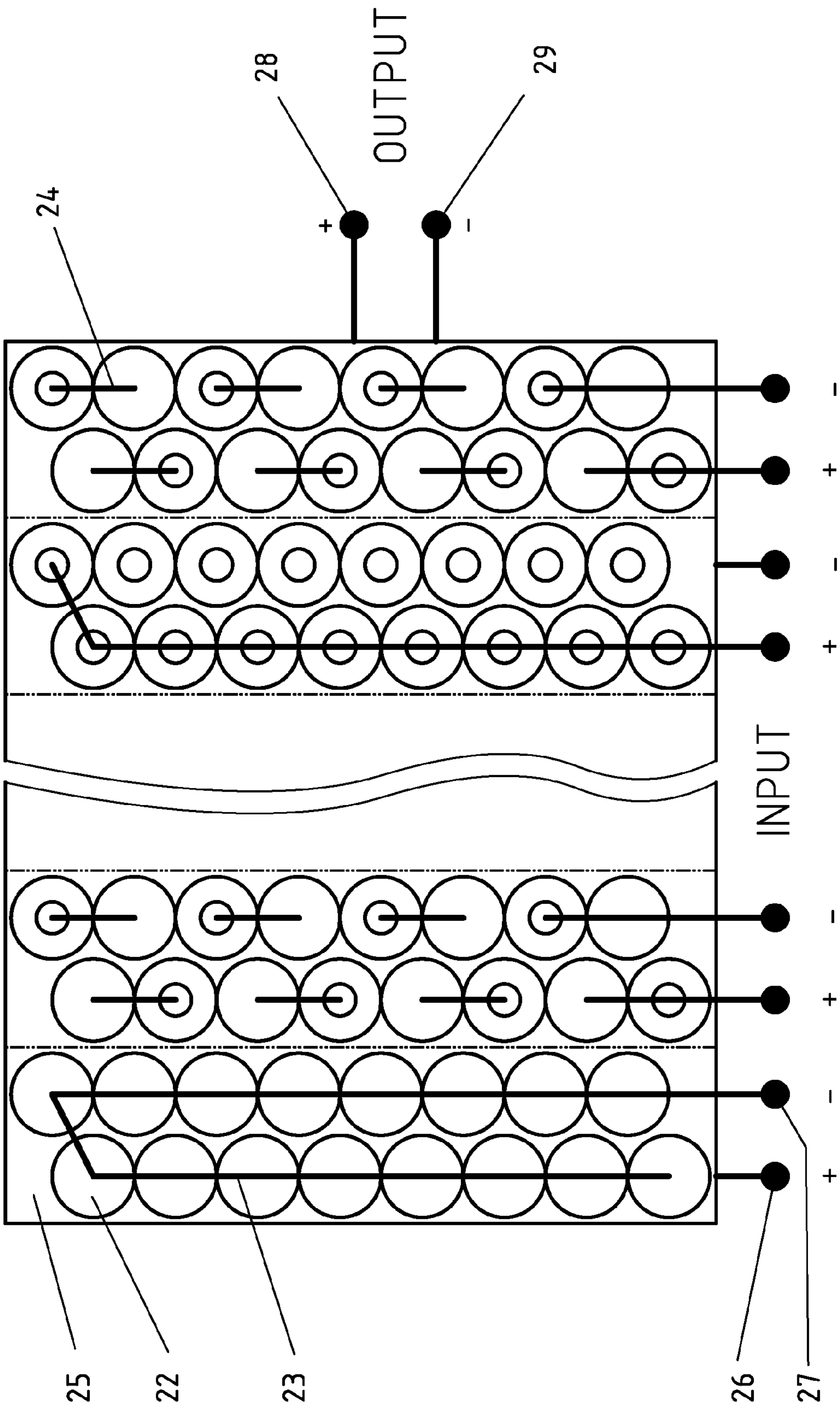
FIG. 4 shows a battery structure.
Figure 5:
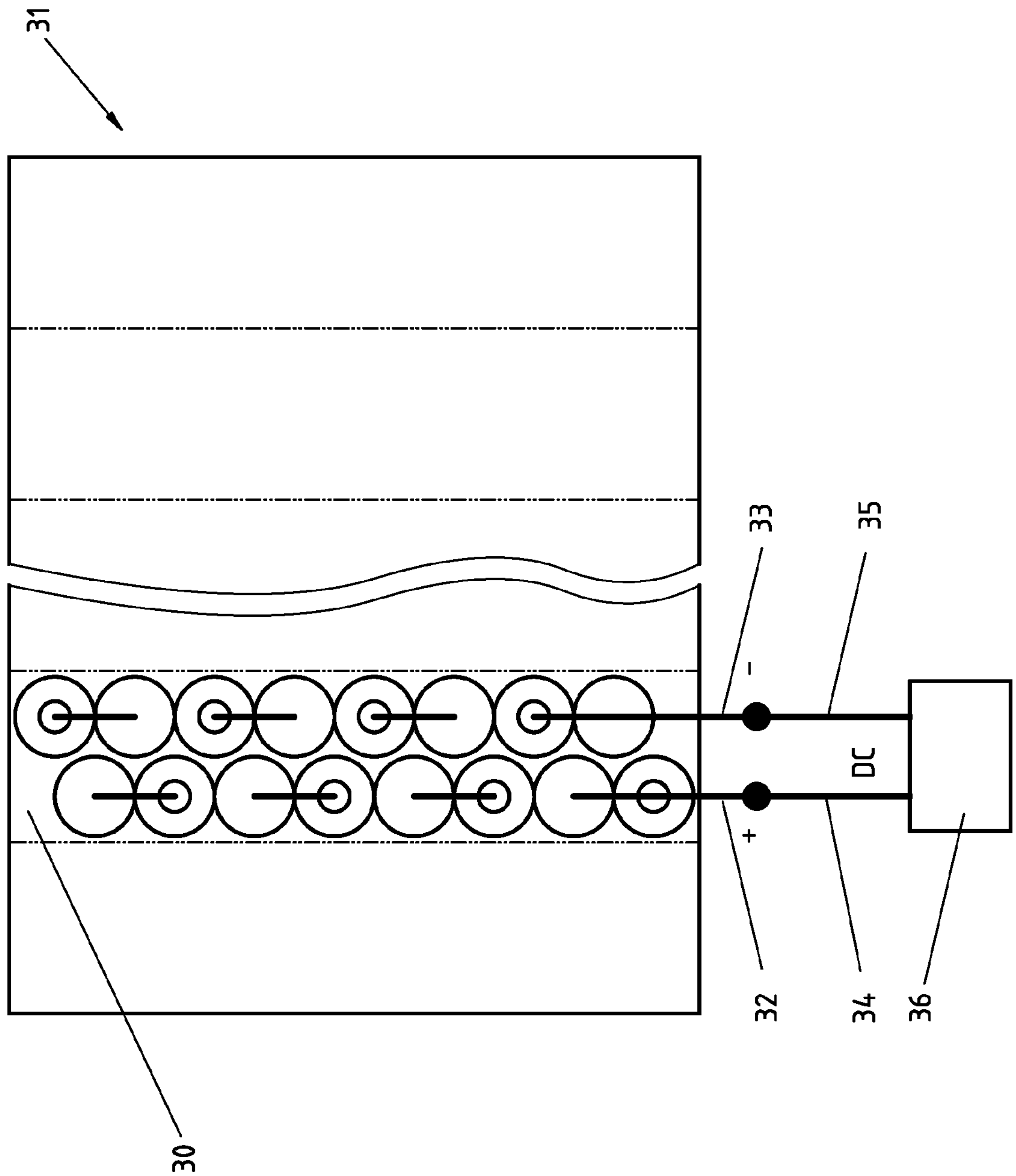
FIG. 5 shows a battery module of the battery in recharging mode.
Figure 6:
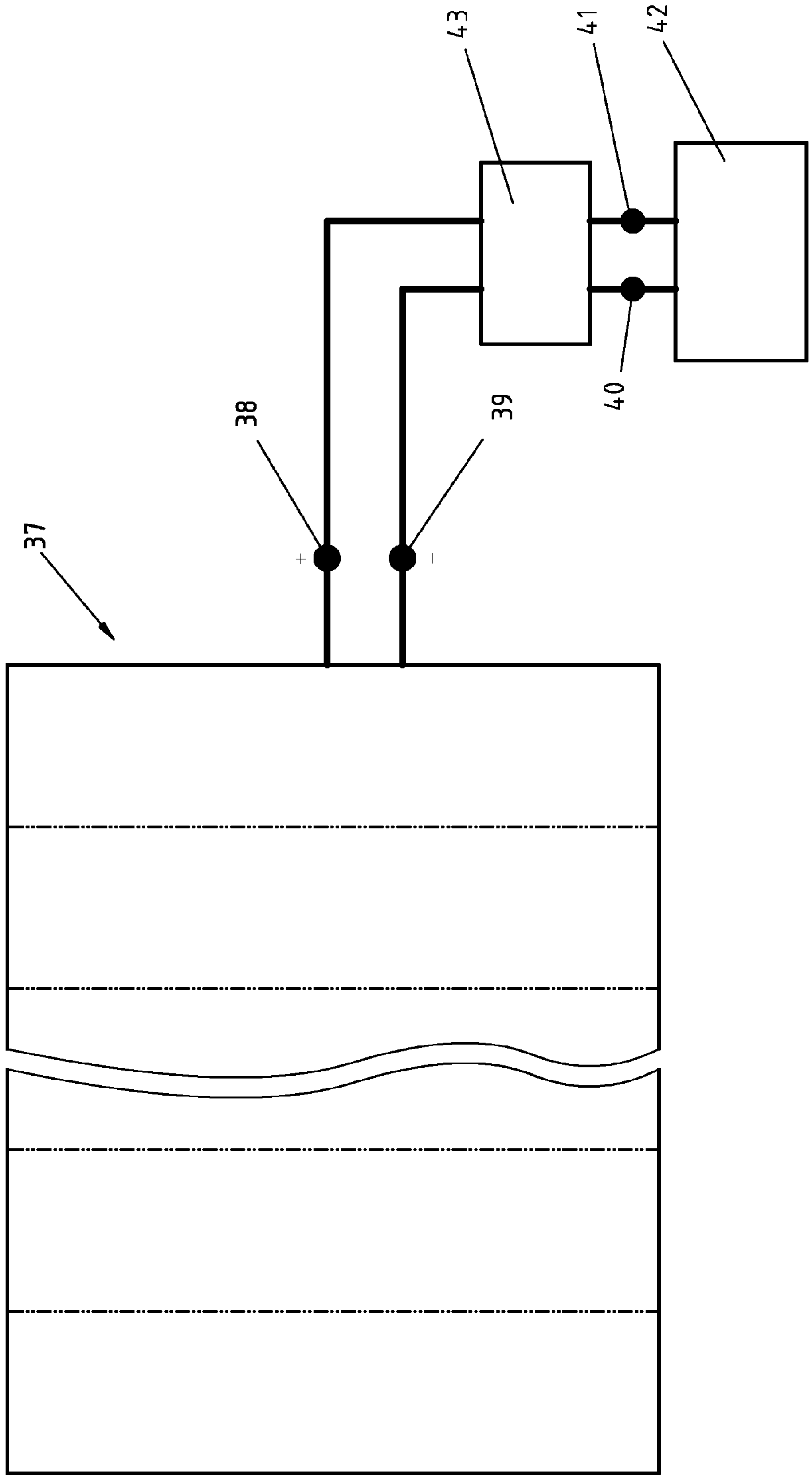
FIG. 6 shows a battery in supplying mode.

In FIG. 1 is illustrated the electrical wiring diagram of a recharging terminal using a plurality of DC independent power supply units, comprising a power station 1 powered by 120V, connected to the power grid 2. The power station 1 has "n" DC pairs of outputs positive and negative, powering the "n" independent power supply units 3. The "n" negative outputs of the "n" independent power supply units 3 are connected to an independent multi-contacts charger 4, having the "n" negative terminals 5, a single null 6 and one protective earth terminal 7. In FIG. 2 is illustrated the electrical wiring diagram of a recharging terminal using a plurality of one phase AC independent power supply units 8, comprising a power station 9 powered by 240V having "n" one phase AC pairs of outputs positive and negative, powering the "n" independent power supply units 8 which is connected to the power grid 10. The "n" outputs of the "n" independent power supply units 8 are connected to an independent multi-contacts charger 11, having the "n" negative terminals 12, a single null 13 and one protective earth terminal 14. In FIG. 3 is illustrated the electrical wiring diagram of a recharging terminal using a plurality of three phase AC independent power supply units 15, powered by a power station 16 of 380V or more, connected to the power grid 17. This power station 16 has "n" negative AC triplets of outputs and "n" positive terminals, powering the "n" three phase AC independent power supply units 15. The "n" negative triplets of outputs and one single positive output of the "n" independent power supply units 15 are connected to an independent multi-contacts charger 18, having a single null 20, one protective earth terminal 21, and "n" negative triplets of the terminal 19, for a total of "3×n" negative terminals, capable to power "3×n" independent battery modules simultaneously. So, the advantages to use the three phase AC independent power supply units consists in a reduced number of independent power supply units for a battery having the same number the independent battery modules (one third of the number of DC or one phase AC independent power supply units), reducing the cost and the space occupied by the recharging station. The battery is split in a plurality of independent battery modules, each one of these independent battery modules having a plurality of battery cells connected to a pair of independent positive and negative terminals, which are direct connected to an independent power supply unit—in recharging mode, and in supplying mode all these independent terminals being connected to a main battery terminal with a single pair of terminals positive and negative. For any independent power supply units (DC or AC), the charger has a plurality of terminal contacts, which have to be connected to a plurality of independent battery modules. The batteries are working in two modes: recharging mode, using the plurality of the independent terminals of the independent battery modules as battery input terminals and supplying mode, using a main battery terminal one positive and one negative, (one for all the independent battery modules of each battery. In FIG. 4 is shown the battery structure, comprising a plurality of battery cells 22 connected each other in parallel 23, or in series 24, creating an independent battery module 25, each independent battery module having two terminals: one positive 26 and one negative 27. Each battery is acting in two different modes: recharging mode and supplying mode. In recharging mode each independent battery module is connected to one output terminal of an independent power supply unit, via the independent multi-contacts charger. For supplying mode, each independent battery module is connected each other and all are connected to only a main battery terminal, having one positive terminal 28 and to one negative terminal 29. In FIG. 5 is shown an independent battery module 30 of the battery 31 in recharging mode, where it is connected by its input terminals 32 and 33 to the output terminals 34 and 35 of the independent power supply unit 36. In FIG. 6 is shown the battery 37 in supplying mode, having connected its two output terminals 38 and 39 to the input terminals 40 and 41 of the consumer—in this case of a EV motor 42, via the inverter 43.

This principle may be applied to on-board or off-board battery recharging mode.

On-board battery recharging means that the battery is recharged on the consumer (vehicle/cordless powered tool, etc.) without removing the battery. Characteristic of on-board battery recharging consists in the fact that it is applied to big and heavy batteries, with difficult manoeuvring capability and the battery is working in the recharging and the supplying mode in the same unique set-up. This functionality is realized by using for each battery a contact plate installed on the consumer, configured to connect each independent battery module to an independent power supply unit during the battery recharging time and to connect each independent battery module to the main battery terminal during the supplying time, by using a plurality of battery control equipment and battery command equipment.

Off-board battery recharging means that the battery is recharged outside of the consumer (vehicle/cordless powered tool, etc.). Characteristic of off-board battery recharging consists in the fact that it is applied to small and light batteries, with easy manoeuvring capability, when the battery is working in the recharging mode outside of the consumer (vehicle/cordless powered tool, etc.) and on the supplying mode the battery is working on the equipment (vehicle/cordless powered tool, etc.). Therefore, the battery may have different set-ups and separate electric circuits during the recharging and during the supplying time. This functionality is realized by using for each battery two different contact plates: a supplying contact plate installed on the consumer, configured for battery power supplying mode (connecting all the independent battery modules to a unique contact plate supplying terminal) and a recharging contact plate installed outside of the consumer, on the battery recharging equipment, (directly connecting all the independent battery modules of the battery to the independent power supply units).

Figure 7:
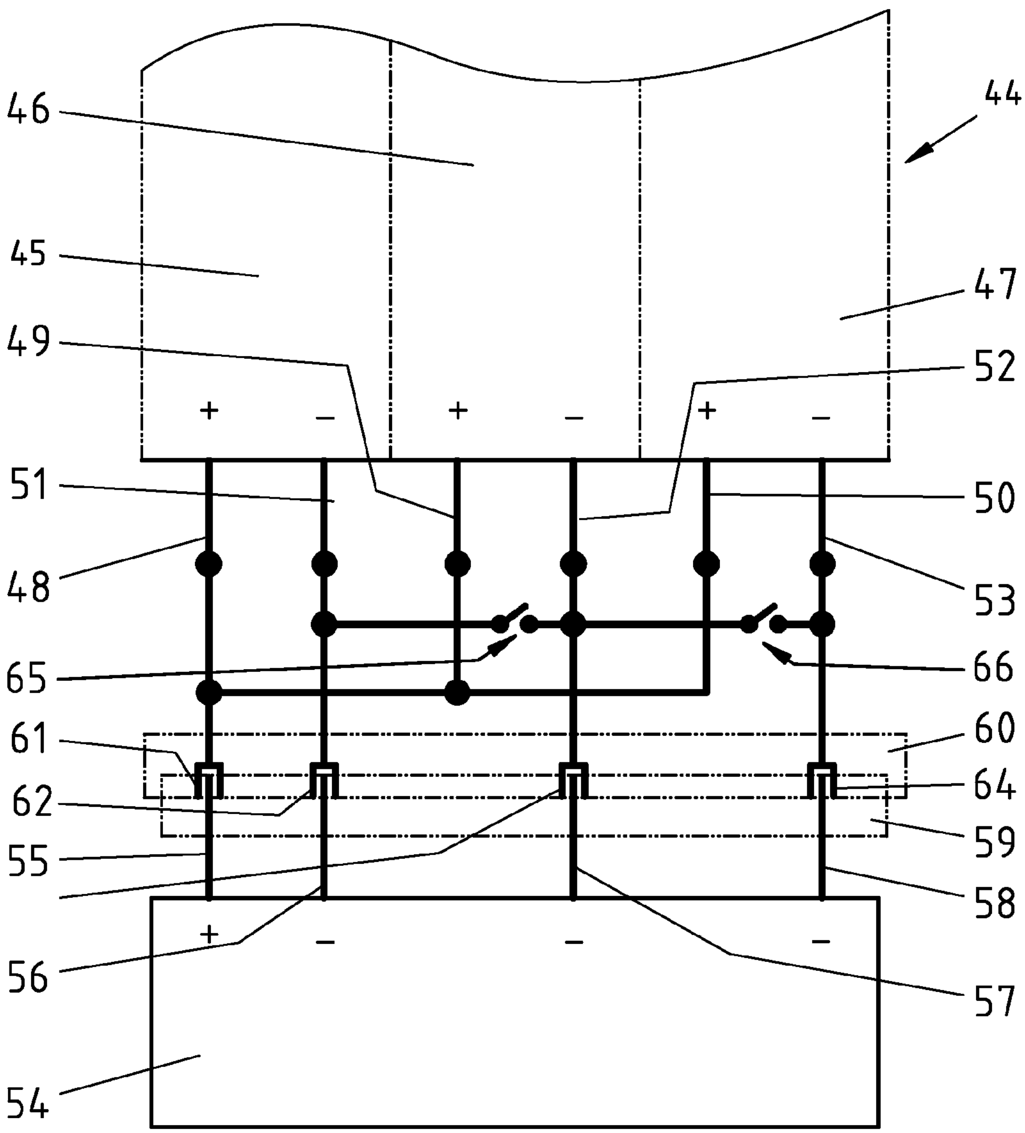
FIG. 7 shows a wiring diagram of a battery triplet having the three modules connected in parallel, working in recharging mode.
Figure 8:
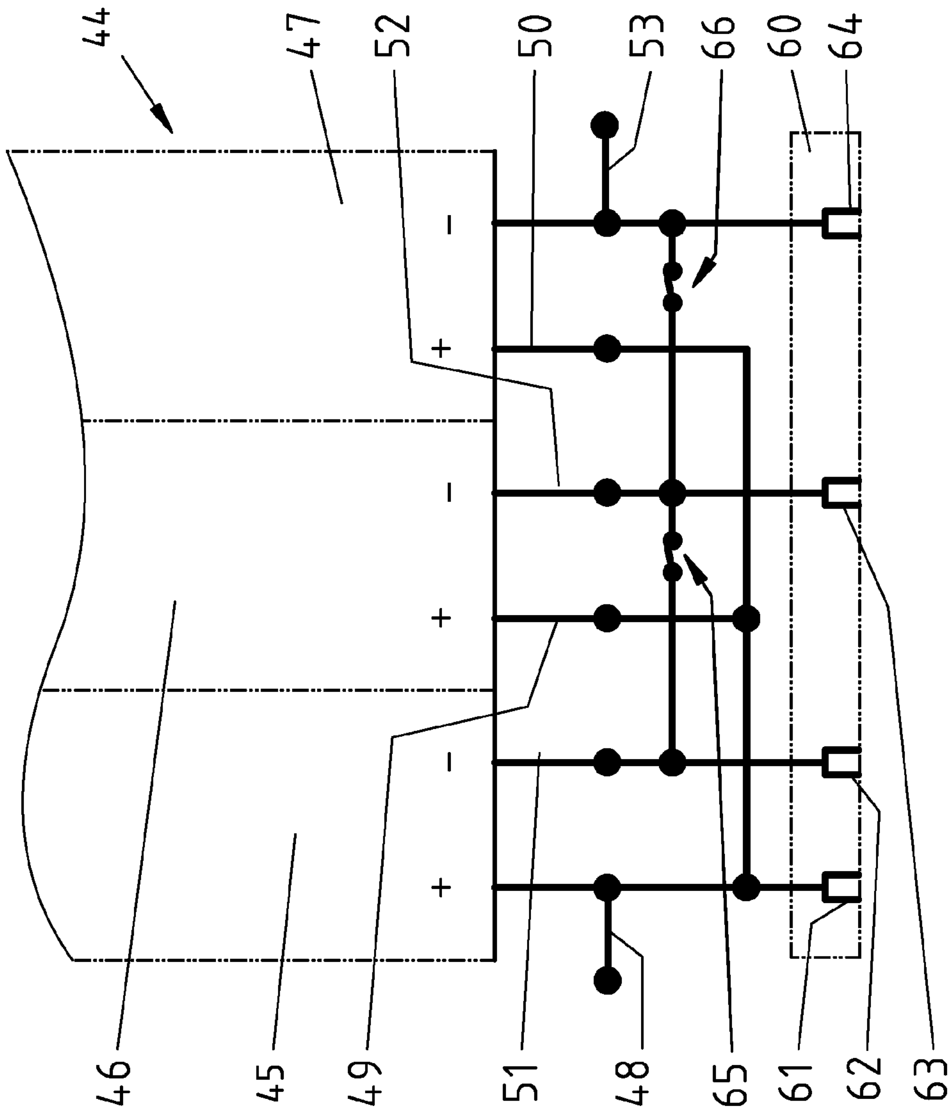
FIG. 8 shows a wiring diagram of a battery triplet having the three modules connected in parallel, working in supplying mode.
Figure 9:
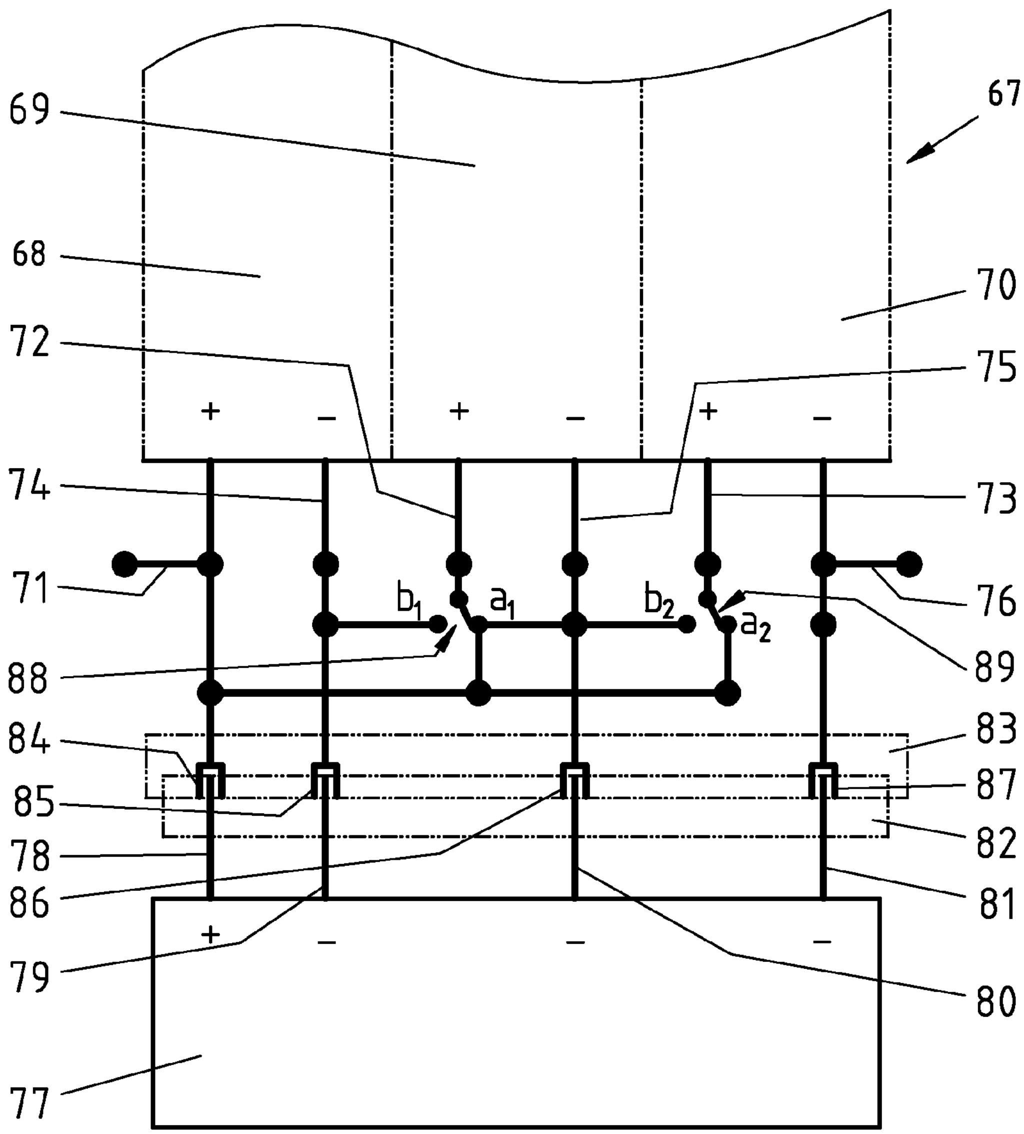
FIG. 9 shows a wiring diagram of a battery triplet having the three modules connected in series, working in recharging mode.
Figure 10:
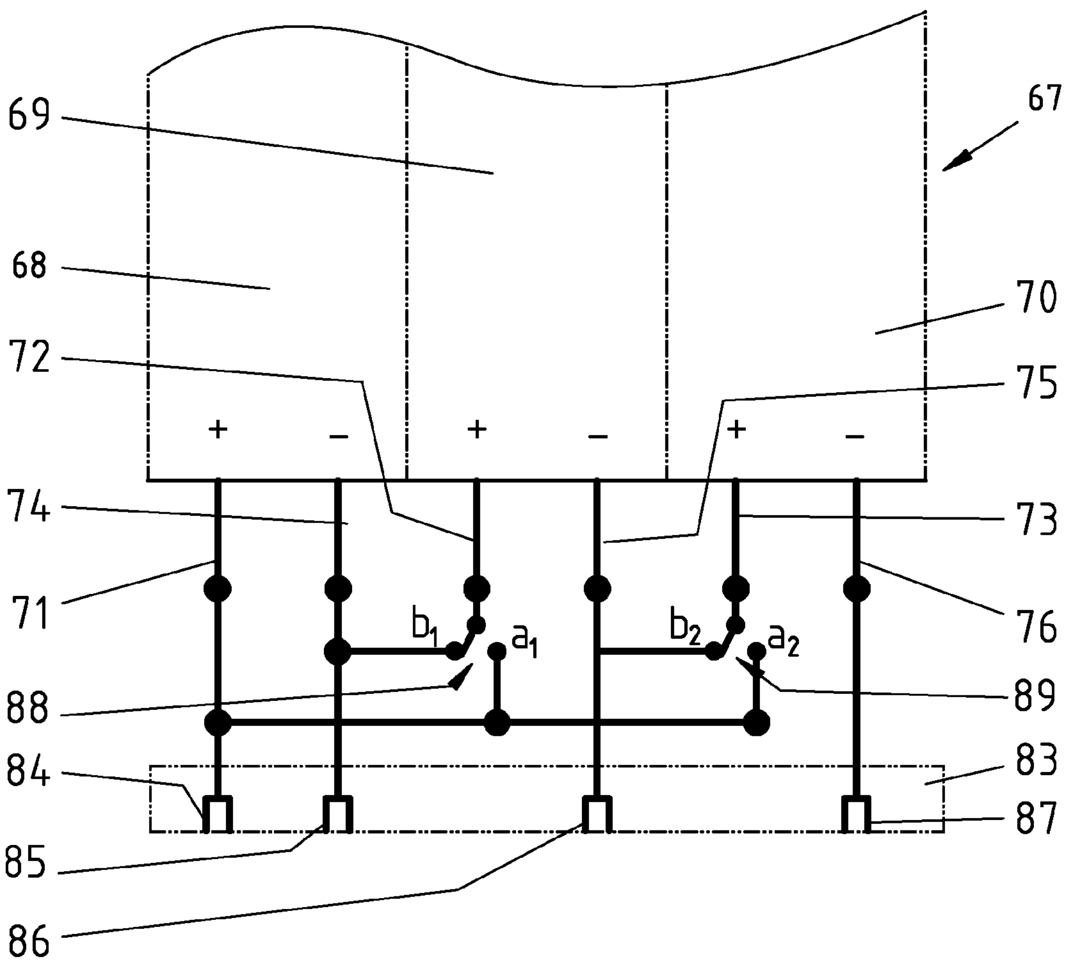
FIG. 10 shows a wiring diagram of a battery triplet having the three modules connected in series, working in supplying mode.

On-board battery recharging consists in the use of the battery in both modes—recharging and supplying mode, in the same set-up, meaning that the battery has to be connected to the independent multi-contacts charger by the equipment battery inlet with its plurality of input terminals and to the consumer by two battery supplying terminals one positive and one negative. Therefore, the two circuits are completely different and consequently they should be separated, and used only one at a time. This is one of the more important difference between the actual battery design and the new design proposed by this invention for on-board battery recharging. Each independent power supply unit of three phase AC is connected to three independent battery modules having one single commune positive (+) input terminal and three distinct negative (−) input terminals, forming a battery triplet. The three modules inside of a triplet may be connected in parallel or in series, depending on the producer requirements, the triplet it self having a triplet output with one positive and one negative terminal. The modules are connected in parallel by using "module switches" (two for each triplet) and are connected in series by using "module changeover switches" (two module changeover switches per triplet). A battery triplet having the three independent battery modules connected in parallel, (using two module switches 65 and 66), working in both modes (recharging and supplying mode) has the wiring diagram like in FIG. 7 and in FIG. 8. As can be seen, for the battery triplet 44, each independent battery module 45, 46 and 47 has two terminals (one positive 48, 49 and 50 and one negative, 51, 52 and 53). In FIG. 7 is shown the wiring diagram for the recharging mode, where can be seen the independent power supply unit 54 (three phase AC) with the four terminals one positive 55 and three negative 56, 57 and 58, the independent multi-contacts charger 59 connected to the battery inlet 60, (by the four connectors 61, 62, 63 and 64). The independent power supply unit 54 powers, via the independent multi-contacts charger 59 and the battery inlet 60, each of the three independent battery modules 45, 46 and 47 of the triplet 44. The three modules have a commune positive input from connector 61 and three negative inputs coming from the negative connectors 62, 63 and 64. The module switches 65 and 66 are on open position. In this way each module is direct powered by each phase of the independent power supply unit 54. In FIG. 8 is shown the wiring diagram of the same triplet 44, for the supplying mode, where the independent power supply unit is disconnected and by closing the module switches 65 and 66 the triplet 44 has the three modules 45, 46 and 47 connected in parallel each other and all are connected to the pair of triplet terminals 48 and 53. The terminals 48 (+) and 53 (−) become the positive and negative terminals of the triplet, which will serve to connect this triplet 44 to other triplets of the battery. Therefore, for each triplet of the battery with the three independent battery modules connected in parallel two module switches are requested: one on each negative cable connecting the middle module to the other two modules of the same triplet. A battery triplet having the three independent battery modules connected in series, working in both modes (recharging and supplying mode) has the wiring diagram like in FIG. 9 and in FIG. 10. As can be seen, each independent battery module 68, 69 and 70, of the battery triplet 67, has two module terminals (one positive (+) 71, 72 and 73 and one negative (−), 74, 75 and 76). In FIG. 9 is shown the wiring diagram for the recharging mode, where can be seen the independent power supply unit 77 (three phase AC) with the four terminals—one positive 78 and three negative 79, 80 and 81, the independent multi-contacts charger 82 connected to the battery inlet 83, (with the four connectors 84, 85, 86 and 87). The independent power supply unit 77 powers each of the three independent modules 68, 69 and 70 of the triplet 67 via the charger 82 and the battery inlet 83. The three independent modules have a commune positive input from connector 84 and each of the three negative inputs coming from the negative connectors 85, 86 and 87. The module changeover switches 88 and 89 are closed on $a_1$ and $a_2$ position. In this way each module is direct powered by each phase of the independent power supply unit 77. In FIG. 10 is shown the wiring diagram of the same triplet 67 for the supplying mode, where the independent power supply unit is disconnected and the triplet 67 has the three modules 68, 69 and 70 connected in series by closing the changeover switches 88 and 89 on $b_1$ and $b_2$ position. The terminals 71 (+) and 76 (−) become the triplet positive and negative terminals, which will serve to connect this triplet 67 to other triplets of the battery. Therefore, for each triplet of the battery with the three independent battery modules connected in series two module changeover switches are required, connecting the middle module to the other two modules of the same triplet. For example, depending on the preferred embodiments of different automakers, for electric vehicles, the module switches 65 and 66 (FIG. 7 and FIG. 8) and the module changeover switches 88 and 89 (FIG. 9 and FIG. 10) may be installed outside of the battery box anywhere on the electric vehicle or even inside of the battery box. These module switches and module changeover switches may be as well an electronic device with the same functionality. Therefore the switches and changeover switches used to connect in parallel or in series the independent battery module of a triplet are "module switches" or "module changeover switches".

Figure 11:
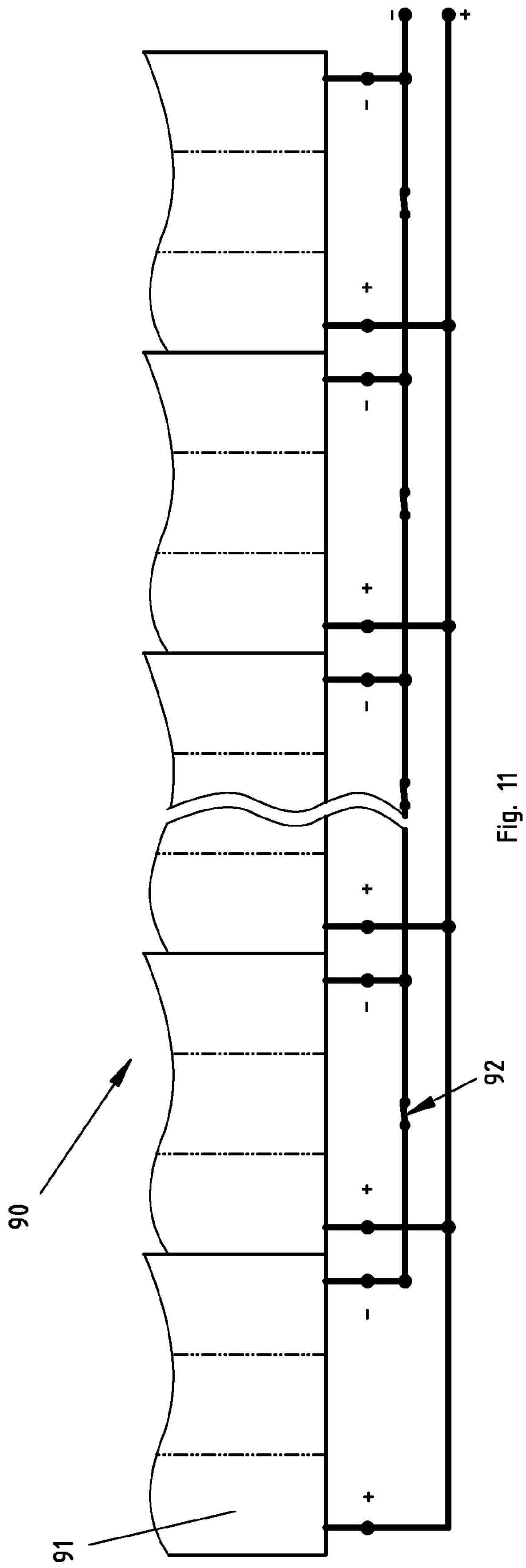
FIG. 11 is presented the wiring diagram of a battery with its triplets connected in parallel.
Figure 12:
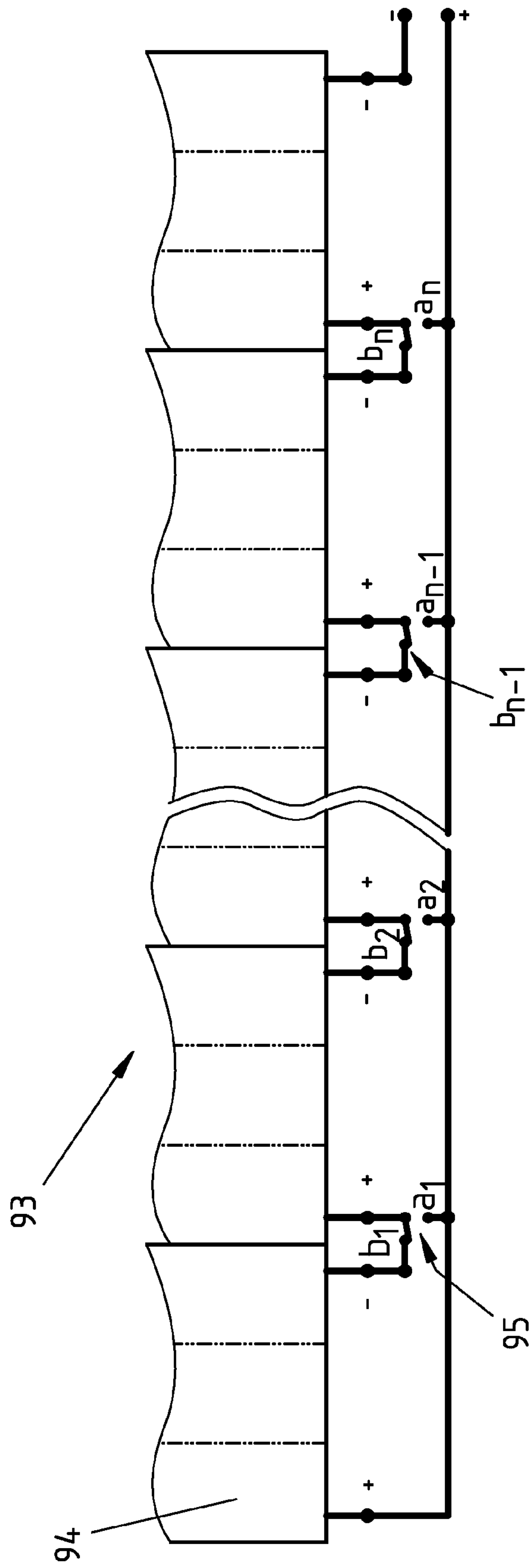
FIG. 12 is presented the wiring diagram of a battery with its triplets connected in series.

A battery may have a plurality of triplets connected each other in parallel or in series, by using "triplet switches" or "triplet changeover switches", each triplet being connected to a 3 phase AC independent power supply unit. In FIG. 11 is presented the wiring diagram of a battery 90 with a plurality of triplets 91 connected in parallel, in supplying mode, having all the triplet switches 92 on the close position. In recharging mode all the triplet switches 92 have to be in the open position. In FIG. 12 is presented the wiring diagram of a battery 93 with a plurality of triplets 94 connected in series, in supplying mode, with all the triplet changeover switches 95 in $b_1, b_2, \ldots b_n$ position. In recharging mode all the triplets changeover switches 95 have to be in $a_1, a_2, \ldots a_n$ position.

Considering two actual electric vehicles cases (case 1 and case 2) in FIG. 13 to FIG. 19 are presented the wiring diagrams for two potential embodiments applying this principle. In the actual case 1, the 33.5 Kwh battery contains 430 cells grouped in 5 independent battery modules connected in parallel, each independent battery module containing 86 cells, connected in series (86S,5P). The actual recharging time for 80% recharge of this battery is about 5.5 hours by using the actual recharging station of 240V at 6.6 Kw.

In the actual case 2, the battery of 85 Kwh contains 7104 cells in 16 independent battery modules wired in series. Each independent battery module contains 6 groups of 74 cells wired in parallel; the 6 groups are than wired in series within the independent battery module. By using a Supercharger of 480V and about 22 KW, the recharging time for 80% battery recharge is about 40 minutes.

Figure 13:
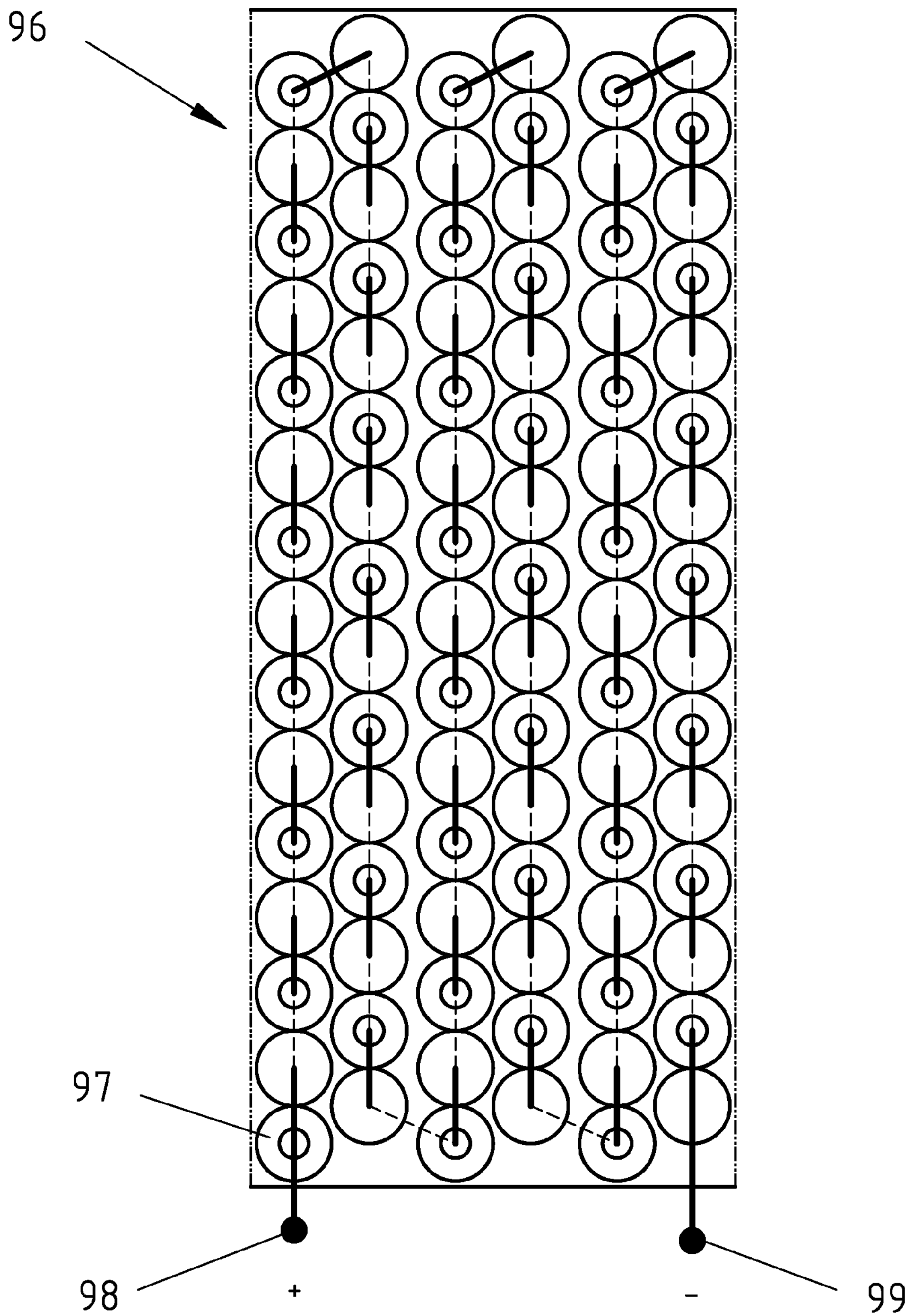
FIG. 13 is an embodiment of a module having 30 cells connected in series.
Figure 14:
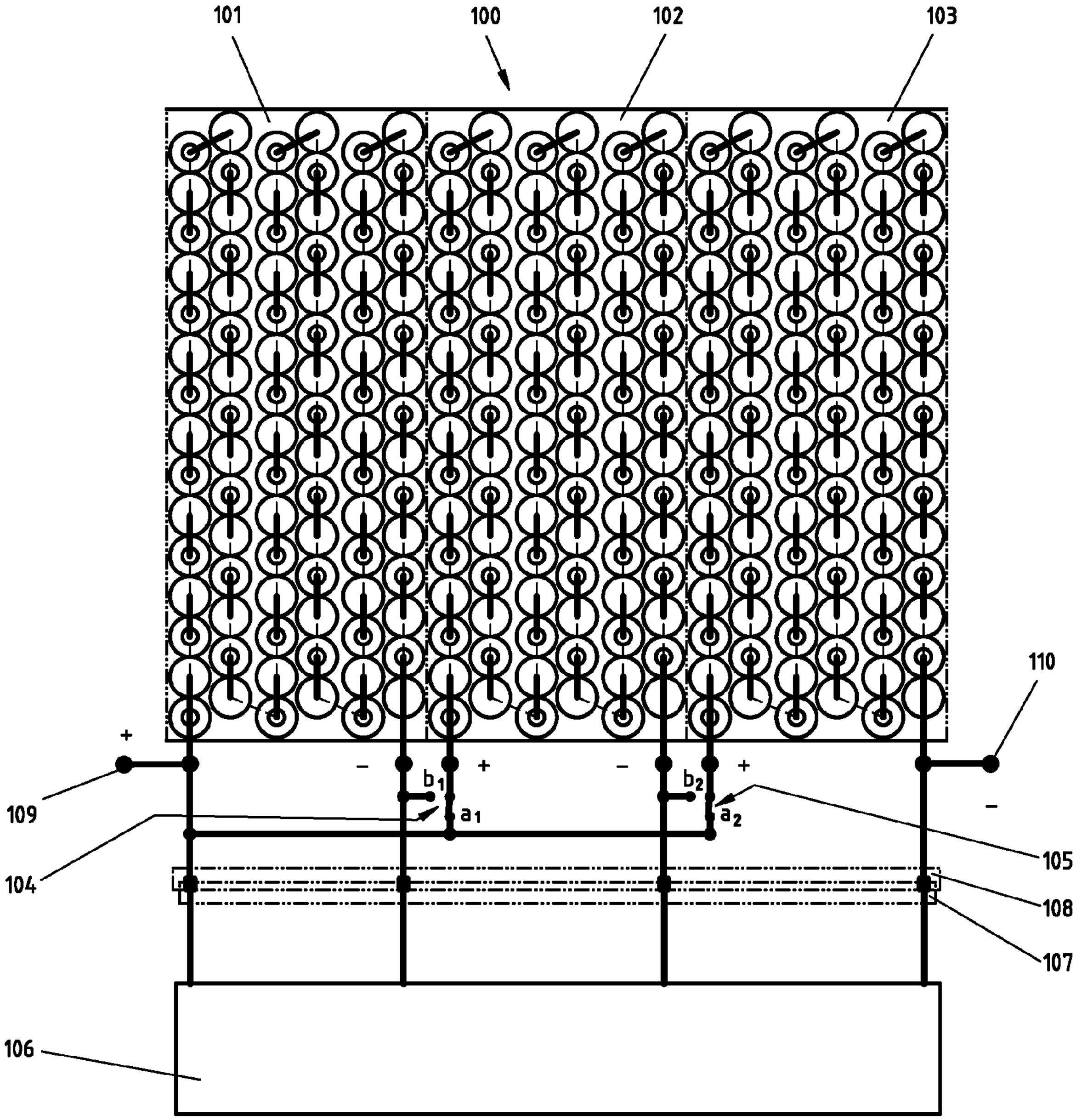
FIG. 14 is an embodiment of a battery triplet showing the battery cells connected in series and the wiring diagram for the recharging mode.
Figure 15:
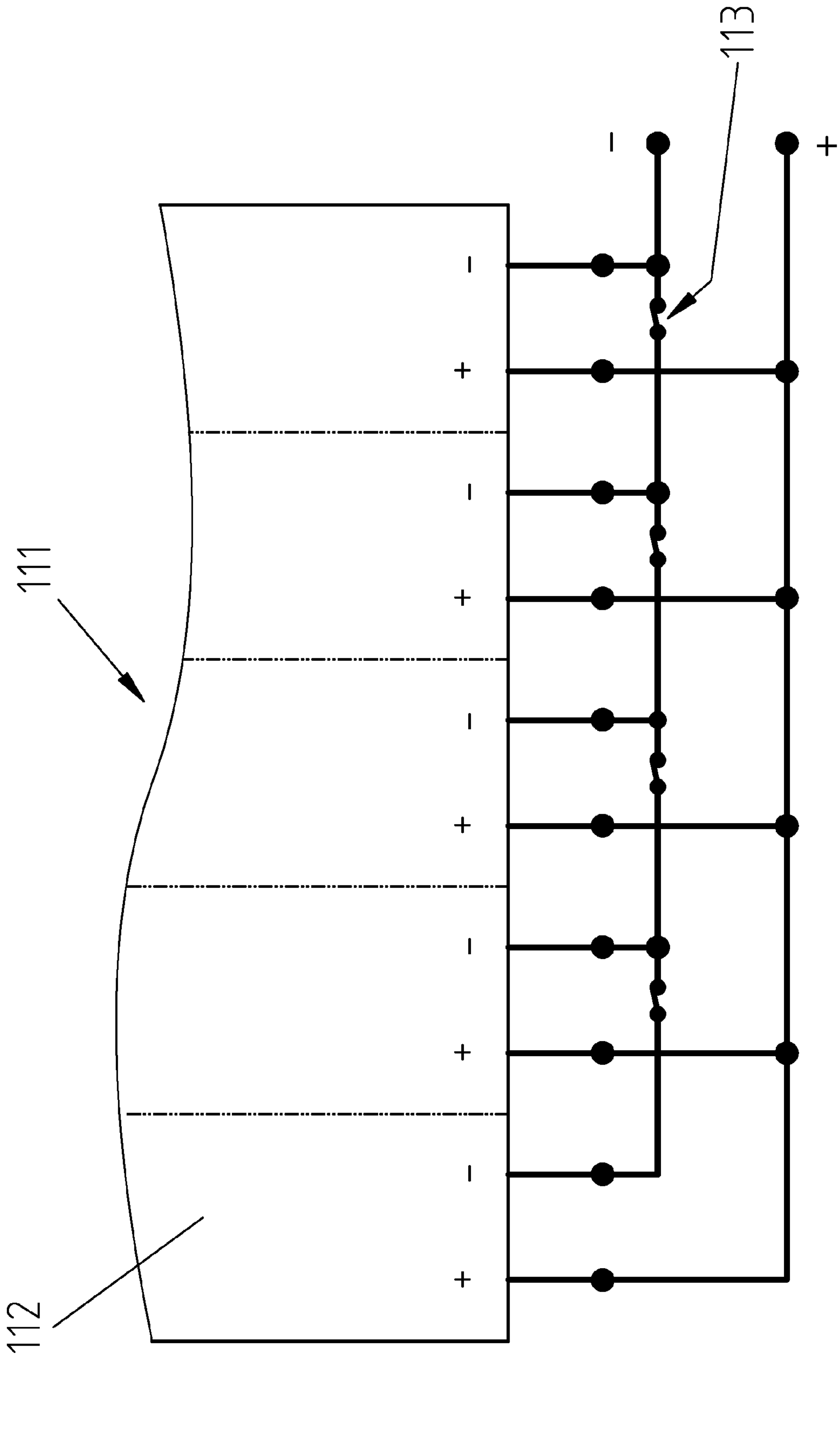
FIG. 15 is a wiring diagram of a battery with its five triplets connected in parallel in the supplying mode.

Using three phase AC independent power supply units and applying the principle described in this invention, opponent to case 1, in FIG. 13 to FIG. 15 is shown a battery comprising a total of 450 cells grouped in 5 triplets connected in parallel, each triplet comprising 3 independent battery modules connected in series and each independent battery module comprising 30 cells connected in series (30S,3S,5P). In FIG. 13 is shown an embodiment of an independent battery module 96 having 30 cells 97 connected in series, having the positive module terminal (+) 98 and the negative module terminal (−) 99. In FIG. 14 is illustrated a triplet 100 comprising three independent battery modules 101, 102 and 103 like the independent battery module described here above in recharging mode, all three independent battery modules connected each other in series like in FIG. 9 and FIG. 10, using the modules changeover switches 104 and 105, and the independent power supply unit 106, powering the triplet 100 via the partial independent multi-contacts charger 107 and the partial multi-contacts equipment battery inlet 108. The triplet 100 has a positive triplet terminal 109 and a negative triplet terminal 110, used to be connected to other triplets of the battery. For the battery recharging mode the independent multi-contacts charger 107 is connected to the multi-contacts equipment battery inlet 108 and the triplet changeover switches 104 and 105 are in $a_1$ and in $a_2$ position. For the battery supplying mode the independent multi-contact charger 107 is detached and the triplet changeover switches are in $b_1$ and in $b_2$ position. In FIG. 15 is shown the battery 111 in supplying mode, with its five triplets 112 connected in parallel like in FIG. 11, using four triplet switches 113. By applying this approach, the recharging time may be reduced by a factor of 15 meaning 22 minutes instead of 5.5 hours using 5 independent three phase AC power units of 3 phase AC at 380V and 6.6 Kw. More than that, if the recharging time is not satisfactory, it can be cut on two by splitting the battery in two, respecting the overall battery cells connections and use simultaneously two independent multi-contact chargers of the same recharging terminal, having two multi-contacts equipment battery inlets, one for each group of the 5 independent three phase AC power supply units. In this way the recharging time is cut in two, taking only 11 minutes for battery recharging. If this time is not satisfactory, a third independent multi-contact charger with a group of 5 independent three phase AC power supply units of 3—phase AC at 380V and 6.6 Kw may be used, cutting the recharging time in tree, at 7.33 minute per recharge, which is reasonable and close to the actual time for refill the IC vehicles with gas. Also, the recharging time may be reduced by using more powerful power supply units, up to 500V and 50 KW. All these possibilities are open.

Figure 16:
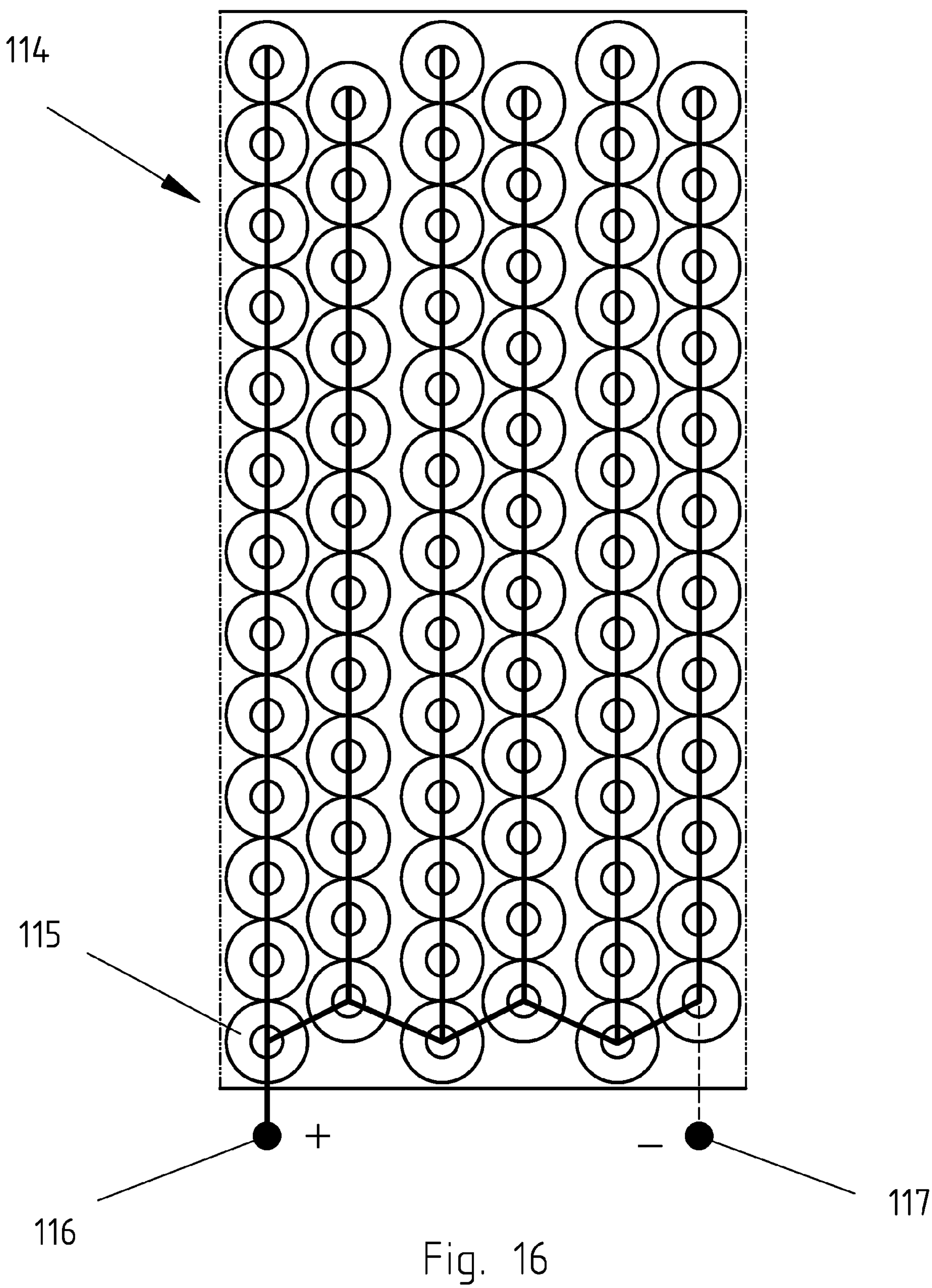
FIG. 16 is an embodiment of a group of 74 battery cells connected in parallel.
Figure 17:
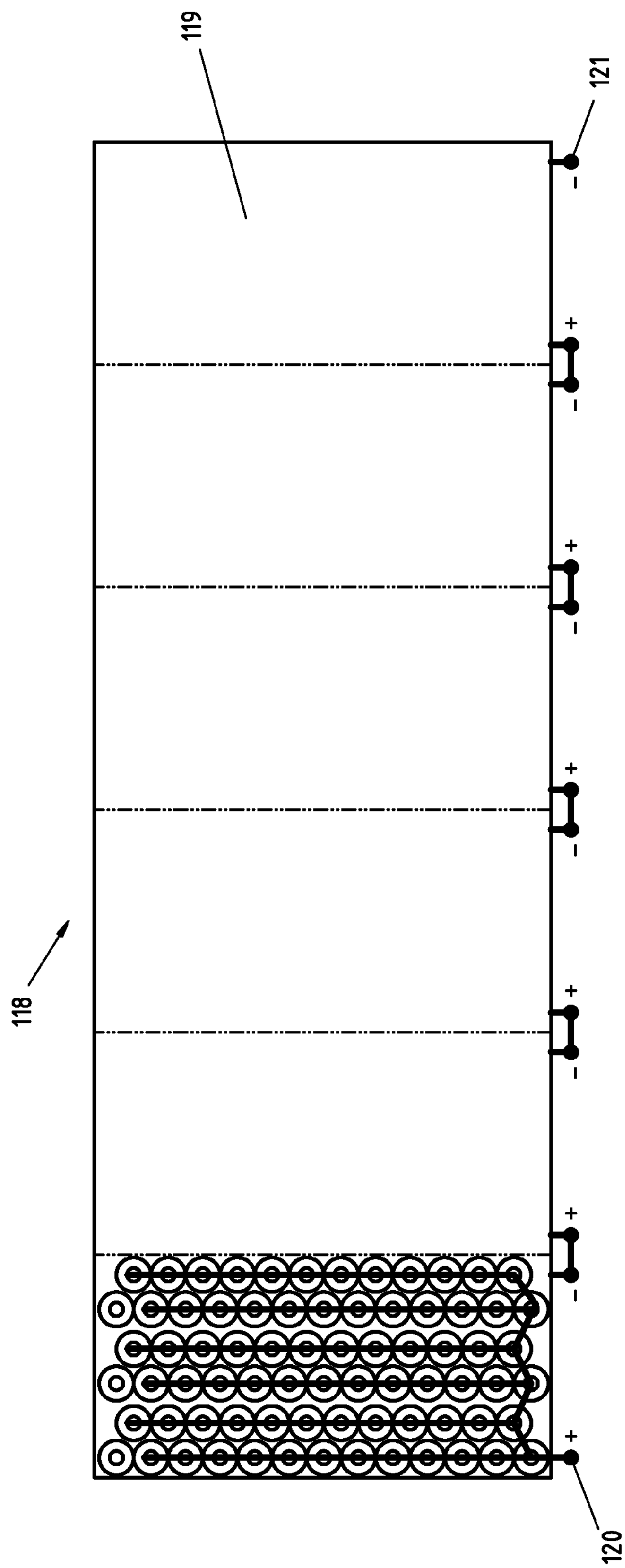
FIG. 17 is an embodiment of a module having 6 groups of 74 cells, connected in series.
Figure 18:
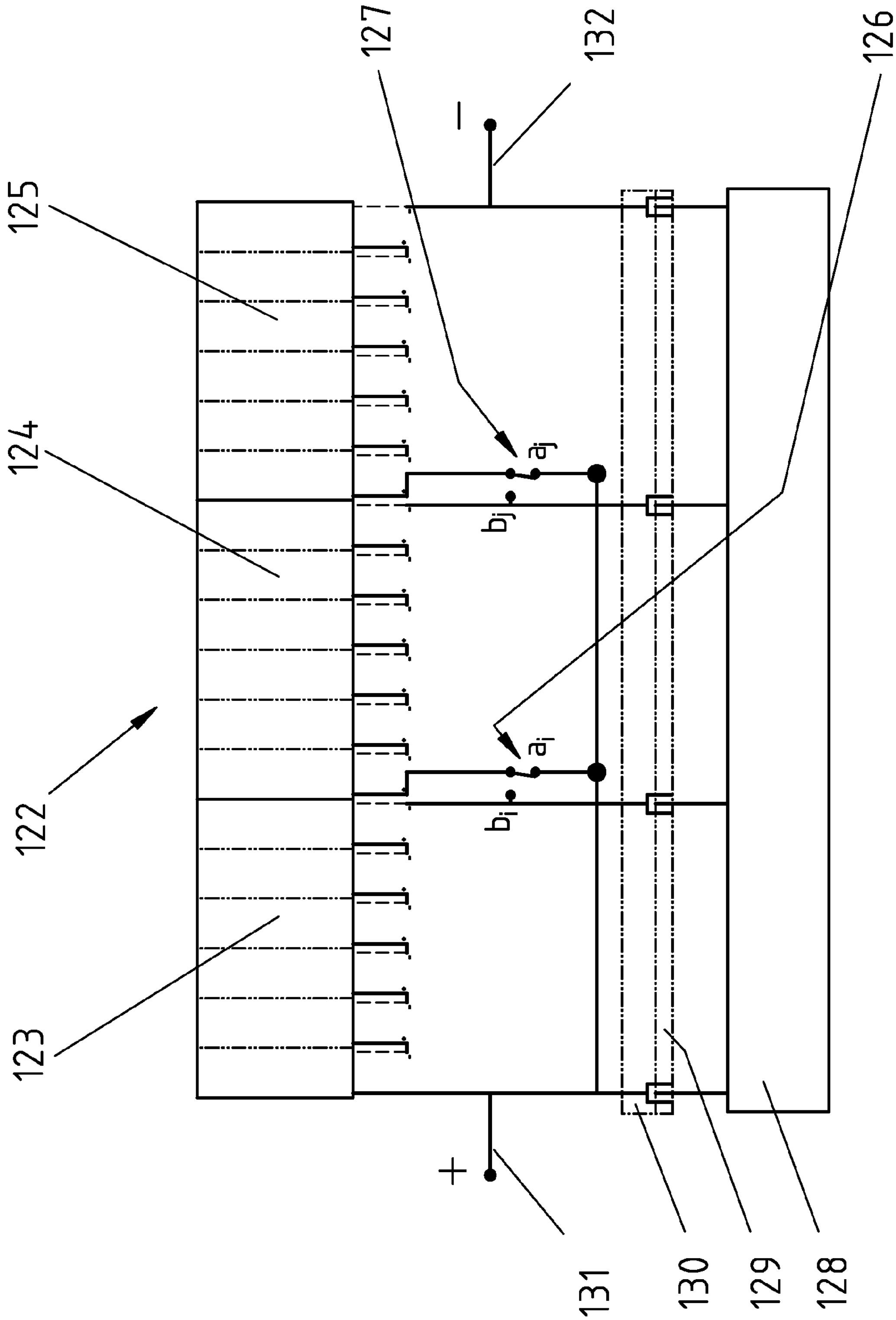
FIG. 18 is a wiring diagram of a triplet of three modules connected each other in series, in recharging mode.
Figure 19:
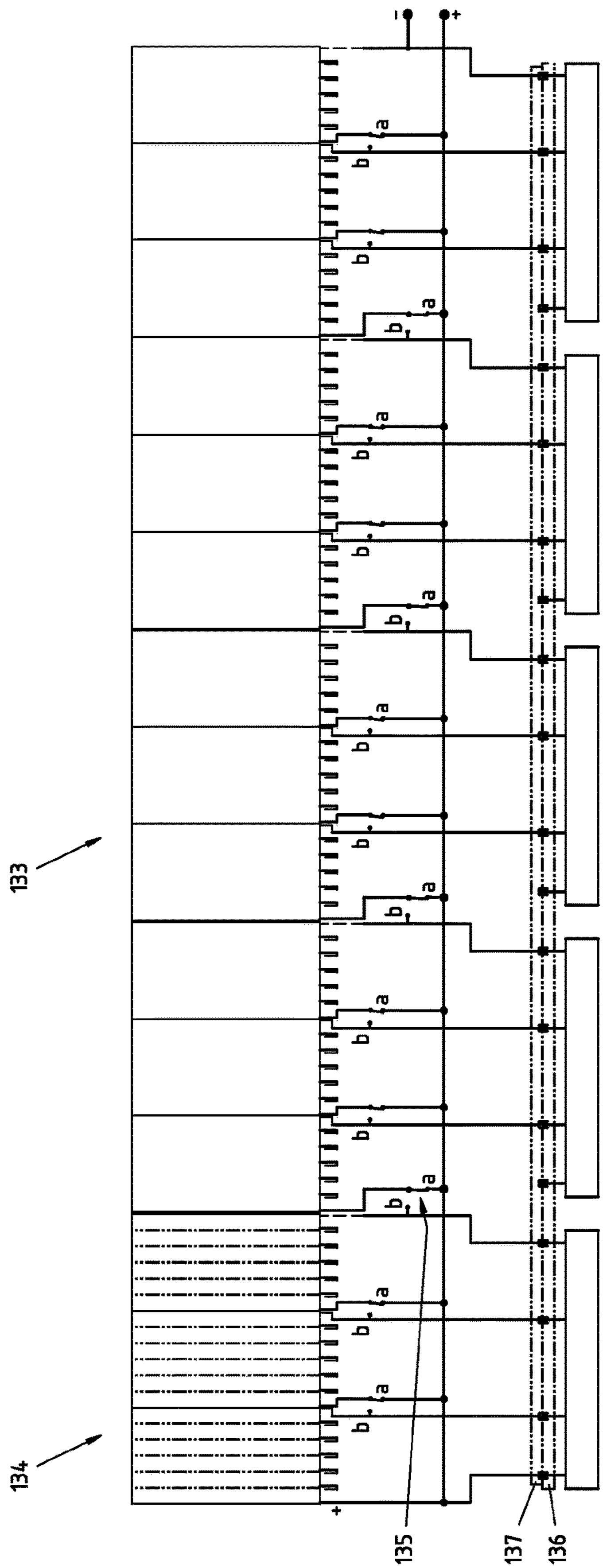
FIG. 19 is a wiring diagram of a battery with its five triplets connected in series, in supplying mode.

Using three phase AC independent power supply units and applying the principle described in this invention, opponent to case 2, in FIG. 16 to FIG. 19 is shown a battery comprising a total of 6750 cells grouped in 5 triplets connected in series, each triplet comprising 3 independent battery modules connected in series, each battery module comprising 6 groups connected in series, each group having 75 cells connected in parallel (75P6S,3S,5S). In FIG. 16 is presented an embodiment of a group 114 of 75 battery cells 115 connected in parallel, having a positive group terminal 116 and a negative group terminal 117. In FIG. 17 is shown an independent battery module 118 having 6 groups of 75 cells each 119, connected in series, having the positive module terminal 120 and the negative module terminal 121. In FIG. 18 is illustrated a triplet 122 in recharging mode, comprising three independent battery modules 123, 124 and 125 like the independent battery module described here above, all three connected each other in series like in FIG. 9 and FIG. 10, using the module changeover switches 126 and 127 and the independent power supply unit 128, powering the triplet 122 via the partial independent multi-contacts charger 129 and the partial multi-contacts equipment battery inlet 130. The triplet 122 has a positive triplet terminal 131 and a negative triplet terminal 132, used to be connected to other triplets of the battery. For the battery recharging mode the independent multi-contact charger 129 is connected to the multi-contacts equipment battery inlet 130 and the triplet changeover switches 126 and 127 are on $a_i$ and on $a_j$ position. For the battery supplying mode the independent multi-contacts charger 129 is detached and the triplet changeover switches 126 and 127 are in $b_i$ and in $b_j$ position. In FIG. 19 is shown the battery 133 with its five triplets 134 connected in series like in FIG. 12, using four triplet changeover switches 135. For the battery recharging mode the independent multi-contacts charger 136 is connected to the multi-contacts equipment battery inlet 137 and the triplet changeover switches 135 are in a position. For the battery supplying mode the independent multi-contacts charger 136 is detached and the triplet changeover switches are in b position. By applying this approach, for case 2, the recharging time may be reduced by a factor of 15, meaning 2.66 minutes instead of 40 minutes. More than that, if the recharging time is not satisfactory, it can be cut on two by splitting the battery in two, respecting the overall battery cells connections and use simultaneously two independent multi-contacts chargers of the same recharging terminal, having two multi-contacts equipment battery inlets and double number of independent power supply units. In this way the recharging time is cut in two, taking only 1.3 minutes for battery recharging. If this time is not satisfactory, a third independent multi-contact charger and triple number of independent power supply units may be used, cutting the recharging time in tree, at 0.7 minutes per recharge, which is very short battery recharging time, even better than the actual time for refill the IC vehicles with gas. The number of the independent battery modules and the number of the independent power supply units has to be established based on an optimization algorithm, taking into consideration its cost over the time reduction.

Figure 20:
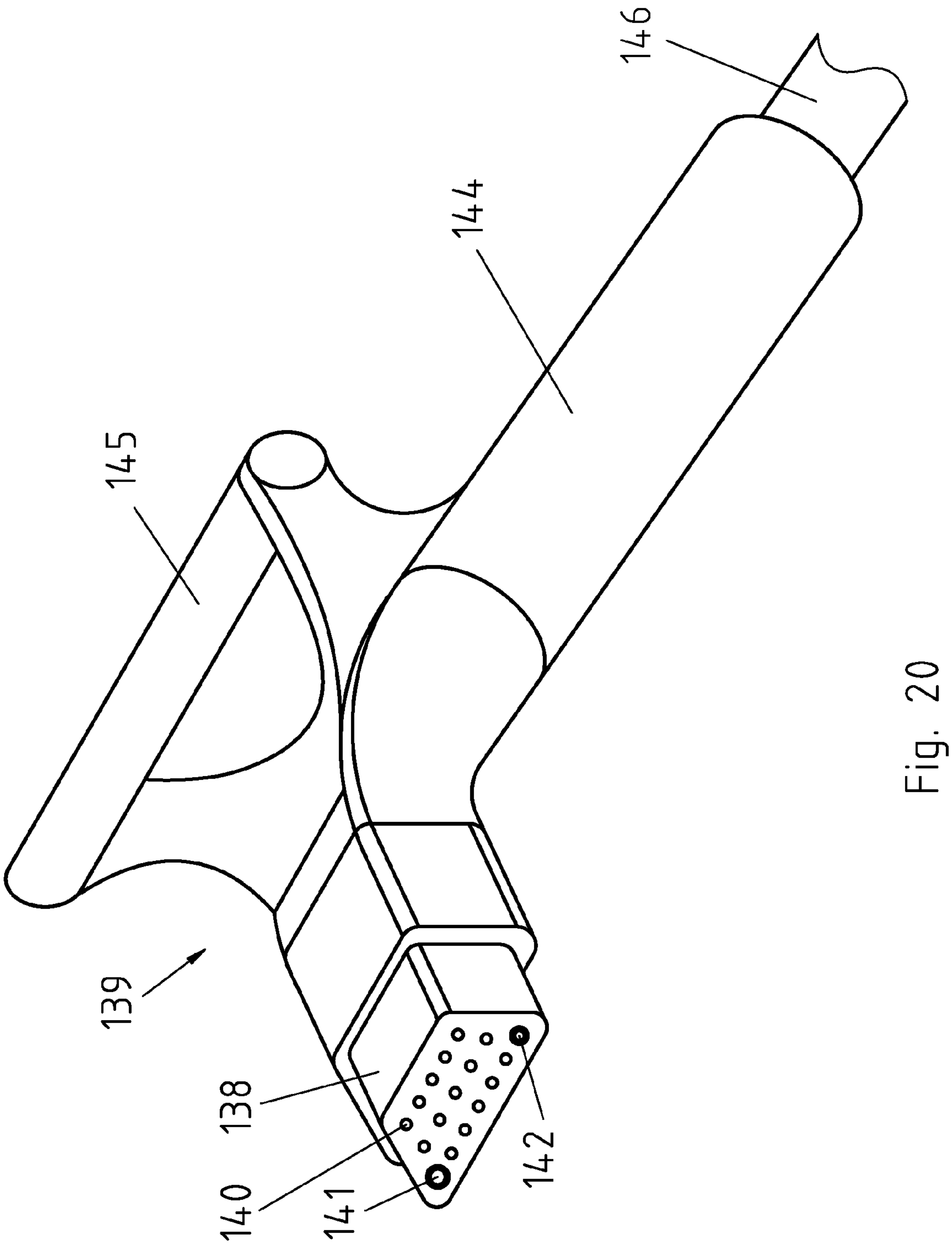
FIG. 20 is an isometric view of the charger having a mistake-proof design for an electric vehicle.
Figure 21:
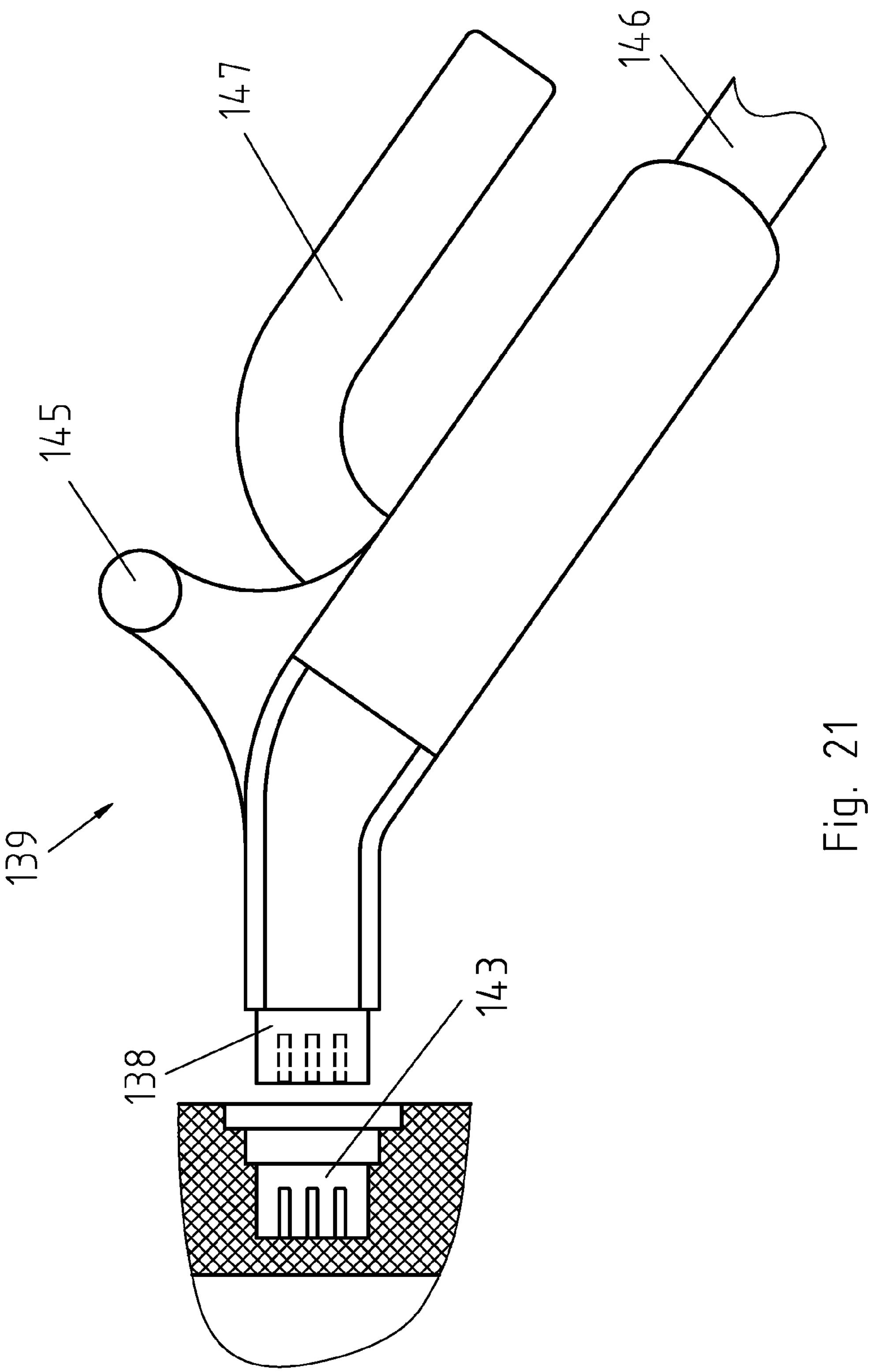
FIG. 21 is a lateral view of a charger with its plug-in coupler male connector of an electric vehicle and a partial cross section of a socket female connector inlet.
Figure 22:
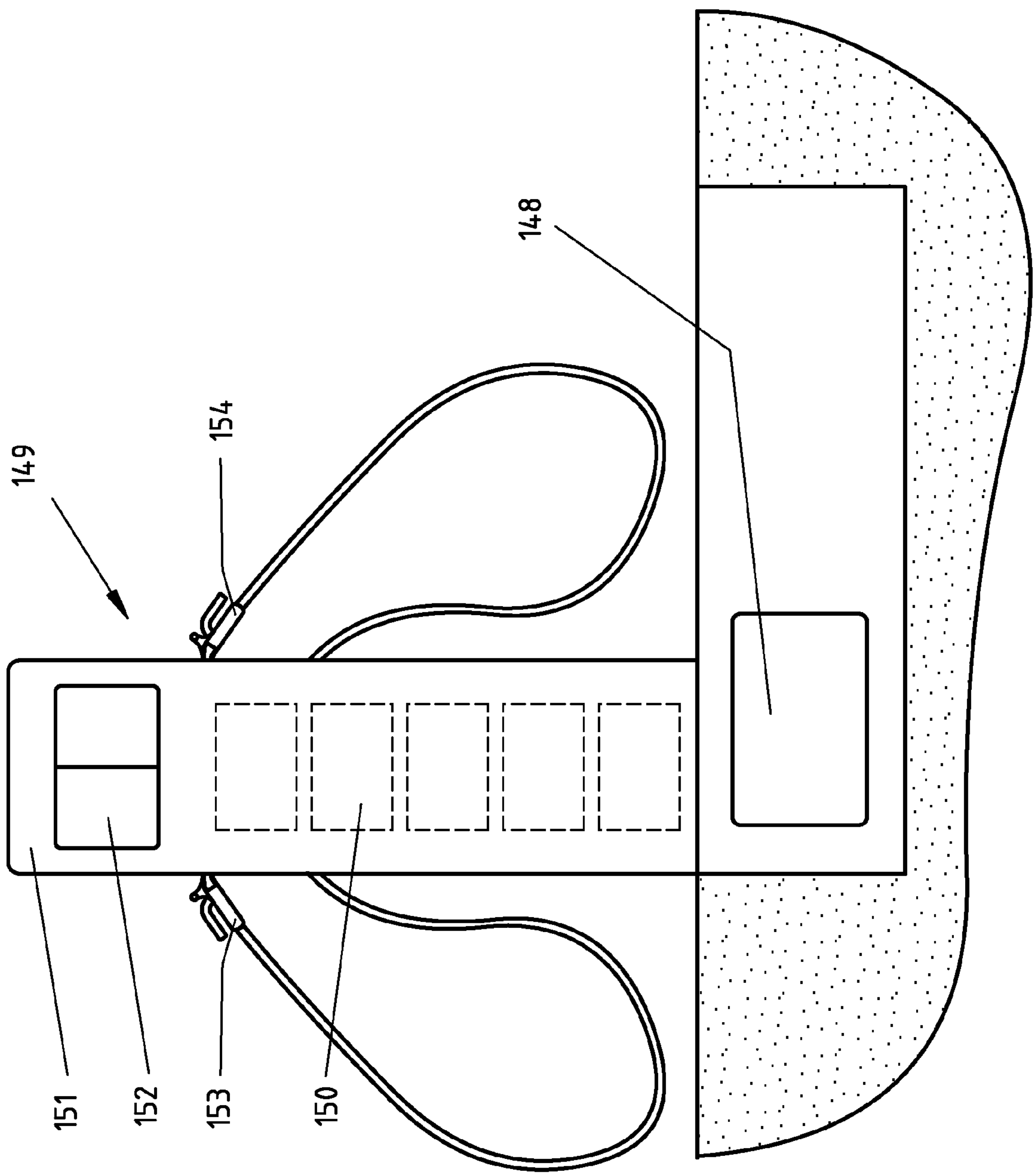
FIG. 22 is a recharging station with an underground power station and a recharging stand equipped with two chargers in lateral position.
Figure 23:
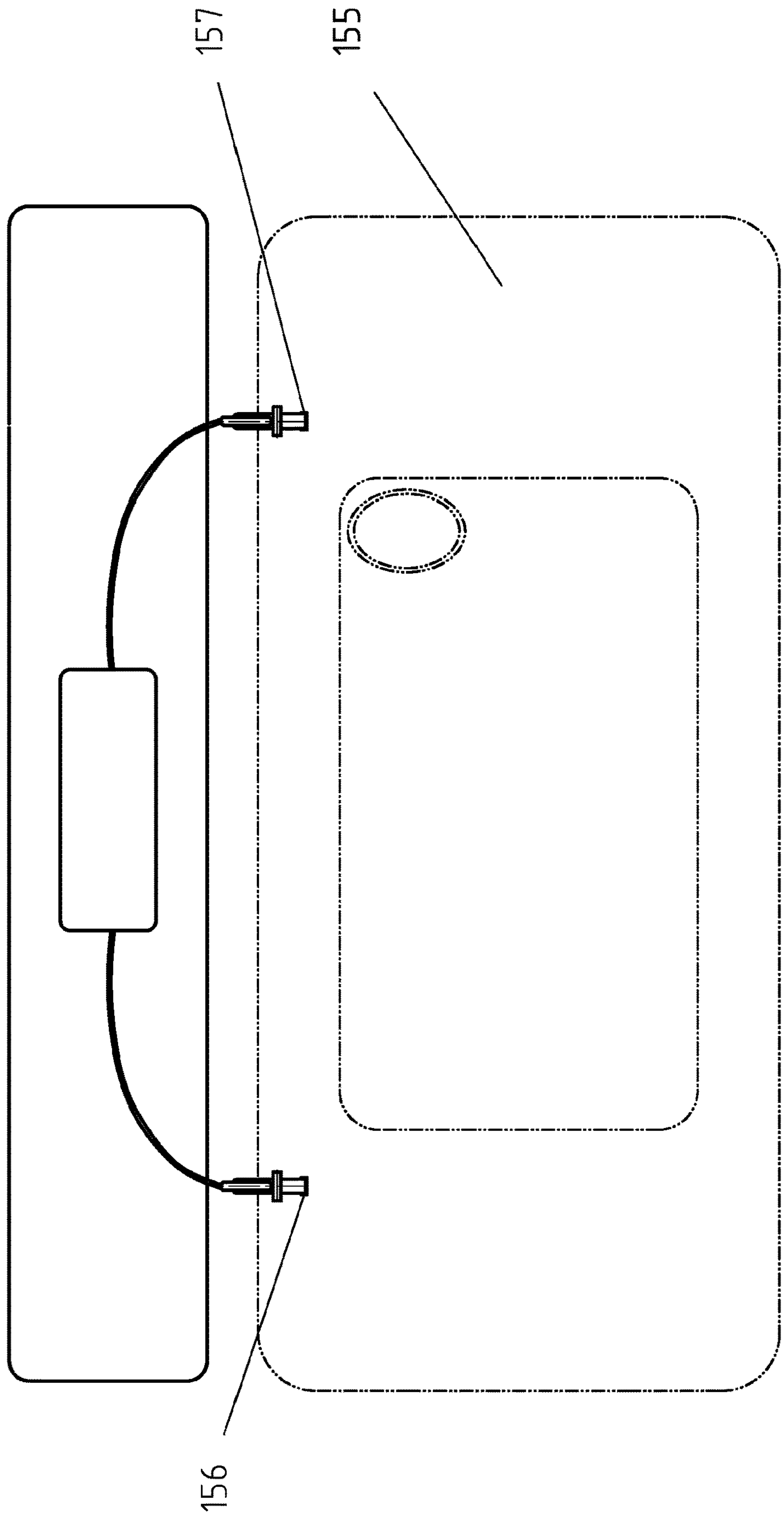
FIG. 23 is a recharging stand with two chargers in lateral position, recharging a vehicle using rear and front inlet simultaneously.
Figure 24:
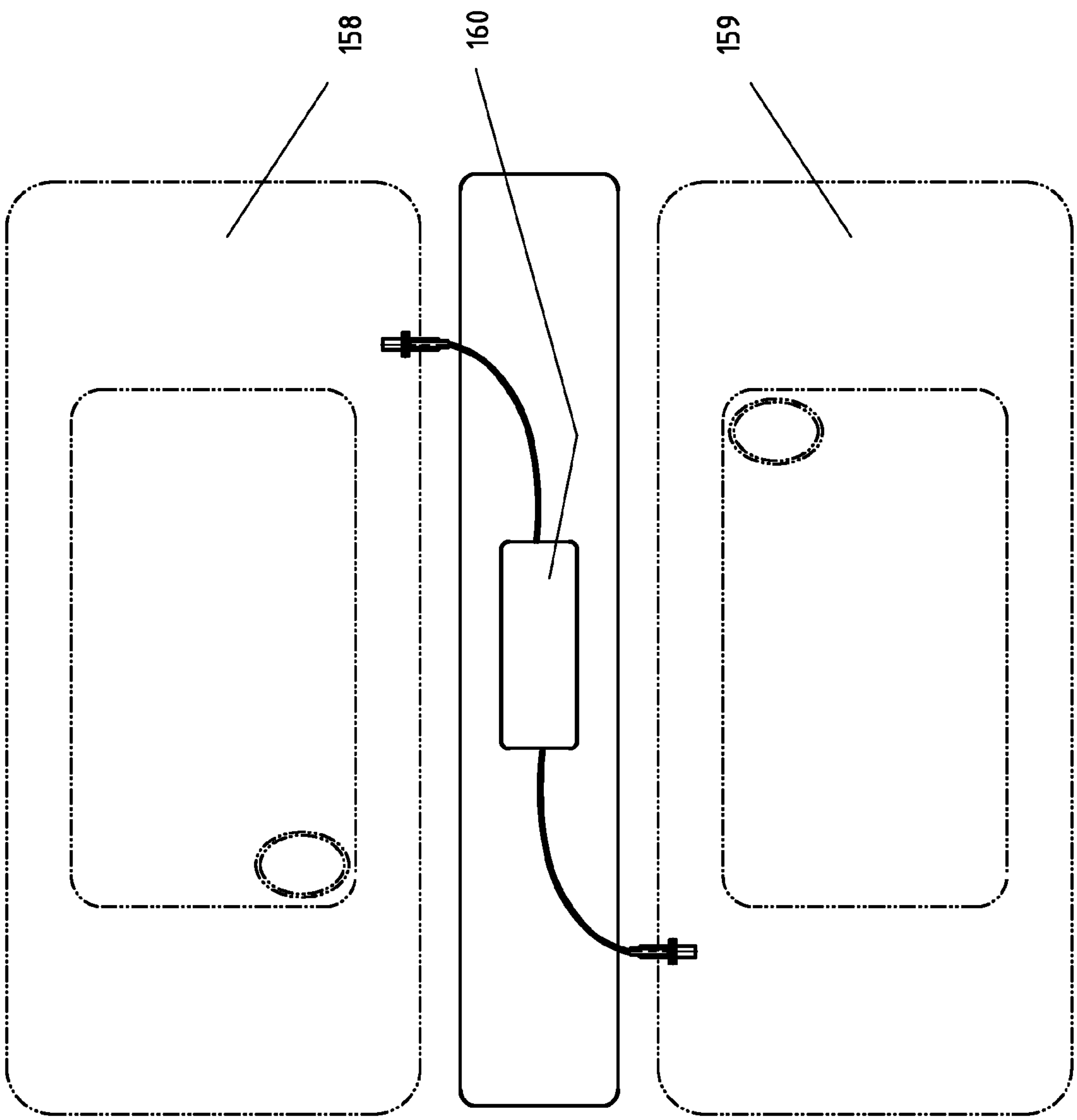
FIG. 24 is a recharging stand with two chargers in lateral position, recharging simultaneously two vehicles located on both sides of the recharging stand.
Figure 25:
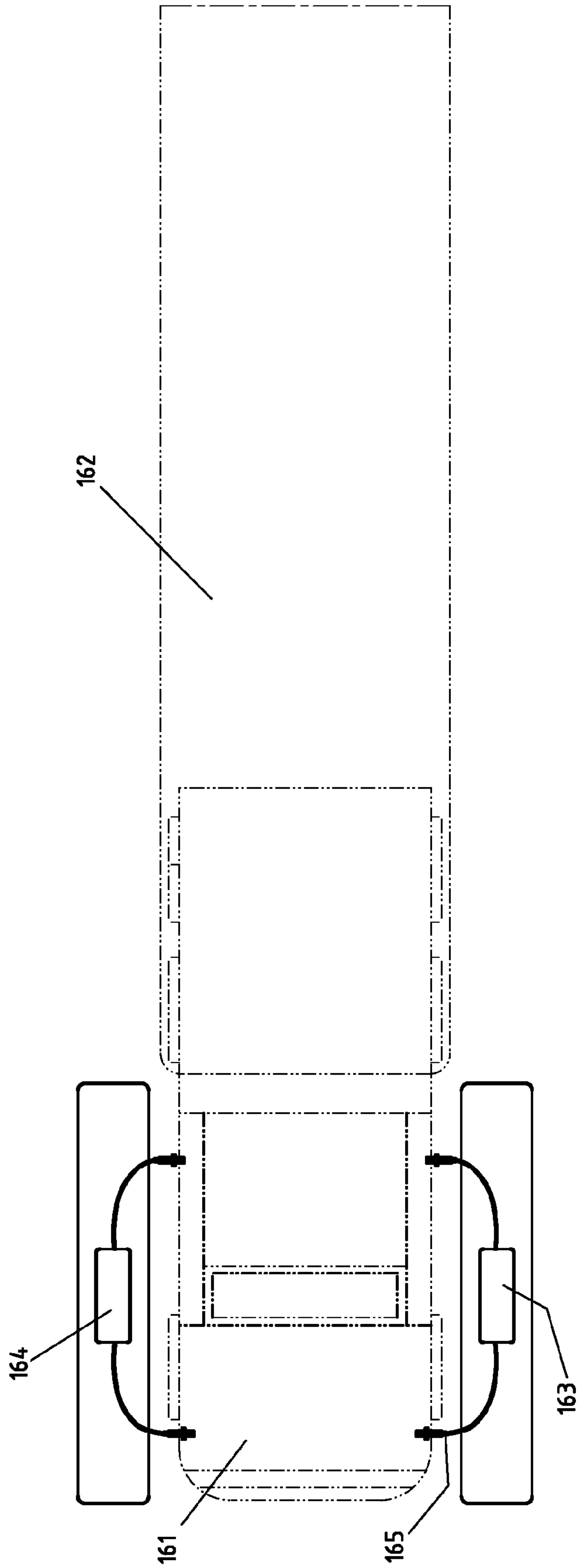
FIG. 25 is a recharging station for electric trucks with trailers, having two recharging stands, one on each side of the truck.
Figure 26:
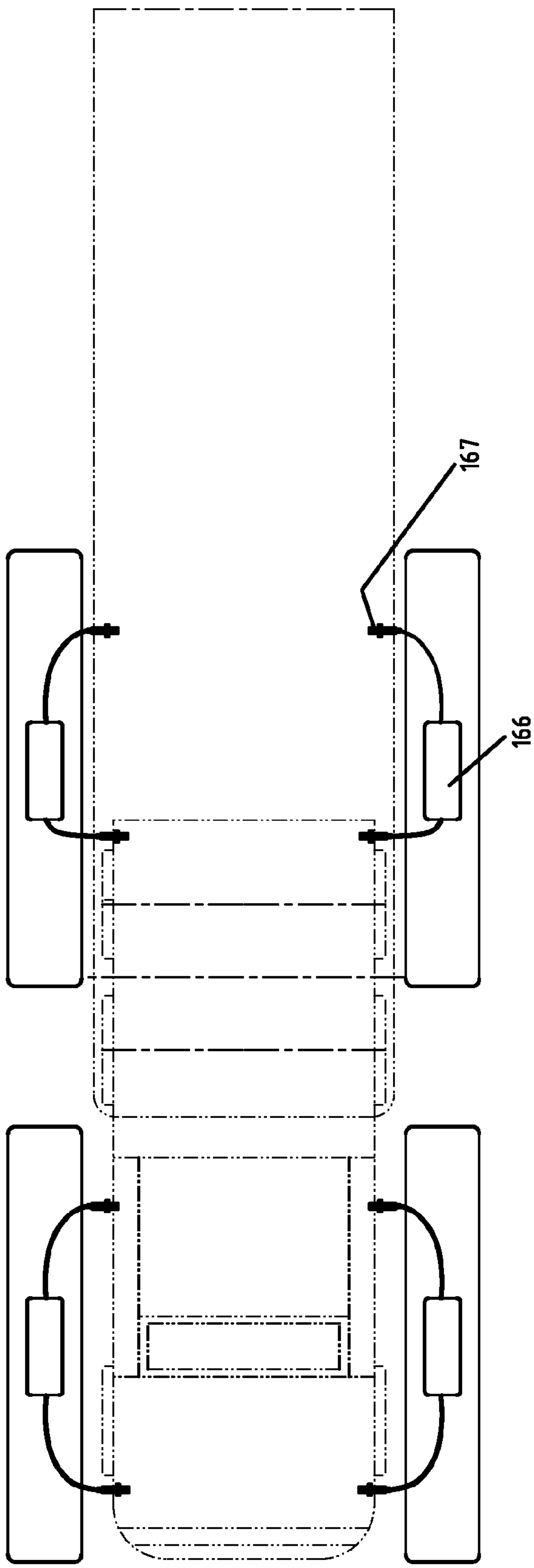
FIG. 26 is a recharging station for electric trucks with trailers, having a plurality of recharging stands on each side of the truck, each one with a plurality of multi-contacts chargers working simultaneously.
Figure 27:
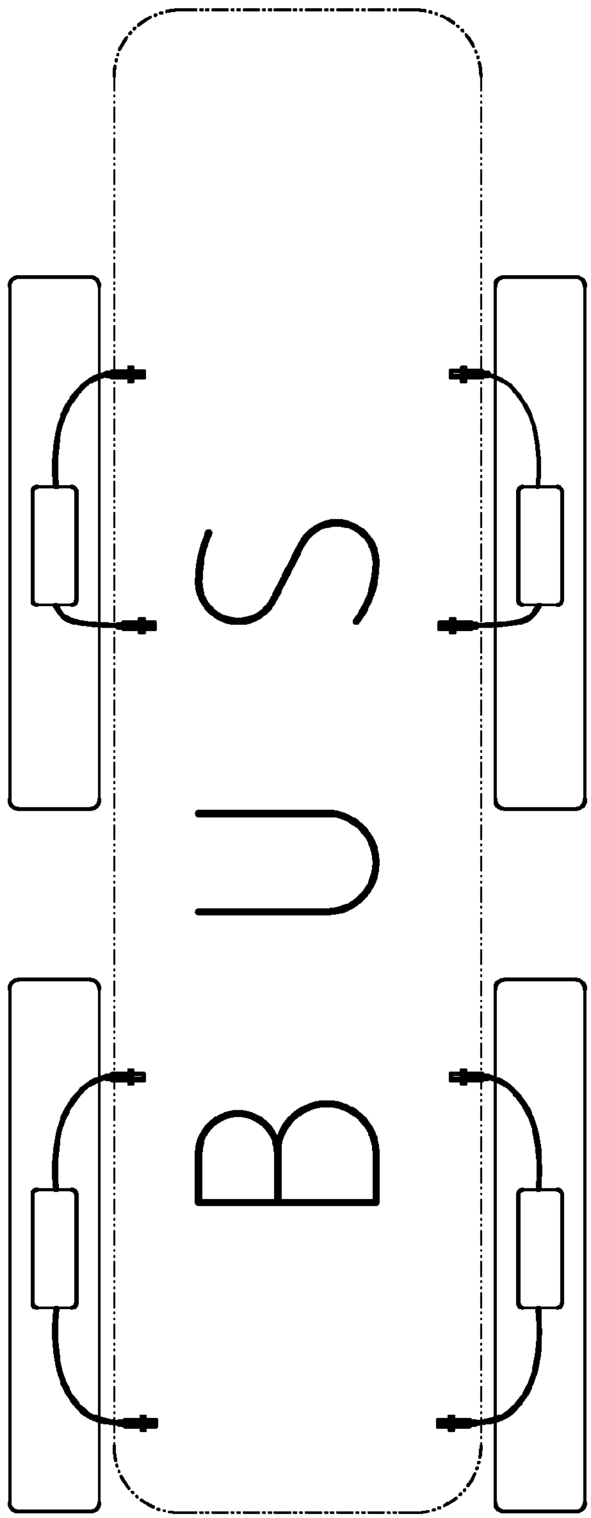
FIG. 27 is a recharging station for buses, having a plurality of recharging stands on each side of the bus, each one with a plurality of multi-contacts chargers working simultaneously.

For electric vehicles with on-board battery recharging, the independent multi-contact charger has one positive output terminal, one protective earth terminal and a plurality of negative output terminals, one for each independent battery module. A mistake-proof design of a charger for an electric vehicle battery and recharging terminal may be as shown in FIG. 20, FIG. 21 and FIG. 22. The plug-in coupler male connector 138 of the independent multi-contact charger 139 may be a trapezoidal shape, which is a mistake-proof design, making sure that the independent multi-contacts charger 139 may be plug-in only in one single position. The independent multi-contacts charger 139 is capable to accommodate a plurality of negative output terminals 140, one positive terminal 141 and one protective earth terminal 142, see FIG. 20. In order to easy install the vehicle socket female connector multi-contacts equipment battery 138 into the electric multi-contacts equipment battery inlet 143, (FIG. 21), the independent multi-contacts charger 139 may have two handles: one in the cable direction 147 and another one 145 perpendicular on the first handle, making possible two hands maneuverings. The handle on the cable direction may be around the cables 146, like the handle 144 of FIG. 20 or detached of the cables like the handle 147 in FIG. 21. In FIG. 22 is shown a recharging terminal 149, having an underground power station 148, comprising the connectors to the AC grid. The recharging terminal 149, has a plurality of independent power supply units 150 in the lower portion of the recharging stand 151. The recharging stand 151 of a recharging terminal 149 is equipped with a communication screen 152 and with two independent multi-contacts chargers 153 and 154 located in the lateral opposite position of the recharging terminal. This lateral opposite position of the independent multi-contacts chargers gives the possibility to recharge the vehicle 155 using the rear multi-contacts equipment battery inlet 156 and the front multi-contacts equipment battery inlet 157 simultaneously like in FIG. 23. This version of recharging terminal, having lateral chargers, may be very useful also to recharge two vehicles 158 and 159 in the same time, placed in parallel on both sides of the recharging terminal 160, see FIG. 24. This solution using a plurality of independent multi-contacts chargers per recharging terminal opens the door to a reasonable recharging time for electric trucks and electric buses or any kind of heavy electric vehicle. In FIG. 25 is shown an electric truck 161 and a trailer 162 being recharged in a recharging station having two recharging terminals 163 and 164, one on each side of the electric truck 161, and each one with two lateral opposite independent multi-contacts chargers 165, working simultaneously. In this case, if each battery has 15 independent battery modules, the recharging time for the 4 batteries installed on the electric truck 161, using four independent multi-contacts chargers is reduced by a factor of 15*4=60. Therefore, an electric truck which need at least 20 hours to be recharged with the actual technology, will be recharged in only 20 minutes in the future, by using the proposed invention. In order to increase the electric trucks autonomy, batteries may be located as well on the trailer, underneath of its platform. In this case, for electric trucks with trailers a recharging station may be like in FIG. 26, having a plurality of recharging terminals 166, each one with a plurality of independent multi-contacts chargers 167. In this case, if each battery has 15 independent battery modules, the recharging time for the 8 batteries installed on the electric truck and the trailer is reduced by a factor of 15*8=120. Therefore, an electric truck which needs at least 20 hours to be recharged with the actual technology, will be recharged in only 10 minutes in the future, by using the proposed invention. The same thing for electric buses, shown in FIG. 27. Imagine for an electric bus recharged at two terminals on each side, having two independent multi-contacts chargers each, instead of 20 hours, it will be recharged in only 10 minutes. This is possible using ordinary recharging station in the future because due to their long distance between the multi-contacts equipment battery inlets, the long electric trucks and long electric buses may use two ordinary terminals on each side, like in FIG. 26 and FIG. 27. The limits are just a question of optimization, not a technical problem anymore.

Figure 28:
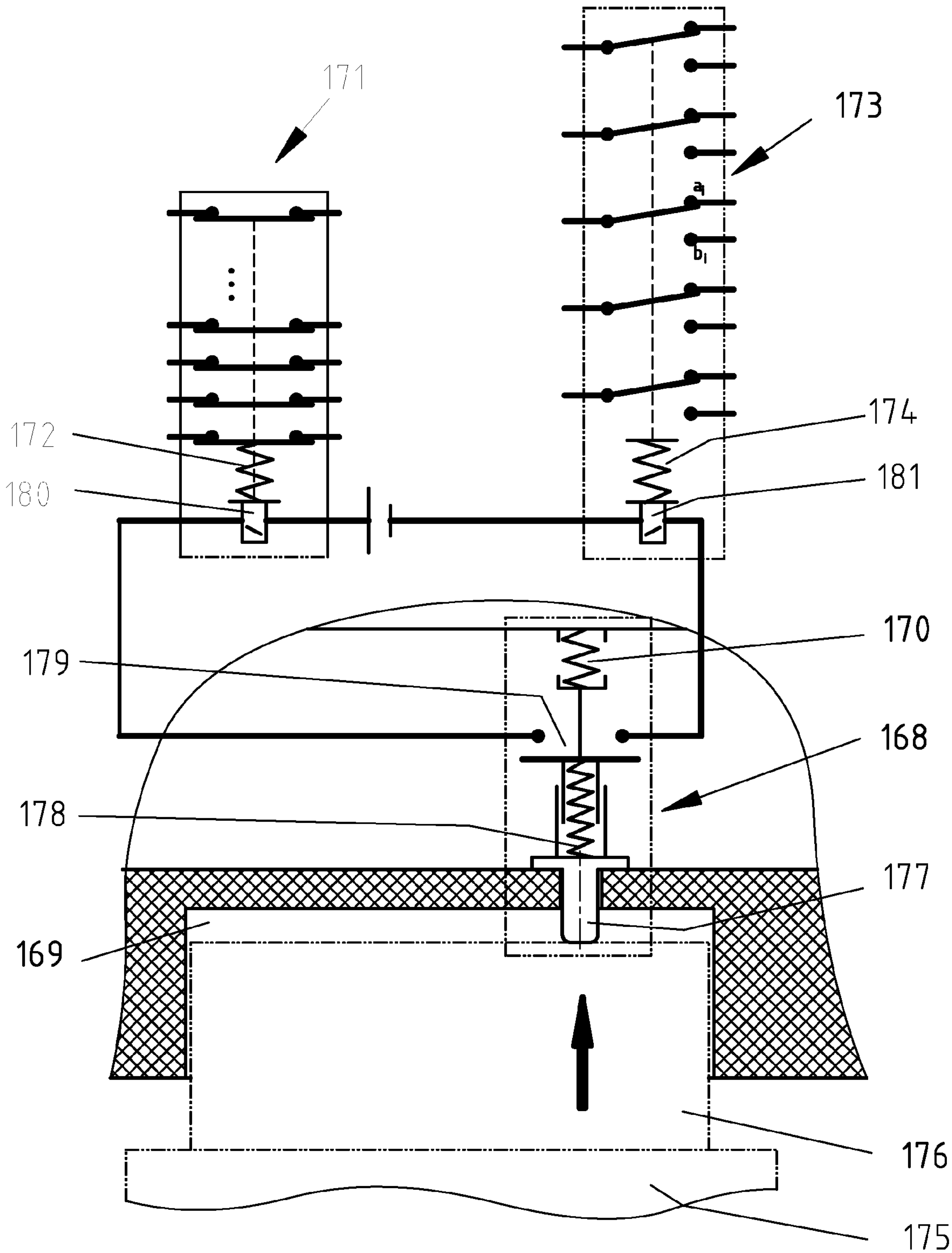
FIG. 28 is a wiring diagrams of an embodiment for a modules switches and modules changeover switches circuit in supplying mode.
Figure 29:
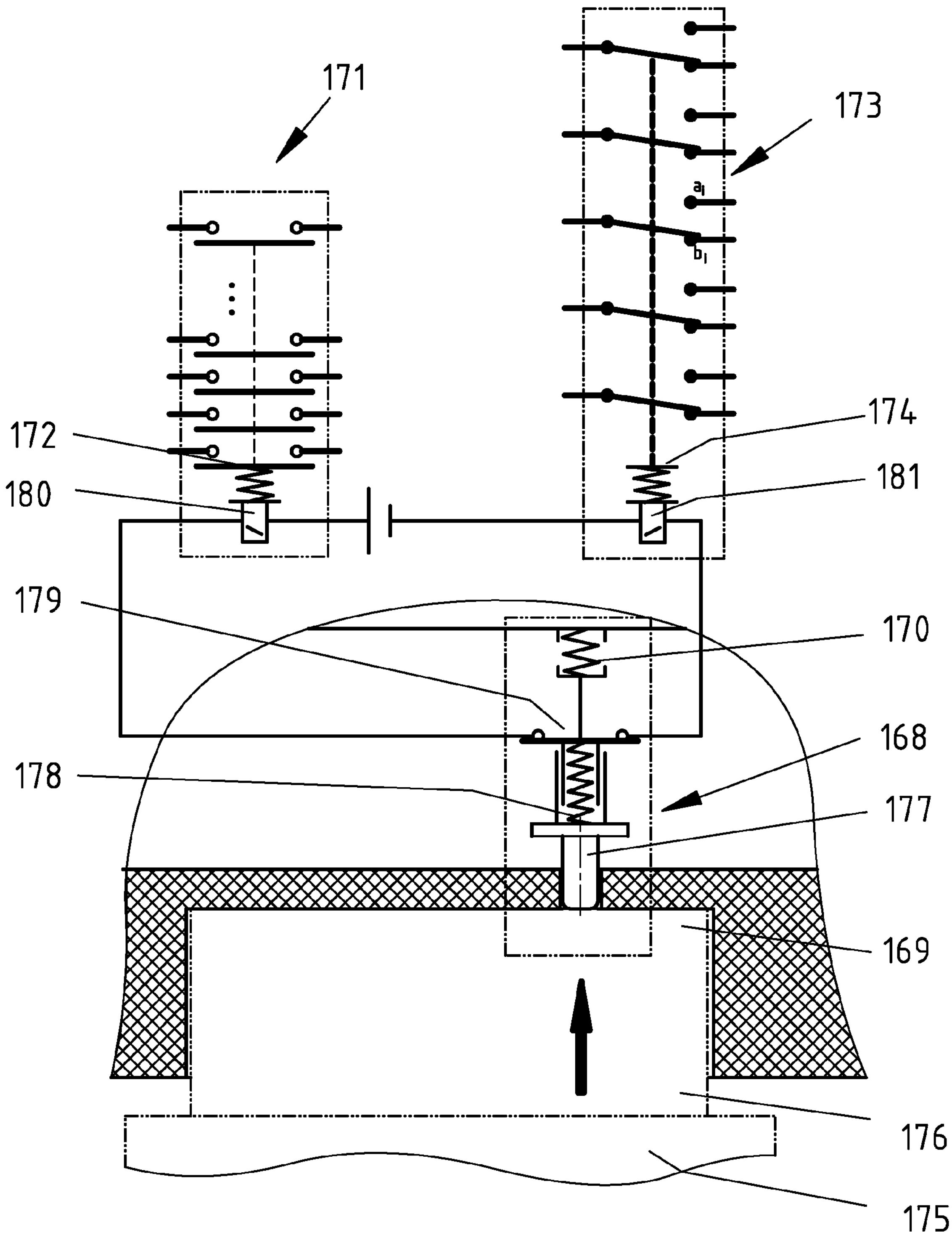
FIG. 29 is a wiring diagrams of an embodiment for a modules switches and modules changeover switches circuit in recharging mode.

For on-board battery recharging vehicles, to control the recharging mode and the supplying mode, a "modules command switch" may be installed into the multi-contacts equipment battery inlet. This modules command switch is on a normal open position for the supplying mode. All battery modules switches (for independent battery modules connected in parallel) and all battery modules changeover switches (for the independent battery modules connected in series) of the battery are kept on the wright position (for supplying mode) by compression springs controlled by these command switches. When the vehicle is in the recharging station, and an independent multi-contacts charger is introduced with its independent multi-contacts charger outlet into the multi-contacts equipment battery inlet, for recharging the battery, the modules command switch is activated by the charger and it is changed on the ON position activating the electromagnets of all battery module switches and battery module changeover switches, changing the battery status on the recharging mode. When the independent multi-contacts charger is taken out of the multi-contacts equipment battery inlet, the modules command switch is dis-activated and all the battery module switches and battery modules changeover switches are changed on the supplying mode again. In FIG. 28 and in FIG. 29 are illustrated the wiring diagrams of an embodiment applying the principle described here before for a modules command switch circuit. In FIG. 28 for the supplying mode, the modules command switch 168 located into the multi-contacts equipment battery inlet 169 is on normal open position, activated by the compression spring 170. All the battery modules switches 171 are on the position for supplying mode activated by the compression spring 172 and all the battery modules changeover switches 173 are on the $a_i$ position for supplying mode, activated by the compression spring 174. When the independent multi-contacts charger 175 is introduced with its independent multi-contacts charger outlet 176 into the multi-contacts equipment battery inlet 169, see FIG. 29, the plunger 177 of the modules command switch 168 is pushed against the compression spring 170, via a compression spring 178 (which is stronger than the compression spring 170 to ensure a good contact and to take over the dimensional variations) and the contact 179 of the module command switch is turned ON, activating the electromagnet 180 which pushes the compression spring 172 turning off the battery modules switches 171 for recharging mode, and activating the electromagnet 181 of the battery modules changeover switches 173, which pushes the compression spring 174 and turns all battery modules changeover switches 173 in the $b_i$ position for recharging mode.

The batteries discussed herein may have different embodiments depending on the kind of their battery cells, their independent battery modules and their attachment on the electric vehicle. For the on-board battery recharging version, when the batteries remain attached on the vehicle for recharging and supplying mode, the actual configuration of different manufacturers may be used. The only difference is related to the wiring diagram, which has to introduce some battery modules switches or battery modules changeover switches and a modules command switch, discussed herein.

The off-board battery recharging consists in the use of a battery: which has a reasonable or an easy maneuverability and may be taken out or put in, very easy in a very short time. This kind of battery recharging is very appropriate for the electric bikes, electric scooters, cordless powered tools, etc. For electric cars, SUV's, electric trucks etc., the batteries have to be easy accessible. A possibility is to use electric vehicles described in the U.S. patent application Ser. No. 16/190,038 per Nov. 13, 2018, where the batteries are installed on the electric vehicles inside of a plurality of battery drawers. Each drawer contains a plurality of batteries, each one having two external terminals, one positive (+) and one negative (−). In this case, when the battery has to be recharged, it is taken out of the vehicle and changed by a full battery. For the driver, the "battery recharging time" in this case is in fact a "battery changing time".

Figure 31:
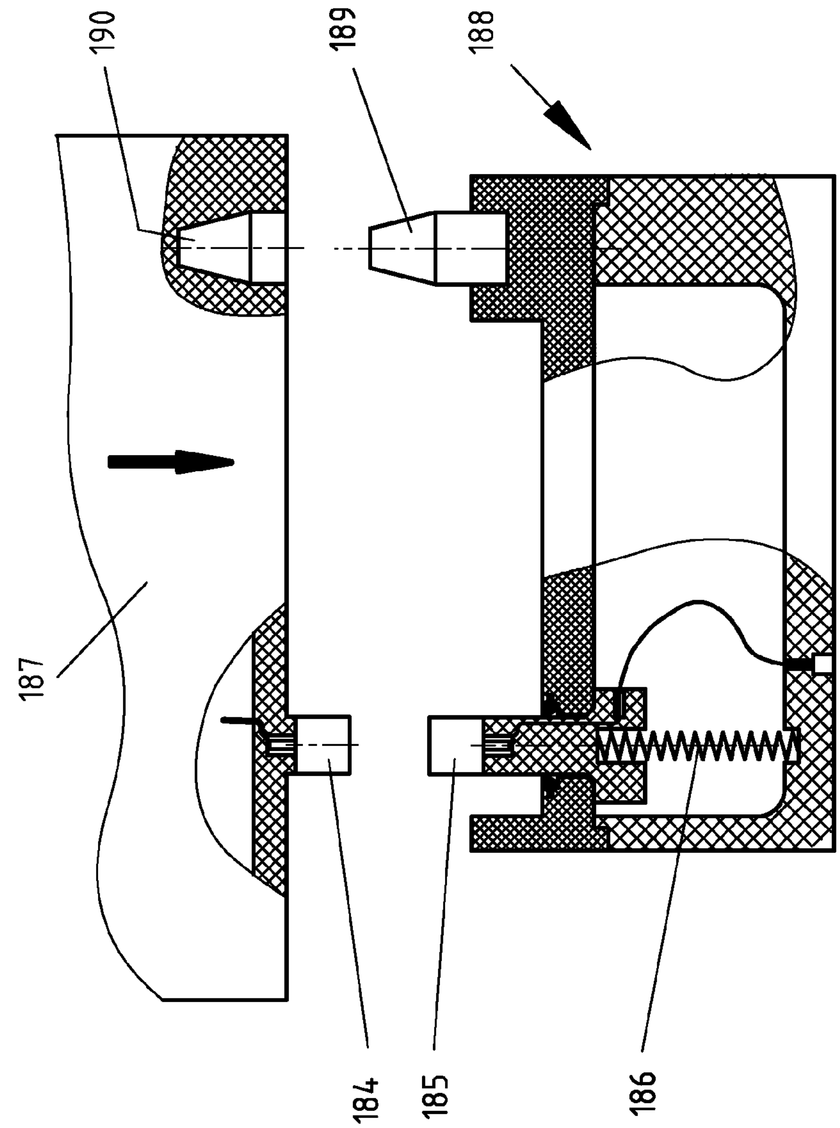
FIG. 31 is a partial cross section of a battery and a contact plate for an embodiment of a pair of contacts showing the alignment taper pin and the two contacts having a flat contact surface, with one of them installed on an elastic element.
Figure 30:
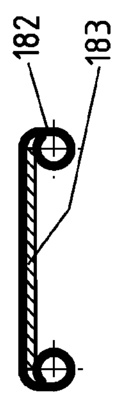
FIG. 30 is an embodiment of an ordinary pair of contacts.
Figure 32:
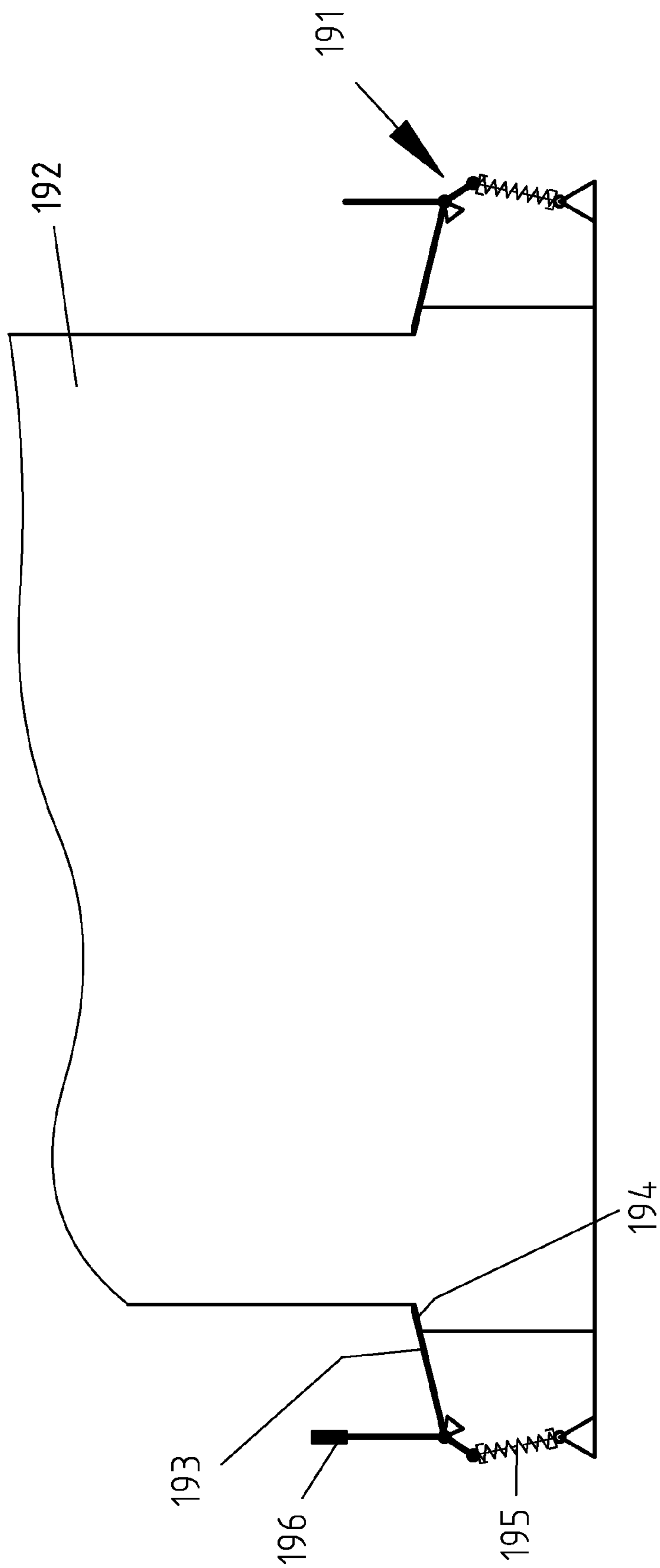
FIG. 32 is a sketch of an embodiment of a battery with a clamping device on the clamping position.
Figure 33:
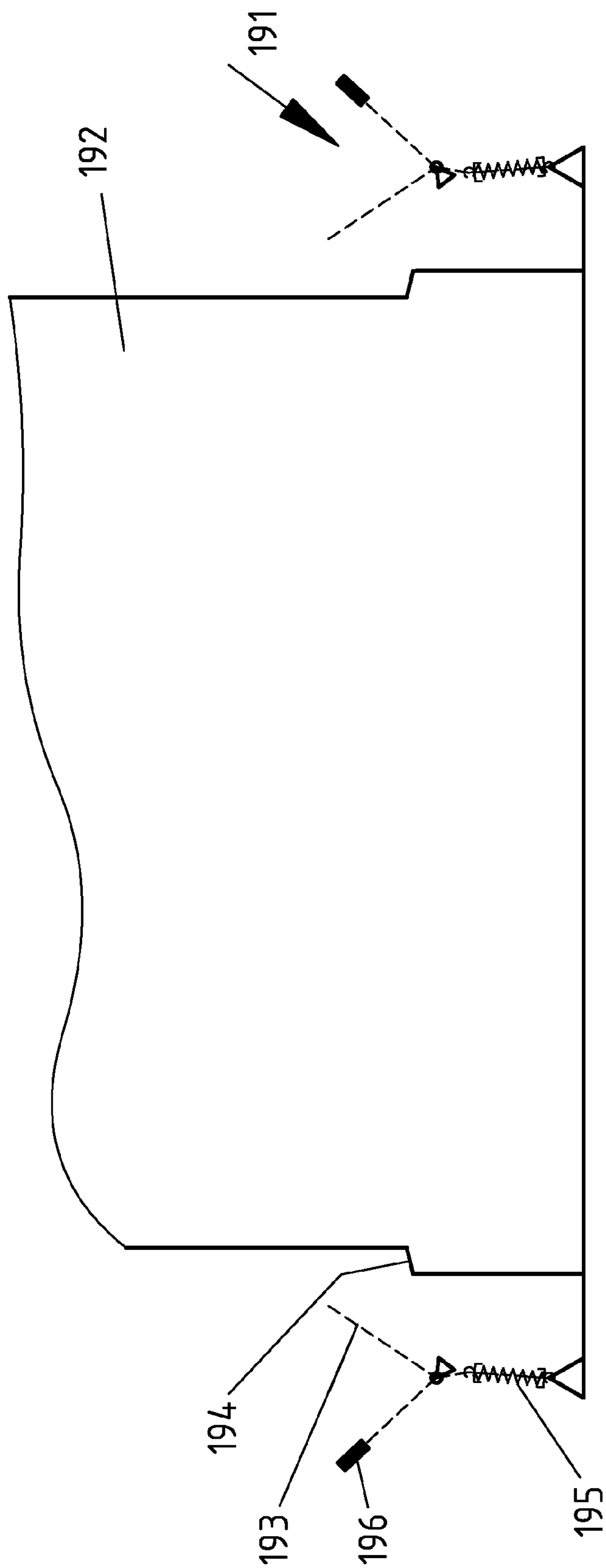
FIG. 33 i is a sketch of an embodiment of a battery with a clamping device on the un-clamping position.

For off-board battery recharging, the present invention relates to a battery recharging equipment configured to allow a very easy battery installation by simple battery deposition on an off-board recharging contact plate. As it was discussed before, taking into consideration the plurality of independent power supply units and the plurality of battery modules, in order to obtain a good electric contact, one of the contacts of each pair of contacts has to be an elastic contact capable to take the dimensional variation. In FIG. 30 is shown an embodiment of an ordinary pair of contacts having a female type of socket 182 and a male type of plug-in connector 183. The elastic element in this design is the socket 182. This kind of contacts may be used for small batteries, used for example for electric bikes, cordless powered tools, etc. Another embodiment for this pair of contacts, may be like in FIG. 31, where the two contacts 184 and 185 have a flat contact surface and one of them is installed on an elastic element 186. In this cases it is necessary to use some alignment elements in order to make sure the contacts of the battery 187 and the contact plate 188 fit each other. These alignment elements are two conical pins 189, which go into the conical holes 190 of the battery 187. Using the kind of contacts like in FIG. 31, the battery has to be attached to the vehicle/cordless powered tool/equipment very quickly by a clamping device 191, like in FIG. 32. The battery 192 is kept in place by a clamping device 191, which is in this embodiment an articulated clamping mechanism comprising a clamping arm 193, which acts on a shoulder 194 of the battery 192 activated by a compression spring 195. By the handle 196 the clamping device is opened and the battery will be set free to be taken out, see FIG. 33.

Figure 34:
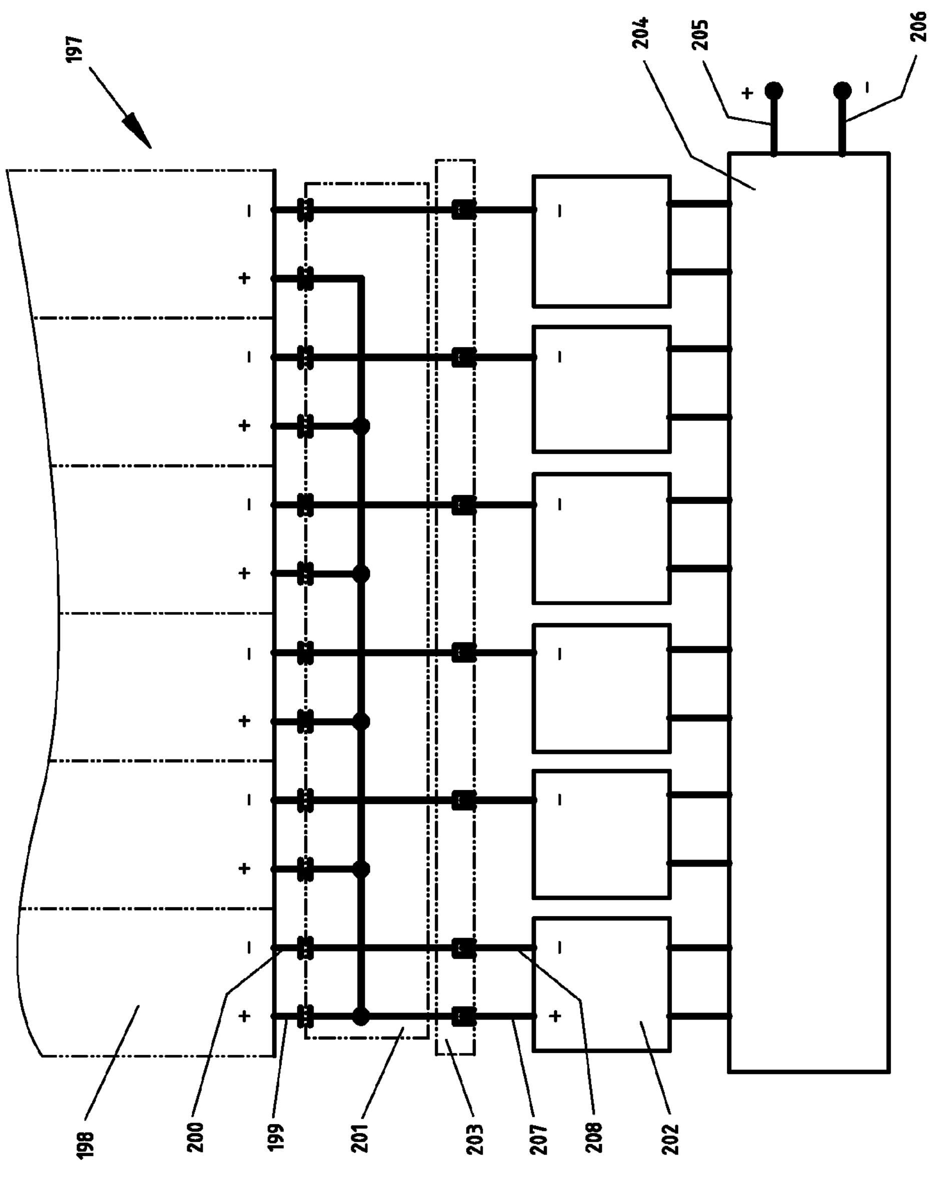
FIG. 34 is a wiring diagram of a battery with its recharging contact plate in recharging mode.
Figure 35:
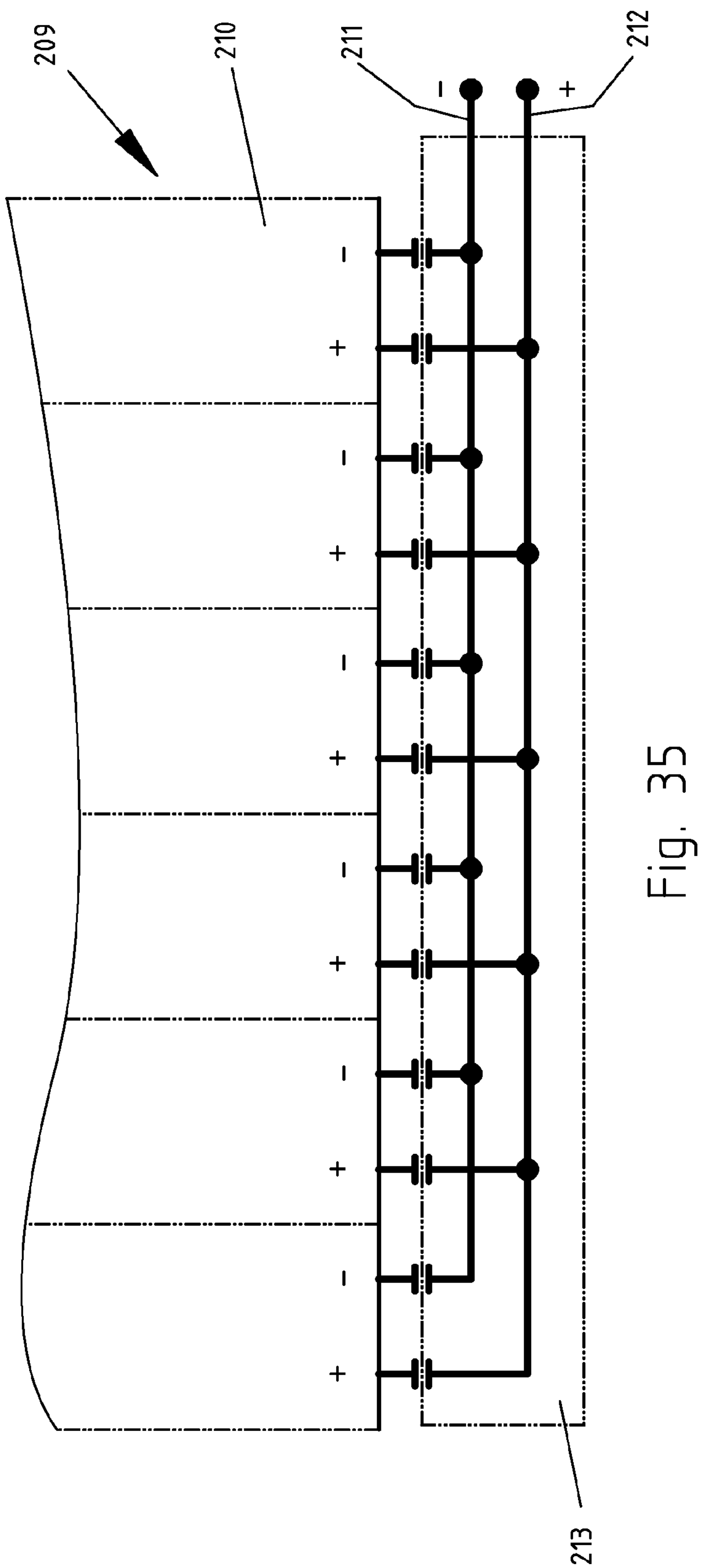
FIG. 35 is a wiring diagram of a battery with its supplying contact plate in supplying mode, having the plurality of independent battery modules connected each other in parallel.
Figure 36:
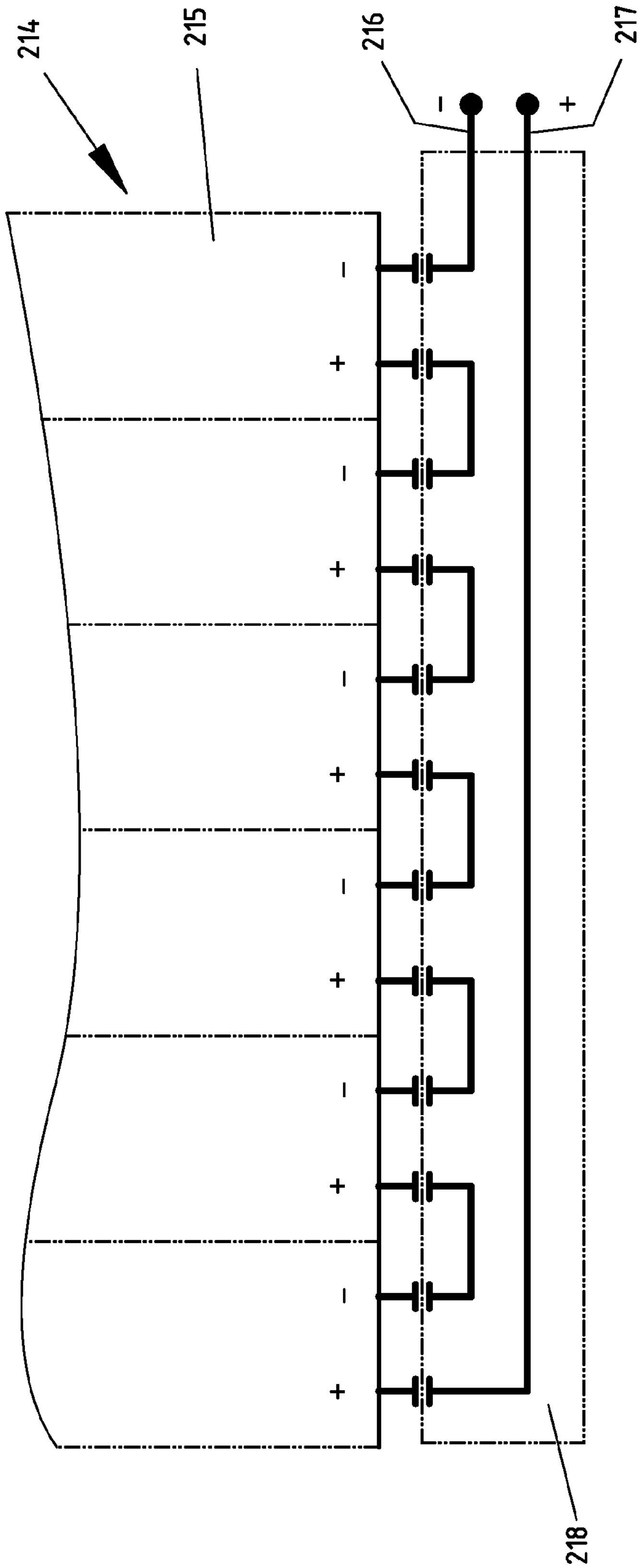
FIG. 36 is a wiring diagram of a battery with its supplying contact plate in supplying mode, having the plurality of independent battery modules connected each other in series.

For off-board recharging version, the batteries in the recharging mode are connected to the independent power supplying units via a "recharging contact plate" and in supplying mode they are connected to the vehicle/cordless powered tool/equipment via a "supplying contact plate". In FIG. 34 is illustrated the wiring diagram of a off-board recharging battery 197 in recharging mode, having a plurality of independent modules 198 each module with a positive terminal 199 and a negative terminal 200, fitting with the respective contacts of the recharging contact plate 201, which is connected to a plurality of independent power supply units 202, via the multi-contacts equipment battery inlet and the independent multi-contact charger 203. The independent power supply units are powered by the power station 204, which has the positive terminal 205 and the negative terminal 206. The power station may be one phase AC 120V or two phase AC 240V, or three phase AC 380V. Also, the independent power supply units may be one phase AC, or DC or three phase AC. For the following embodiments the independent power supply units will be considered one phase AC. As can be seen, each independent battery module 198 of the battery 197 is connected to one positive terminal 207 of one independent power supply unit 202 and to the negative terminal 208 of each independent power supply unit, via the recharging contact plate 201 and the independent multi-contact charger 203. In FIG. 35 is shown the same battery 209 having a plurality of independent battery modules 210 connected each other in parallel, in supplying mode, using a "supplying contact plate" 213. As can be seen, all independent battery modules are connected in parallel to the positive terminal 212 and to the negative terminal 211 of the battery 209, located on the supplying contact plate 213, representing the main battery terminal. In FIG. 36 is shown the similar battery 214 having the plurality of independent battery modules 215 connected each other in series, in supplying mode. As can be seen, all modules are connected in series each other and connected to the negative terminal 216 and the positive terminal 217 of the battery 214 which are located on the supplying contact plate 218, representing the main battery terminal.

Consequently, for off-board battery recharging it is necessary one recharging contact plate installed outside of the vehicle and one supplying contact plate installed on the vehicle. The recharging contact plate is connected to the plurality of independent power supply units (via an independent multi-contact charger and the multi-contacts equipment battery inlet) and to the plurality of independent battery modules, realizing the connection between the independent powers supply units and the independent battery modules. The supplying contact plate realizes the connection between the plurality of independent battery modules and the main battery terminal. The recharging and the supplying contact plates for off-board battery recharging are adapted to the battery configuration, taking into consideration the connections between the independent battery modules—parallel, in series or mix. Indifferent of the kind of modules connection, (parallel, in series or mix), these connections are "direct connections" realized into the contact plates, without any other device like: switches or changeover switches. For off-boarding recharging, the main battery terminal is installed on the supplying contact plate. The supplying contact plate realizes a "direct connection" between the plurality of independent battery modules and the main battery terminal. For the recharging contact plate used for off-board recharging, the contact plate inlet is direct connected to the multi-contacts equipment battery inlet. The recharging contact plate realizes a "direct connection" of the plurality of independent battery modules to the vehicle battery inlet, without any switches or changeover switches, for any battery configuration (parallel or series modules connection).

Figure 37:
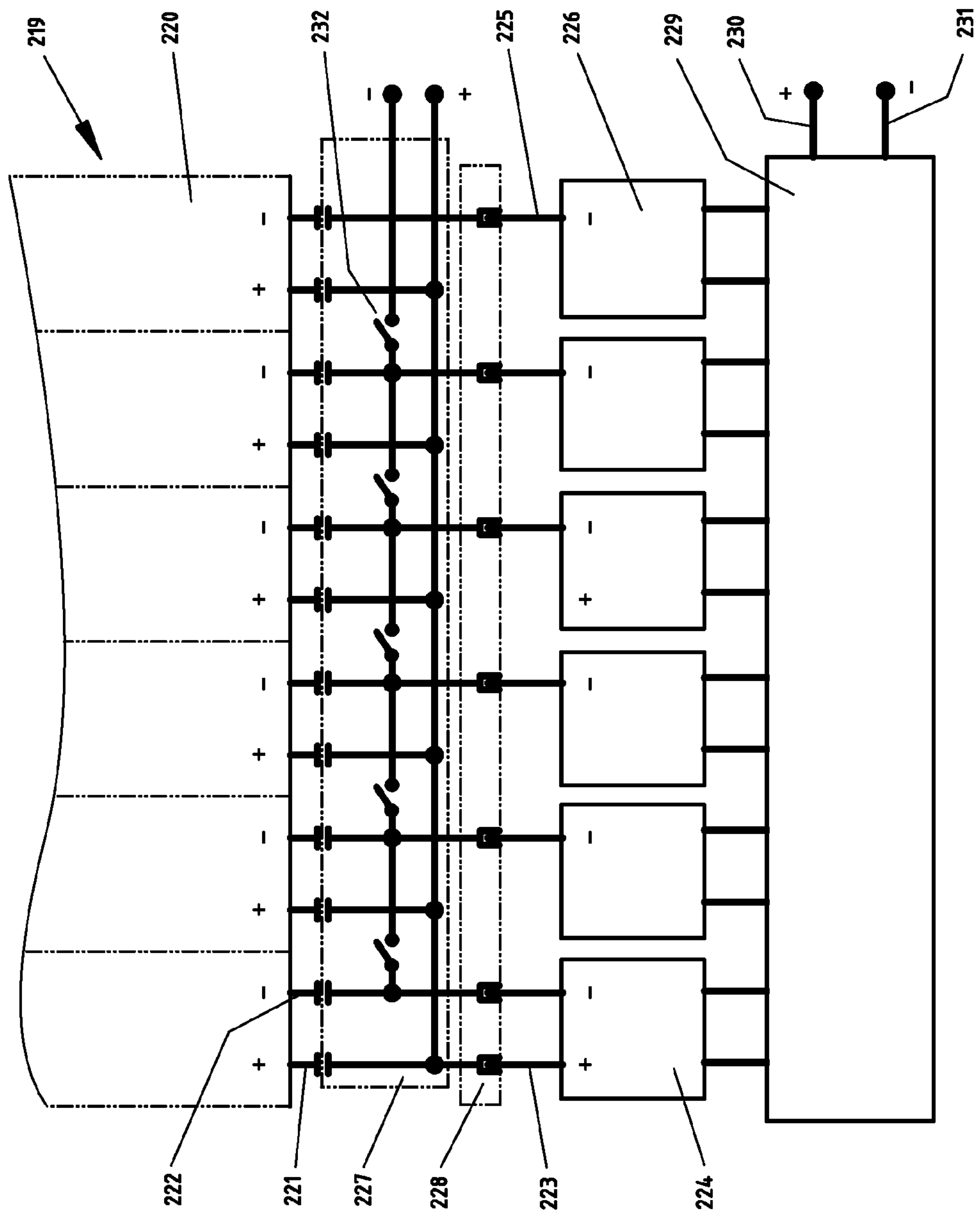
FIG. 37 is a wiring diagram for the recharging mode of a battery with its on-board contact plate, having a plurality of independent battery modules connected in parallel for the supplying mode using battery modules switches.
Figure 38:
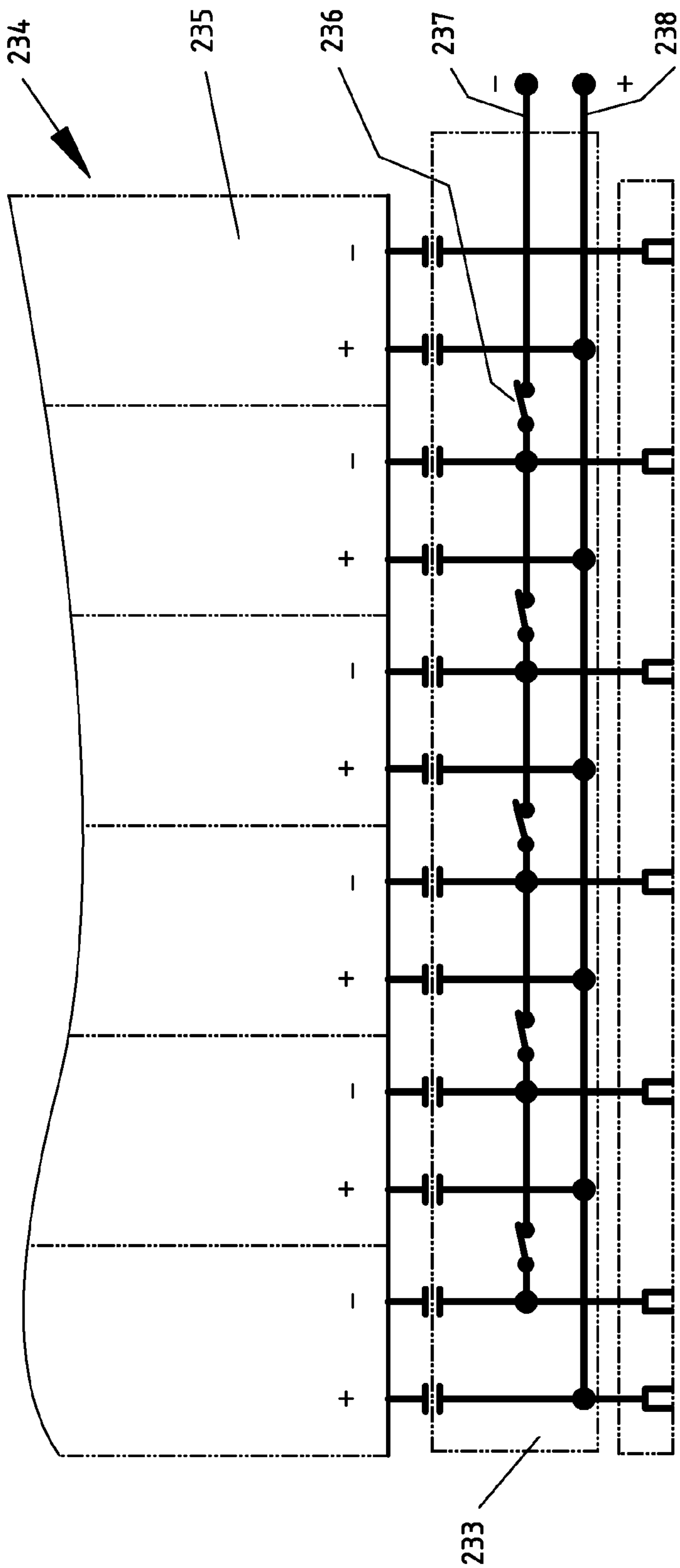
FIG. 38 is a wiring diagram for the supplying mode of a battery with its on-board contact plate, having a plurality of independent battery modules connected in parallel for the supplying mode using battery modules switches.
Figure 39:
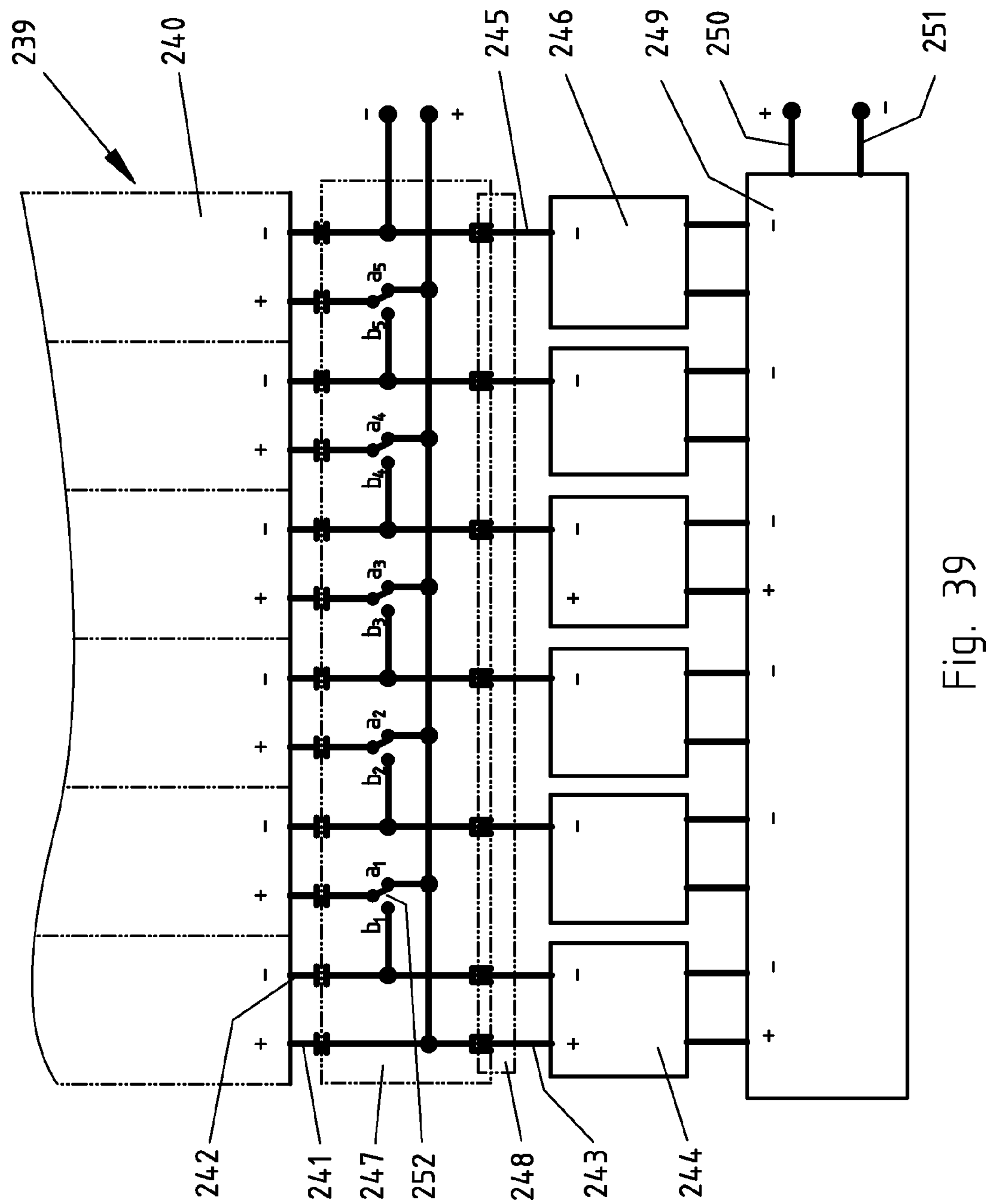
FIG. 39 is a wiring diagram for the recharging mode of a battery with its on-board contact plate, having a plurality of independent battery modules connected in series for the supplying mode using battery changeover switches.
Figure 40:
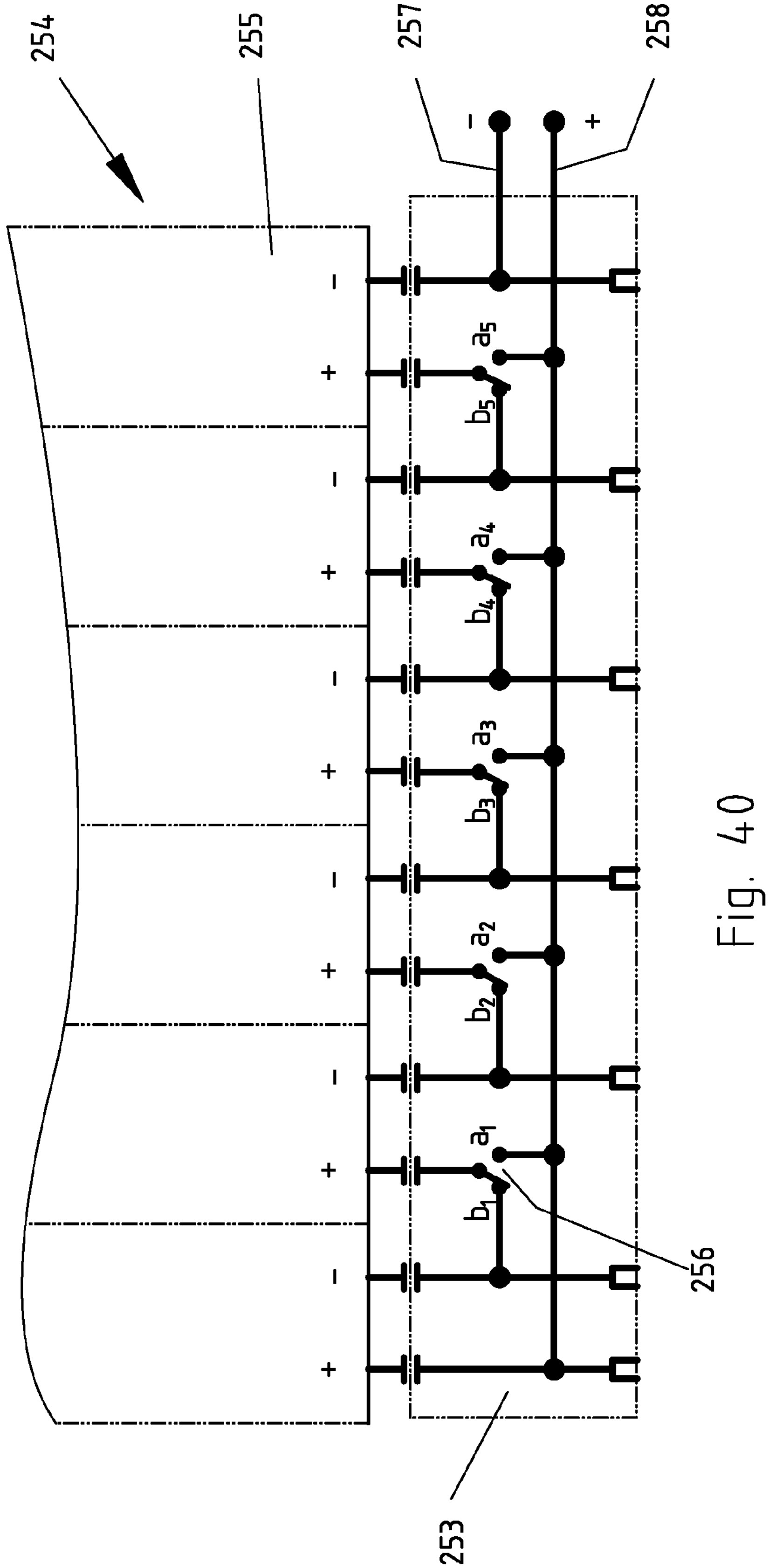
FIG. 40 is a wiring diagram for the supplying mode of a battery with its on-board contact plate, having a plurality of independent battery modules connected in series for the supplying mode using battery changeover switches.
Figure 41:
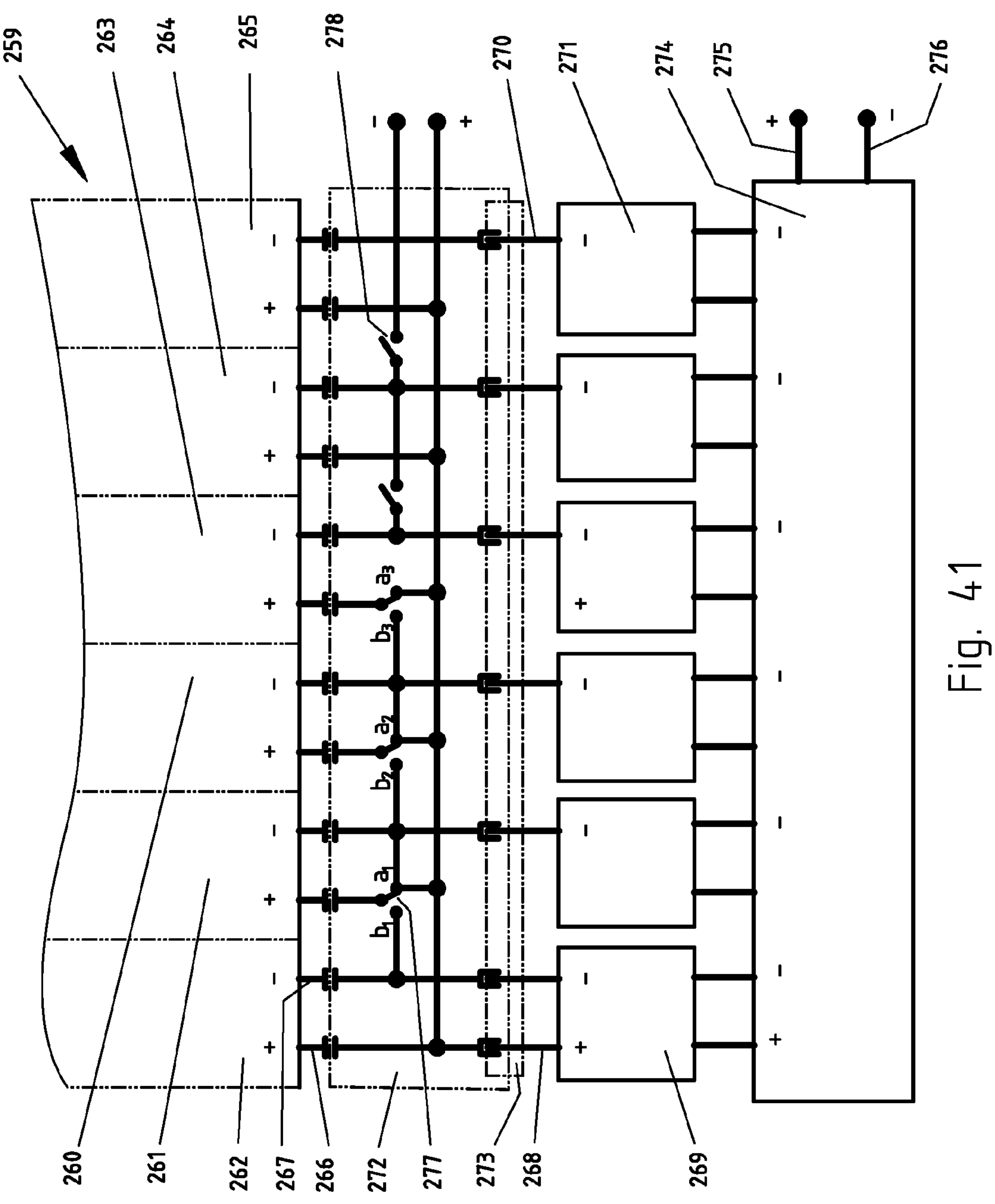
FIG. 41 is a wiring diagram for the recharging mode of a battery with its on-board contact plate, having a triplet of independent battery modules connected in series and a triplet of battery independent modules connected in parallel for the supplying mode.
Figure 42:
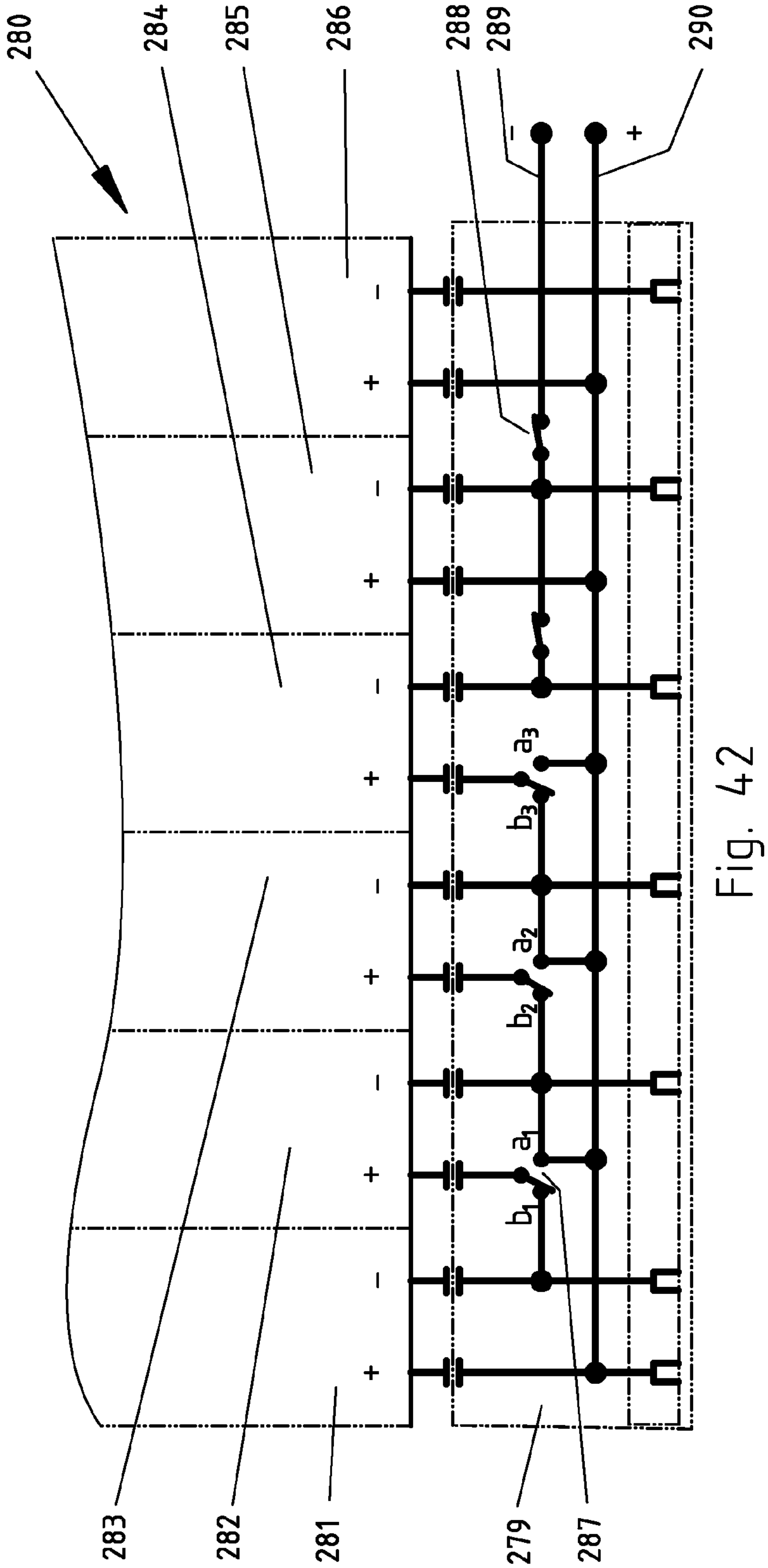
FIG. 42 is a wiring diagram for the supplying mode of a battery with its on-board contact plate, having a triplet of independent battery modules connected in series and a triplet of independent battery modules connected in parallel for the supplying mode.

In case when the battery is used in on board set-up, a unique contact plate is required. Therefore, for this case in FIG. 37 is illustrated the wiring diagram for the recharging mode of a battery 219 having a plurality of independent battery modules 220 connected in parallel for the supplying mode. Each independent battery module having a positive terminal 221 and a negative terminal 222 is connected with its positive terminal to one single positive terminal 223 of one independent power supply unit 224 and with its negative terminal to each negative terminal 225 of each independent power supply unit 226 via the supplying contact plate 227 and the independent multi-contacts charger 228. Each independent power supply unit is connected to the recharging terminal of a power station 229, which has the positive terminal 230 and the negative terminal 231 connected to the electrical grid, (one phase AC). On the negative circuit the modules switches 232 are used. In order to separate the modules each other during the recharging time, these modules switches 232 are on open position. Like is illustrated in FIG. 38, for supplying mode, the same contact plate 233 may be used for the battery 234, having the independent battery modules 235 connected in parallel. The independent multi-contacts charger is disconnected and the modules switches 236 are on ON position, closing the negative circuit and connecting in parallel all battery modules 235. The supplying terminals 237 and 238 of the battery 234 are installed on the contact plate 233. In FIG. 39 is illustrated the wiring diagram for the recharging mode of a battery 239 having a plurality of independent battery modules 240 connected in series for the supplying mode. Each module having a positive terminal 241 and a negative terminal 242 is connected with its positive terminal to one single positive terminal 243 of one independent power supply unit 244 and with its negative terminal to each negative terminal 245 of each independent power supply unit 246 via the contact plate 247 and the multi-contact charger 248. Each independent power supply unit is connected to the recharging terminal of a power station 249, having the positive terminal 250 and the negative terminal 251 connected to the electrical grid, (one phase AC). On the positive circuit of the modules the modules changeover switches 252 are used. In order to separate the modules each other during the recharging time, these modules changeover switches 252 are on $a_i$ position. Like is illustrated in FIG. 40, for supplying mode, the same contact plate 253 may be used for the battery 254, having the independent battery modules 255 connected in series. The independent multi-contacts charger is disconnected and the modules changeover switches 256 are on $b_i$ position, closing the circuit and connecting in series all independent battery modules 255. The supplying terminals 257 and 258 of the battery 254 are installed on the contact plate 253. In FIG. 41 is illustrated the wiring diagram for the recharging mode of a battery 259 having a plurality of battery modules 260, 261, 262 and 263 connected in series and 264 and 265 connected in parallel, in supplying mode. Each module, having a positive terminal 266 and a negative terminal 267, is connected with its positive terminal to one single positive terminal 268 of one independent power supply unit 269 and with its negative terminal to each negative terminal 270 of each independent power supply unit 271 via the contact plate 272 and the independent multi-contacts charger 273. Each independent power supply unit is connected to the power recharging terminal of the power station 274, which has the positive terminal 275 and the negative terminal 276 connected to the electrical grid, (one phase AC). On the positive circuit of the independent battery modules 260, 261, 262 and 263, the modules changeover switches 277 are used, and on the negative circuit of the modules 264 and 265, the modules switches 278 are used. In order to separate the modules each other during the recharging time, these modules changeover switches 277 are on $a_i$ position and the modules switches 278 are on open position. Like is illustrated in FIG. 42, the same contact plate 279 may be used for the battery 280, having the modules 281, 282, 283 and 284 connected in series and 285 and 286 connected in parallel, when it is working in the supplying mode. The independent multi-contacts charger is disconnected and the modules changeover switches 287 are on $b_i$ position, closing the circuit and connecting in series the battery modules 281, 282, 283 and 284 and the modules switches 288 are on closed position, connecting in parallel the battery modules 285 and 286. The supplying terminals 289 and 290 of the battery 280 are installed on the contact plate 279. In case when the battery is used in on board set-up, a unique contact plate is required. Depending on the independent battery modules connection to each other, for parallel connection is necessary to have a plurality of ordinary modules switches and for series connection is necessary to have a plurality of modules changeover switches. These modules switches and modules changeover switches may be installed outside or inside of the contact plate. The battery supplying terminals are always installed on the recharging/supplying contact plate.

Up to here it was described in detail the principle and the embodiments for high performance recharging battery assembly for on-board and off-board version, aiming the shortest recharging time possible to achieve.

These principles may be applied to a variety of applications, each one requiring specific characteristics, depending on a plurality of factors such as: electrical parameters, price, recharging time, location, size of the equipment, etc. Each solution is defined by the type of the equipment, the type of battery and its wiring diagram, the type of independent power supply units, the type of power station, type of recharging terminal and the type of charger.

In Table 1 to Table 4 is presented a synthesis of potential solutions with their characteristics and the explicative drawings associated to a variety of embodiments for the battery recharging system.

Figure 43:
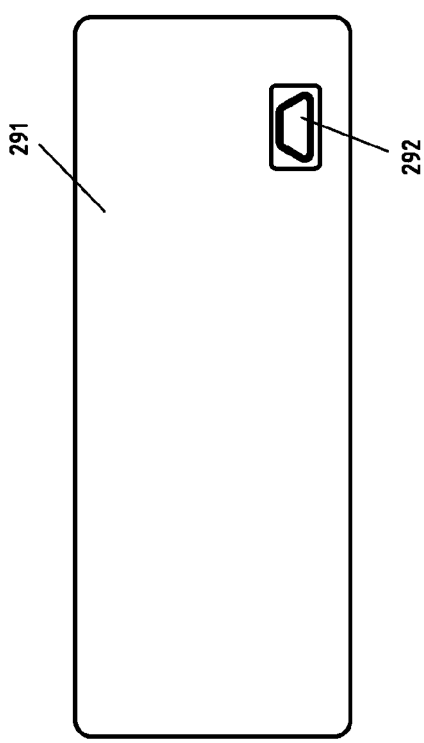
FIG. 43 shows an equipment having a single equipment battery inlet.

A battery recharging system comprises the battery assembly, the equipment battery inlet, the charger with its charger outlet, the power station with its plurality of recharging terminals with their independent power supply units. Depending on the chosen version of each component, the design of the battery recharging system is different as following:

In Table 1 are illustrated two types of equipment based on the number of the equipment battery inlets. There are two possibilities: single inlet equipment and multi-inlet equipment. For a multi-inlet equipment, the battery assembly is the ensemble of a plurality of batteries installed on the equipment, each battery having its own equipment battery inlet. For the multi-inlet equipment the batteries may be inter-connected in series or in parallel. Specific to this design is the fact that in the recharging mode the batteries have to be disconnected each other and in supplying mode they have to be connected to a unique main battery terminal. This is realized by a battery assembly control equipment comprising a plurality of "battery changeover switches" for batteries connected in series and a plurality of "battery switches" for batteries connected in parallel. In FIG. 43 is shown an equipment 291 having a single battery inlet 292.

Figure 44:
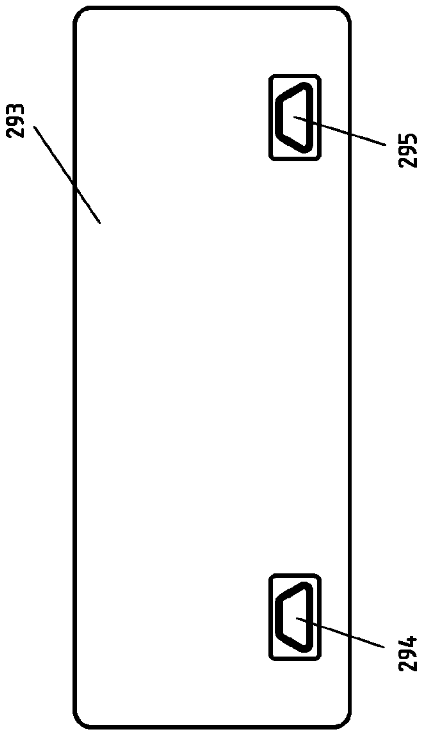
FIG. 44 shows an equipment with two equipment battery inlets.
Figure 46:
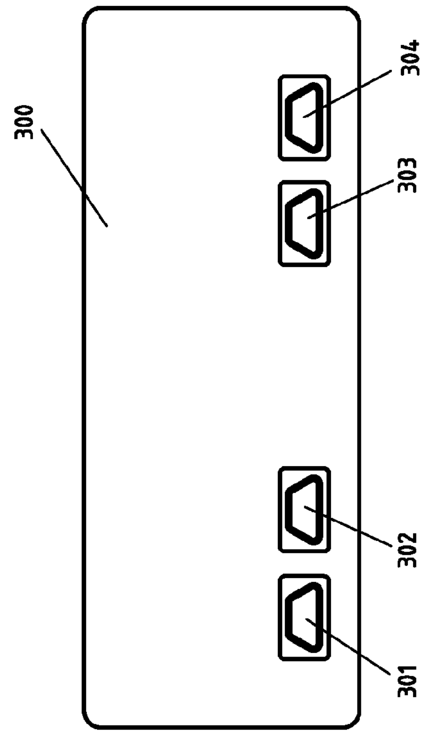
FIG. 46 shows an equipment with four equipment battery inlets.
Figure 45:
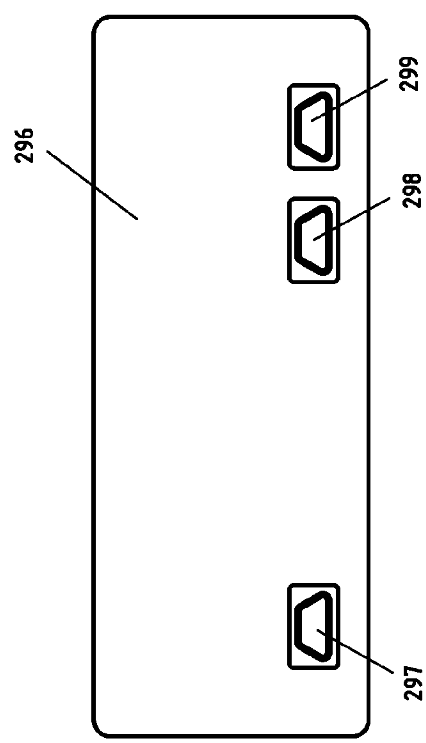
FIG. 45 shows an equipment with three equipment battery inlets.
Figure 47:
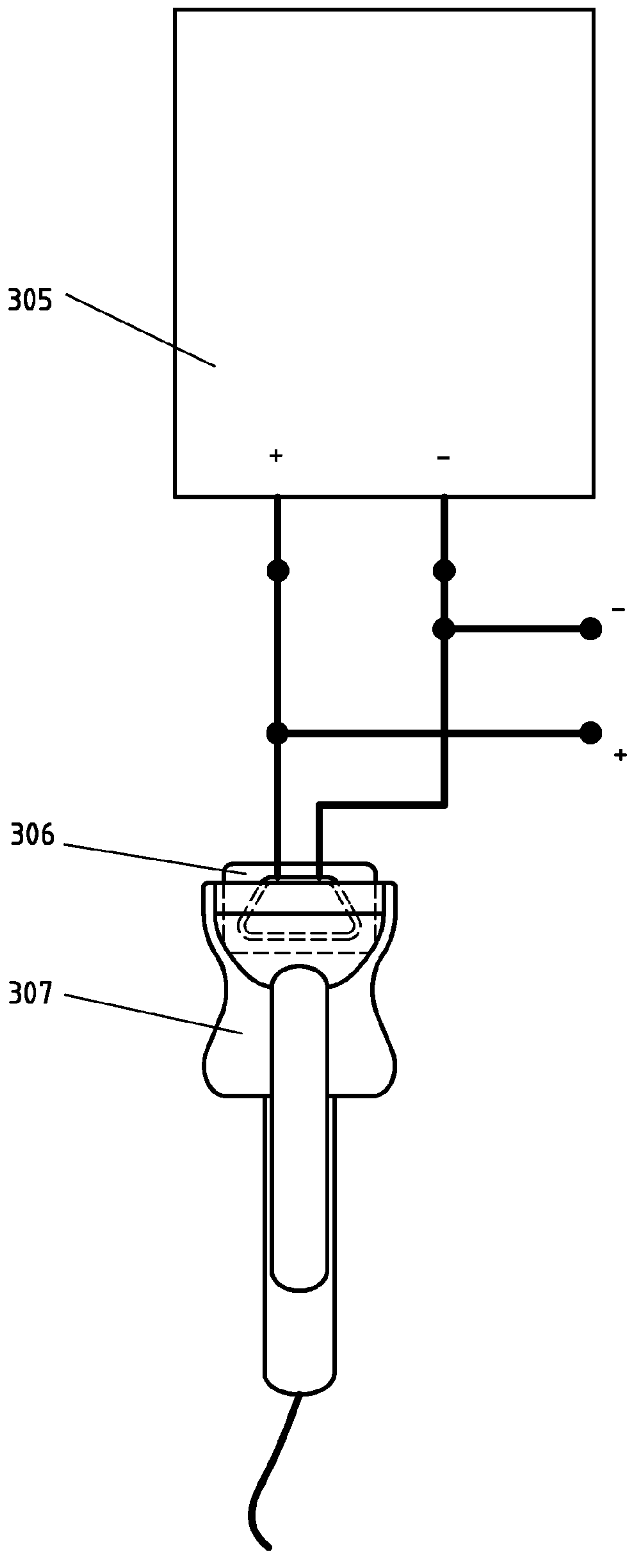
FIG. 47 is the wiring diagram of a single-inlet equipment in recharging mode.
Figure 48:
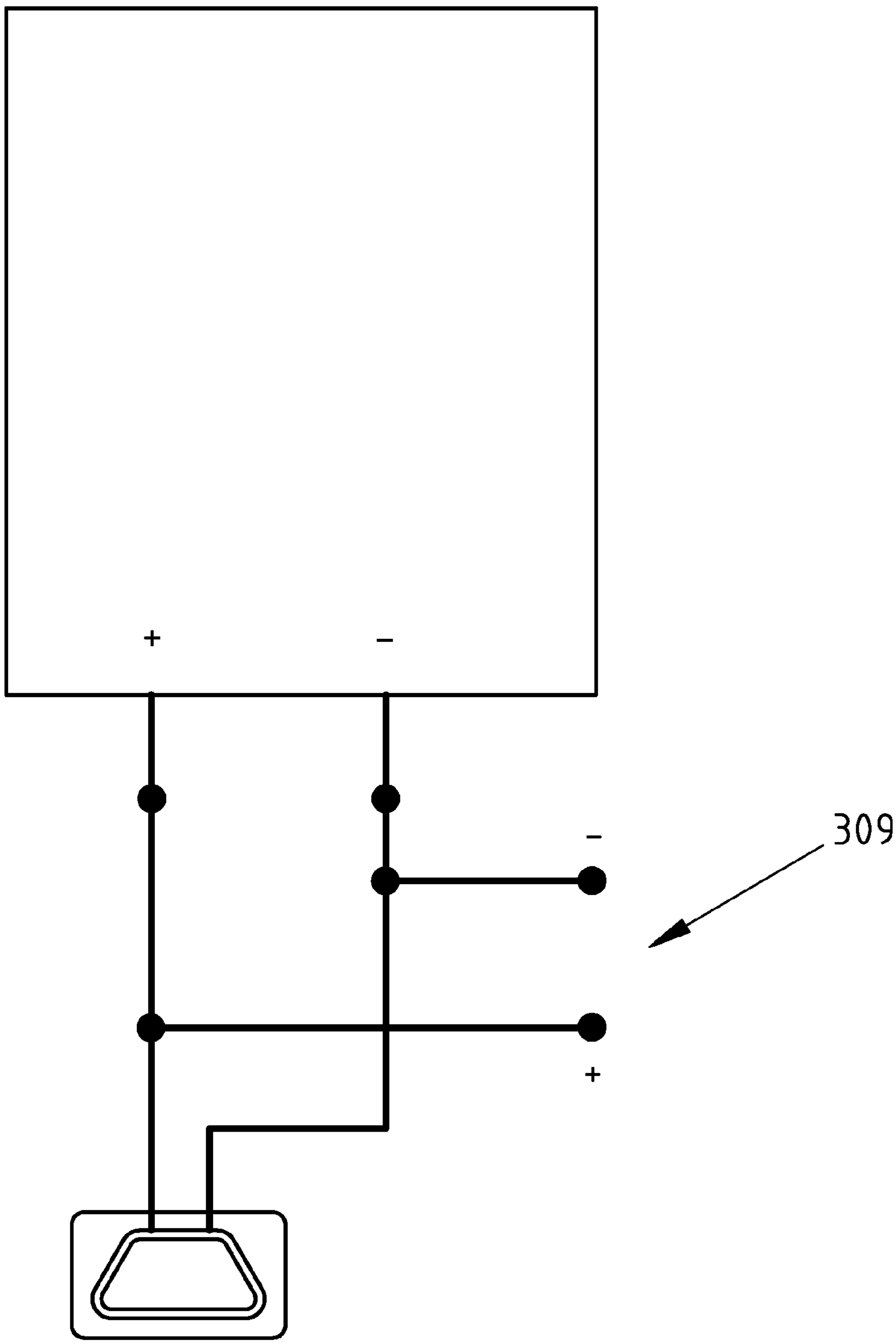
FIG. 48 is the wiring diagram of a single-inlet equipment in supplying mode.
Figure 49:
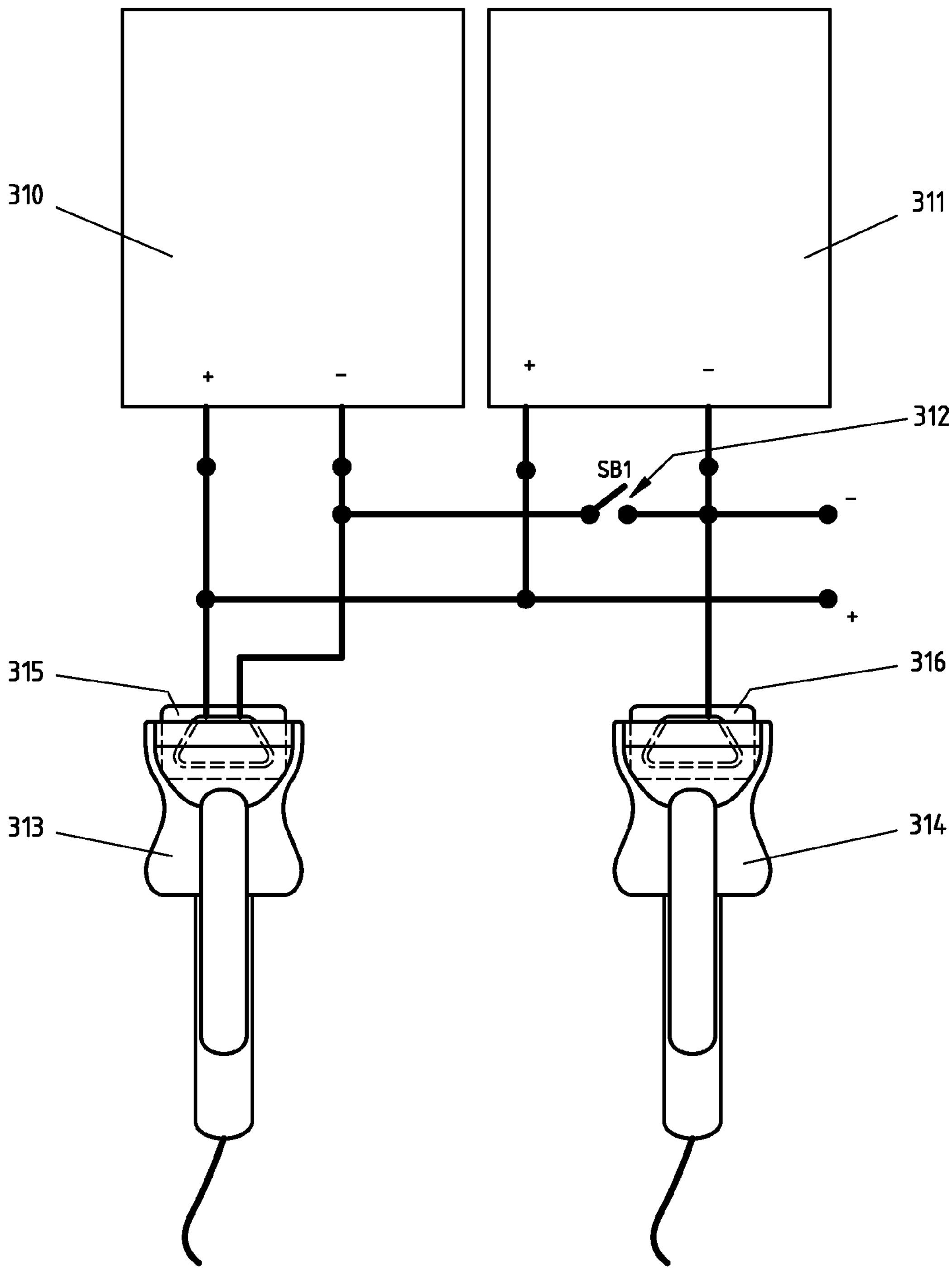
FIG. 49 is the wiring diagram of a double-inlet equipment with batteries connected in parallel in recharging mode.
Figure 50:
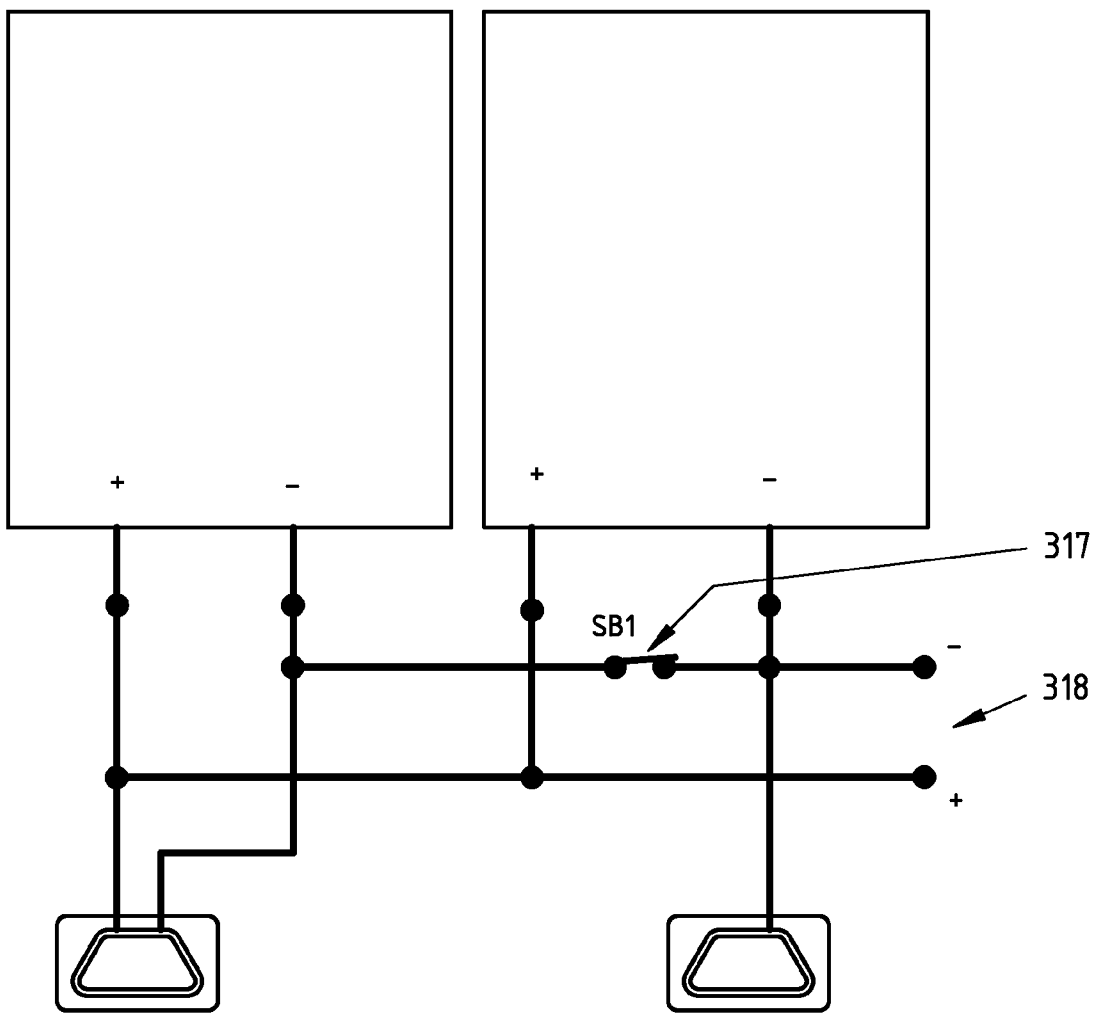
FIG. 50 is the wiring diagram of a double-inlet equipment with batteries connected in parallel in supplying mode.
Figure 51:
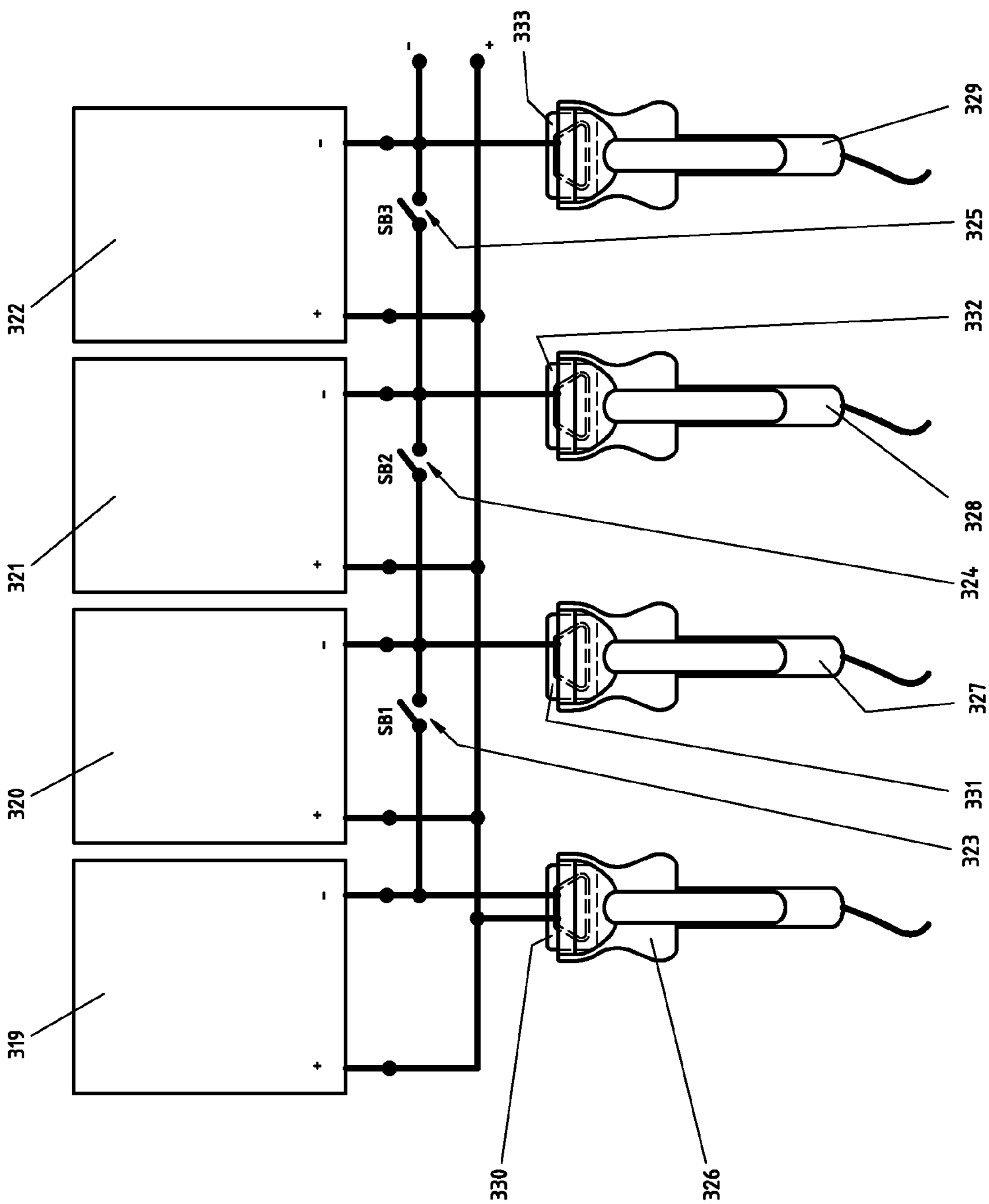
FIG. 51 is the wiring diagram of a four inlet equipment with batteries connected in parallel in recharging mode.
Figure 52:
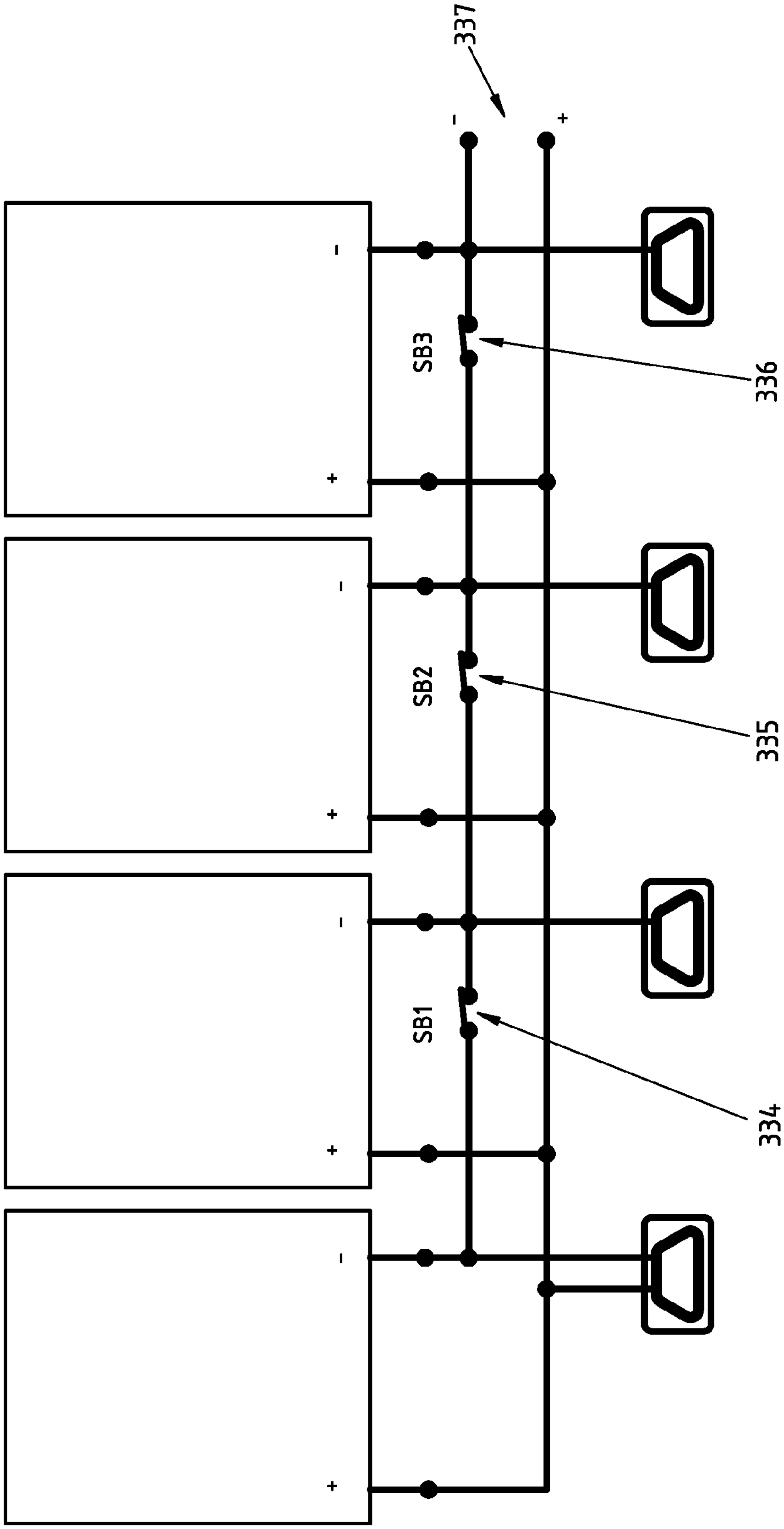
FIG. 52 is the wiring diagram of a four inlet equipment with batteries connected in parallel in supplying mode.
Figure 53:
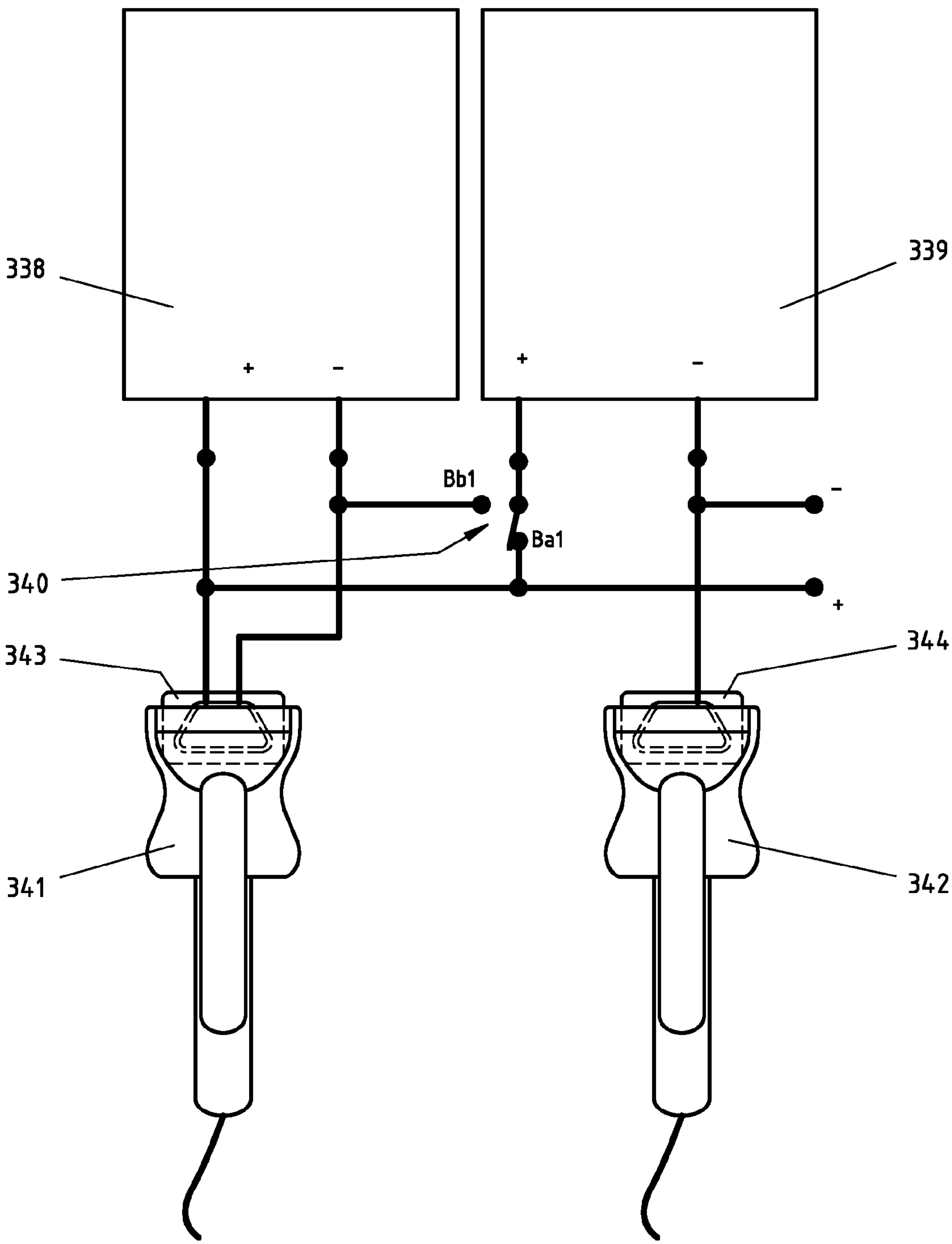
FIG. 53 is the wiring diagram of a double-inlet equipment with batteries connected in series in recharging mode.
Figure 54:
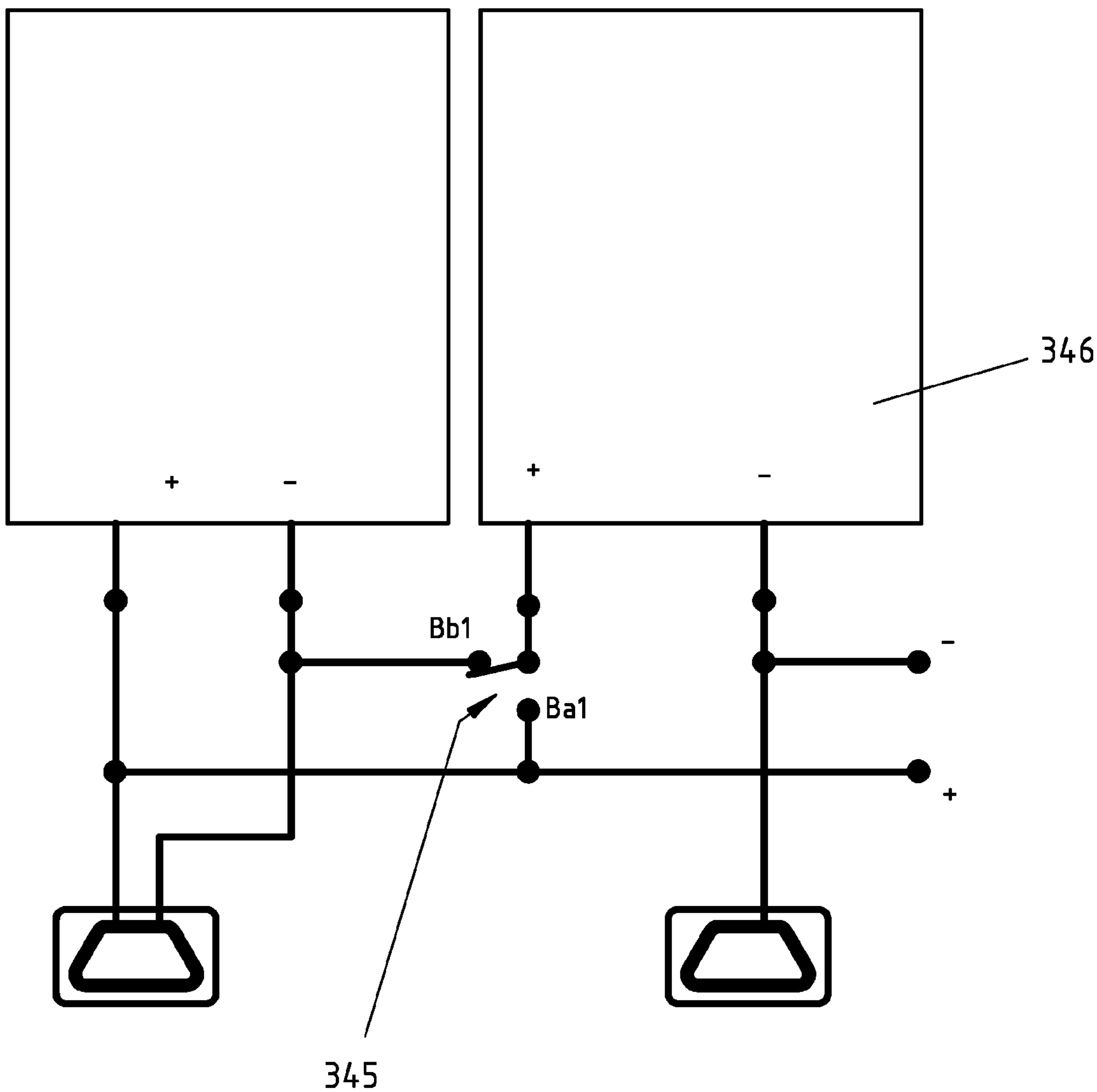
FIG. 54 is the wiring diagram of a double-inlet equipment with batteries connected in series in supplying mode.
Figure 55:
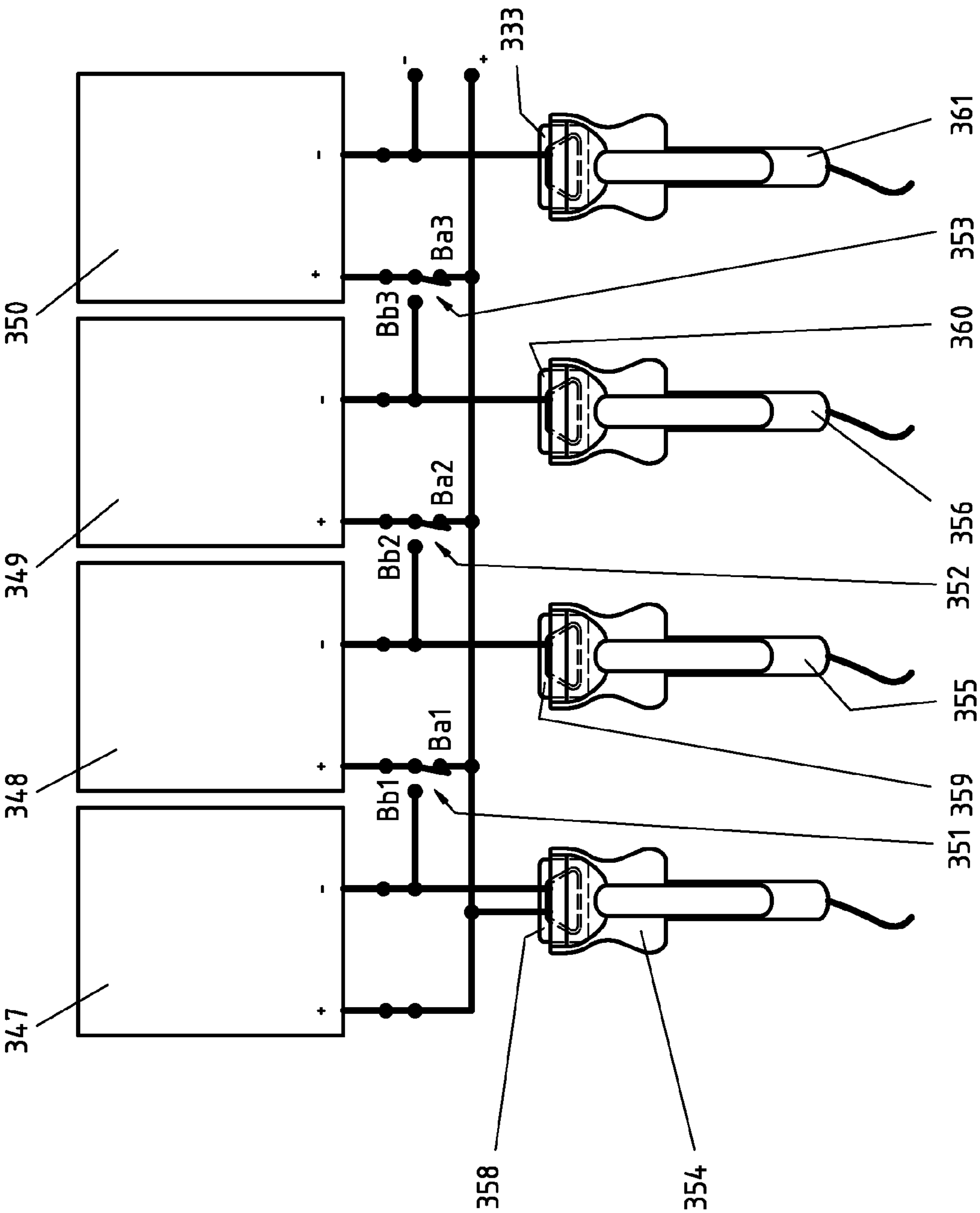
FIG. 55 is the wiring diagram of a four inlet equipment with batteries connected in series in recharging mode.

FIG. 44 shows an equipment 293 with two equipment battery inlets 294 and 295. FIG. 45 shows an equipment 296 with three equipment battery inlets 297, 298 and 299. FIG. 46 shows an equipment 300 with four equipment battery inlets 301, 302, 303 and 304. In FIG. 47 to FIG. 56 are presented wiring diagrams of different configurations in recharging and in supplying mode, as following: FIG. 47 is the wiring diagram of a single-inlet equipment with a battery 305 and a single equipment battery inlet 306 shown in recharging mode, having an independent multi-contacts charger 307 installed into the multi-contacts equipment battery inlet 306. FIG. 48 is the wiring diagram in supplying mode of the same equipment presented in FIG. 47, having the main battery terminal 309. FIG. 49 is the wiring diagram for recharging mode of a double-inlet equipment with two batteries 310 and 311 connected in parallel, using a battery switch 312, which is on open position for the recharging mode, having two independent multi-contacts chargers 313 and 314 installed into the multi-contacts equipment battery inlets 315 and 316. FIG. 50 is the wiring diagram in supplying mode of the same equipment presented in FIG. 49, having the battery switch 317 on closed position and the unique main battery terminal 318. FIG. 51 is the wiring diagram for recharging mode of an equipment with four equipment battery inlets, having four batteries 319, 320, 321 and 322 connected in parallel, using three battery switches 323, 324 and 325 which are on open position for the recharging mode, having four independent multi-contacts chargers 326, 327, 328 and 329 installed into the multi-contacts equipment battery inlets 330, 331, 332 and 333. FIG. 52 is the wiring diagram in supplying mode of the same equipment presented in FIG. 51, having the battery switches 334, 335 and 336 on closed position and the unique main battery terminal 337. FIG. 53 is the wiring diagram for recharging mode of a double-inlet equipment with two batteries 338 and 339 connected in series, using a battery changeover switch 340, which is in Ba1 position for the recharging mode, having two independent multi-contacts chargers 341 and 342 installed into the multi-contacts equipment battery inlets 343 and 344. FIG. 54 is the wiring diagram in supplying mode of the same equipment presented in FIG. 53, having the battery changeover switch 345 in Bb1 position and the unique main battery terminal 346. FIG. 55 is the wiring diagram for recharging mode of an equipment with four equipment battery inlets, having four batteries 347, 348, 349 and 350 connected in series, using three battery

TABLE 1

Figure 56:
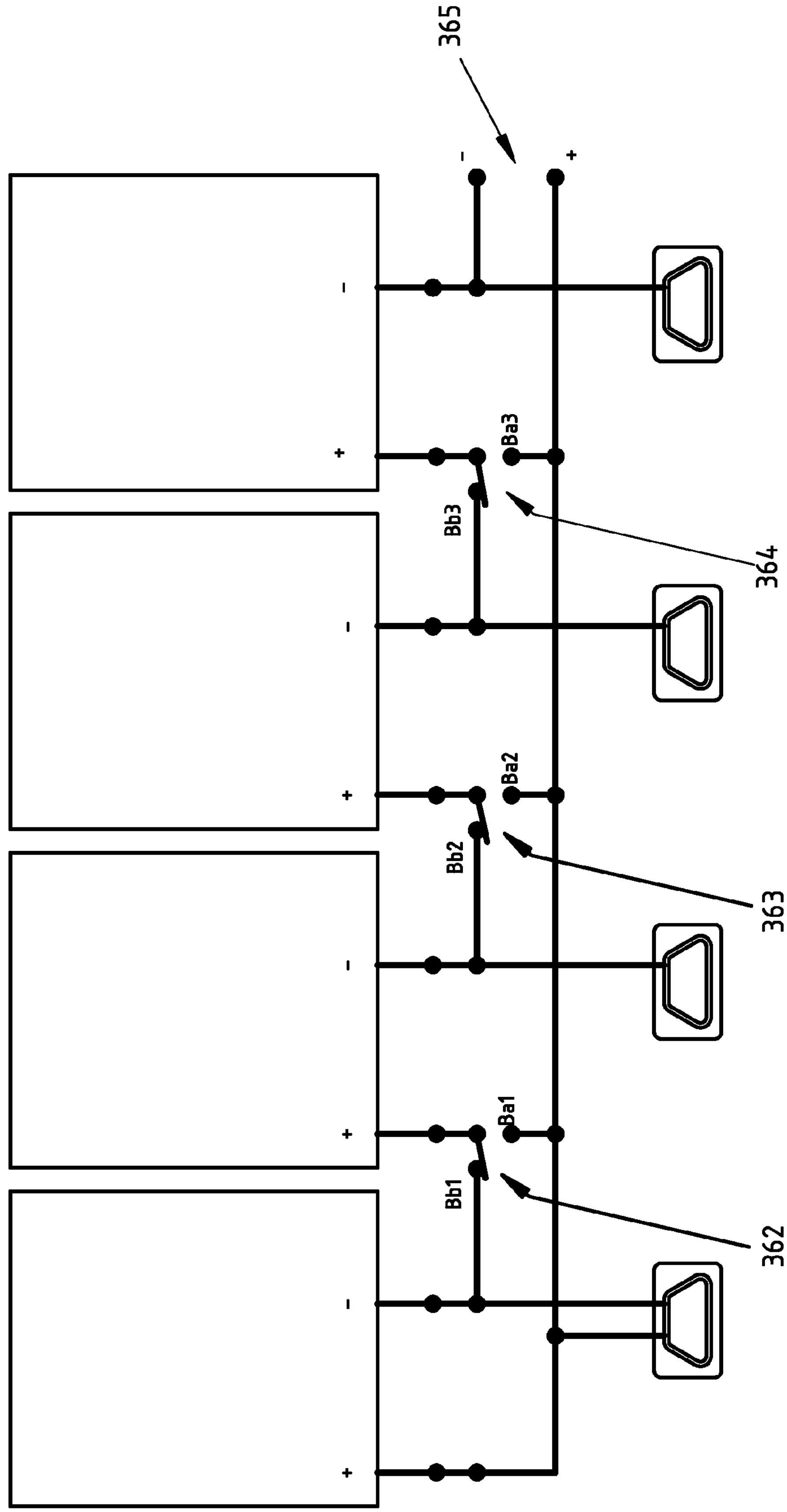
FIG. 56 is the wiring diagram of a four inlet equipment with batteries connected in series in supplying mode.

| Equipment Type | Equip. Code | Equip. Battery Inlet Number | Batteries Number | Equip. With its Battery Inlets | Batteries Connection | Battery Switches Number | Battery Switches Type | Wiring diagram Recharge | Wiring diagram Supply | Embodiment Recharge | Embodiment Supply | Equip. Battery Inlet | Charger OUTLET |
|---|---|---|---|---|---|---|---|---|---|---|---|---|---|
| Single-inlet | 1IN | 1 | 1 | FIG. 43 | N/A | N/A | N/A | FIG. 47 | FIG. 48 | | | FIG. 67 & FIG. 68 | FIG. 69 |
| Multi-inlet | 2IN | 2 | 2 | FIG. 44 | Parallel | 1 | Ordinary | FIG. 49 | FIG. 50 | FIG. 57 | FIG. 58 | FIG. 71 | FIG. 72 |
| | 2IN | 2 | 2 | | Series | 1 | Change-over | FIG. 53 | FIG. 54 | FIG. 61 | FIG. 62 | | |
| | 3IN | 3 | 3 | FIG. 45 | Parallel | 2 | Ordinary | | | | | | |
| | 3IN | 3 | 3 | | Series | 2 | Change-over | | | | | | |
| | 4IN | 4 | 4 | FIG. 46 | Parallel | 3 | Ordinary | FIG. 51 | FIG. 52 | FIG. 63 | FIG. 64 | | |
| | 4IN | 4 | 4 | | Series | 3 | Change-over | FIG. 55 | FIG. 56 | FIG. 65 | FIG. 66 | | |

changeover switches 351, 352 and 353 which are in Ba1, Ba2 and Ba3 position for the recharging mode, having four independent multi-contact chargers 354, 355, 356 and 357 installed into the multi-contacts equipment battery inlets 358, 359, 360 and 361. FIG. 56 is the wiring diagram in supplying mode of the same equipment presented in FIG. 55, having the battery changeover switches 362, 363 and 364 in Bb1, Bb2 and Bb3 position and the unique main battery terminal 365.

Figure 57:
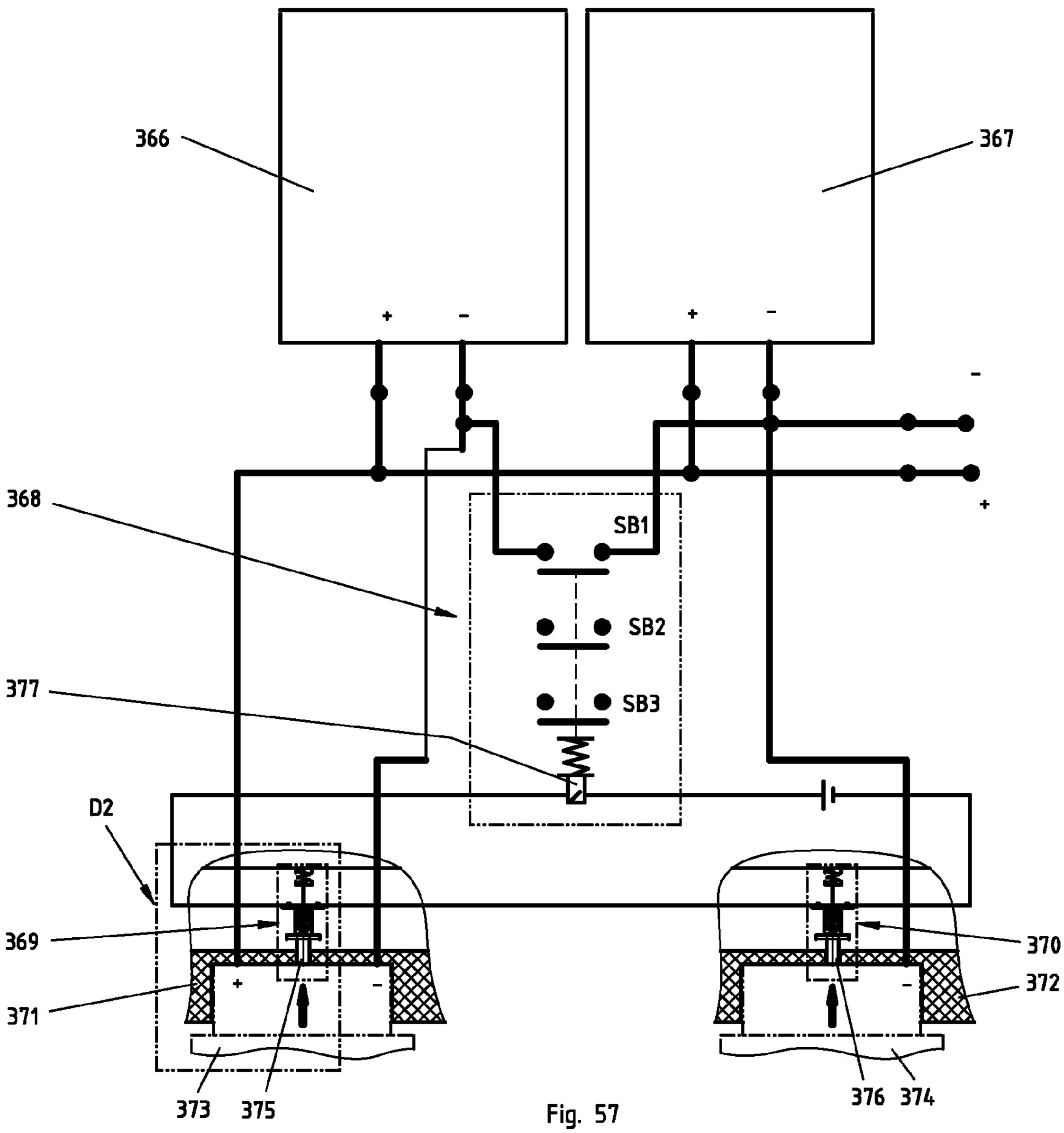
FIG. 57 shows a wiring diagram of an equipment embodiment with two batteries connected in parallel in the recharging mode.
Figure 58:
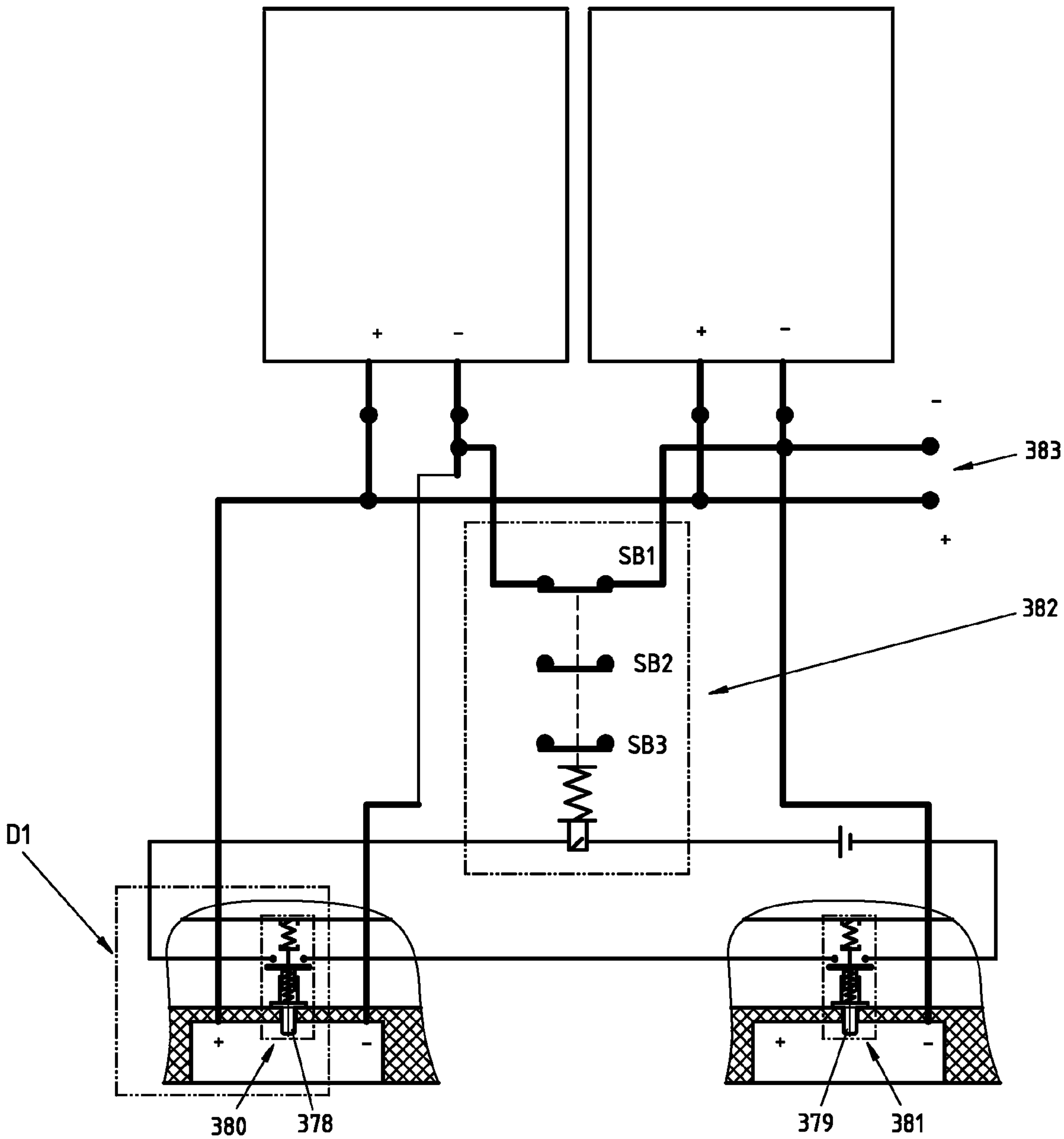
FIG. 58 shows a wiring diagram of an equipment embodiment with two batteries connected in parallel in the supplying mode.
Figure 59:
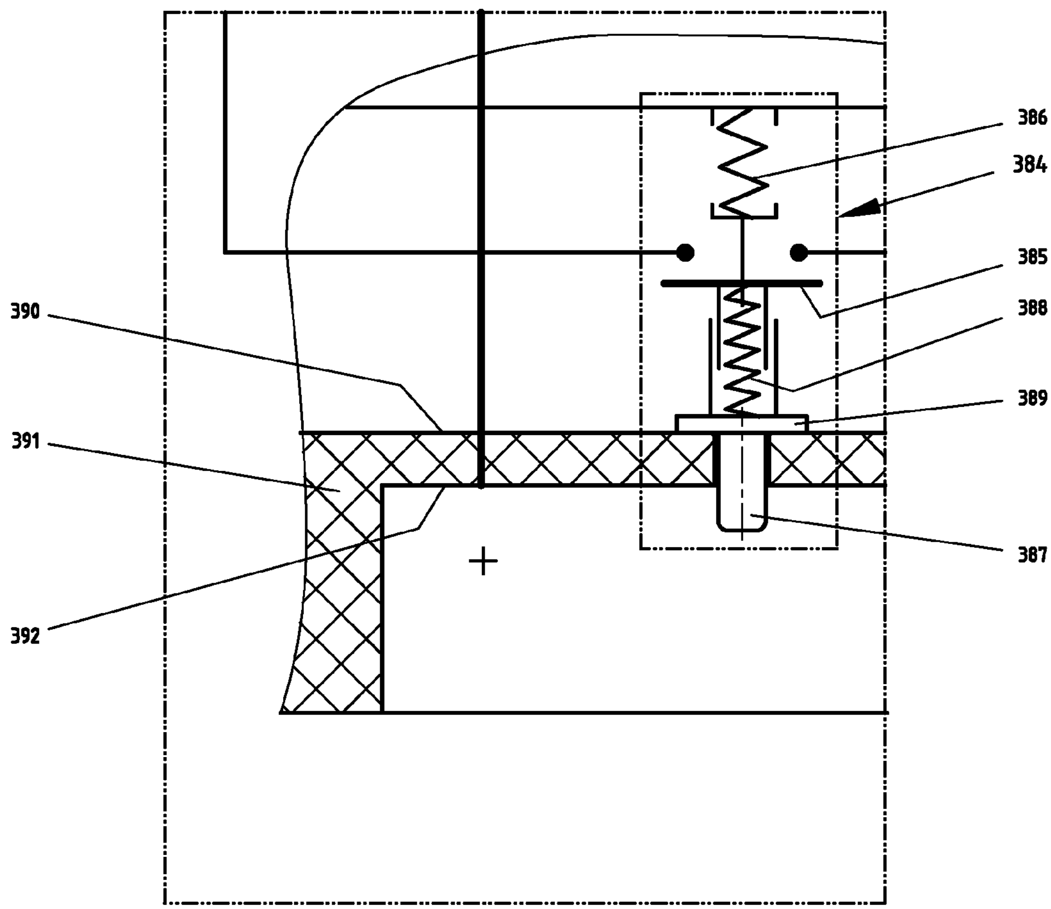
FIG. 59 is the Detail D1 of FIG. 58 showing the battery command switch dis activated for the battery supplying mode.
Figure 60:
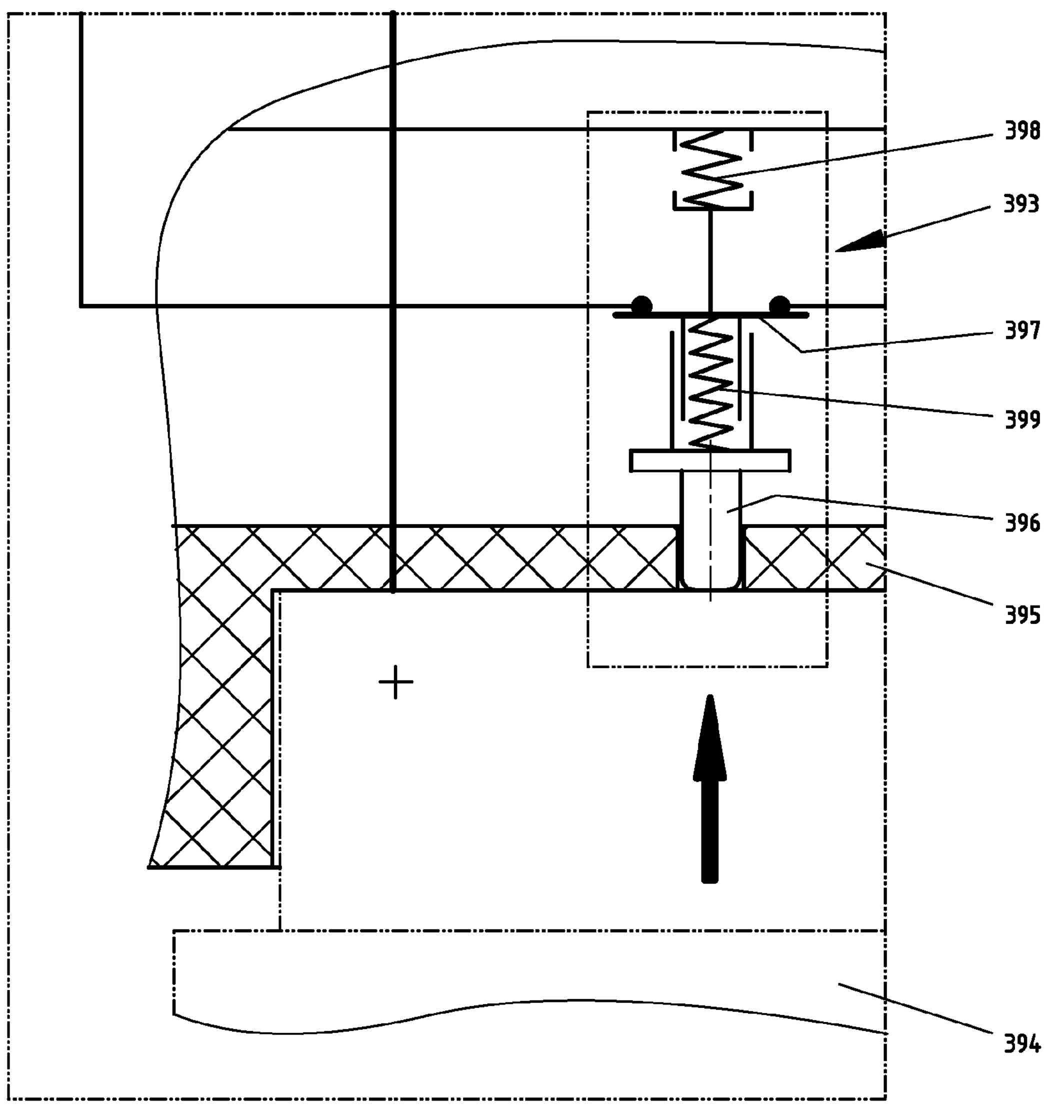
FIG. 60 is the Detail D2 of the FIG. 58, showing the battery command switch activated for the battery recharging mode.
Figure 61:
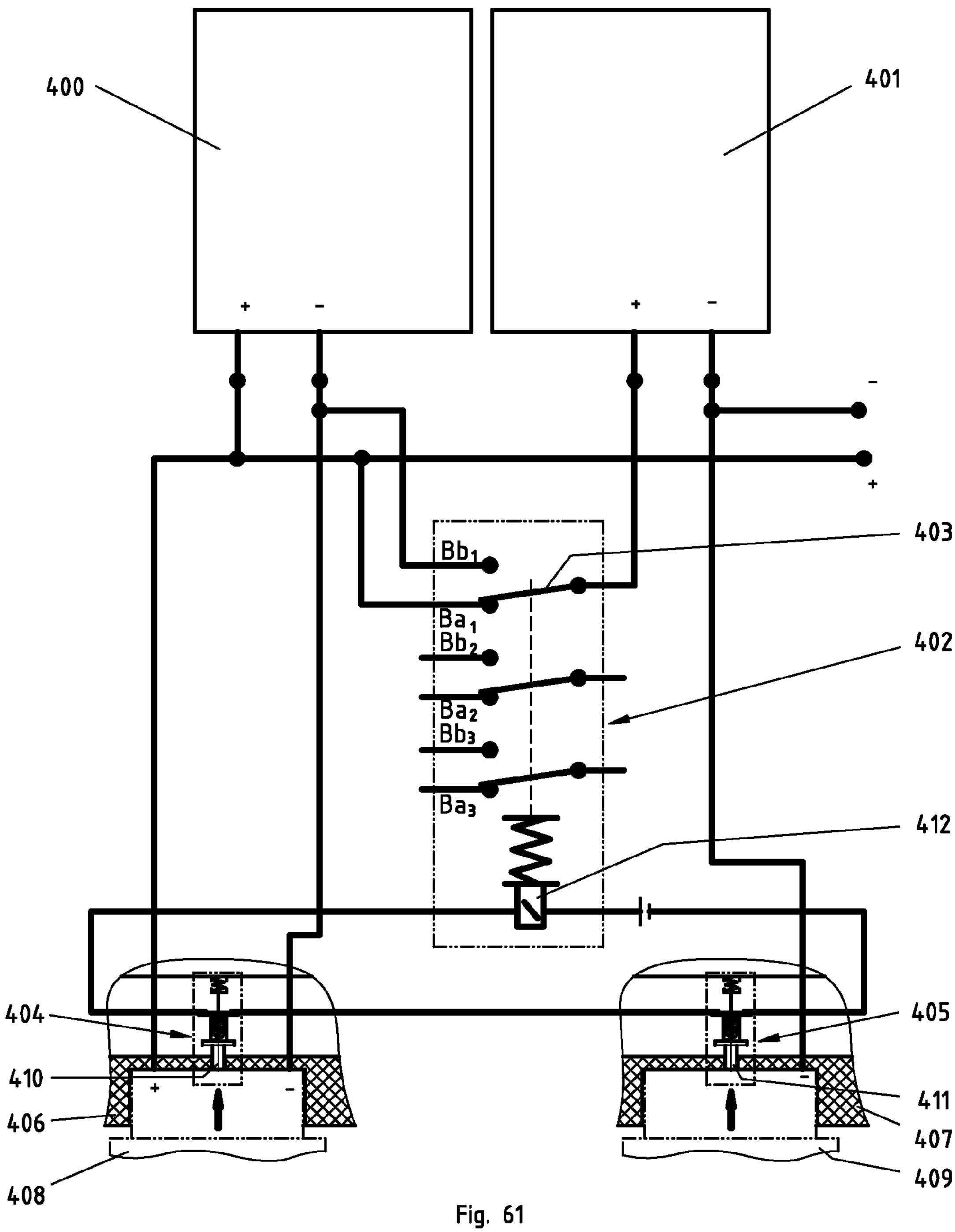
FIG. 61 shows a wiring diagram of an equipment embodiment with two batteries connected in series, in the recharging mode.
Figure 62:
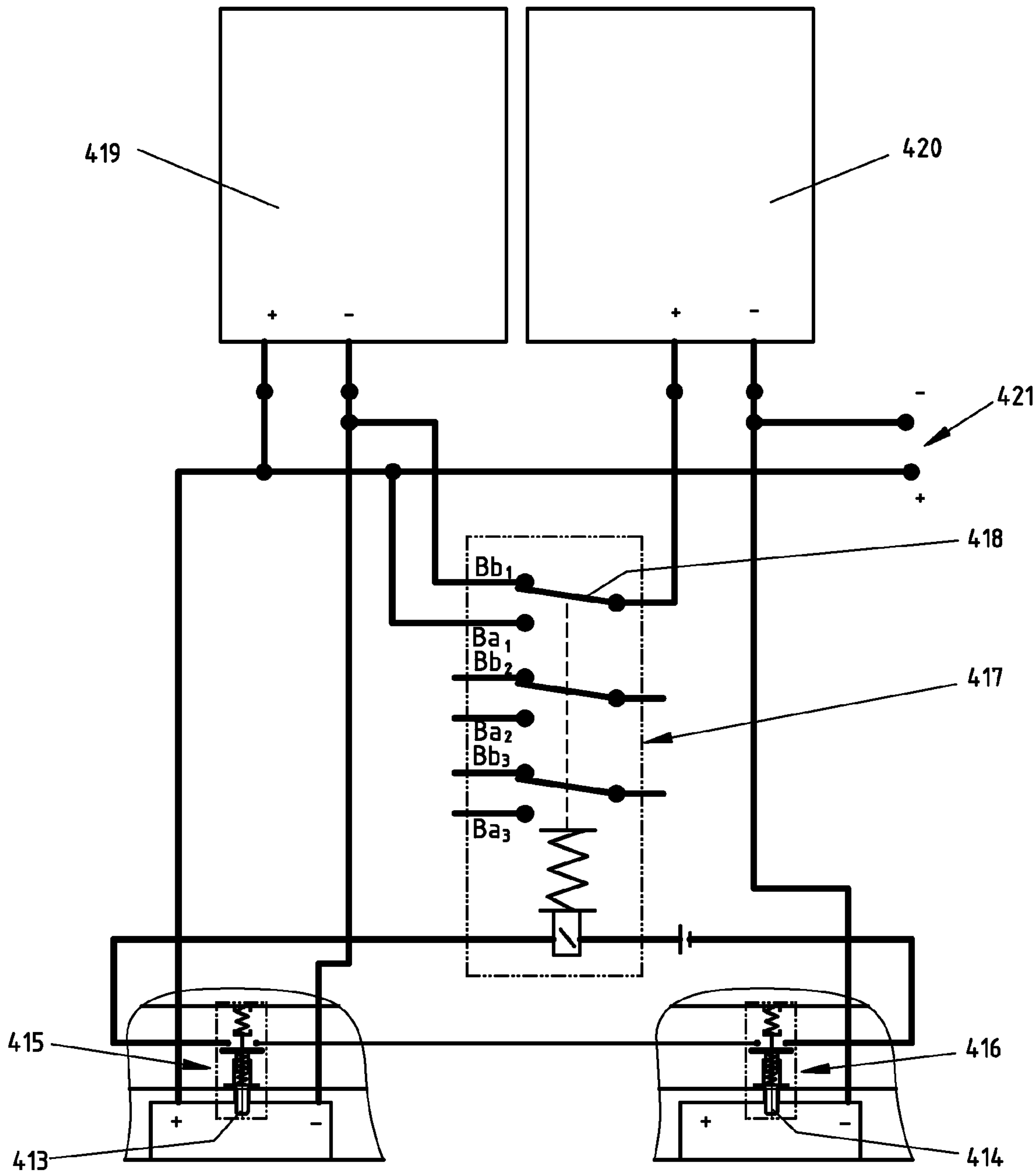
FIG. 62 shows a wiring diagram of an equipment embodiment with two batteries connected in series, in the supplying mode.
Figure 63:
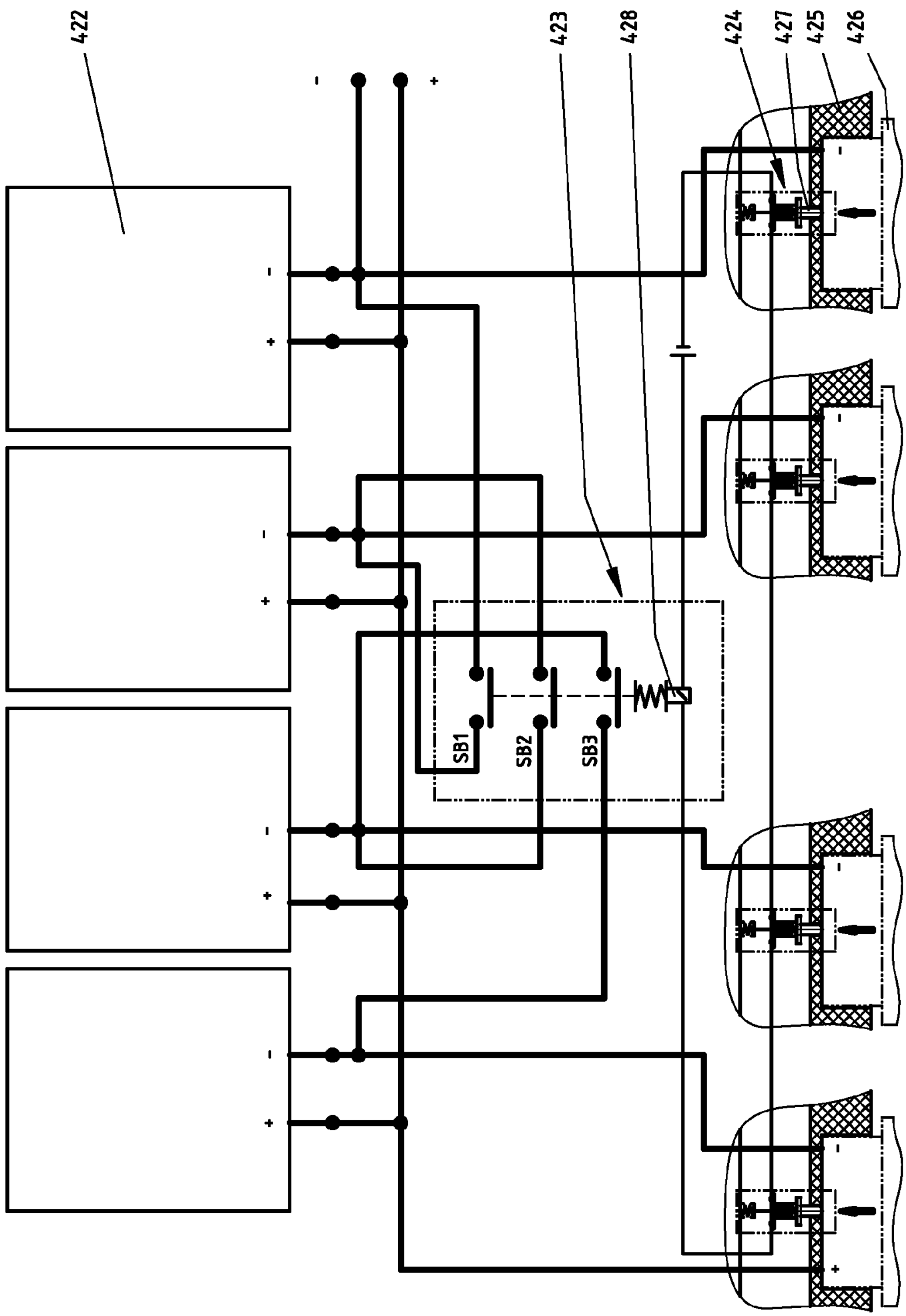
FIG. 63 shows a wiring diagram of an equipment with four batteries connected in parallel in the recharging mode.
Figure 64:
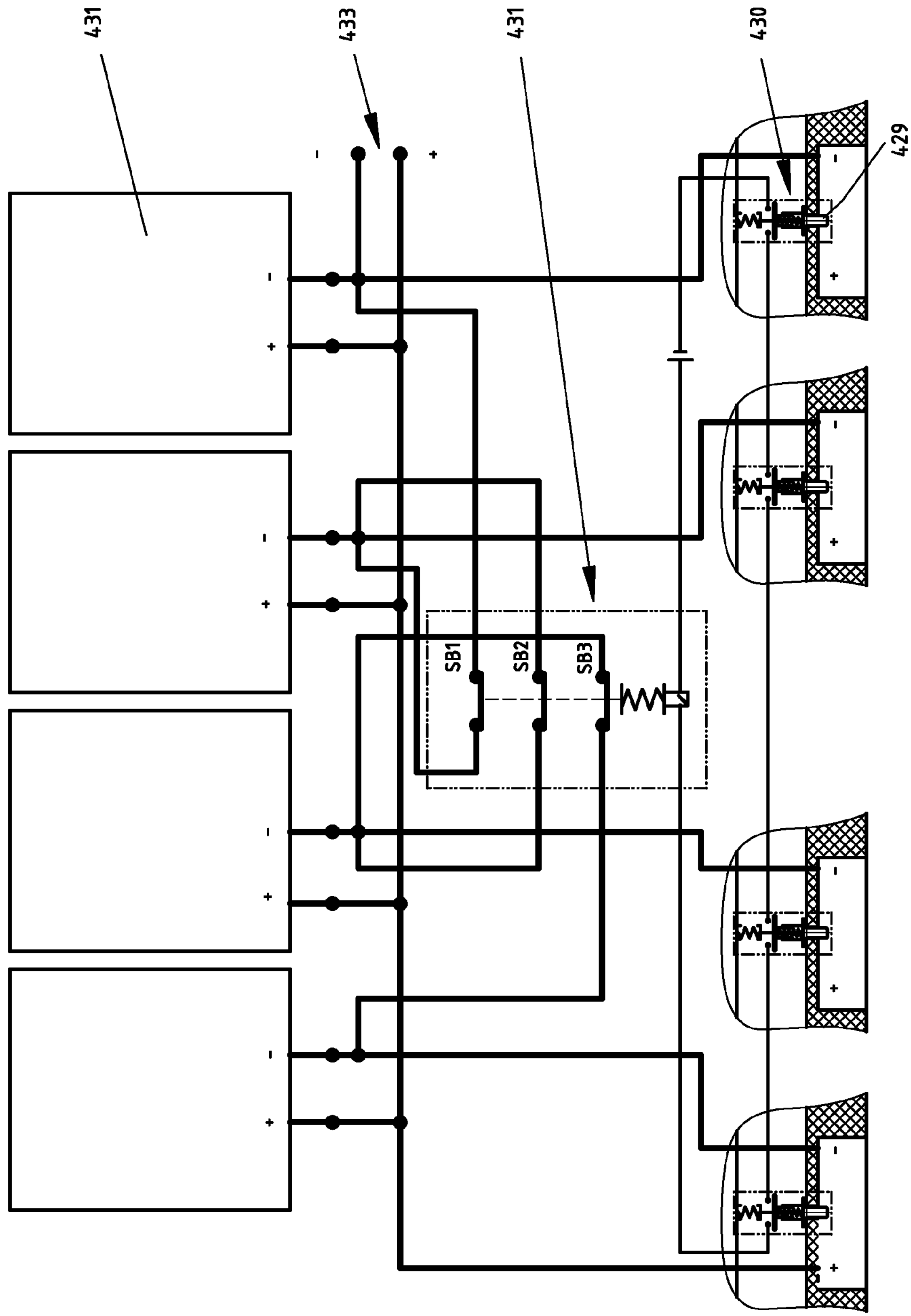
FIG. 64 shows a wiring diagram of an equipment with four batteries connected in parallel in the supplying mode.
Figure 65:
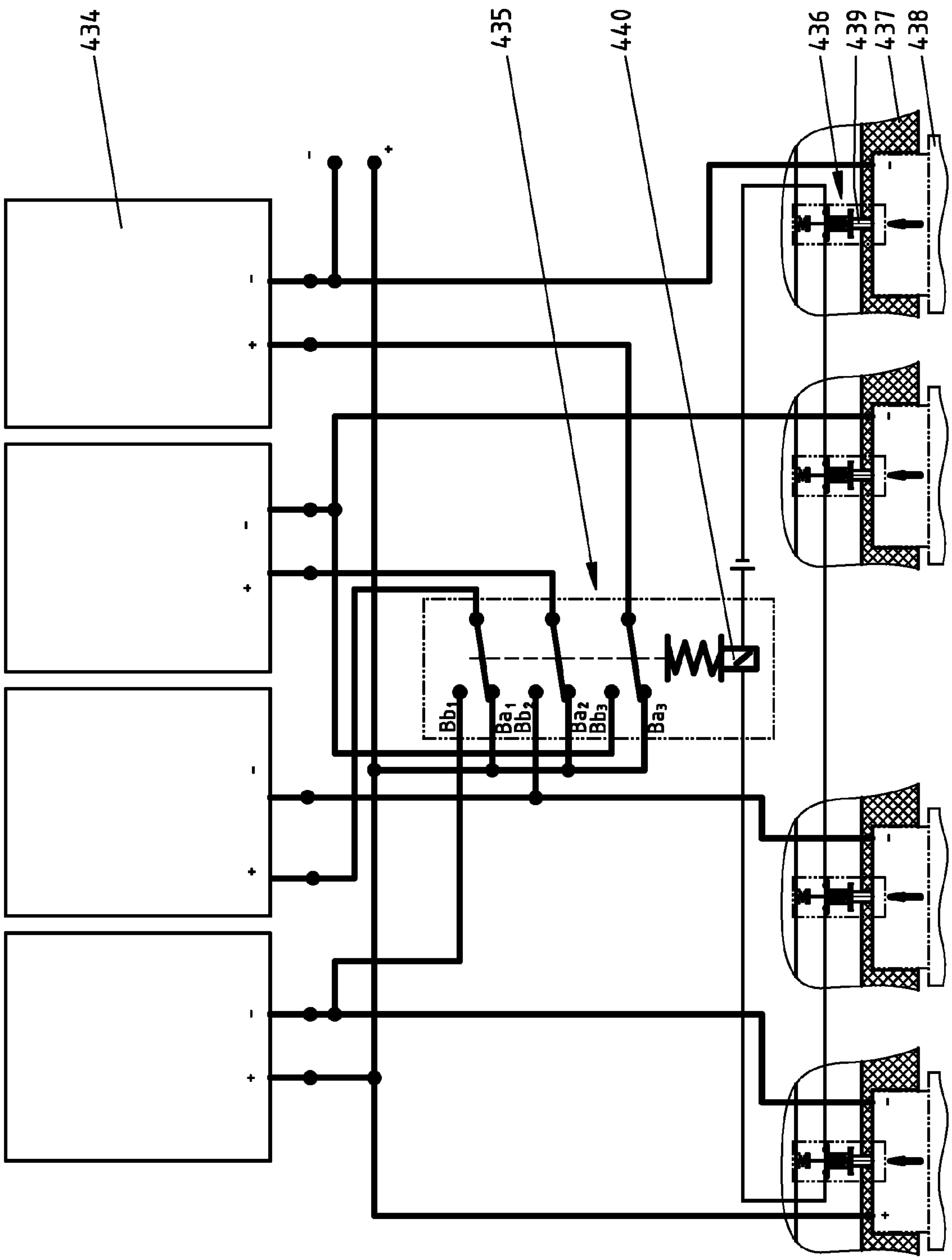
FIG. 65 shows a wiring diagram of an equipment with four batteries connected in series in the recharging mode.
Figure 66:
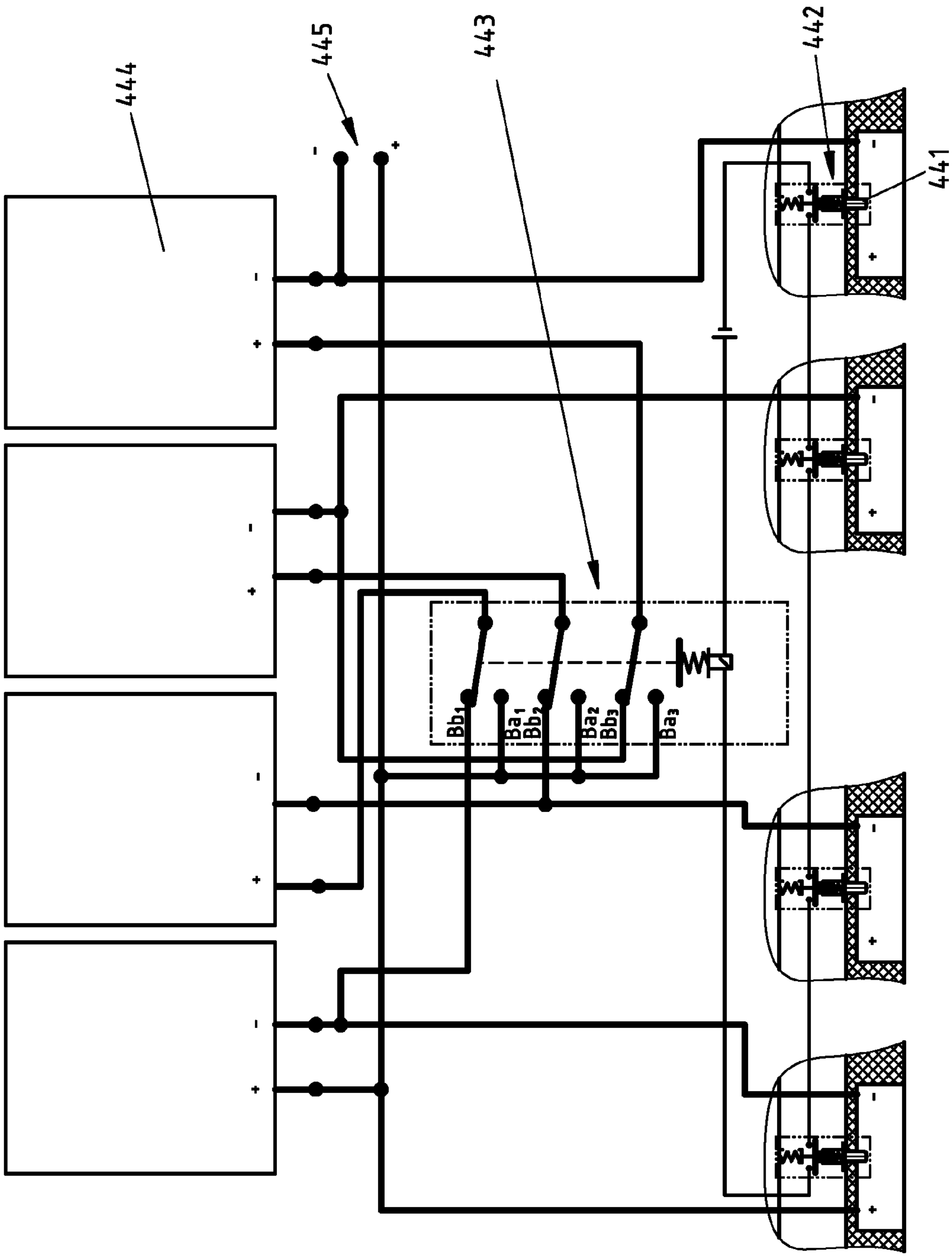
FIG. 66 shows a wiring diagram of an equipment with four batteries connected in series in the supplying mode.
Figure 67:
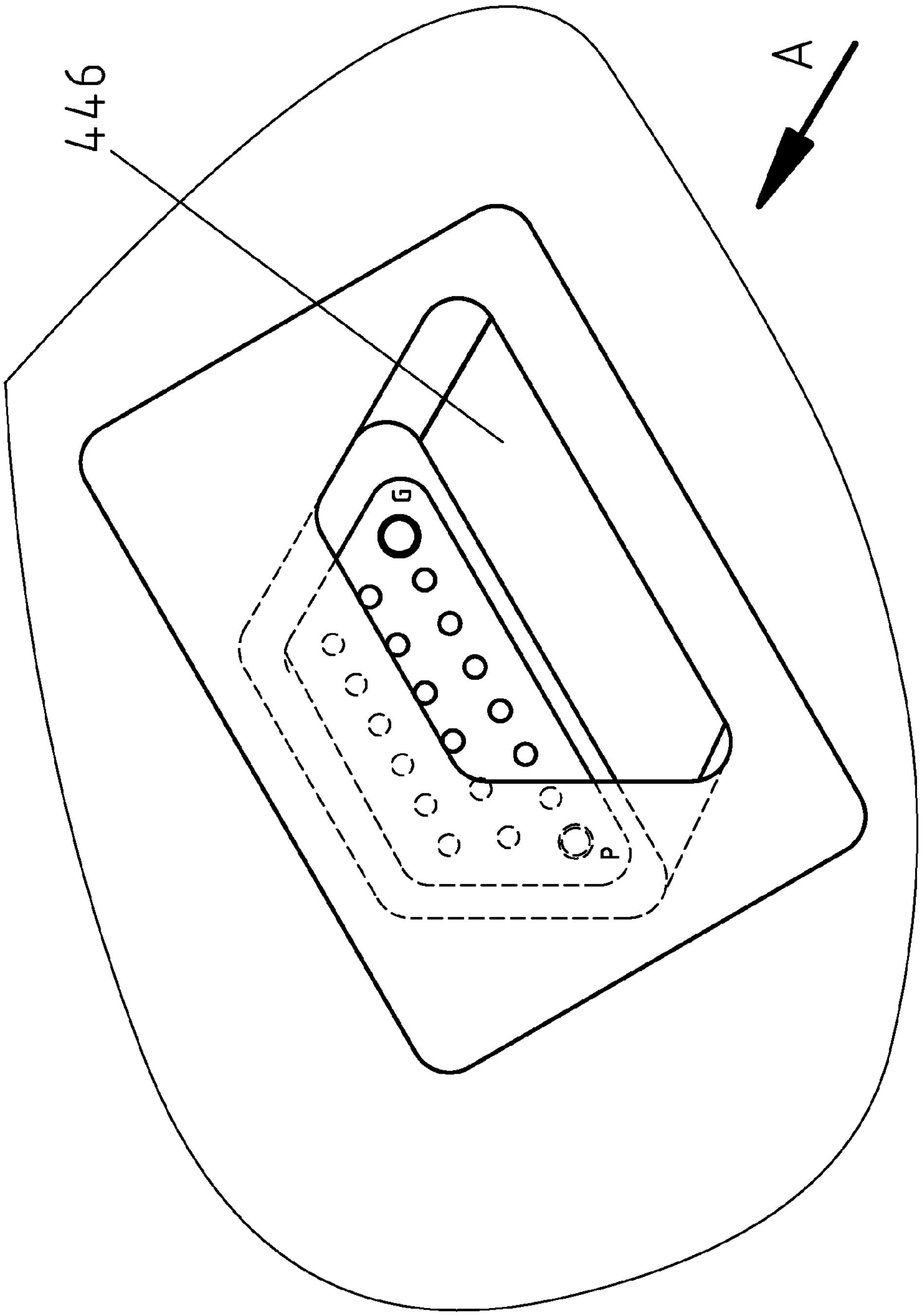
FIG. 67 is an isometric view of an multi-contacts equipment battery inlet of an equipment with one single battery.
Figure 68:
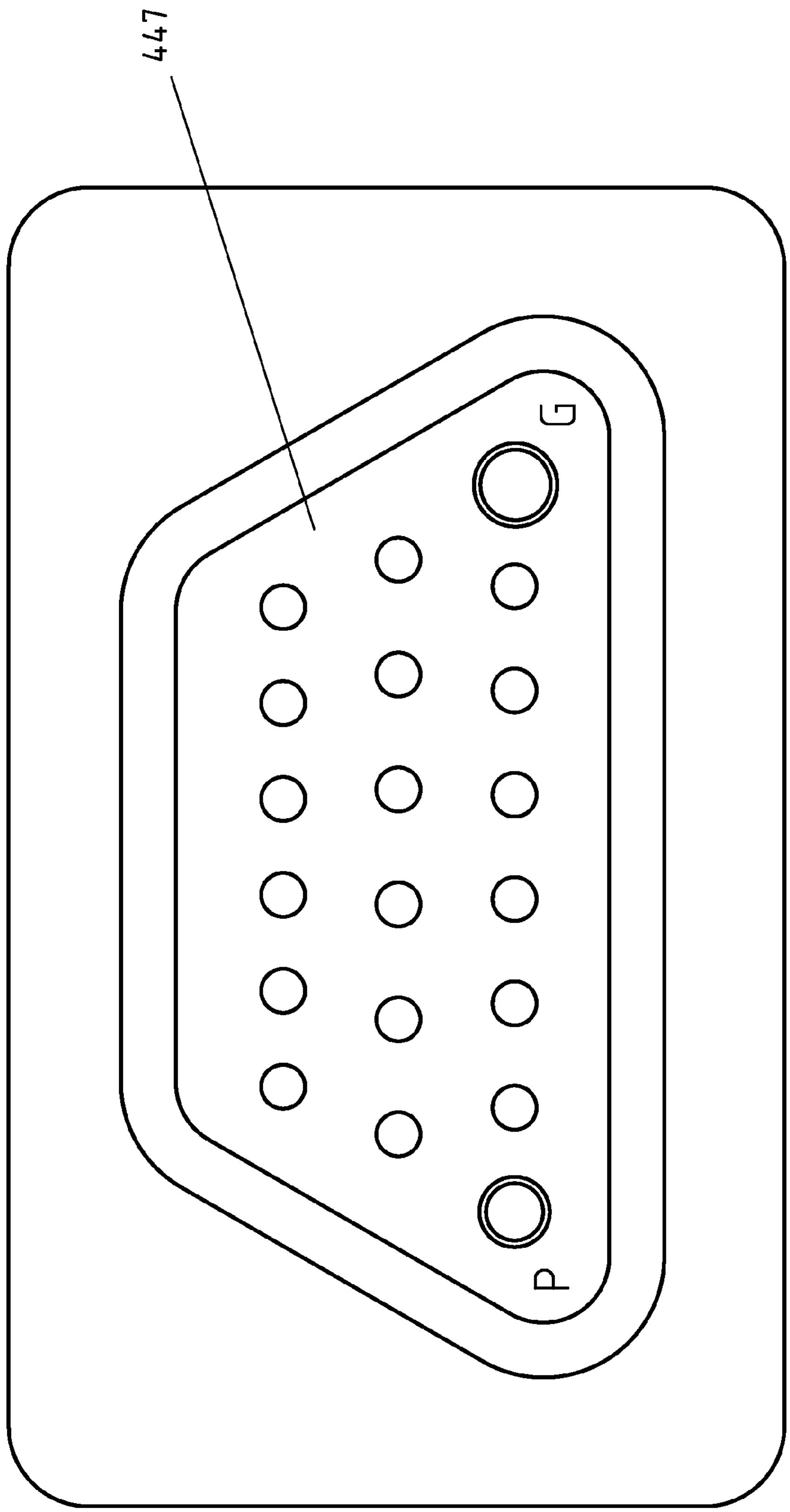
FIG. 68 is a front view of an multi-contacts equipment battery inlet of an equipment with one single battery.
Figure 69:
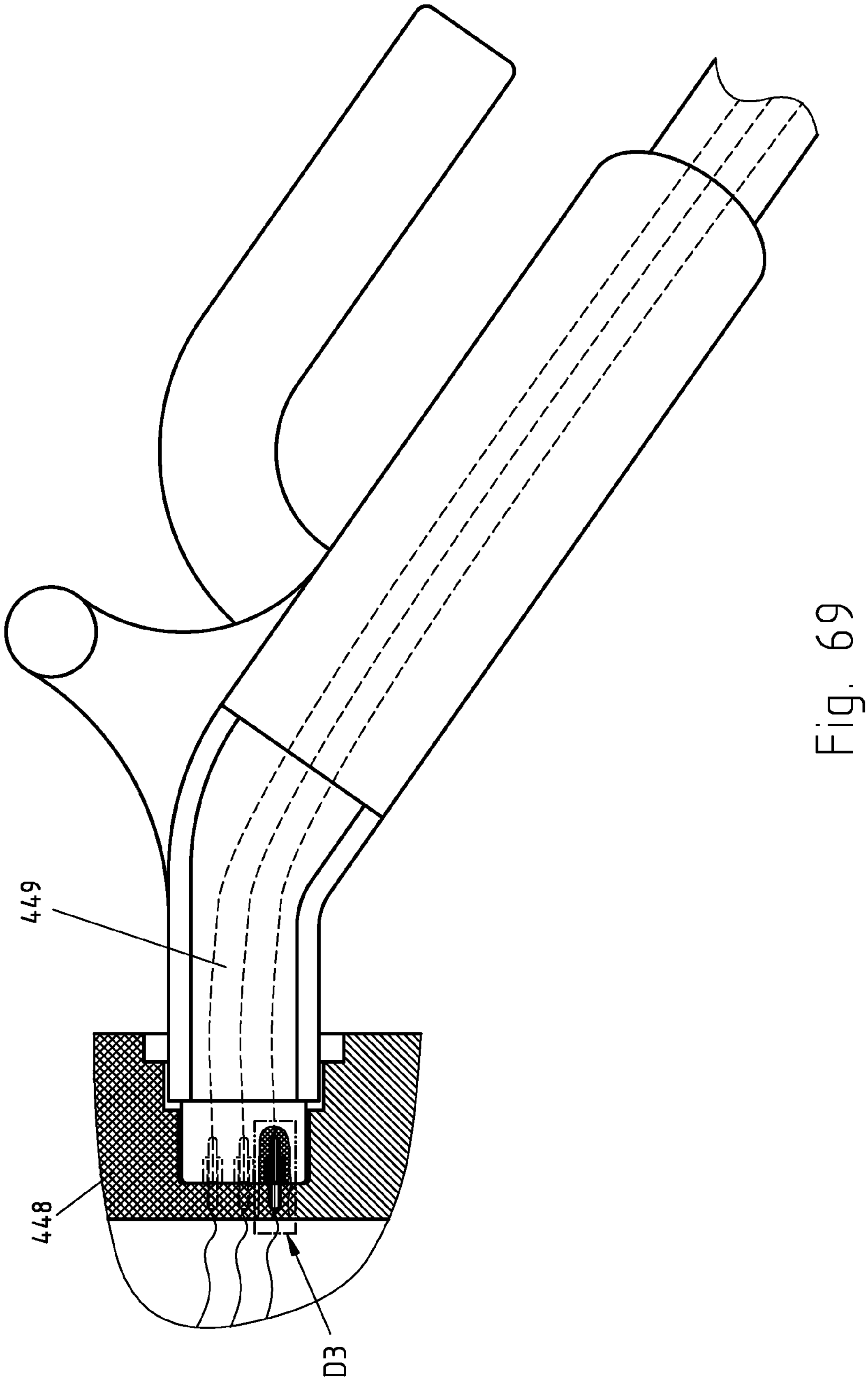
FIG. 69 is a lateral view of an independent multi-contacts charger and a partial cross section of an equipment inlet having the multi-contacts charger outlet installed on it.
Figure 70:
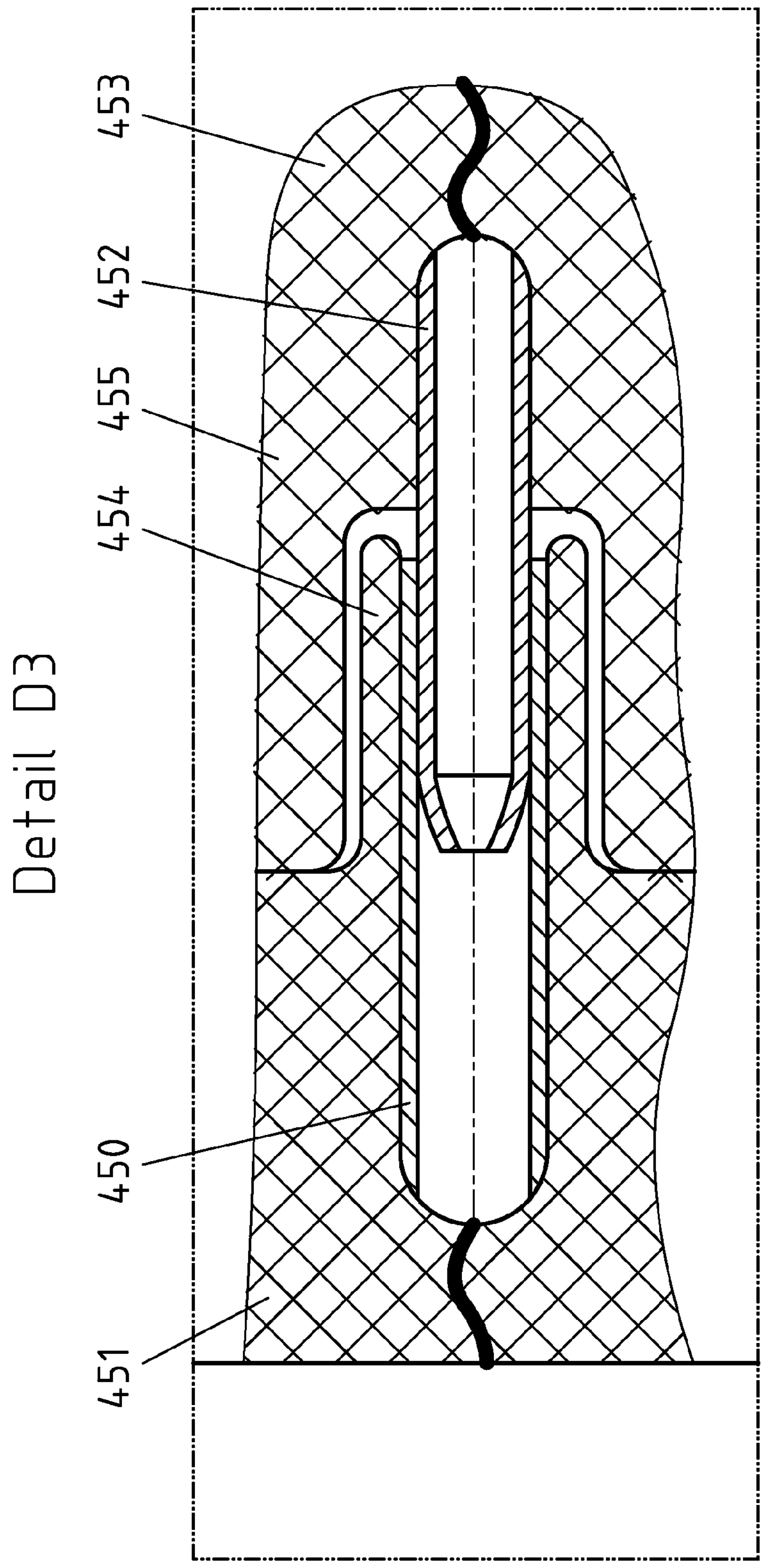
FIG. 70 is the Detail D3 of the FIG. 69 showing a cross section of the engagement of the contacts equipment inlet—multi-contacts charger.
Figure 71:
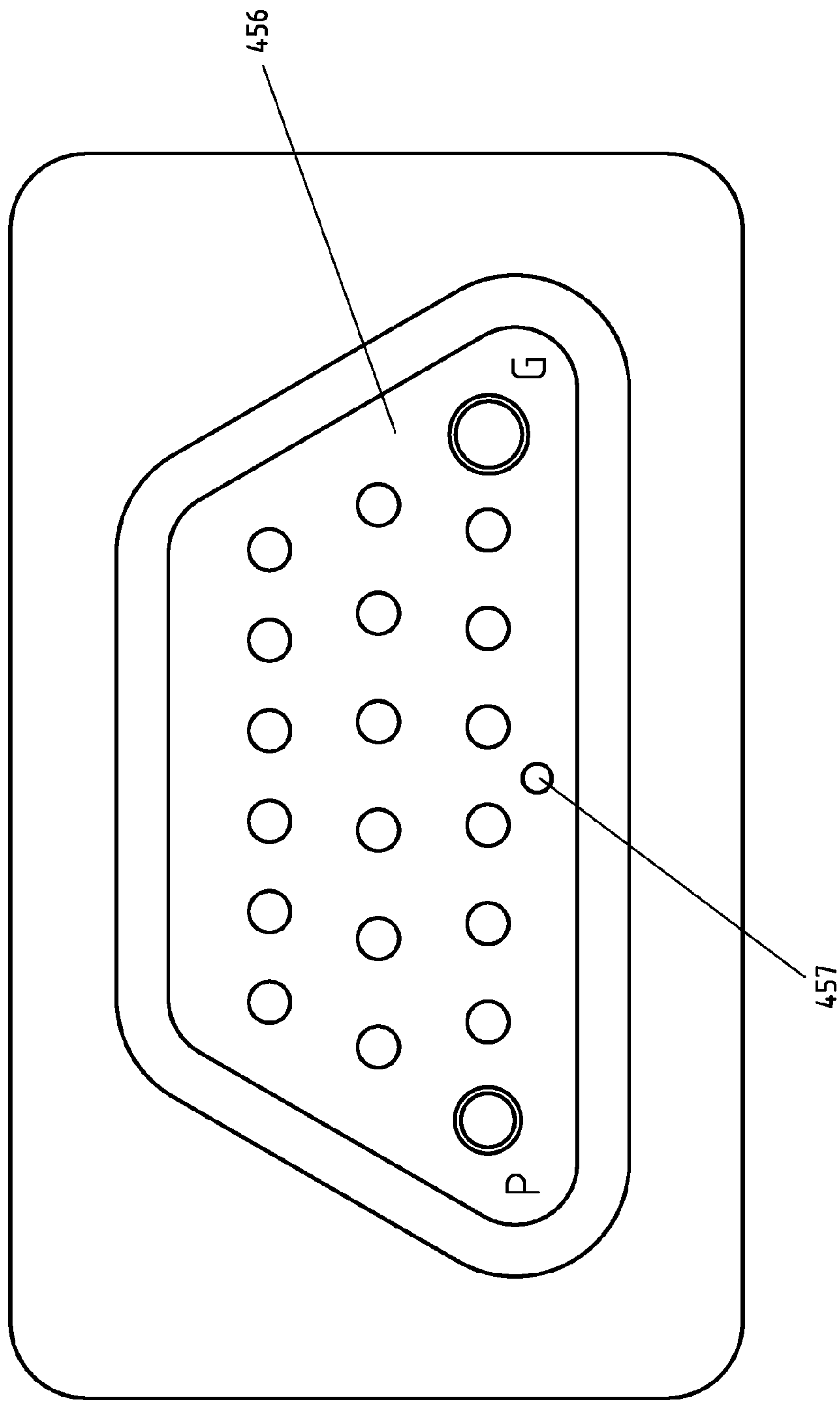
FIG. 71 is the front view of an multi-contacts equipment battery inlet of a multi-inlet equipment.
Figure 72:
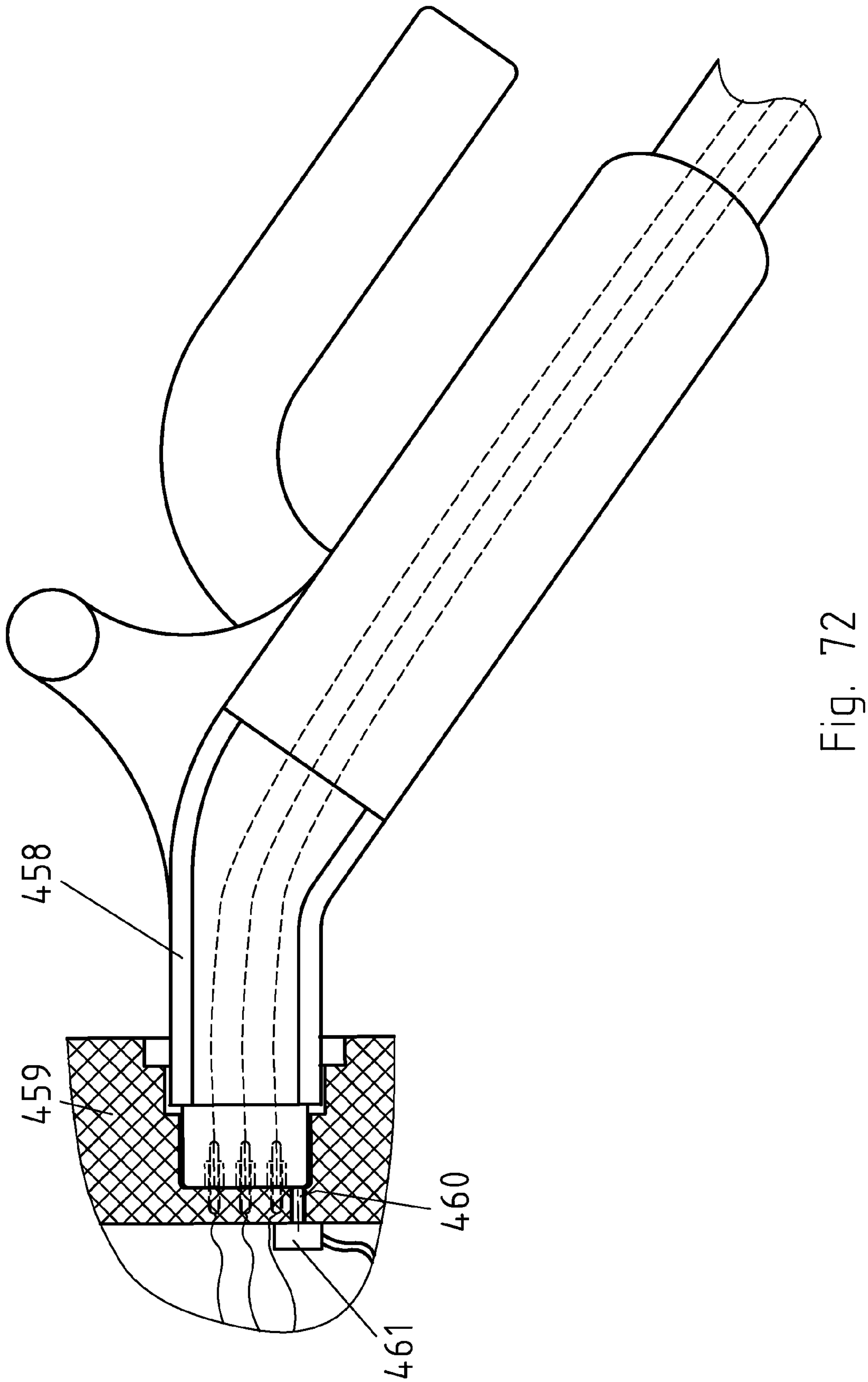
FIG. 72 shows an independent multi-contacts charger plugged in one of the multi-inlets of a multi-battery equipment.

In FIG. 57 to FIG. 61 are presented wiring diagrams of different embodiments for the equipments discussed here before, in recharging mode. For each application may be used one, two or all three of these battery switches. The battery switches are controlled by a battery assembly control equipment, comprising a plurality of battery command switches, one installed on each equipment battery inlet. The battery command switches are connected always in series for each equipment, in order to activate the battery switches for all batteries just when all the independent multi-contacts chargers are installed for recharging. In FIG. 57 is shown an equipment with two batteries 366 and 367, connected in parallel in the recharging mode via the contact SB1 of the battery switches 368, which is in open position in order to separate the two batteries circuits. The battery switch 368 is commanded by the two battery command switches 369 and 370 each one installed into each of the two multi-contacts equipment battery inlets 371 and 372, being activated by each independent multi-contacts charger 373 and 374 when it is introduced into the multi-contacts equipment battery inlet for battery recharging, by pushing in the plungers 375 and 376. The two battery command switches are connected in series, activating the electromagnet 377 of the battery switches 368, which change the battery switch contacts SB1, SB2 and SB3 on the open position, allowing in this way to separate the two circuits of the two batteries and connecting each one directly to its independent multi-contacts charger. When the independent multi-contacts charger is taken out, see FIG. 58, plungers 378 and 379 of the battery command switches 380 and 381 move out, dis-activating the battery switch 382, which closes the contacts SB1, SB2 and SB3 of the battery switch 382, connecting in parallel the two batteries which have a unique main battery terminal 383 for supplying mode. FIG. 59 is the Detail D1 of FIG. 58 showing the battery command switch 384 is activated with its contact 385 open, for the battery supplying mode. The contact 385 is kept open, for the supplying mode of the battery, by the compression spring 386. On the opposite side of the contact 385, between the contact 385 and the plunger 387, there is another compression spring 388, stronger than the spring 385. The length of the spring 388 is in a such way that the contact 385 is on an open position when the plunger shoulder 389 is in contact with the surface 390 of the inlet 391 and the plunger tip is out, exceeding the surface 392 of the multi-contacts equipment battery inlet 391. FIG. 60 is the Detail D2 of the FIG. 58, showing the battery command switch 393 activated for the battery recharging mode. By introducing the independent multi-contact charger 394 into the multi-contacts equipment battery inlet 395, the plunger 396 is pushed in, pushing the contact 397 on a close position, by compressing the spring 398. The spring 399 is compressed as well, this elastic element 399 taking out the dimensional variation of the system, ensuring a good contact of the battery command switch 393. In FIG. 61 is shown an equipment with two batteries 400 and 401, connected in series in the recharging mode by the battery changeover switches 402 having the contact 403 on the Ba1 position. The battery changeover switches 402 are commanded by the two battery command switches 404 and 405 each one installed into each of the two equipment battery inlets 406 and 407, being activated by each independent multi-contacts charger 408 and 409 when the they are introduced into the two multi-contacts equipment battery inlets for battery recharging, by pushing in plungers 410 and 411. The two battery command switches are connected in series, activating the electromagnet 412 of the battery changeover switches 402, which changes the contact 403 on the Ba1 position, allowing in this way to separate the two circuits of the two batteries and connecting each one to its independent multi-contacts charger. When the independent multi-contacts chargers 408 and 409 are taken out, see FIG. 62, the plungers 413 and 414 of the battery command switches 415 and 416 move out, dis activating the battery changeover switches 417, which change the contact 418 on the Bb1 position, connecting in series the two batteries 419 and 420, having a unique main battery terminal 421, for supplying mode. In FIG. 63 is shown an equipment with four batteries 422, connected in parallel in the recharging mode by the contact SB1, SB2 and SB3 of the battery switches 423. The battery switches 423 are controlled by four battery command switches 424 each one installed into each of the four multi-contacts equipment battery inlets 425, being activated by each independent multi-contacts charger 426 when it is introduced into the multi-contacts equipment battery inlet for battery recharging, by pushing in each plunger 427. The four battery command switches are connected in series, activating the electromagnet 428 of the battery switches 423, which change the switches SB1, SB2 and SB3 on the open position, allowing in this way to separate the four circuits of the four batteries and connecting each one to its independent multi-contact charger. When the chargers are taken out, see FIG. 64, each plunger 429 of each battery command switches 430 move out, dis activating the battery switches 431, which closes the contacts SB1, SB2 and SB3, connecting in parallel the four batteries 432, which have a unique main battery terminal 433, for supplying mode. In FIG. 65 is shown an equipment with four batteries 434, connected in series in the recharging mode by the battery changeover switches 435 having the contacts in the Ba1, Ba2 and Ba3 position. The battery switches 435 is commanded by four battery command switches 436 each one installed into each of the four multi-contacts equipment battery inlets 437, being activated by each independent multi-contacts charger 438 when it is introduced into the multi-contacts equipment battery inlet for battery recharging, by pushing in each of the plungers 439. The four battery command switches are connected in series, activating the electromagnet 440 of the battery switches 435, which changes the contacts in the Ba1, Ba2 and Ba3 position, allowing in this way to separate the four circuits of the four batteries and connecting each one to its independent multi-contacts charger. When the chargers are taken out, see FIG. 66, the plungers 441 of each command switch 442 moves out, dis activating the battery changeover switches 443, which change the contacts in the Bb1, Bb2 and Bb3, position, connecting in series the four batteries 444, having a unique main battery terminal 445, for supplying mode. FIG. 67 is an isometric view of an multi-contacts equipment battery inlet of an equipment with a single battery, so single multi-contacts equipment battery inlet 446 without any plunger for the battery command switch, because in this case there is not necessary a such of battery switches. In FIG. 68 is presented the view A of the same multi-contacts equipment battery inlet 447. In FIG. 69 is illustrated an assembly comprising the multi-contacts equipment battery inlet 448 and the independent multi-contacts charger 449, for en equipment having a single battery, so a single multi-contacts equipment battery inlet. In a partial section is shown in Detail D3, the engagement of an inlet—outlet contacts (multi-contacts equipment battery inlet in contact with the independent multi-contact charger outlet contact), presented in FIG. 70. The inside diameter of a tubular metallic contact 450 of the multi-contacts equipment battery inlet 451 creates an electric contact with the outside diameter of the tubular metallic contact 452 of the independent multi-contacts charger outlet 453. In order to avoid any accident, both metallic contacts are inside of an insulating material of the multi-contacts equipment battery inlet 454 and of the independent multi-contacts charger outlet 455, when free (not inlet-outlet connection). This is the principle for all inlet—outlet contacts. FIG. 71 is the View A of a multi-contacts equipment battery inlet 456 of a multi-inlet equipment, where can be seen the plunger 457 controlling the recharging process of the multi-battery equipment, by a battery command switch. FIG. 72 shows a charger 458 plugged in one of the multi-inlets 459 of a multi-battery equipment. It can be seen that the independent multi-contacts charger 458 pushes in the plunger 460 of the battery command switch for battery switches 461, opening in this way the battery switches and separating the electric circuits of each battery for the recharging mode. When the independent multi-contacts charger will be taken out, the plunger 460 it will be set free and the battery switches will establish again the contact between all batteries of the equipment, setting the battery equipment for the supplying mode.

In Table 2 are illustrated different types of independent power supply units taking into consideration the use and the type of recharging, for a basic equipment battery inlet. The basic equipment battery inlet is a dedicated equipment battery inlet required for each use and each type of recharging equipment. There are two main categories of use: industrial and domestic. For the industrial use there are two types of recharging: industrial fast and industrial regular recharging. For the domestic use depending on the recharging time goal and equipment, there are a least six types of recharging: domestic triple fast, domestic fast, domestic triple 2 phase, domestic single 2 phase, domestic double mono phase, and domestic single mono phase. As can be seen in Table 2, for industrial use are always used 3-phase AC at 380V and 50 Kw independent power supply units. The difference between the fast recharging and the regular recharging consists in the number of independent power supply units of the industrial recharging terminal, therefore in the number of the active contacts of the charger. Considering as example a battery having 18 modules associated in 6 triplets (6TP,3×6MP), for the fast recharging are used six 3-phase AC at 380V and 50 Kw independent power supply units (one independent power supply unit per each battery triplet—one phase of each independent power supply unit per each independent battery module) with an 18 active contacts of the independent multi-contacts charger, having the code (IF3×6). For the same battery (6TP,3×6MP), for the regular recharging are used only two 3-phase AC at 380V and 50 Kw independent power supply units (one independent power supply unit per a group of three battery triplets—one phase of the each independent power supply unit per each battery triplet), with a 6 active contacts of the independent multi-contacts charger, having the code (IR3×2).

As can be seen in Table 2, for domestic use, may be used different number and different type of independent power supply units such as: three or one 2-phase AC at 240V and 7 Kw, two or one 2-phase AC at 240V and 3.6 Kw, and three or one mono phase AC at 120V and 2.7 Kw. Each option has advantages and disadvantages: Faster the recharging, more expensive recharging equipment is required.

Figure 73:
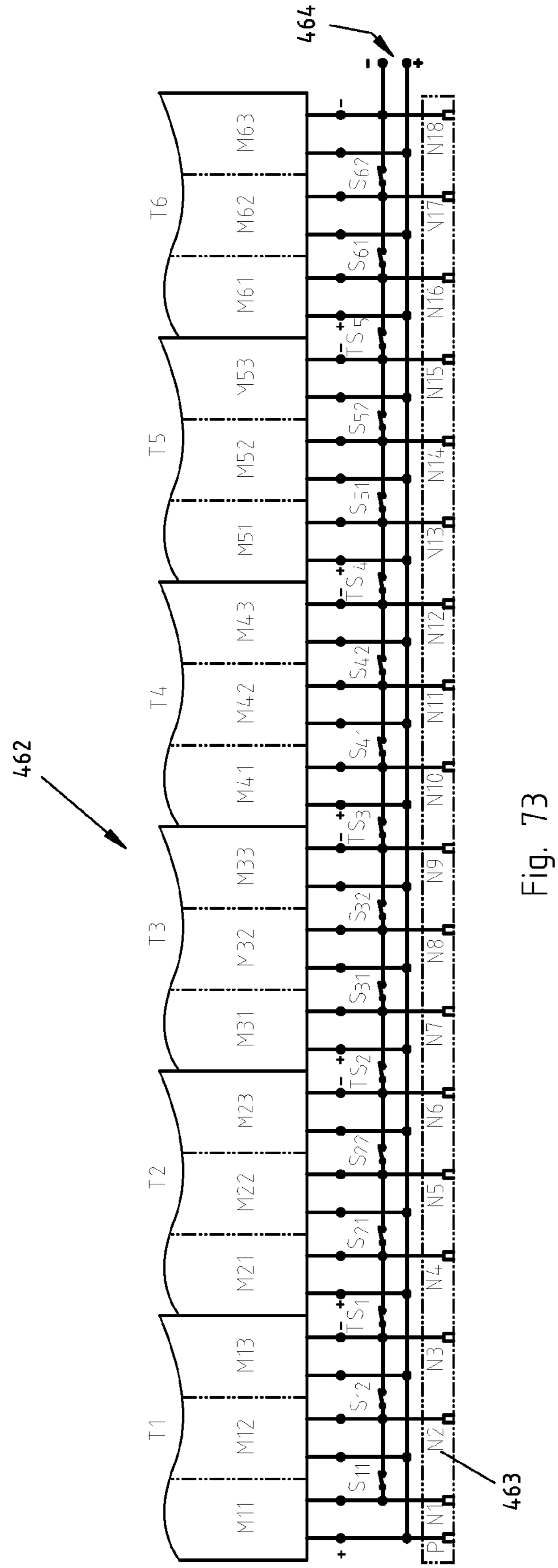
FIG. 73 is a wiring diagram of a battery (6TP,3×6MP) in the supplying mode.
Figure 74:
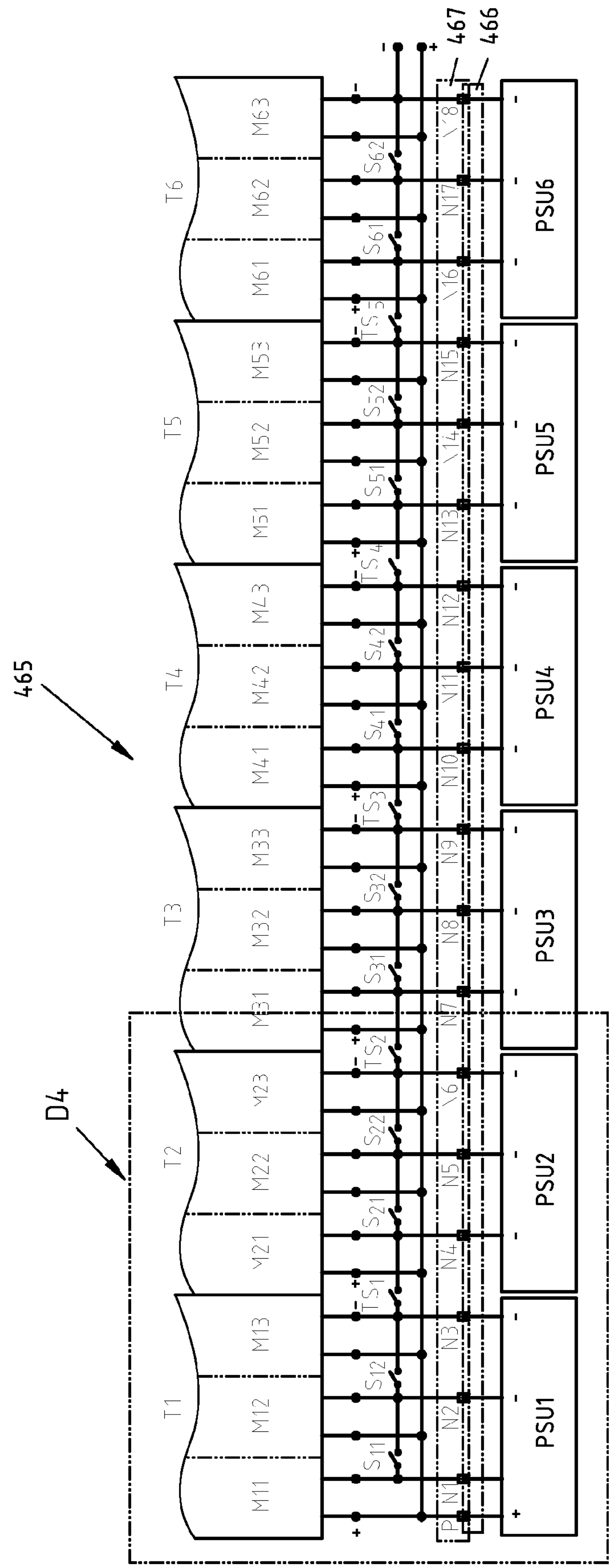
FIG. 74 is a wiring diagram of a battery (6TP,3×6MP) in the recharging mode.

For the same battery, having 18 modules associated in 6 triplets (6TP,3×6MP), in FIG. 73 to FIG. 101 are presented the wiring diagrams for supplying and recharging mode, the embodiments of the basic equipment battery inlet and their associated independent multi-contacts chargers and command switches for different industrial and domestic configurations. For example, for the industrial fast use, in order to have enough power to achieve a great productivity, one of the best option for battery recharge is to use six independent power supply units of AC 3 phase at 380V and about 50 Kw, code (IF3×6). For the fast version, a short recharging time is obtained by connecting each triplet to one 3 phase independent power supply unit and each independent battery module to one of the three phases. In Table 2 for a simpler graphic representation is considered only a single type of battery, having the battery modules and the battery triplets connected in parallel, so a (6TP,3×6MP) battery. This doesn't reduce the grade of generalization, because the wiring diagrams for series connection, as discussed herein, are similar and are easy to be applied for any case. Therefore, in FIG. 73 is shown the wiring diagram of this kind of battery (6TP,3×6MP) in the supplying mode, which is the same for all the cases described in Table 2. As mentioned before, the battery has 6 triplets Ti (i=(1 to 6)), each triplet comprising three independent battery modules Mij (i=(1 to 6) and j=(1 to 3)). For each triplet Ti there are two modules module switches Sik (k=1, 2) and for one battery there are 5 triplets switches TSg (g=(1 to 5)) all of them on a close position, connecting in parallel all 18 battery independent battery modules to the main battery terminal 464. The battery 462 is connected to a basic equipment battery inlet 463 having a positive (null) contact P and Nm (m=1 to 18)) negative contacts. The battery 462 has a main battery terminal 464. In FIG. 74 to FIG. 81 are presented the wiring diagrams in recharging mode, the multi-contacts equipment battery inlet and the independent multi-contacts charger for an industrial fast recharging terminal, using six 3-phase AC at 380V and 50 Kw independent power supply units. The FIG. 74 is a wiring diagram of the recharging mode of the same (6TP,3×6MP) battery 465 presented in FIG. 73. As it was discussed before, the battery is connected to 6 independent power supply units PSUh (h=(1 to 6)) of three phase AC, by the independent multi-contacts charger outlet 466, which is installed into the basic equipment battery inlet 467, connected to the battery 465.

TABLE 2

Figure 76:
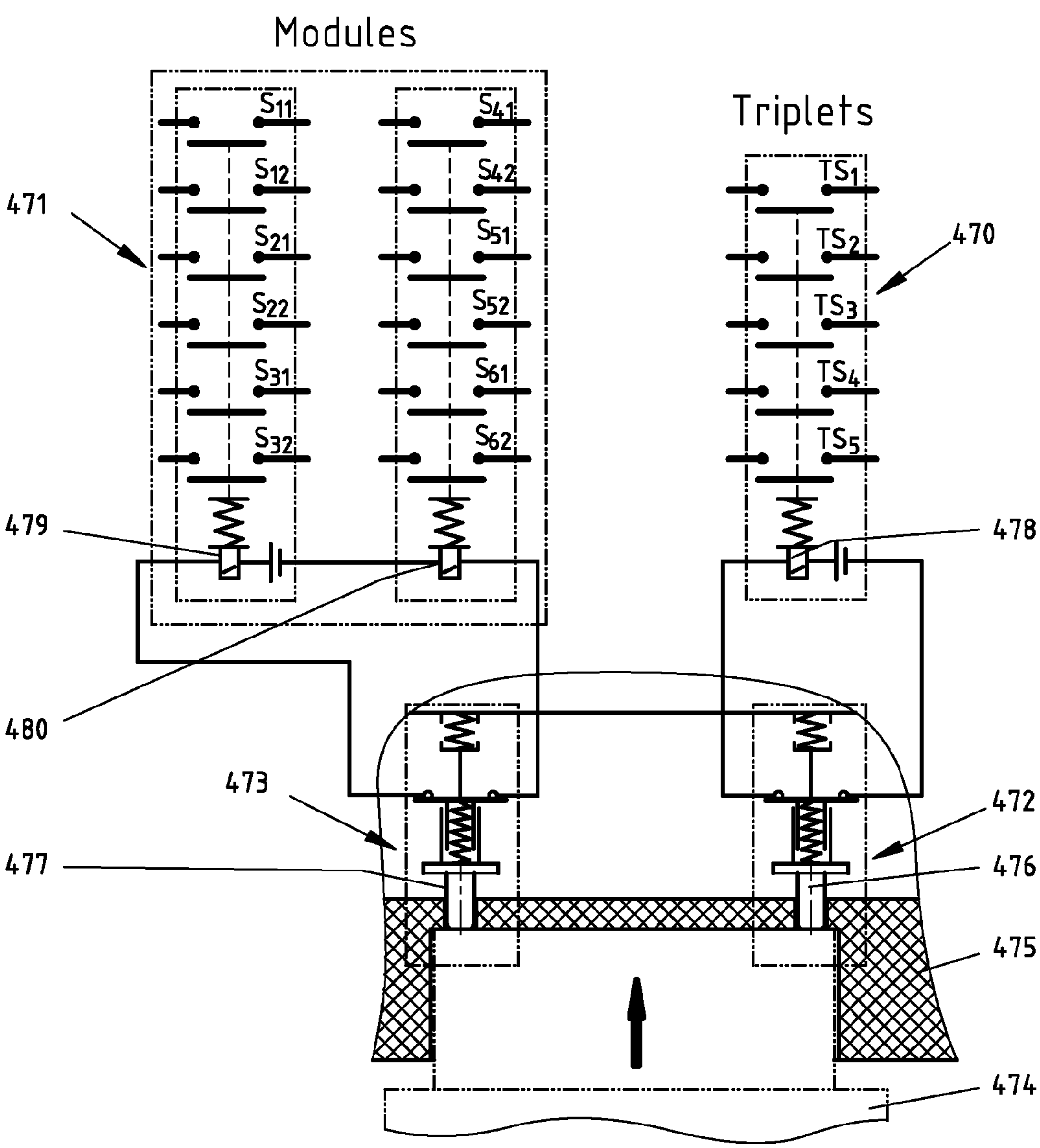
FIG. 76 is a recharging mode wiring diagram of an embodiment of the triplets switches and the modules switches with their command switches.
Figure 78:
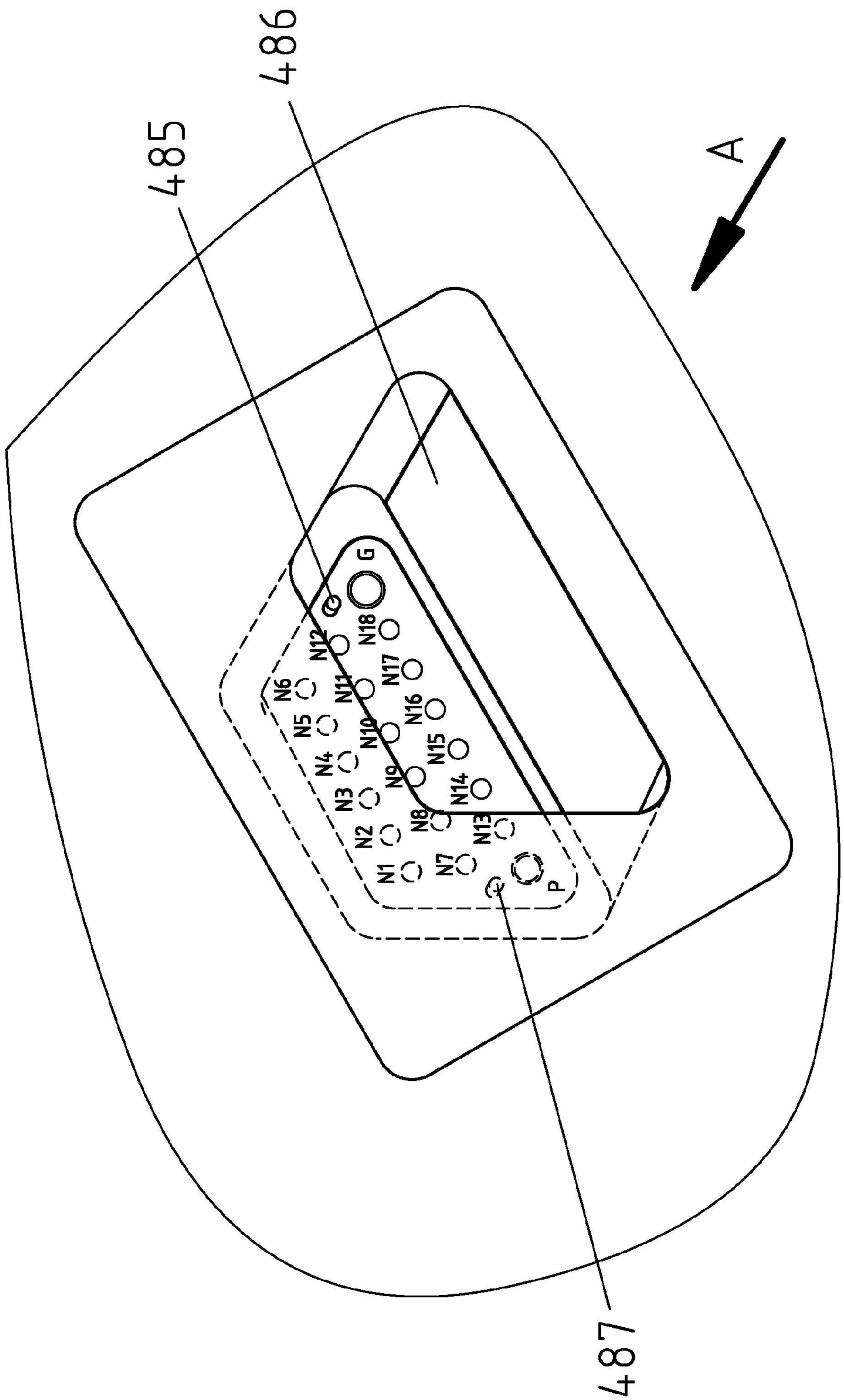
FIG. 78 is an isometric view of the basic equipment battery inlet.
Figure 79:
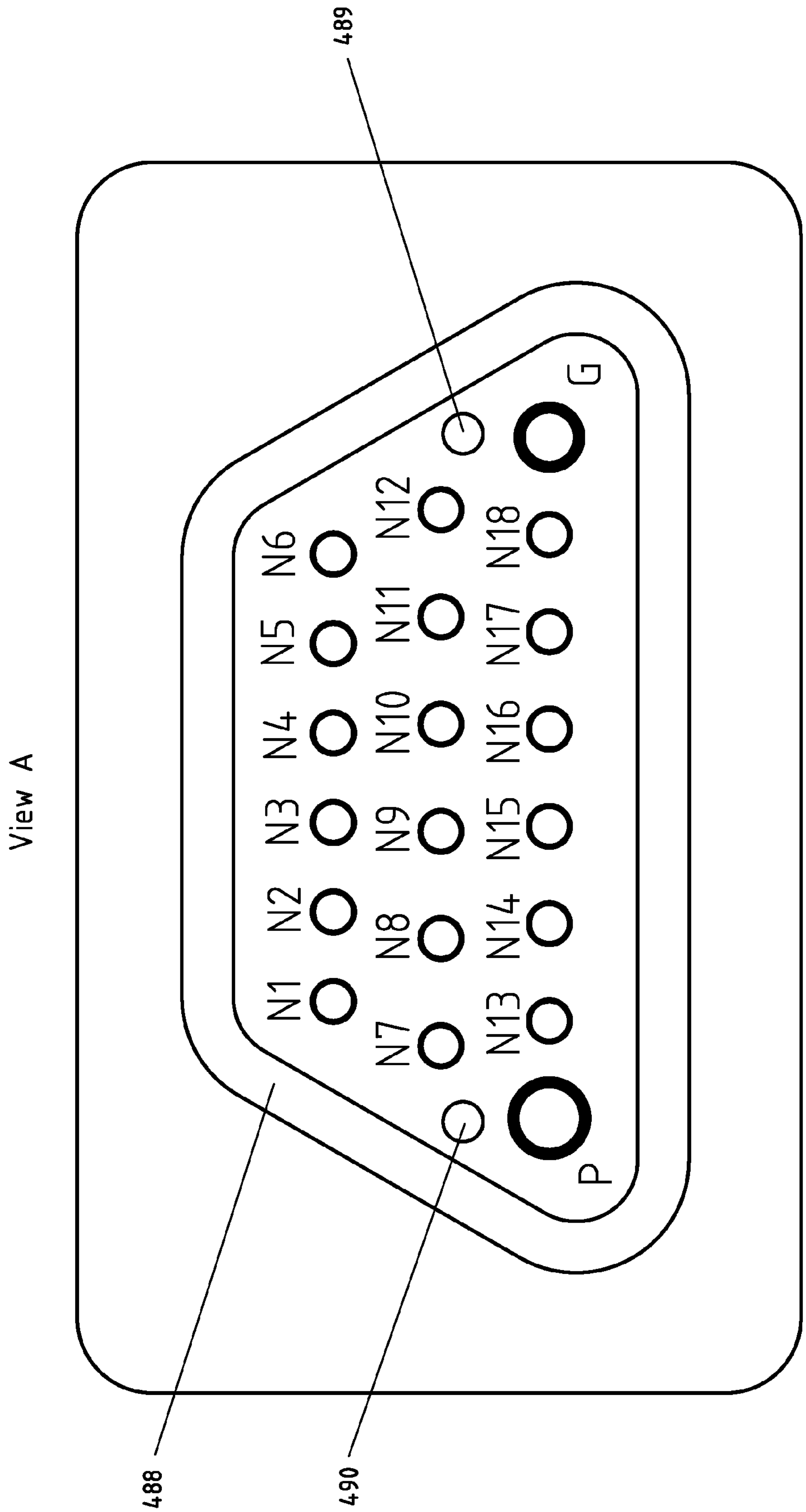
FIG. 79 is the front view A of a basic equipment battery inlet.
Figure 80:
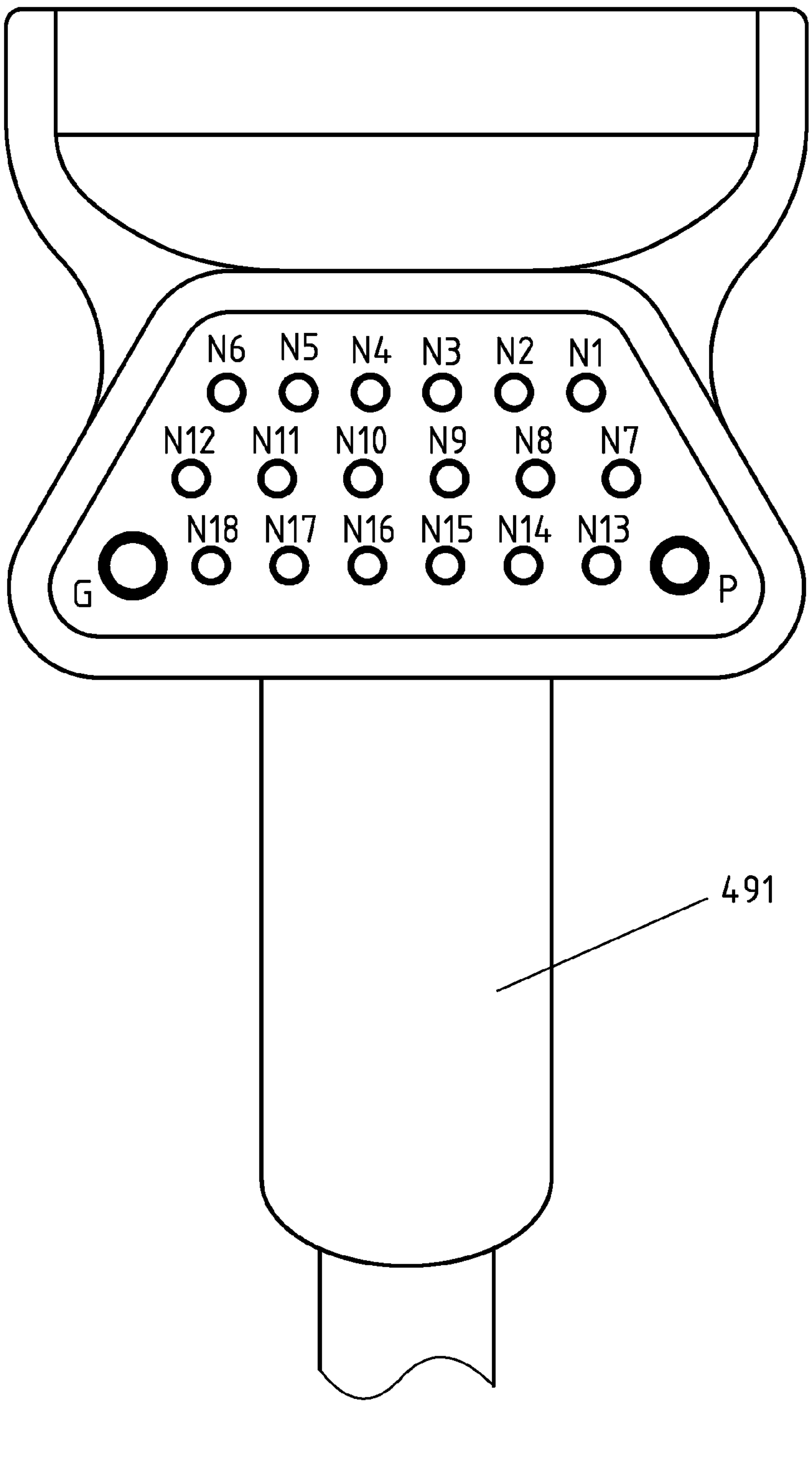
FIG. 80 shows a view of the multi-contacts charger with its contacts.
Figure 81:
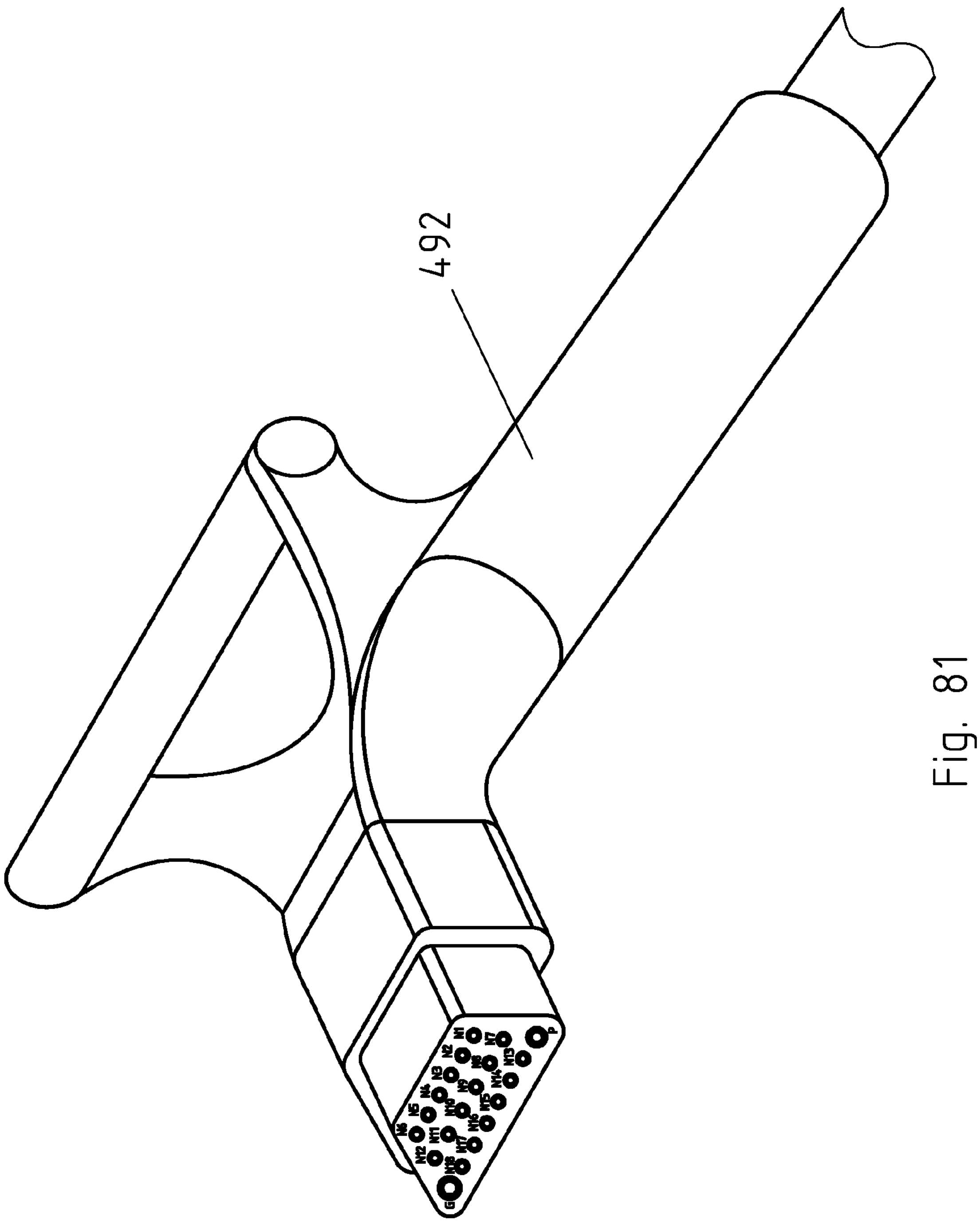
FIG. 81 is an isometric view of the multi-contacts charger.
Figure 82:
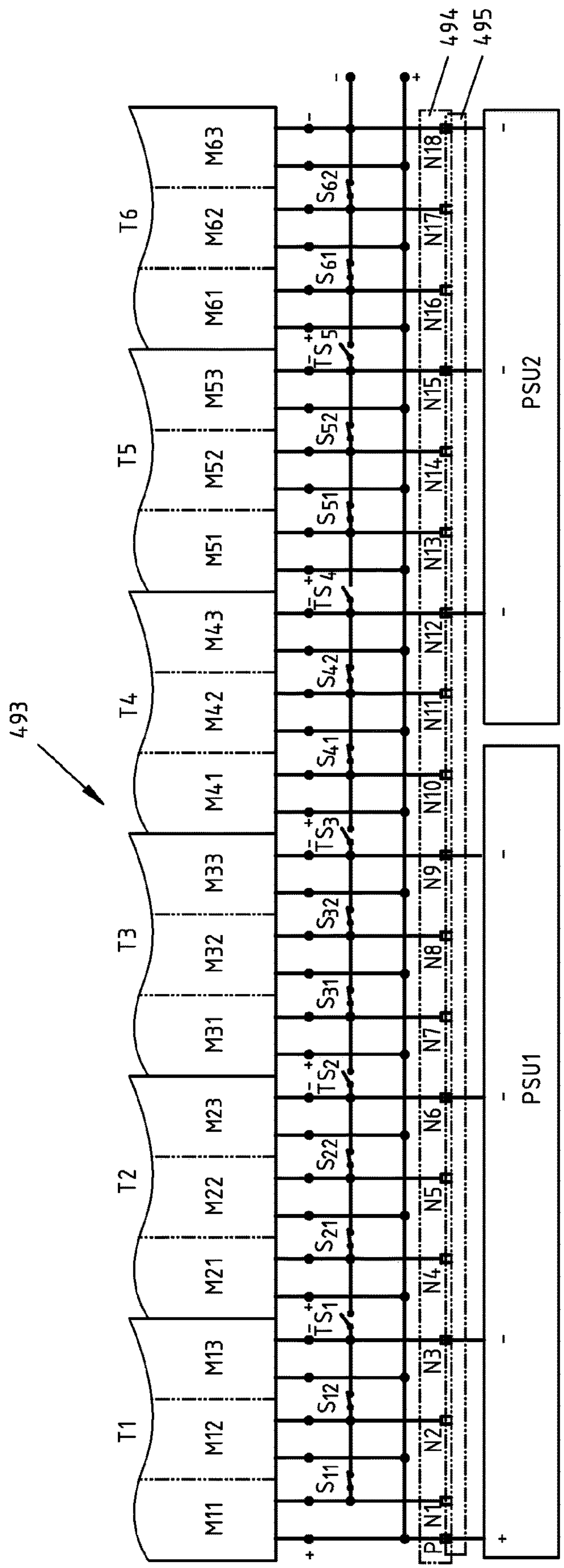
FIG. 82 shows a wiring diagram of the recharging mode of the (6TP,3×6MP) battery using two power supply units of 380V and 50 Kw, each.
Figure 83:
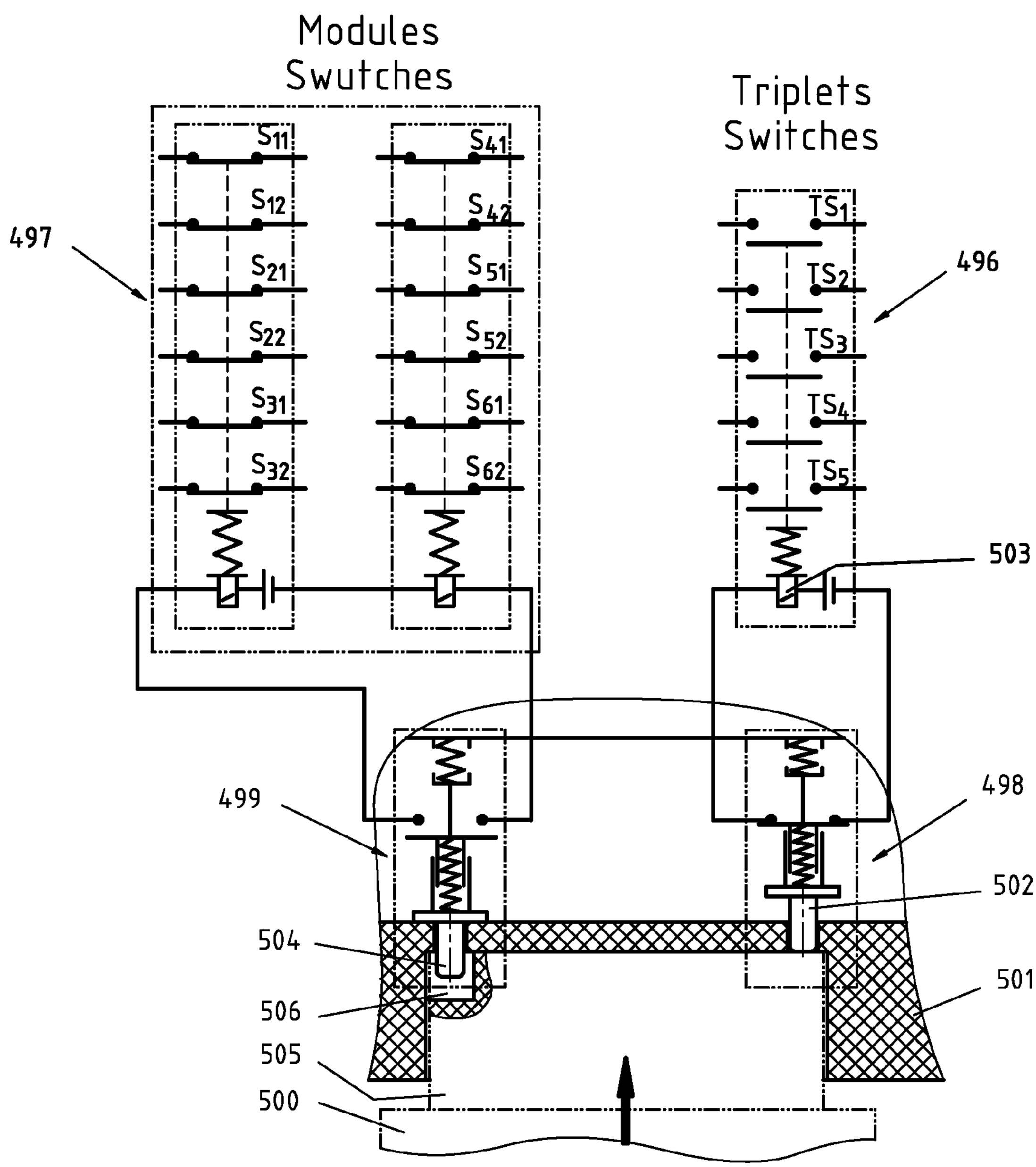
FIG. 83 is a recharging mode wiring diagram of an embodiment of the triplets switches, the modules switches and their command switches for the (6TP,3×6MP) battery using two independent power supply units of 380V and 50 Kw, each.
Figure 84:
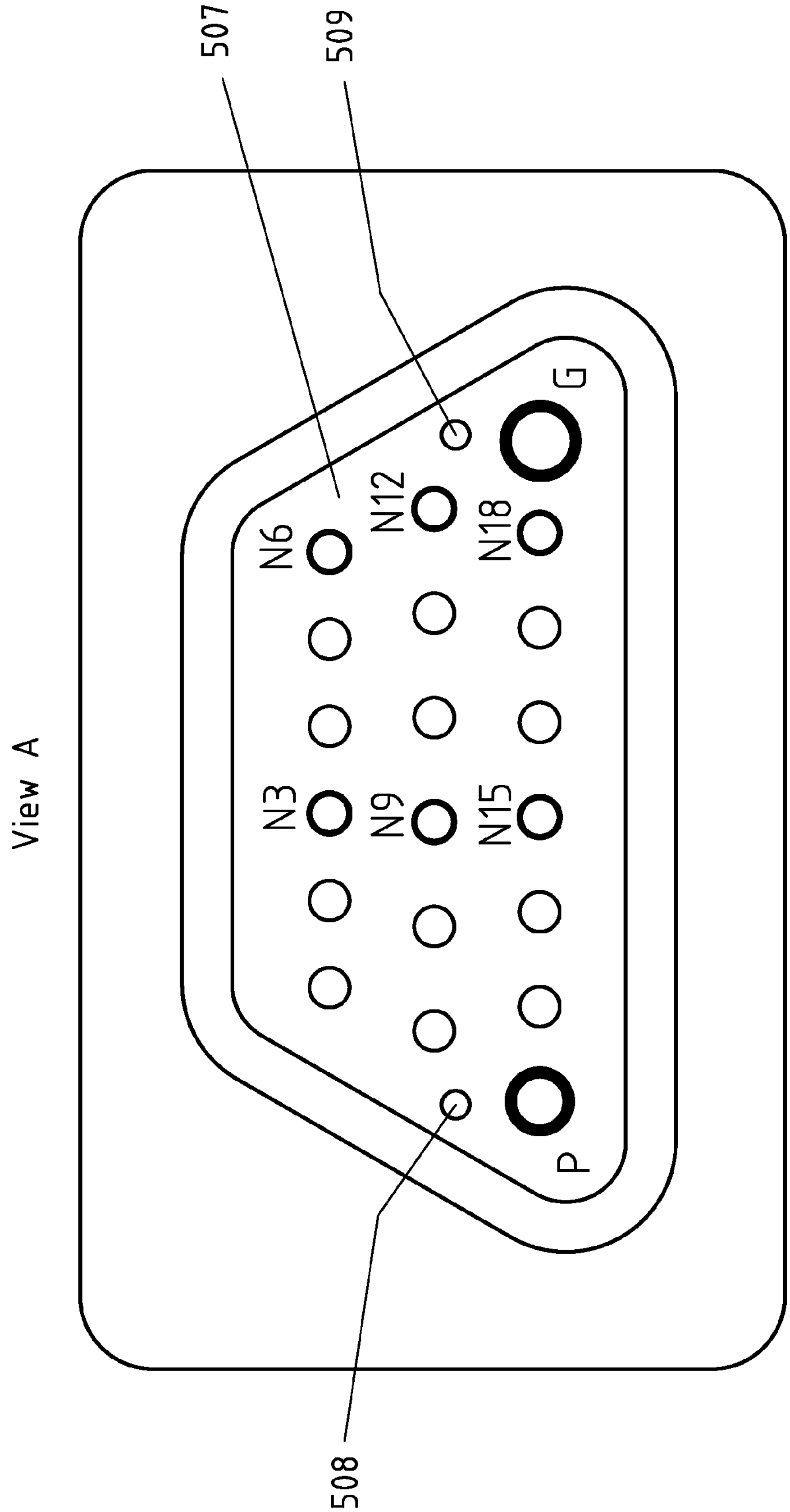
FIG. 84 shows the 20 contacts basic equipment battery inlet with its 8 active contacts, using two 3-phase AC at 380V and 50 Kw power supply units.
Figure 85:
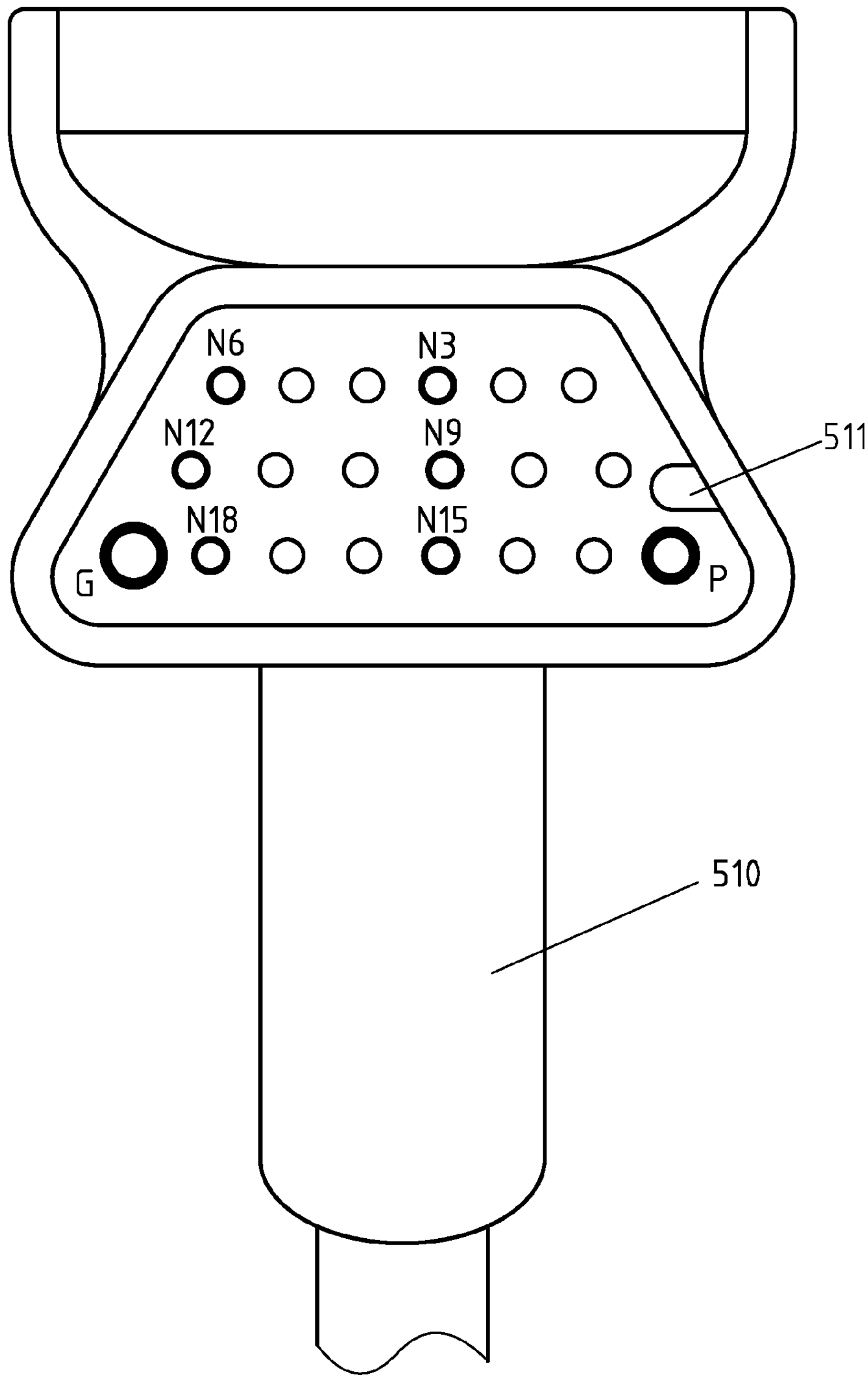
FIG. 85 illustrates the multi-contacts charger fitting with the 20 contacts basic equipment battery inlet, having 8 active contacts, using two 3-phase AC at 380V and 50 Kw independent power supply units.
Figure 86:
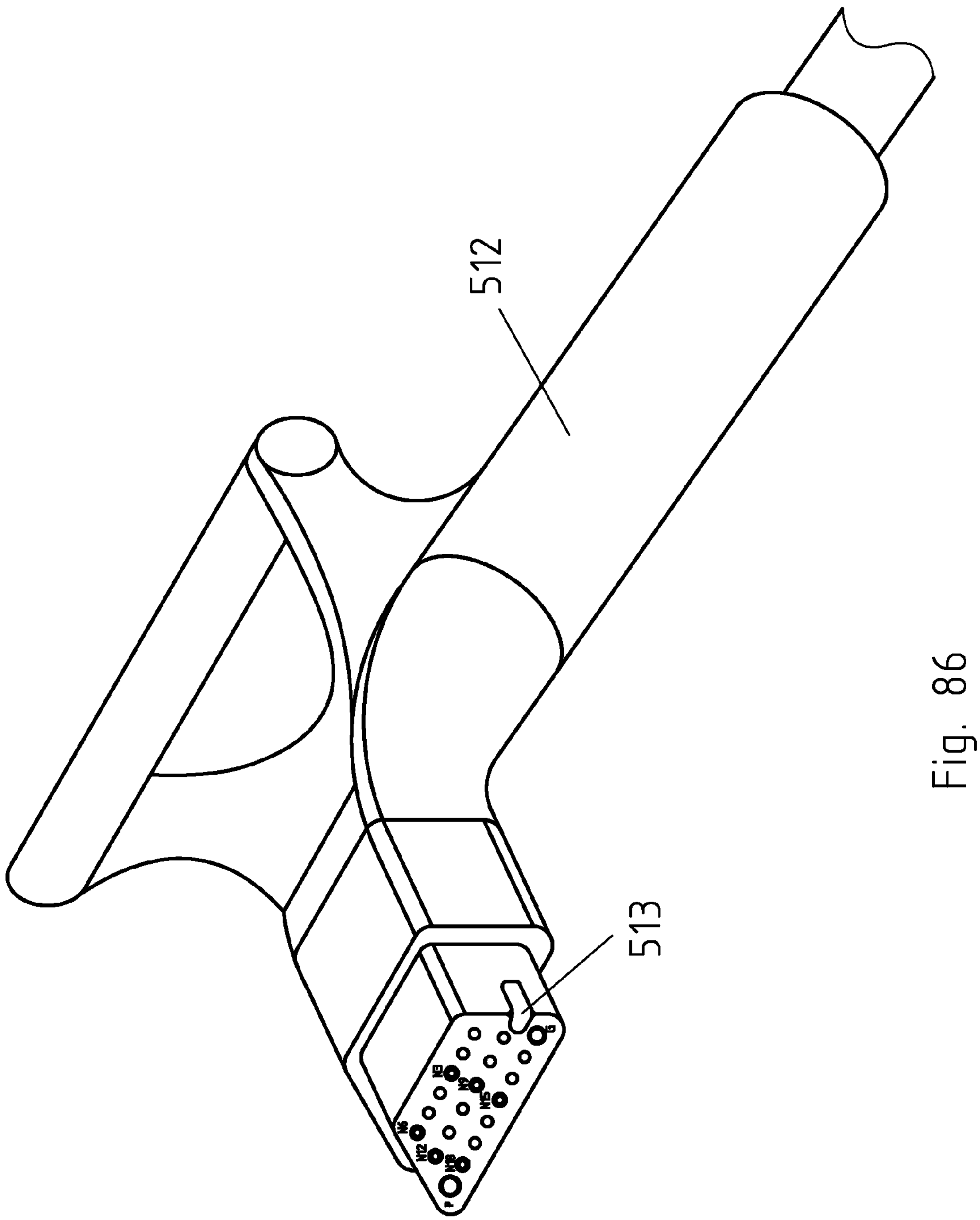
FIG. 86 is an isometric representation of the charger fitting with the 20 contacts basic equipment battery inlet having 8 active contacts, using two 3-phase AC at 380V and 50 Kw independent power supply units.
Figure 87:
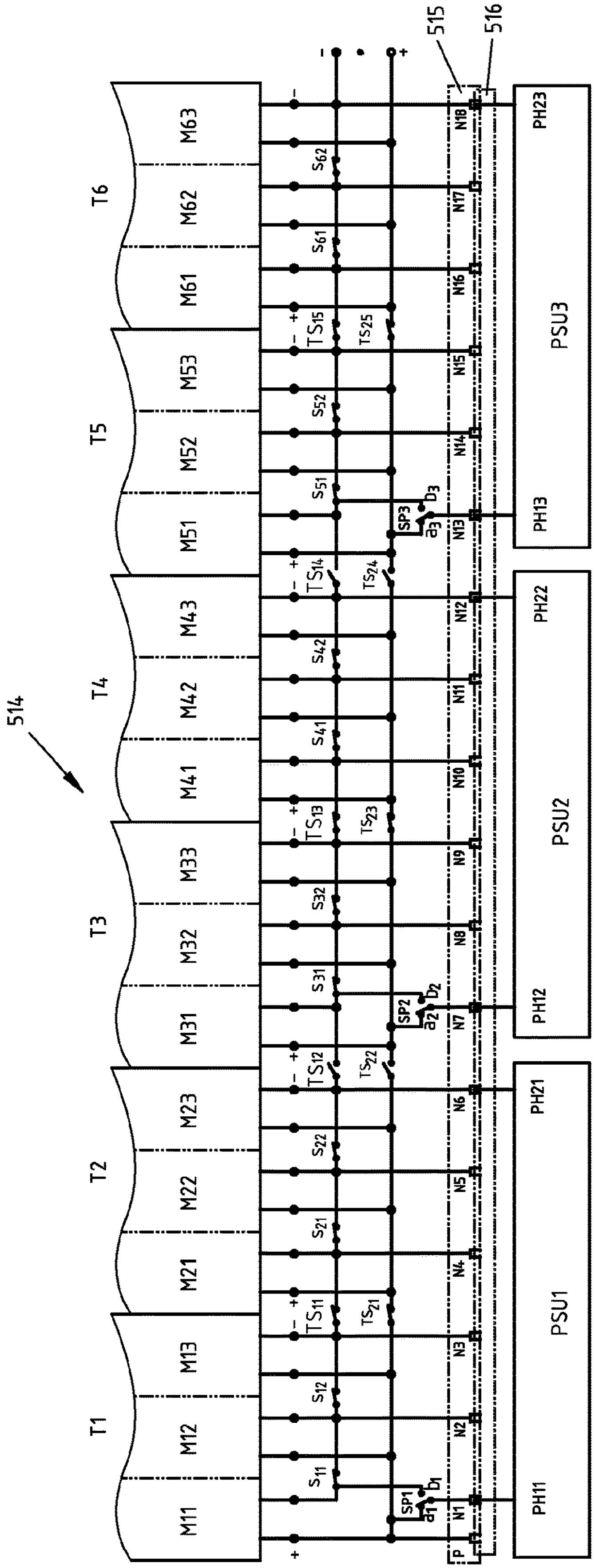
FIG. 87 shows a wiring diagram of the recharging mode of the (6TP,3×6MP) battery, using the 20 contacts basic equipment battery primary inlet for three 2-phase AC at 240V and 7 Kw independent power supply units.
Figure 88:
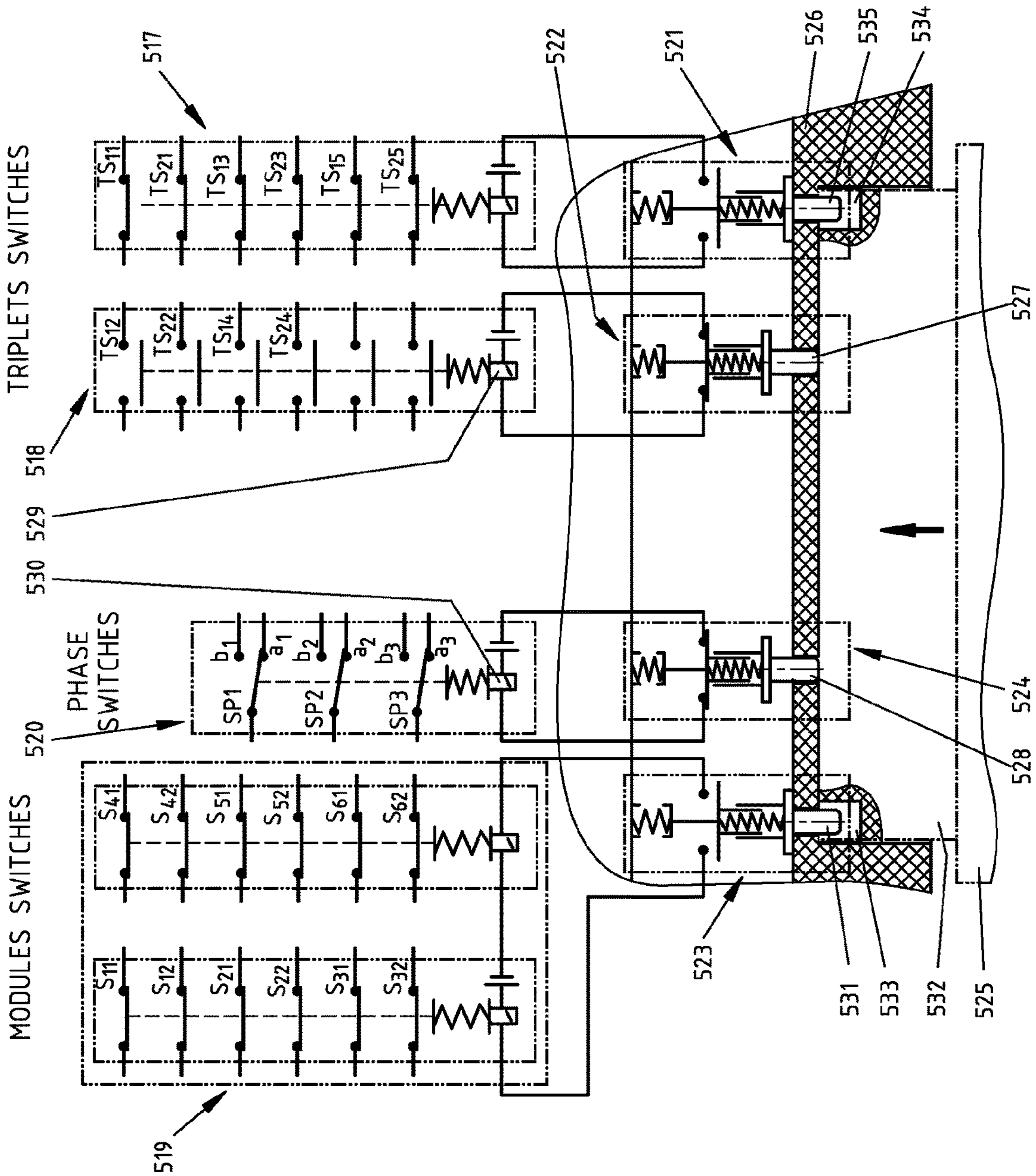
FIG. 88 is a recharging mode wiring diagram of an embodiment of the triplets switches, the modules switches, the phase switches and their command switches.
Figure 89:
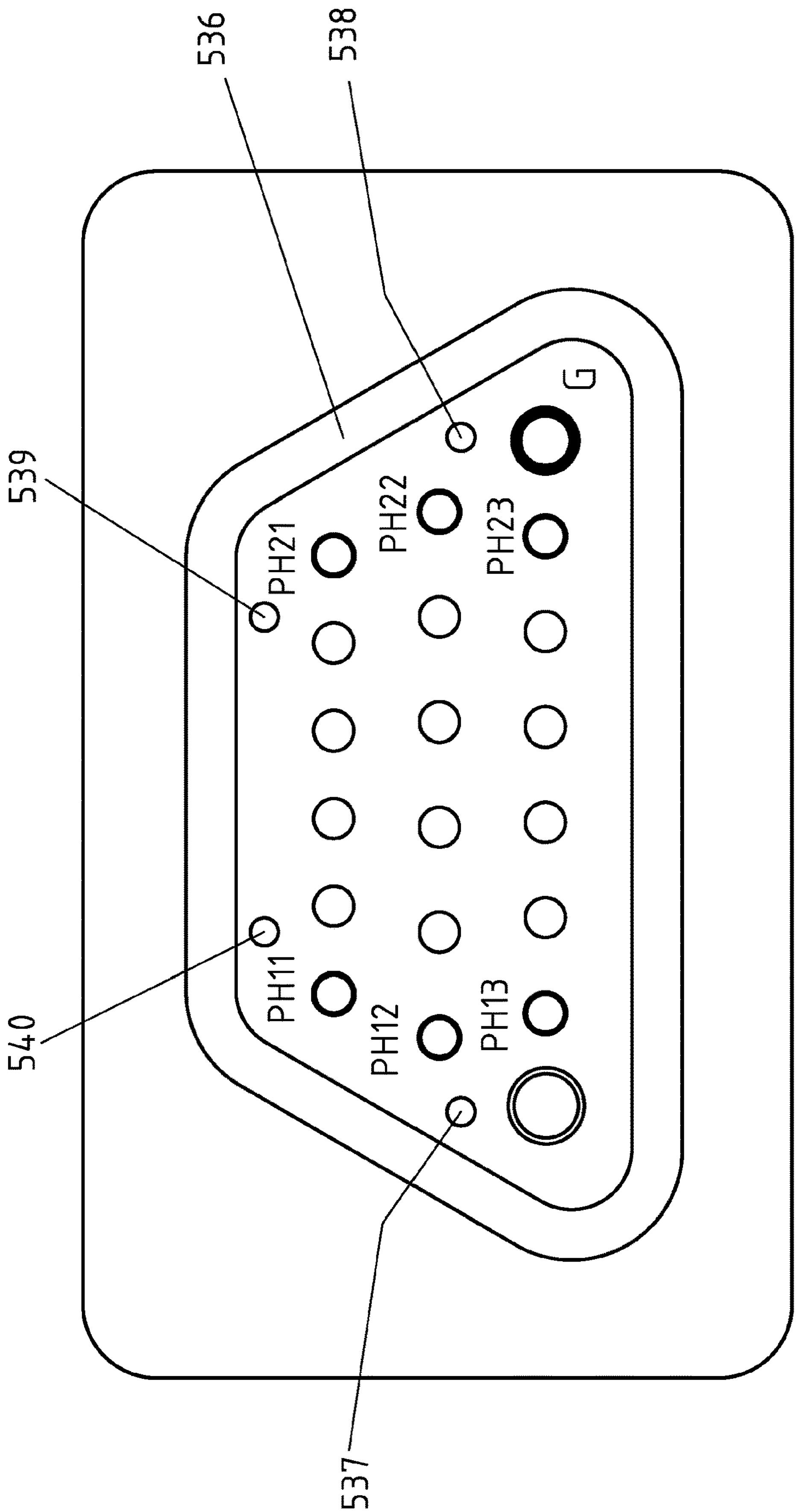
FIG. 89 shows the 20 contacts basic equipment battery inlet with its 7 active contacts and the four plungers of the command switches.
Figure 90:
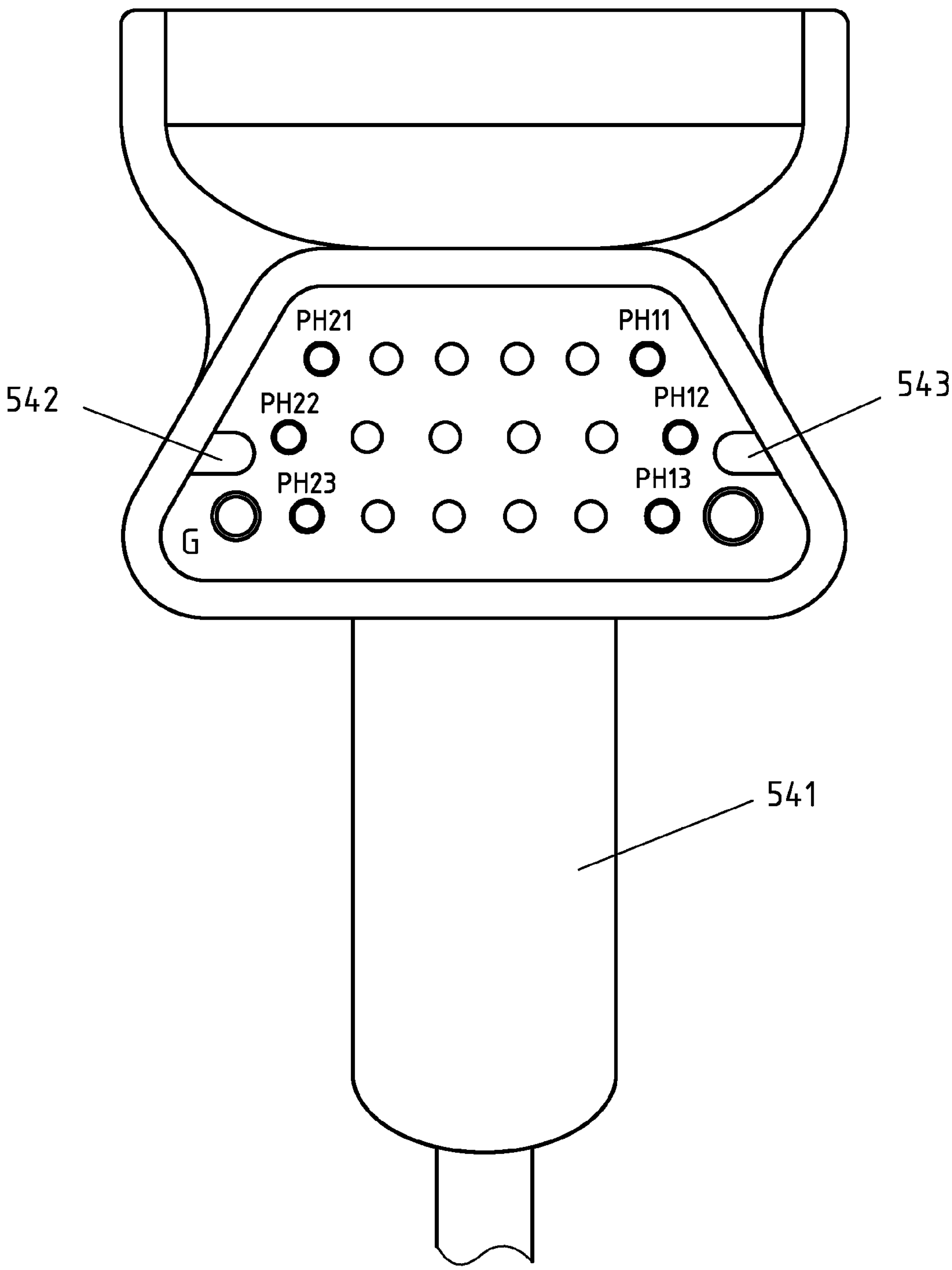
FIG. 90 illustrates the multi-contacts charger fitting with the 20 contacts basic equipment battery inlet, having 7 active contacts and the two recesses for the command switches plungers.
Figure 91:
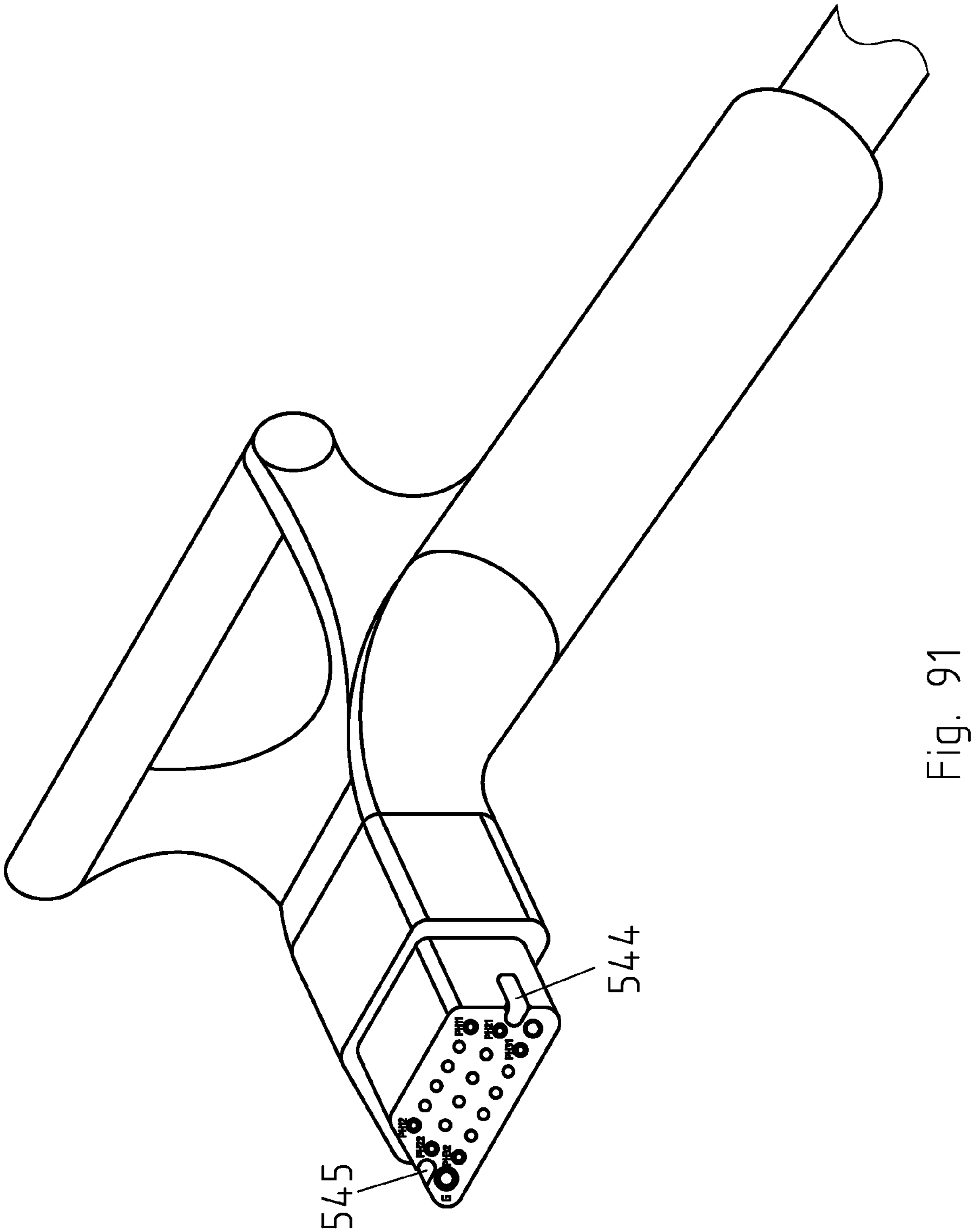
FIG. 91 is an isometric representation of the multi-contacts charger fitting with the 20 contacts basic equipment battery inlet, having 7 active contacts and two recesses for the command switches plungers.
Figure 92:
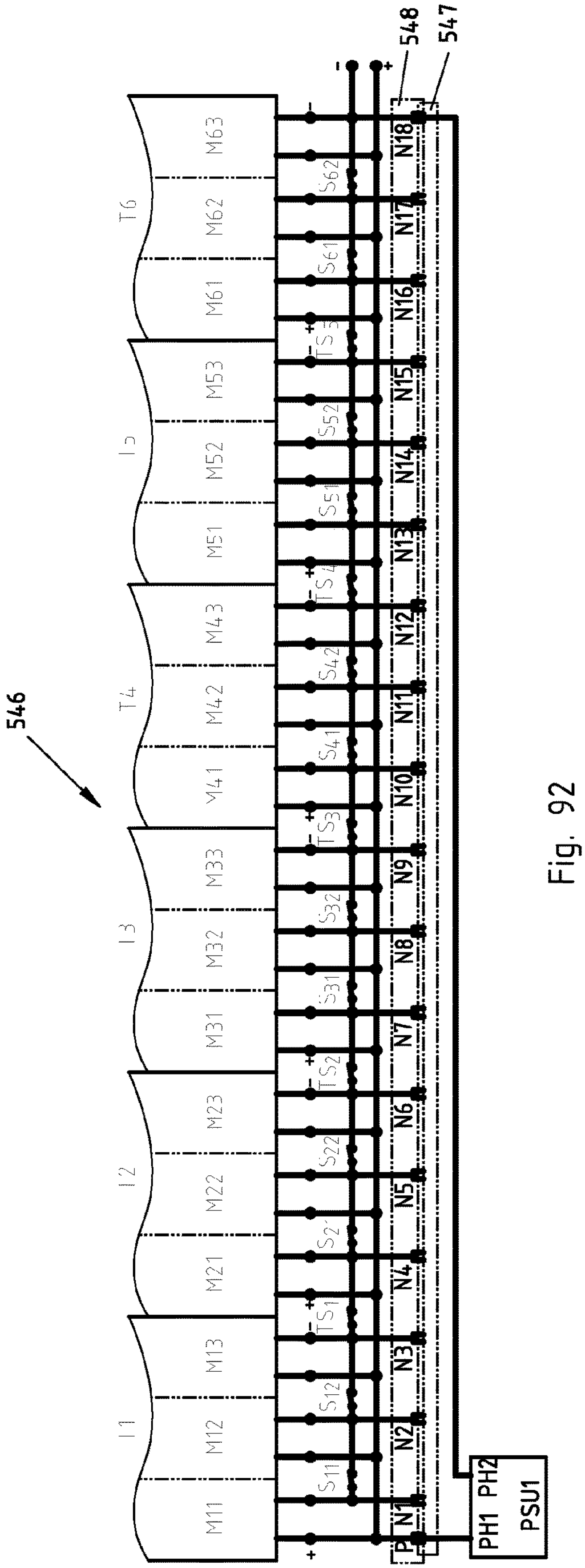
FIG. 92 is a wiring diagram in the recharging mode of the (6TP,3×6MP) battery, connected to a single 2-phase AC at 240V and 7 Kw independent power supply unit.
Figure 93:
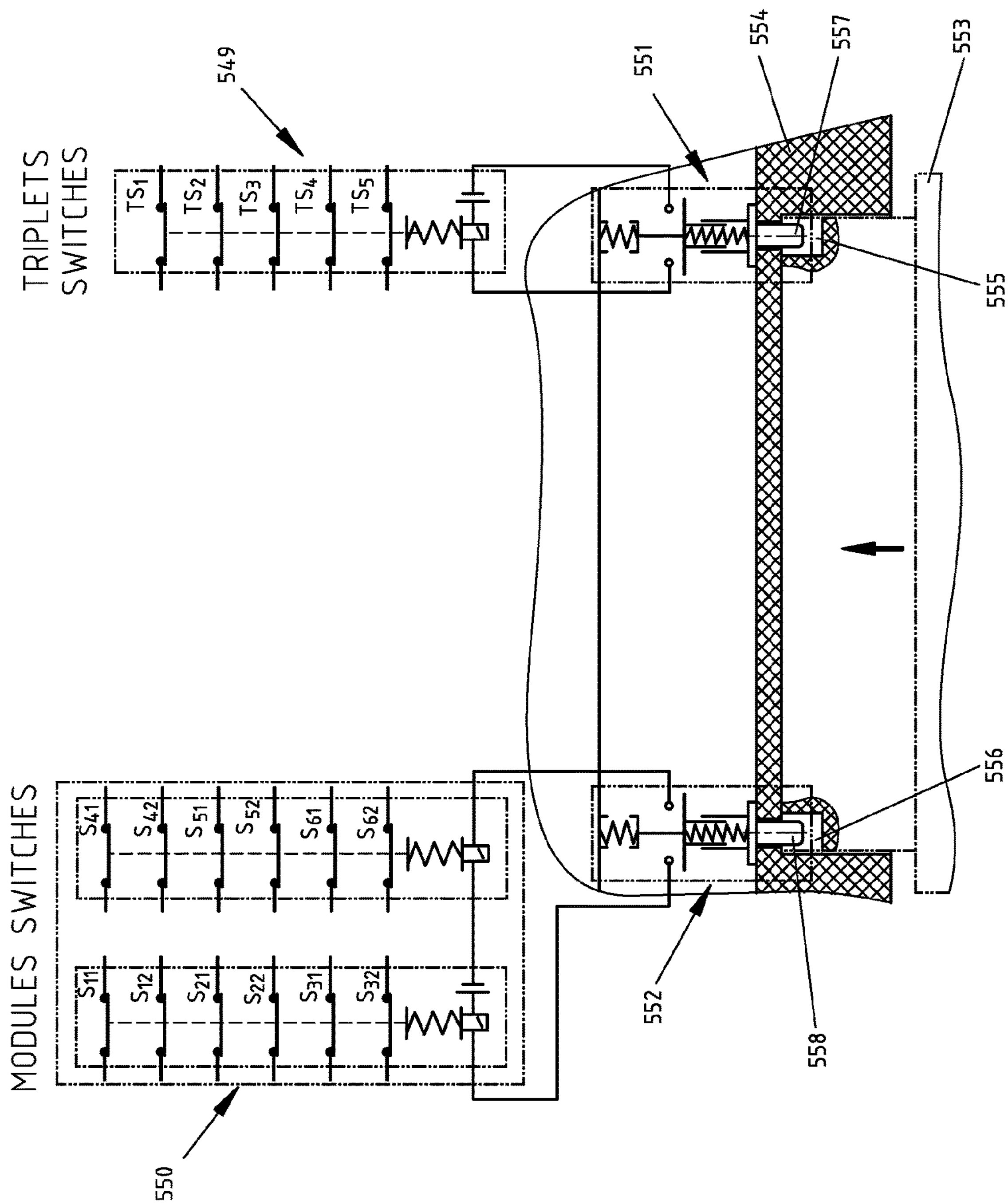
FIG. 93 is a recharging mode wiring diagram of an embodiment of the triplets switches, the modules switches and their command switches.
Figure 94:
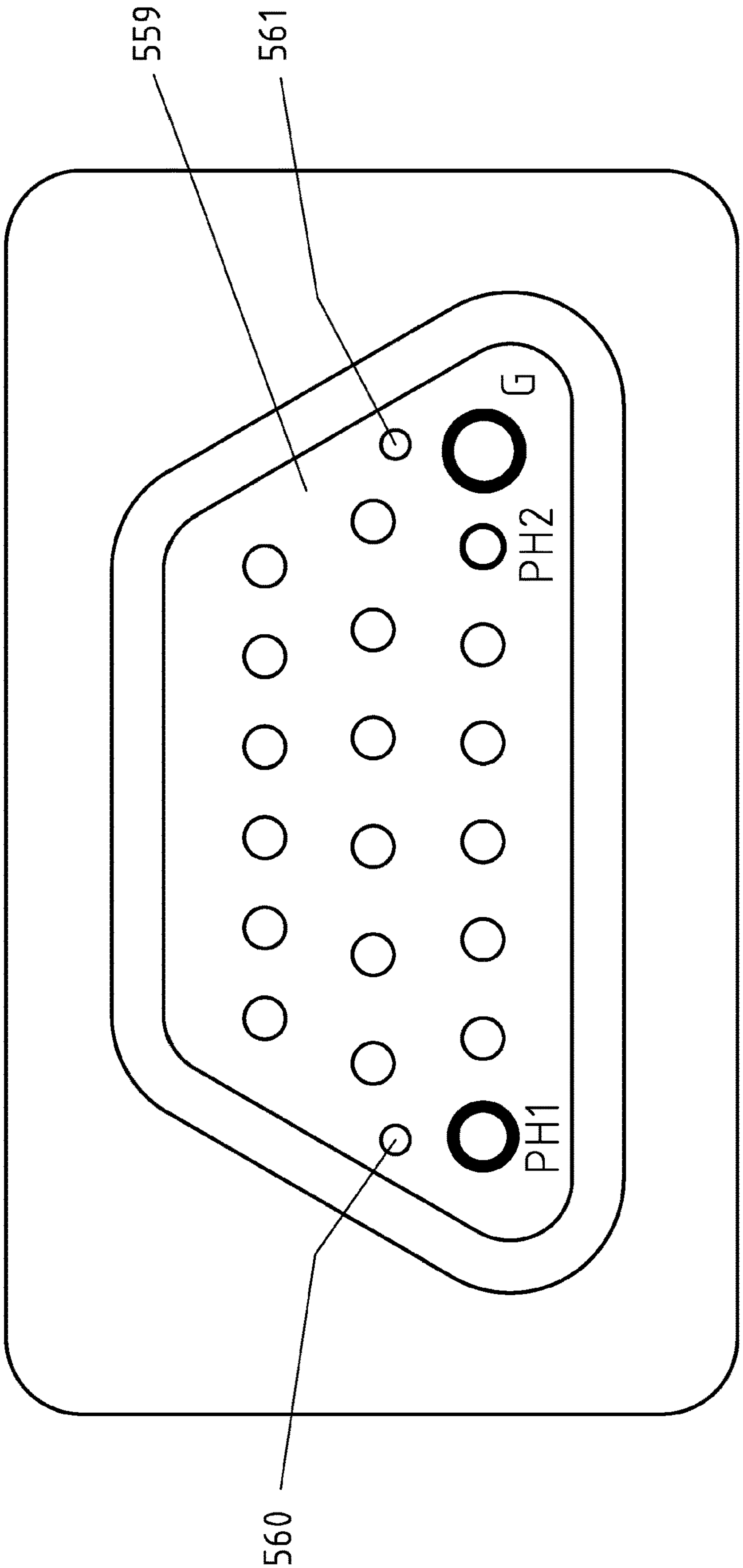
FIG. 94 shows the 20 contacts basic equipment battery inlet with its 3 active contacts and the two plungers of the command switches.
Figure 95:
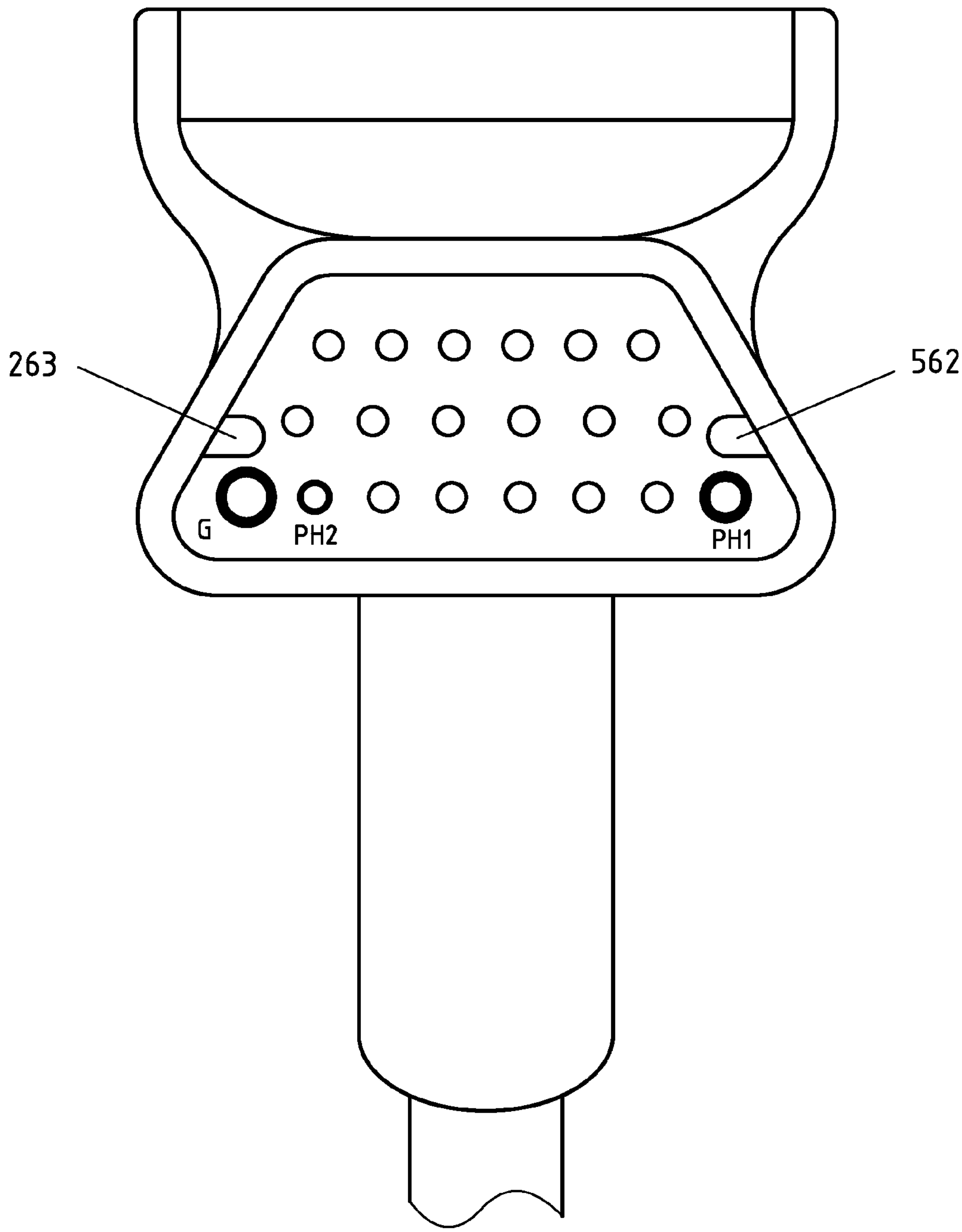
FIG. 95 illustrates the multi-contacts charger fitting with the 20 contacts basic equipment battery inlet, having 3 active contacts and the two recesses for the command switches plungers.
Figure 96:
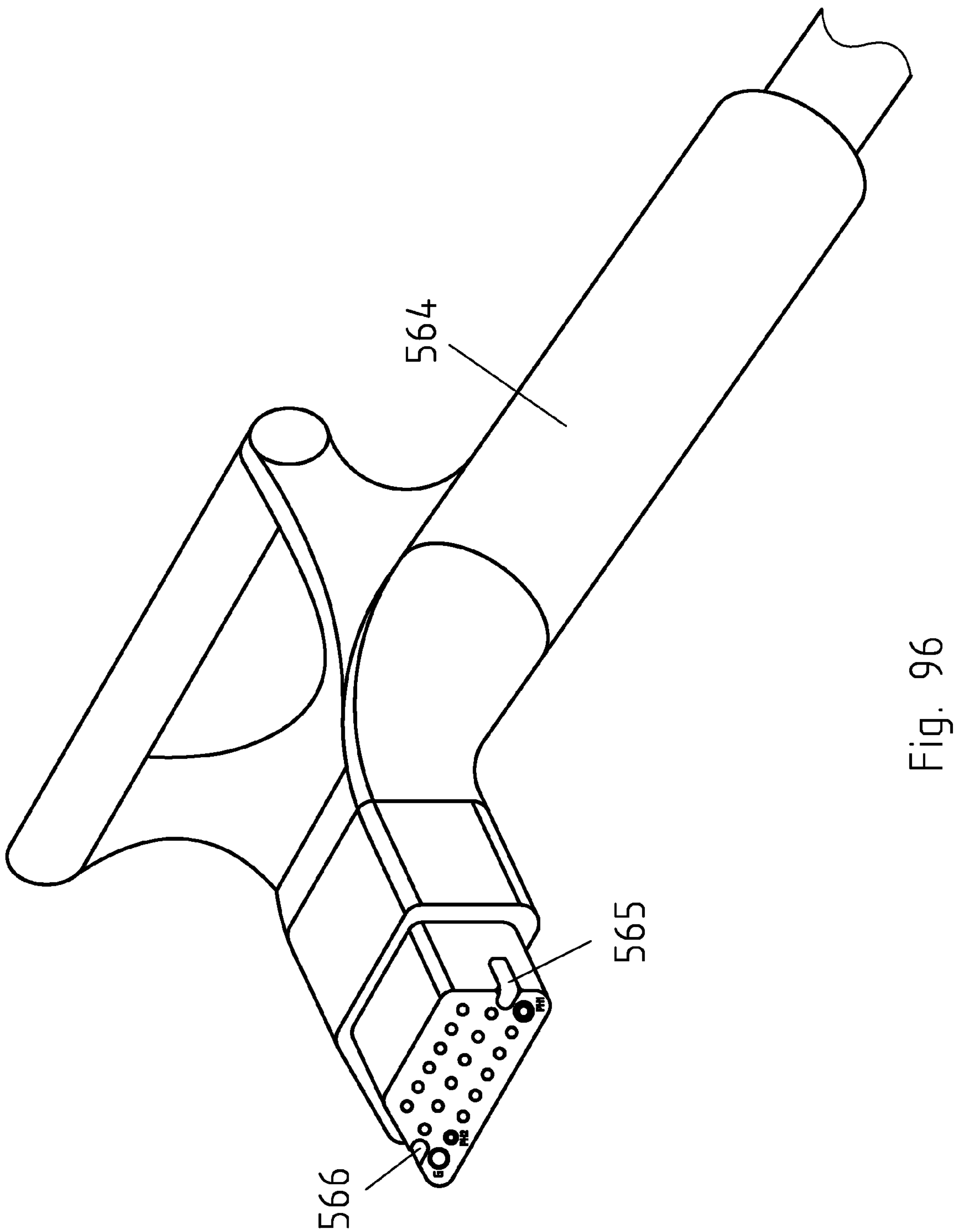
FIG. 96 is an isometric representation of the multi-contacts charger fitting with the 20 contacts basic equipment battery inlet, having 3 active contacts and two recesses for the command switches plungers.
Figure 97:
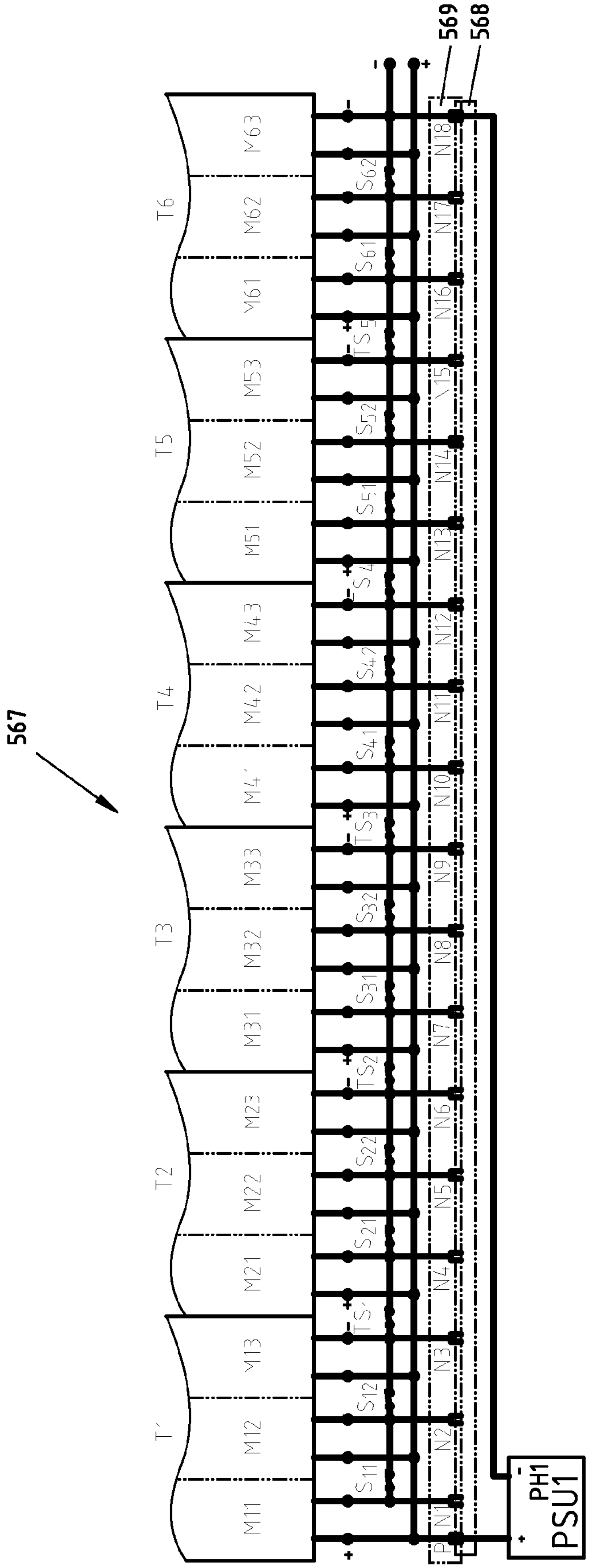
FIG. 97 is a wiring diagram of the recharging mode of the same (6TP,3×6MP) battery using a single mono-phase AC at 120V and 2.7 Kw independent power supply unit.
Figure 98:
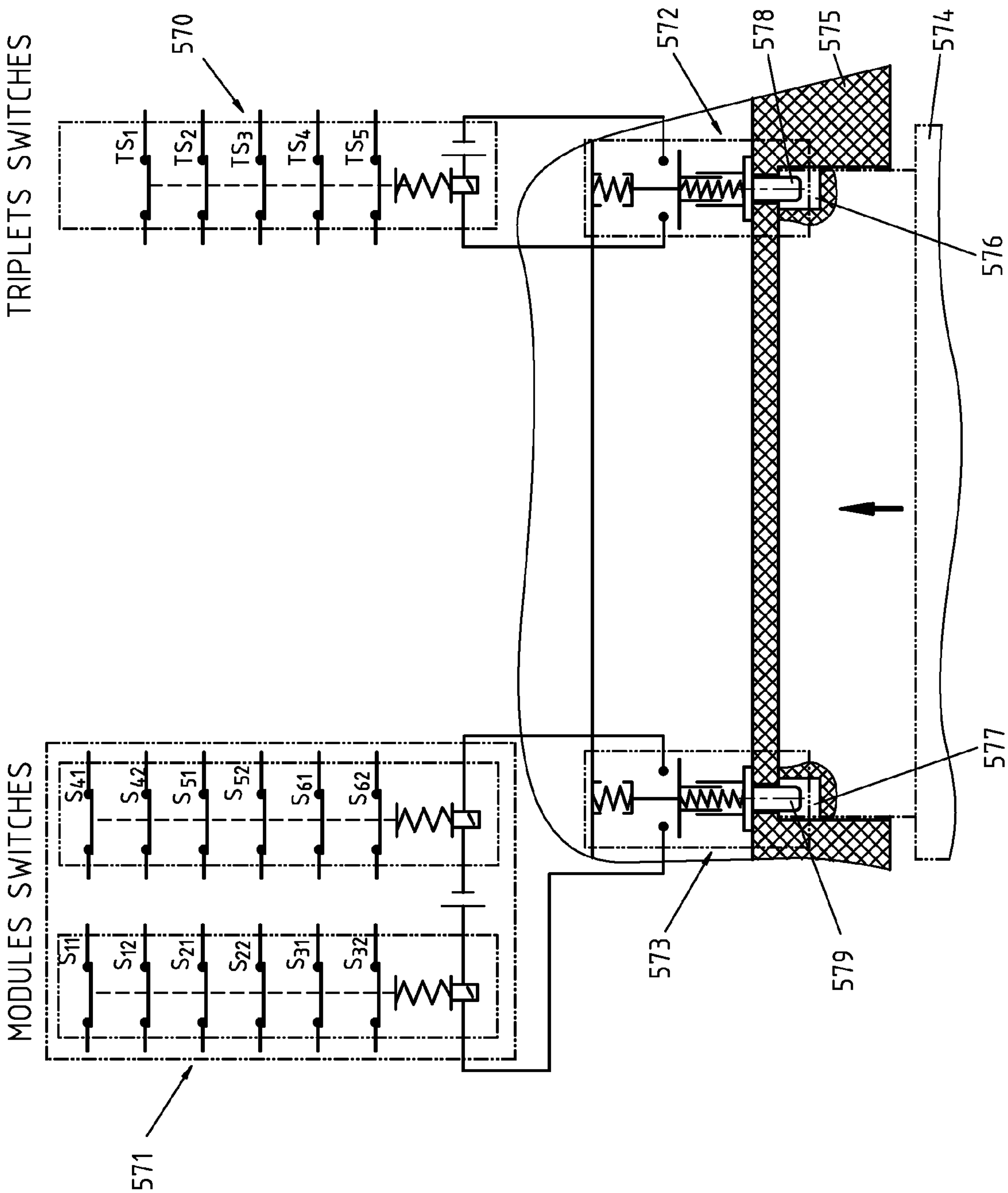
FIG. 98 is a recharging mode wiring diagram of an embodiment of the triplets switches, the modules switches and their two command switches.
Figure 99:
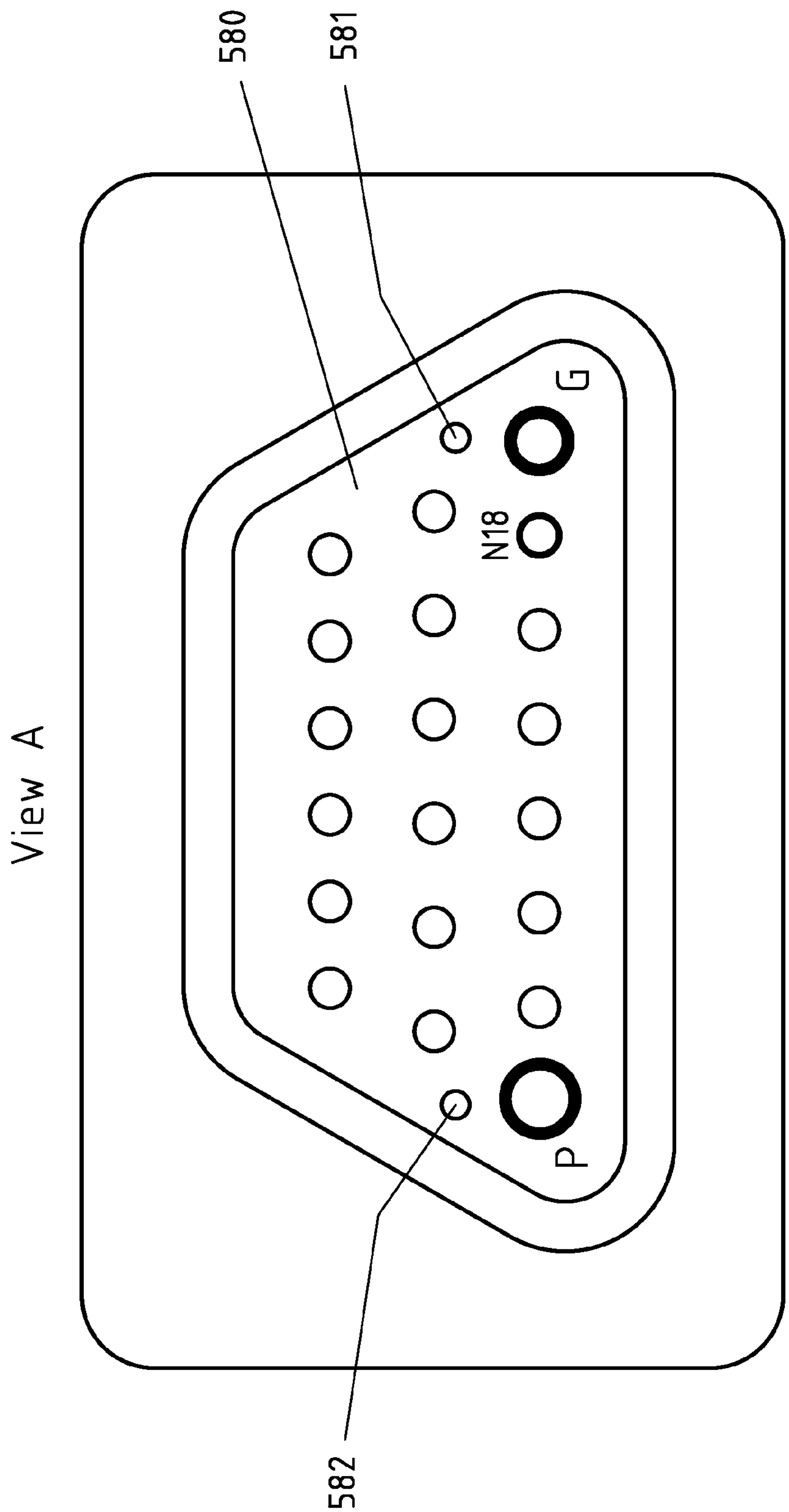
FIG. 99 shows the 20 contacts basic equipment battery inlet with its 3 active contacts and the two plungers of the command switches.
Figure 100:
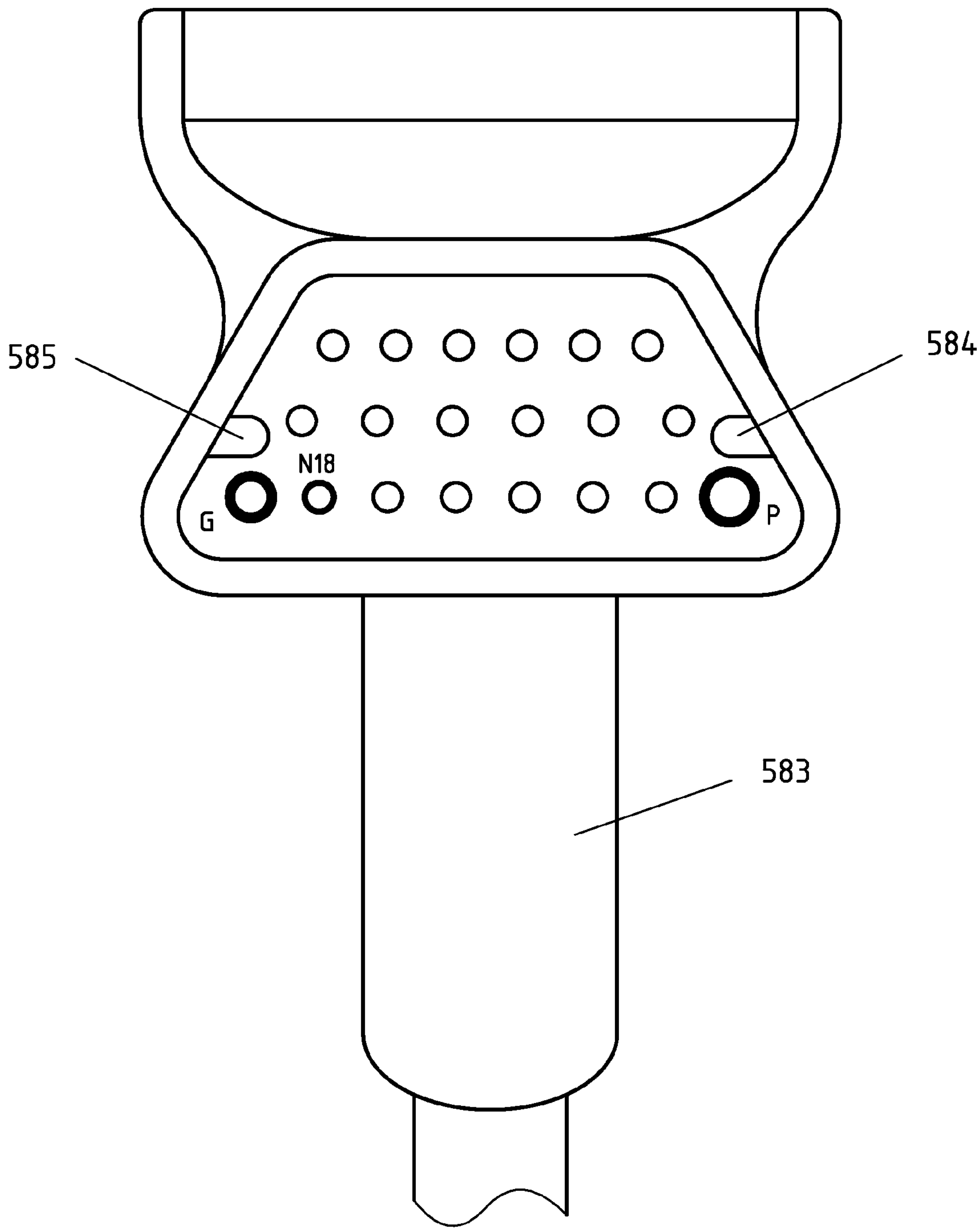
FIG. 100 illustrates the multi-contacts charger fitting with the 20 contacts basic equipment battery inlet, having 3 active contacts and the two recesses for the command switches plungers.
Figure 101:
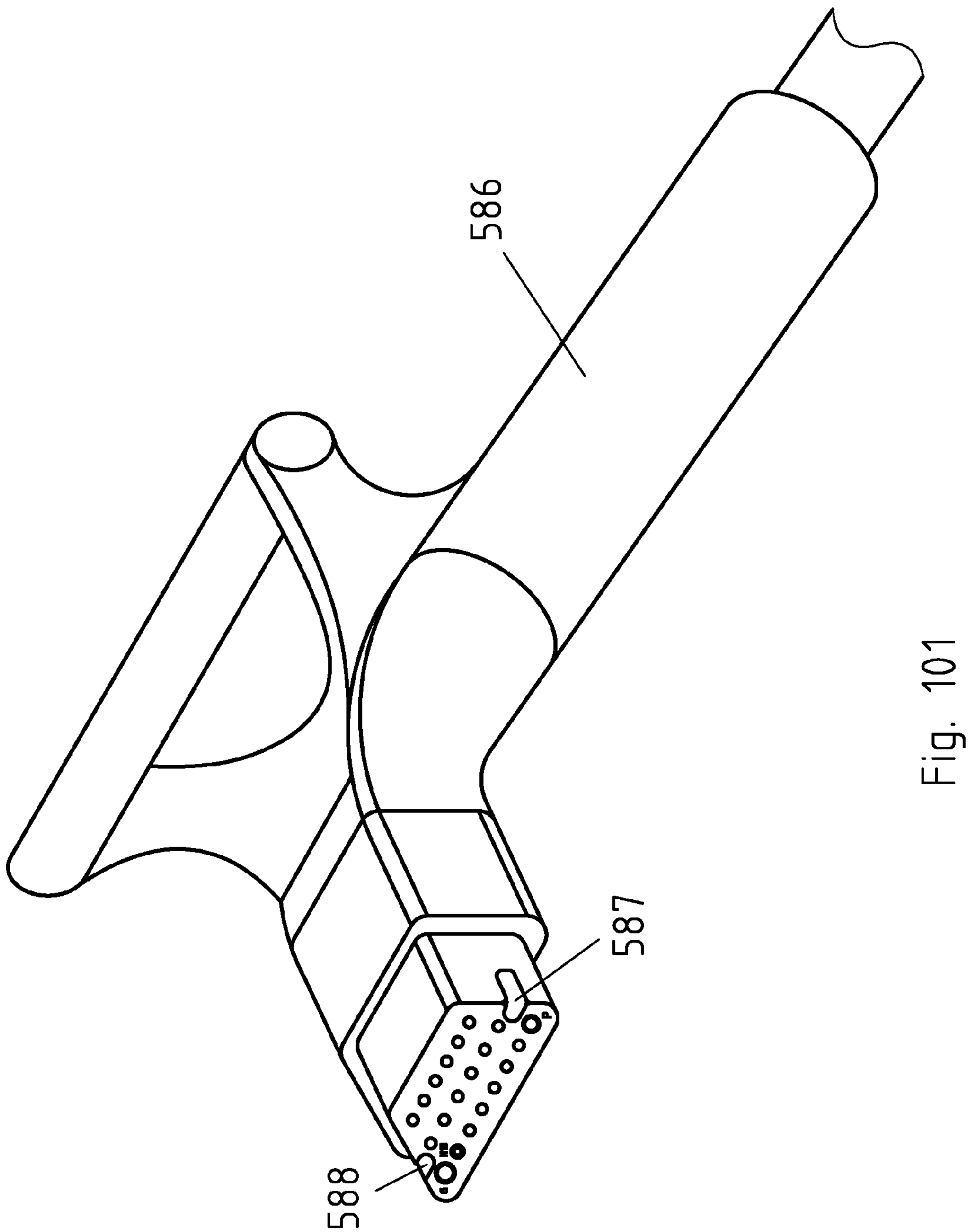
FIG. 101 is an isometric representation of the multi-contacts charger fitting with the 20 contacts basic equipment battery inlet, having 3 active contacts and two recesses for the command switches plungers.

| | | | | | | Figure Number with Parallel connection for modules and for triplets | | | | | | |
|---|---|---|---|---|---|---|---|---|---|---|---|---|
| | | | | | | Wiring diagram | | | Equip-ment | Charger OUTLET | | |
| Use | Type of Recharging | Type of PSU | PSU Code AC#Ph, #V, #Kw | Number of PSU per Terminal | Charger Active Contacts Number | Sup-plying | Re-charging | Command Switches | INLET Contacts | Contacts View | Isometric | Preferred App-lication |
| Industrial | Fast | 3 Phase | AC3, 380 V, | 6 | 18 | FIG. 73 | FIG. 74 | FIG. 76 | FIG. 78 & FIG. 79 | FIG. 80 | FIG. 81 | Electric Vehicles |
| | Regular | | 50 Kw | 2 | 6 | | FIG. 82 | FIG. 83 | FIG. 84 | FIG. 85 | FIG. 86 | |
| Domestic | Triple Fast | 2 Phase | AC2, 240 V, | 3 | 6 | | FIG. 87 | FIG. 88 | FIG. 89 | FIG. 90 | FIG. 91 | Cordless Tools, |
| | Fast | | 7 Kw | 1 | 1 | | FIG. 92 | FIG. 93 | FIG. 94 | FIG. 95 | FIG. 96 | Bikes, |
| | Double 2 Phase | 2 Phase | AC2, 240 V, | 2 | 4 | | | | | | | Motor Cycles |
| | Sina le 2 Phase | | 3.6 Kw | 1 | 1 | | | | | | | |
| | Triple Mono Phase | Mono-phase | AC1, 120 V, | 3 | 3 | | | | | | | |
| | Single Mono Phase | | 2.7 Kw | 1 | 1 | | FIG. 97 | FIG. 98 | FIG. 99 | FIG. 100 | FIG. 101 | |

Figure 75:
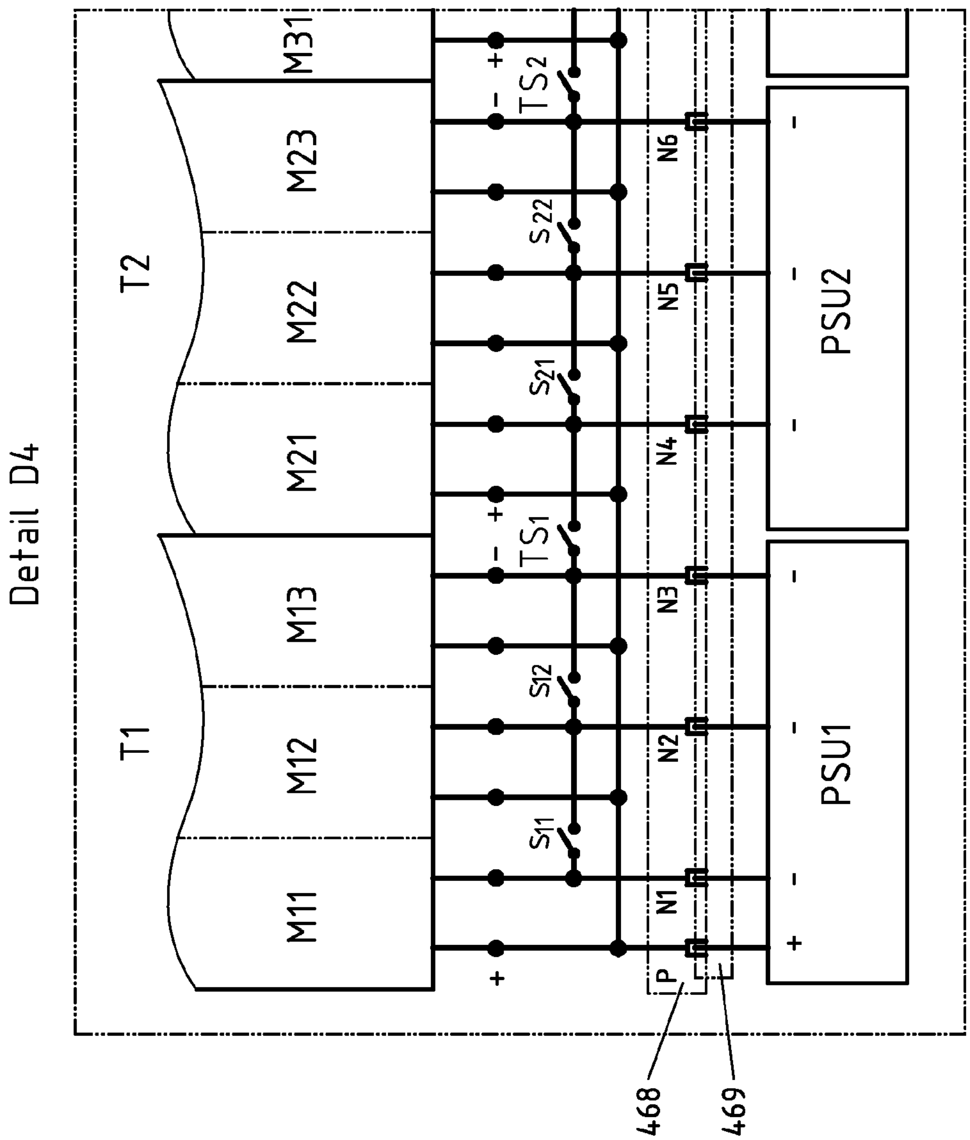
FIG. 75 is shown the Detail D4 of the FIG. 74.
Figure 77:
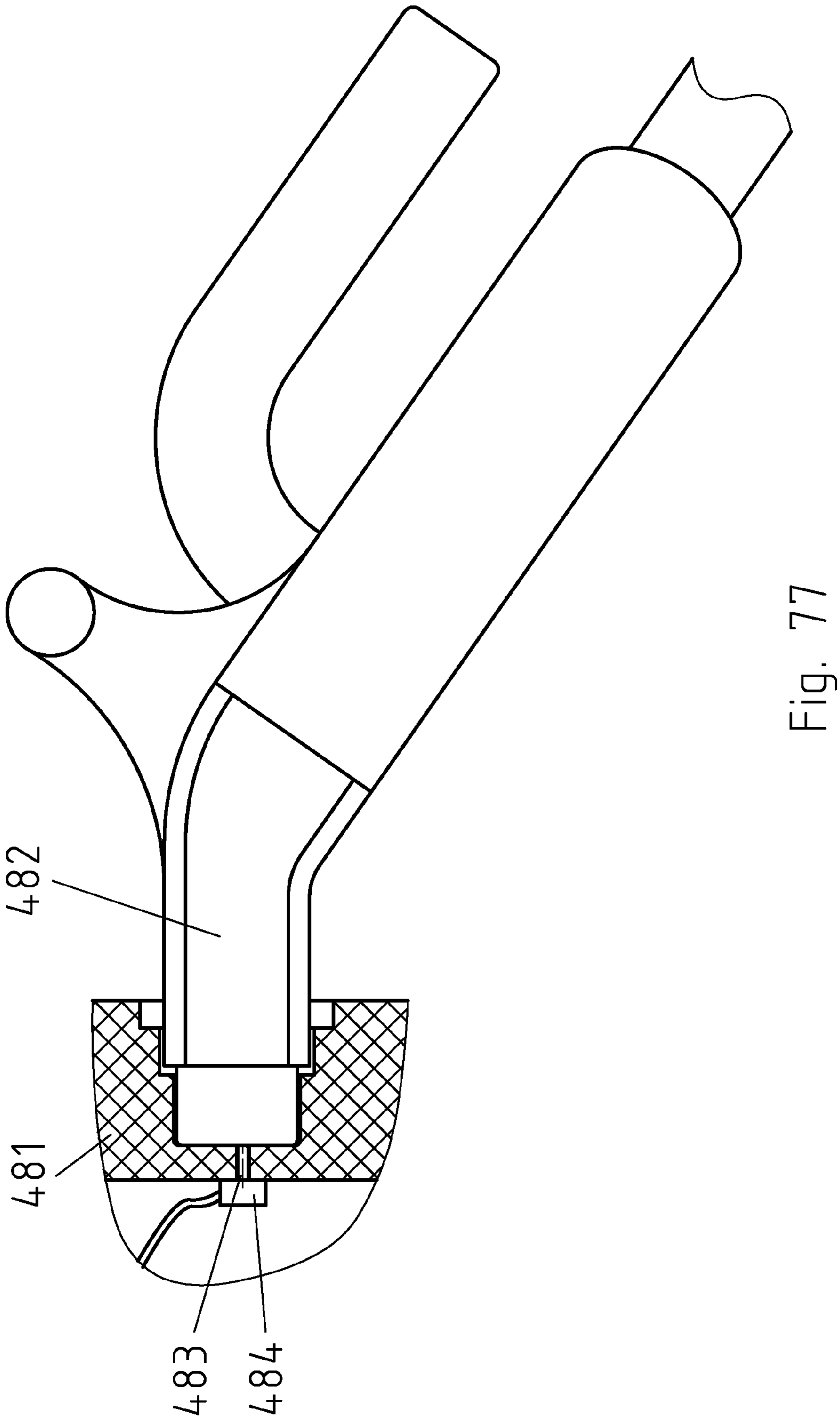
FIG. 77 is a vertical cross section of the basic equipment battery inlet and the multi-contact charger in a plan passing through the plunger of the command switch.

All triplets switches Ti and modules switches Sij are open, disconnecting the independent battery triplets and the independent battery modules from each other, in this way connecting each independent battery module Mij to one phase of each independent power supply unit PSUh. It is necessary to connect one of the null (positive) terminal P of one independent power supply unit to the battery. In FIG. 75 is shown the Detail D4 of the FIG. 74, illustrating two triplets T1 and T2, with the 6 modules M11 to M23, the triplets switches TS1 and TS2 and the modules switches S11, S12, S21 and S22 all open, partial basic equipment battery inlet 468, partial independent multi-contacts charger outlet 469 and two independent power supply units PSU1 and PSU2. The FIG. 76 is a recharging mode wiring diagram of an embodiment of the triplets switches 470, the modules switches 471 and the two triplets command switches 472 (for triplets switches) and modules command switches 473 (for modules switches). As can be seen, the independent multi-contacts charger 474, which is installed into the basic equipment battery inlet 475, pushes the two plungers 476 and 477 of the triplets command switch 472 and the module command switch 473, activating the electromagnets 478, 479 and 480, which command the triplets switches 470 and the modules switches 471, disconnecting each module and triplet from each other, allowing the fast recharge of each module of the battery. The triplets command switch 472 and the modules command switch 473 are similar with the battery command switches for battery switches, described here before and shown in FIG. 60, which is the detail D2 of FIG. 59. FIG. 77 is a vertical cross section of the basic equipment battery inlet 481 and the independent multi-contacts charger 482, in a plan passing through the plunger 483 of the battery/module/triplets command switch 484. It is seen the independent multi-contacts charger 482 installed into the basic equipment battery inlet 481 pushing in the plunger 483 of the battery/module/triplets command switch 484. The FIG. 78 is an isometric view of the basic equipment battery inlet 485, showing the positive (null) contact P, the Nm (m=1 to 18)) negative contacts and the ground contact G, as well as the two plungers 486 and 487, set free after the independent multi-contacts charger was taken out. The FIG. 79 is the View A of FIG. 78, showing the 20 contacts basic equipment battery inlet 488 with all the 20 contacts P, G, Nm (m=(1 to 18)) and the plungers 489 and 490. FIG. 80 shows a view of the independent multi-contacts charger 491 with its contacts P, G and Nm (m=(1 to 18)), which fits with the 20 contacts of the basic equipment battery inlet presented above. FIG. 81 is an isometric view of the independent multi-contacts charger 492, showing its special shape, with its mistake-proof trapezoidal out-let, its handles and contacts.

In FIG. 82 to FIG. 86 are presented the wiring diagrams, the basic equipment battery inlet and the independent multi-contacts charger for an industrial regular recharging terminal using only two 3-phase AC at 380V and 50 Kw independent power supply units. In FIG. 82 is shown a wiring diagram of the recharging mode of the same (6TP,3×6MP) battery 493 presented in FIG. 73, using a basic equipment battery primary inlet 494 with Nm (m=1 to 18) contacts, the independent multi-contacts charger 495 and two independent power supply units of 380V and 50 Kw Each triplet Ti (i=1 to 6) of the battery 493 is connected with its negative terminal (−) to one (negative) phase of the two independent power supply units PSU1 and PSU2 and with its positive terminal (+) to the null terminal P of one of the independent power supply unit (in this case PSU1). The triplets are separated during the recharging by the triplet switches TSg (g=1 to 5), which have to stay open. Inside of each triplet, the three independent modules are connected in parallel by the modules switches Sik. The FIG. 83 is a recharging mode wiring diagram of an embodiment of the triplets switches 496, the modules switches 497 and the two command switches: triplets command switch 498 (for triplets switches) and modules command switch 499 (for modules switches). As can be seen, the independent multi-contacts charger 500, which is installed into the 20 contacts basic equipment battery inlet 501 pushes the plunger 502 of the triplets command switch 498, activating the electromagnet 503, which command the triplets switches 496, disconnecting each triplet from each other, and allowing the fast recharge of each triplet of the battery. The module switches stay close (connecting each other the independent modules of each triplet), so the plunger 504 of the modules command switch 499 has to stay untouched by the charger outlet 505, when the charger 500 is installed. In order to do this, the charger outlet 505 is designed with a recess 506 to receive the plunger 504 without touching it. In this way the modules switches 497 are no activated. The FIG. 84 shows the 20 contacts of the basic equipment battery inlet 507 with its 8 active contacts P, G, N3, N6, N9, N12, N15 and N18. Also are shown the two plungers 508 for the modules command switch and 509 for the triplets command switch. FIG. 85 illustrates the independent multi-contacts charger 510 fitting with the 20 contacts of the basic equipment battery inlet (shown in FIG. 84), having 8 active contacts P, G, N3, N6, N9, N12, N15 and N18, and the recess 511, to avoid the activation of the plunger of the modules command switch. FIG. 86 is an isometric representation of the independent multi-contacts charger 512 fitting with the 20 contacts of the basic equipment battery inlet (shown in FIG. 84), having 8 active contacts P, G, N3, N6, N9, N12, N15 and N18, and the recess 513, to avoid the activation of the plunger of the modules command switch.

In FIG. 87 to FIG. 91 are presented the wiring diagrams, the basic equipment battery inlet and the independent multi-contacts charger for a domestic triple fast recharging station, using three 2-phase AC at 240V and 7 Kw independent power supply units. In FIG. 87 is shown a wiring diagram of the recharging mode of the same (6TP,3×6MP) battery 514 presented in FIG. 73, using a 20 contacts basic equipment battery inlet 515 with P, G, and Nm (m=1 to 18) contacts, the independent multi-contacts charger 516 and three independent power supply units of two phase AC, 240V and 7 Kw, each. The battery triplets Ti are separated each other by the triplets switches TS1*e* (e=(1 to 5)) on the negative circuit and TS2*e* (e=(1 to 5)) on the positive circuit. The battery 514 is divided into 3 groups, by the triplets switches TS12 & TS22, TS14 & TS24 kept open during the recharging time, each group contains two adjacent triplets. Each phase of the two phases PH1*h* and PH2*h* (h=1 to 3) of each independent power supply unit SPUh (h=1 to 3) is connected to one of the negative contacts of the basic equipment battery inlet, Ni, N6, N7, N12, N13, N18. Each contact N6, N12 and N18 of the phase 2, PH2*h* (h=1 to 3) of each independent power supply unit SPUh (h=(1 to 3)) is connected directly to the negative terminal of the last battery independent module M23, M43 and M63 of each group of the two triplets. Each contact N1, N7 and N13 of the phase 1 PH1*h* (h=1 to 3) of each independent power supply unit SPUh (h=(1 to 3)) is connected to the positive terminal of each first independent battery module M11, M31 and M51 of each group of the two battery triplets via a phase changeover switch SPr (r=(1 to 3)), which is activated and it is on $a_r$ position (r=(1 to 3)). Using these SPr phase changeover switches, allows also to recharge the battery on an industrial fast recharging terminal when the phase changeover switches SPr are dis activated and they are on $b_r$ position. All module switches and the triplet switches TS11, TS12, TS13, TS23, TS15 and TS25 remain closed. The FIG. 88 is a recharging mode wiring diagram of an embodiment of the triplets switches 517 and 518, the modules switches 519, the phase changeover switches 520, the triplets command switch 521 (for triplets switches 517), the triplets command switch 522 (for triplets switches 518) the modules command switch 523 (for module switches 519) and the phase command switch 524 (for phase switches 520). As can be seen, the independent multi-contacts charger 525, which is installed into the 20 contacts basic equipment battery inlet 526 pushes the plungers 527 and 528 of the triplets command switch 522 (for triplets switch 518) and respective the phase command switch 524 (for phase changeover switches 520), activating the electromagnets 529 and 530. The electromagnet 529 commands the triplets switches 518, disconnecting each group of two triplets from each other, and allowing the recharge of each group of two triplets of the battery. The electromagnet 530 commands the phase switches 520 changing the changeover switches on $a_r$ position, connecting the phase 1 of each independent power supply unit to the positive terminal of each first independent battery module of each group of two triplets. The module switches 519 stay closed (connecting the modules of each triplet), so the plunger 531 of the modules command switch 523 has to stay untouched by the independent multi-contacts charger outlet 532, when the independent multi-contacts charger 525 is installed. In order to do this, the independent multi-contacts charger outlet 532 is designed with a recess 533 to receive the plunger 531 without touching it. In this way the modules switches 519 are no activated. In similar situation are triplets switches 517, therefore the charger outlet 532 has another recess 534 in order to don't touch the plunger 535 of the triplets command switch 521. The FIG. 89 shows the 20 contacts basic equipment battery inlet 536 with its 7 active contacts G, PH11, PH12, PH12, PH22, PH13 and PH23. Also are shown the four plungers of the command switches as following: plunger 537 of the modules command switch (for modules switches), plunger 538 and plunger 539 of the triplets command switches (for triplets switches) and plunger 540 of the phase command switch (for phase switches). FIG. 90 illustrates the independent multi-contacts charger 541 fitting with the 20 contacts basic equipment battery inlet (shown in FIG. 89), having 7 active contacts G, PH11, PH12, PH12, PH22, PH13 and PH23 and the two recesses 542 and 543. FIG. 91 is an isometric representation of the independent multi-contacts charger fitting with the 20 contacts basic equipment battery inlet (shown in FIG. 89), having 7 active contacts G, PH11, PH12, PH12, PH22, PH13 and PH23 and the recesses 544 and 545.

In FIG. 92 to FIG. 96 are presented the wiring diagrams, the basic equipment battery inlet and the independent multi-contacts charger for a domestic fast recharging station, using a single 2-phase AC at 240V and 7 Kw independent power supply unit. The FIG. 92 is a wiring diagram in the recharging mode of the same (6TP,3×6MP) battery 546 presented in FIG. 73. The battery is connected to a single 2-phase AC at 240V and 7 Kw independent power supply unit PSU1 by the independent multi-contacts charger outlet 547, which is installed into the basic equipment battery primary inlet 548, connected to the battery 546. All triplets switches TSi, module switches Sij are close, connecting the battery triplets and the independent battery modules each other, in this way connecting all independent battery modules to one single 2 phase independent power supply unit PSU1. It is necessary to connect one phase PH1 to the null (positive) terminal of the first module M11 via the inlet/outlet P contact of the 20 contact basic equipment battery inlet 548 and the respective independent multi-contacts charger outlet 547. The second phase PH2 is connected to the negative terminal of the last independent battery module M63, via the inlet/outlet N18 contact of the 20 contact basic equipment battery inlet 548 and the respective independent multi-contacts charger outlet 547. The FIG. 93 is a recharging mode wiring diagram of an embodiment of the triplets switches 549, the modules switches 550 and the triplets command switches 551 and the modules command switches 552. As can be seen, the charger 553, which is installed into the 20 contact basic equipment battery inlet 554 is designed with two recesses 555 and 556 in order to don't touch the two plungers 557 and 558 of the triplets command switches 549 and the modules command switches 550, in this way keeping ON all triplets switches and modules switches, so all triplets and modules are interconnected. The FIG. 94 shows the 20 contacts basic equipment battery inlet 559 with its 3 active contacts G, P for (PH1) and N18 for (PH2). Also are shown the two plungers of the command switches as following: plunger 560 of the modules command switch, and plunger 561 of the triplets command switches. FIG. 95 illustrates the independent multi-contacts charger fitting with the 20 contacts basic equipment battery inlet (shown in FIG. 94), having 3 active contacts G, P for (PH1) and N18 for (PH2) and the two recesses 562 and 563. FIG. 96 is an isometric representation of the independent multi-contacts charger 564 fitting with the 20 contacts basic equipment battery inlet (shown in FIG. 94), having 3 active contacts G, P for (PH1) and N18 for (PH2) and the recesses 565 and 566.

In FIG. 97 to FIG. 101 are presented the wiring diagrams, the basic equipment battery inlet and the independent multi-contacts charger for a domestic single mono-phase recharging station, using a single mono-phase mono phase AC at 120V and 2.7 Kw independent power supply unit. The FIG. 97 is a wiring diagram of the recharging mode of the same (6TP,3×6MP) battery 567 presented in FIG. 73. The battery is connected to a single mono phase AC at 120V and 2.7 Kw independent power supply unit PSU1 by the independent multi-contacts charger outlet 568, which is installed into the basic equipment battery inlet 569, connected to the battery 567. All triplets switches TSi; and modules switches Sij are close, connecting the independent battery triplets and the independent battery modules each other, in this way connecting all modules to one single mono-phase independent power supply unit PSU1. It is necessary to connect the null (positive) terminal of the independent power supply unit PSU1 to the null (positive) terminal of the first module M11 via the inlet/outlet P contact of the 20 contact basic equipment battery inlet 569 and the respective independent multi-contacts charger outlet 568. The phase PH1 is connected to the negative terminal of the last independent module M63, via the inlet/outlet N18 contact of the 20 contact basic equipment battery inlet 569 and the respective independent multi-contacts charger outlet 568. The FIG. 98 is a recharging mode wiring diagram of an embodiment of the triplets switches 570, the modules switches 571 and the triplets command switches 572 and the modules command switches 573. As can be seen, the multi-contact charger 574, which is installed into the 20 contact basic equipment battery inlet 575 is designed with two recesses 576 and 577 in order to don't touch the two plungers 578 and 579 of the triplets command switch 572 and the modules command switch 573, in this way keeping ON all triplets switches and modules switches, so all triplets and independent battery modules are interconnected. The FIG. 99 shows the 20 contacts basic equipment battery inlet 580 with its 3 active contacts G, P for null and N18 for (PH1). Also are shown the two plungers of the command switches as following: the plunger 581 of the triplets command switches, and the plunger 582 of the modules command switch. FIG. 100 illustrates the independent multi-contacts charger 583 fitting with the 20 contacts basic equipment battery inlet (shown in FIG. 99), having 3 active contacts G, P for null and N18 for (PH1) and the two recesses 584 and 585. FIG. 101 is an isometric representation of the independent multi-contacts charger 586 fitting with the 20 contacts basic equipment battery inlet (shown in FIG. 99), having 3 active contacts G, P for null and N18 for (PH1) and the recesses 587 and 588.

Figure 102:
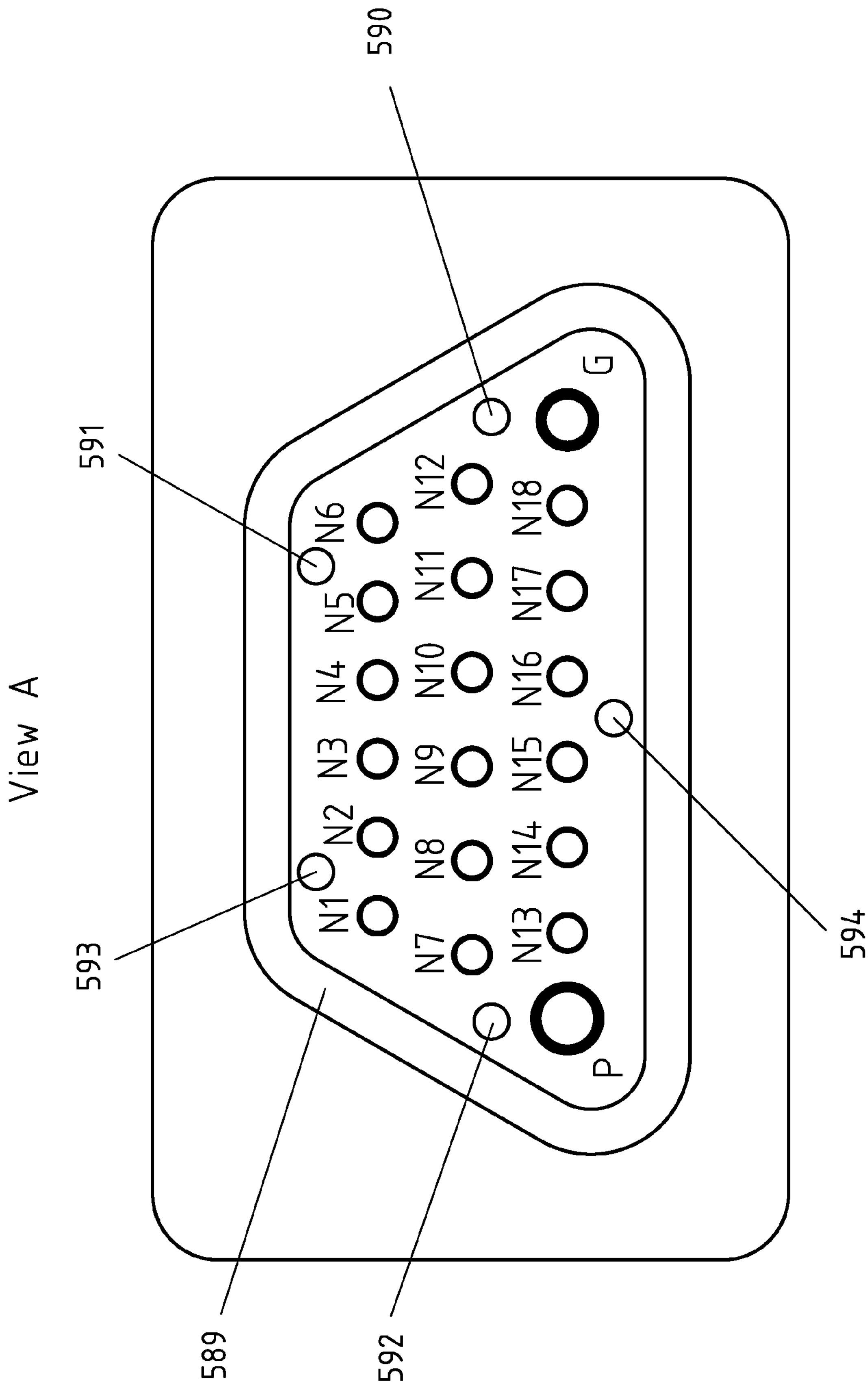
FIG. 102 is an example of a 20 contacts universal vehicle inlet.
Figure 103:
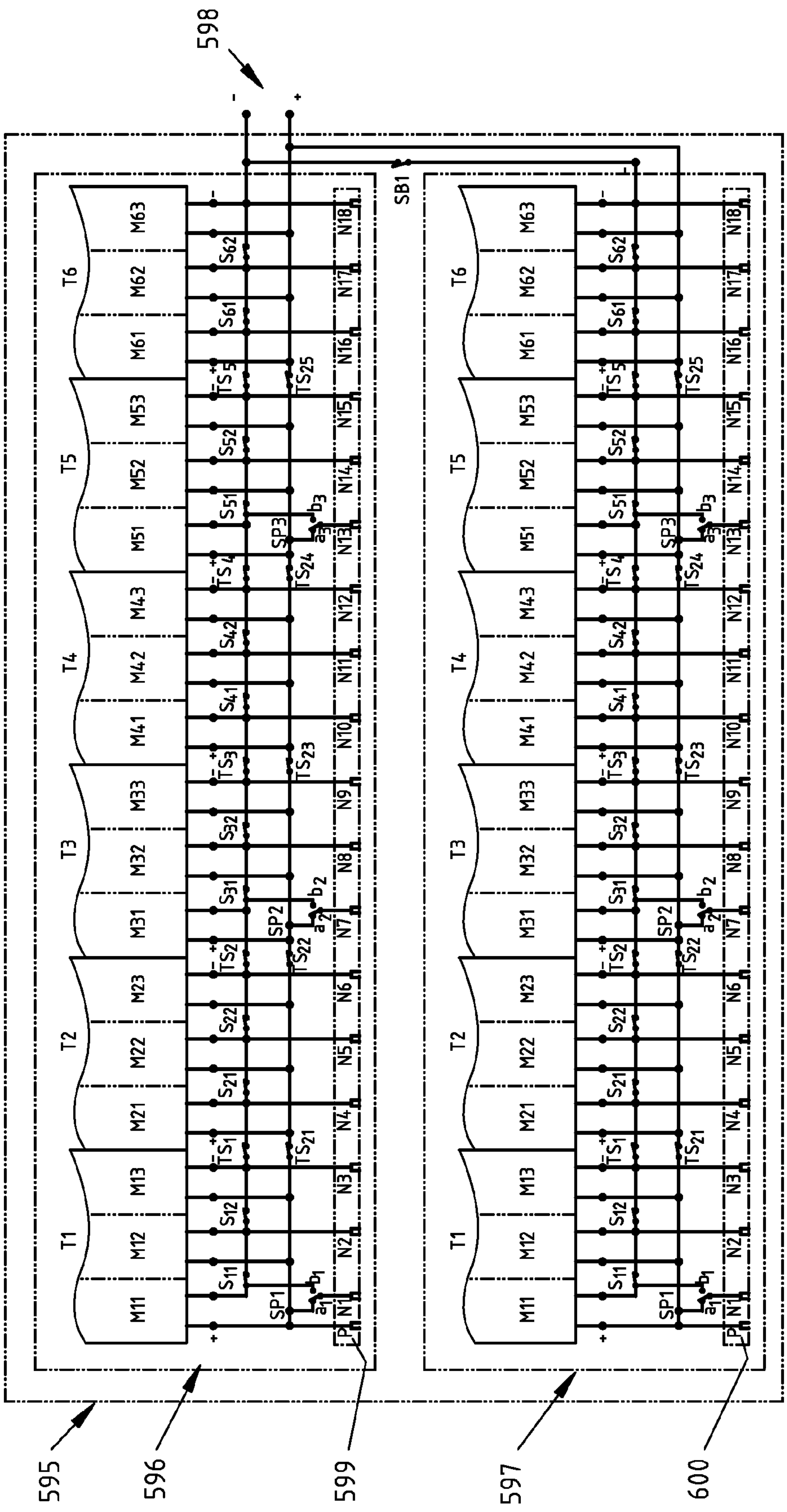
FIG. 103 illustrates a wiring diagram for supplying mode of an electric vehicle battery, composed by two (6TP,3×6MP) batteries connected in parallel, having a unique supplying terminal.
Figure 104:
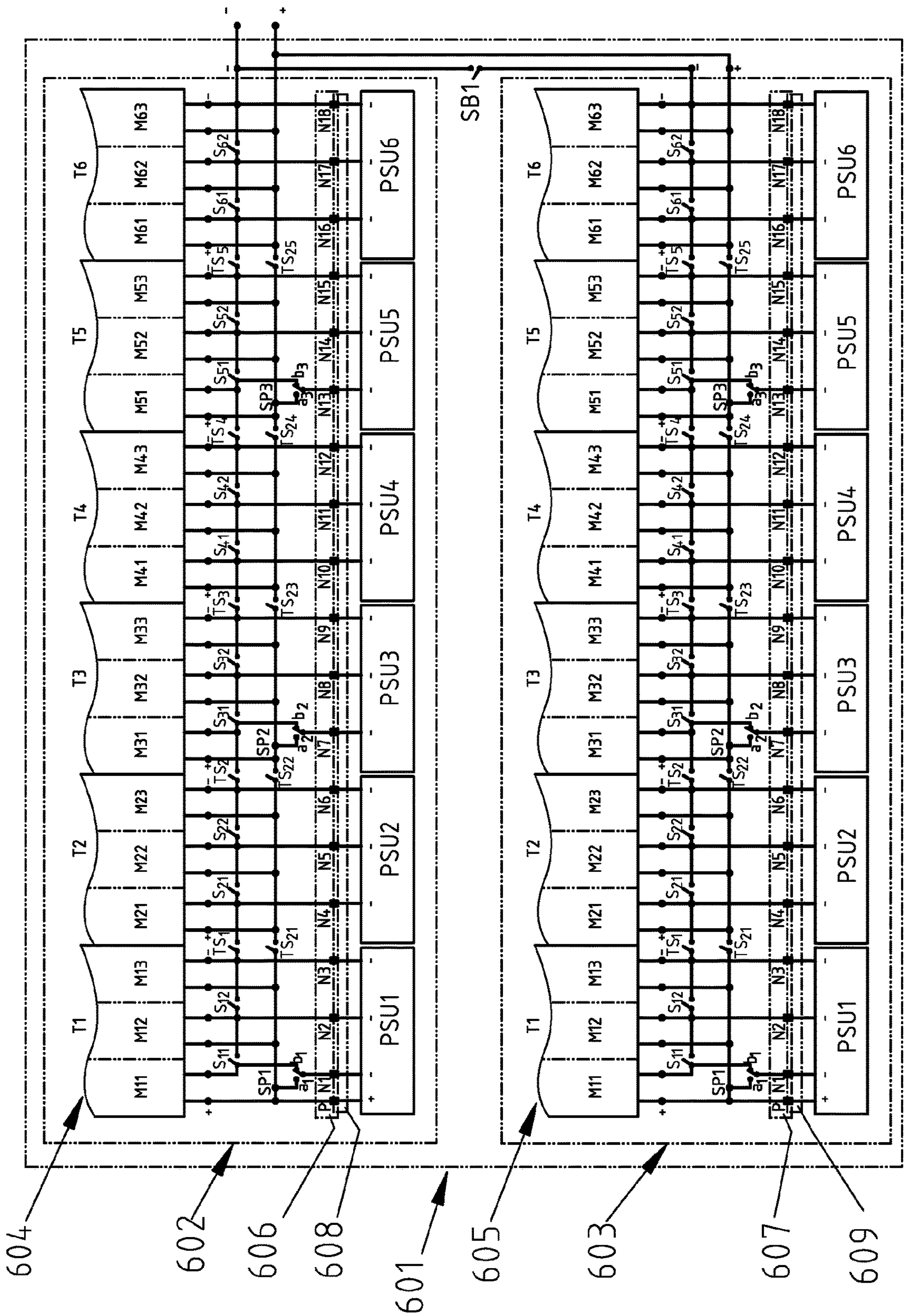
FIG. 104 shows a wiring diagram for recharging mode of an electric vehicle battery, composed by two assemblies, each of them comprising a (6TP,3×6MP) battery, connected in parallel, each battery having a universal 20 contacts vehicle inlet.

Up to here, for easy understanding, it was presented for the same (6TP,3×6MP) battery shown in FIG. 73 different versions of embodiments adapted to different kind of recharging terminals. This design is good to use especially for cordless powered tools, bikes and motor cycles batteries, where each equipment may have its own design for the recharging terminal and for each other component of the system. Instead, for the electric vehicles, is absolutely necessary to be able to recharge the vehicle battery on any kind of recharging terminal for industrial or for domestic use, not like in the actual situation, when each automaker has its specific vehicle inlet and its specific charger outlet. This situation is not acceptable anymore when the number of electric vehicles increases. Therefore, for all electric vehicles (including electric trucks and electric buses) the vehicle inlet has to be designed as a universal vehicle inlet, capable to be connected to any recharging terminal, which has its special charger outlet, adapted to the type and number of independent power supply units used. In Table 3 are presented different embodiments for the battery recharging system, all of them using a universal vehicle inlet. This universal vehicle inlet is capable to support any battery configuration discussed herein, including mono and multi-inlet vehicles (having one or a plurality of batteries installed on the vehicle, which may be recharged simultaneously), recharged to an industrial or domestic recharging terminal. The universal vehicle inlet is a multi-contacts inlet, having a plurality of contacts, and a plurality of command switches, which control the plurality of the modules switches, the triplets switches, the battery switches and the phase switches by adequate command switches. As example, is taken the 20 contacts universal vehicle inlet 589, shown in FIG. 102, having: one ground contact G, one null contact P and 18 phase contacts N1, N2 to N18, as well as the triplets command switches 590 and 591 the modules command switches 592, the phase command switches 593 and the battery command switches 594. Starting from this configuration, each manufacturer may use all these switches and command switches or just part of them, depending of the actual configuration of the batteries of each electric vehicle model. Therefore, it is not mandatory to use all these contacts. In this document, an active contact of the universal vehicle inlet will be drawn with a thicker line and the non active contact (void of metallic contact) will be drawn with a thinner line. In FIG. 102 all 20 contacts are active. For all the examples of Table 3 is considered an electric vehicle with two (6TP,3×6MP) batteries (the same as the battery used in Table 2) connected in parallel, each one of them having a universal vehicle inlet. In FIG. 103 is illustrated a wiring diagram for supplying mode of an electric vehicle battery 595, composed by two (6TP,3×6MP) batteries 596 and 597, connected in parallel by the battery switch SB1, which is on close position, having a unique main battery terminal 598. Each battery 596 and 597 is an assemble of triplets, independent battery modules and a plurality of switches and changeover switches, having a universal vehicle inlet 599 respective 600. FIG. 104 shows a wiring diagram for recharging mode of an electric vehicle battery 601, composed by two battery assemblies 602 and 603, each of them comprising a (6TP,3×6MP) battery 604/605 connected in parallel, each battery having a universal 20 contacts vehicle inlet 606/607, using each of them a 20 contacts adequate independent multi-contacts charger 608/609 of an industrial fast recharging terminal with six 3-phase AC at 380V and 50 Kw independent power supply units SPUh (h=(1 to 6)). The contact SB1 of the battery switches is in open position in order to separate the two battery assemblies.

switch 643. All command switches are mounted on the universal vehicle inlet 644, which receives the independent multi-contacts charger outlet 645 when the independent multi-contacts charger 646 is installed into the universal vehicle inlet 644. As can be seen, for this particular case, when the independent multi-contacts charger is pushed in, are activated the triplets command switch 634 and the battery command switch 642 and are not activated the triplets command switch 635, the modules command switch 638 and the phase command switch 642. In this particular

Figure 105:
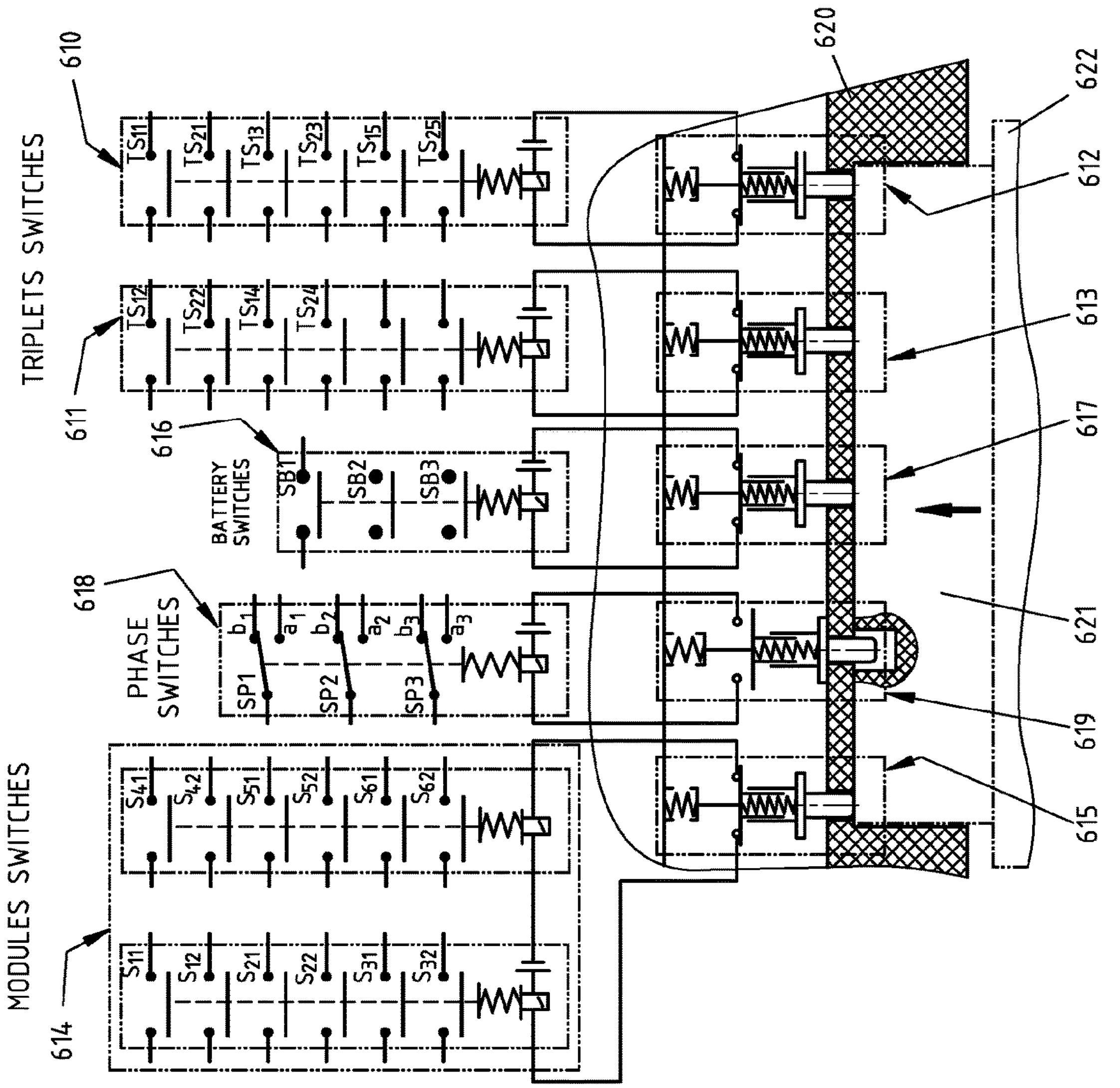
FIG. 105 shows the wiring diagram for the recharging mode of an embodiment of the assemble of batteries, where are illustrated as well the triplets switches, the module switch, the battery switches and the phase switches with their command switches.
Figure 106:
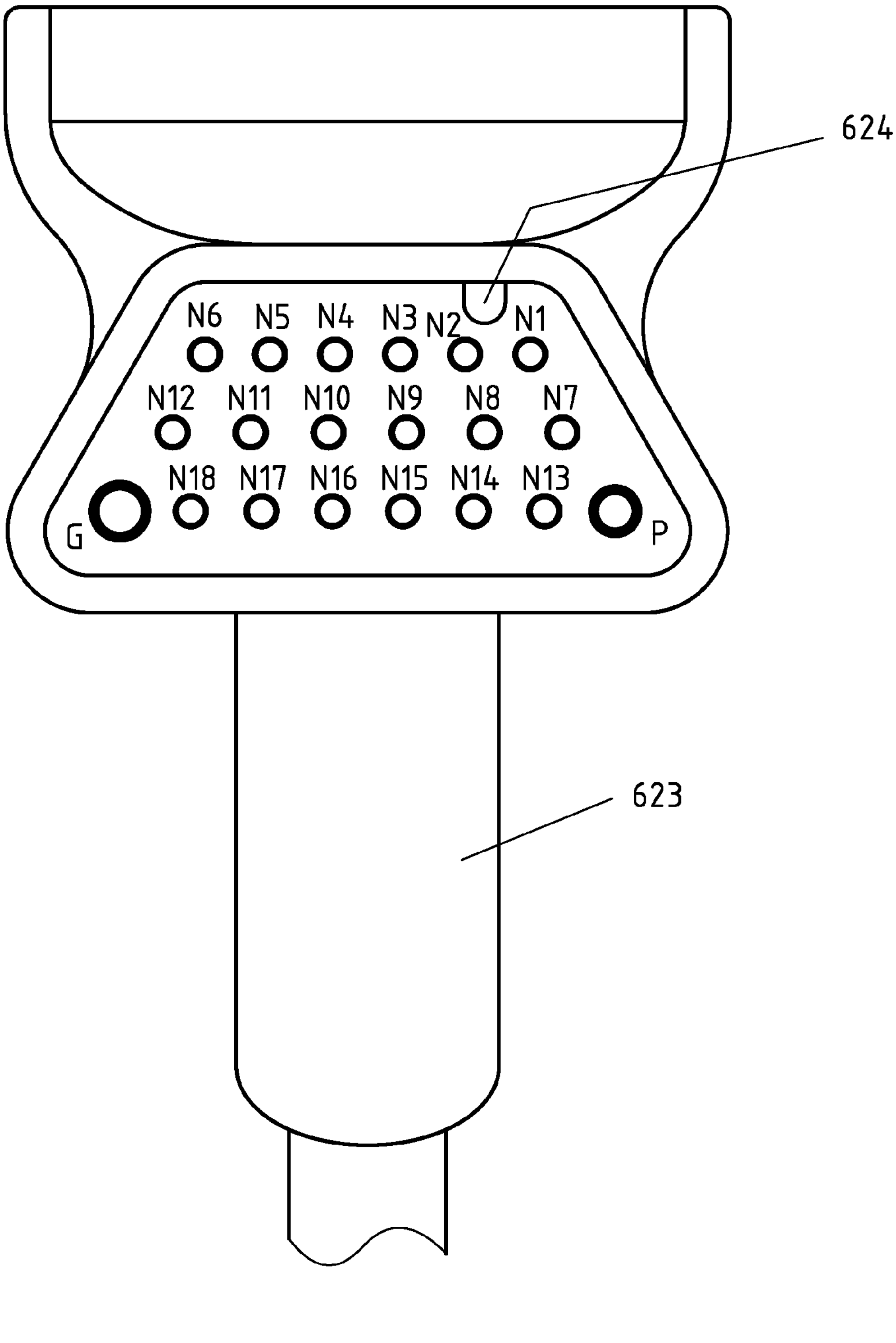
FIG. 106 shows an independent multi-contacts charger with its 6 active contacts, and a recess, protecting the phase command switch.
Figure 107:
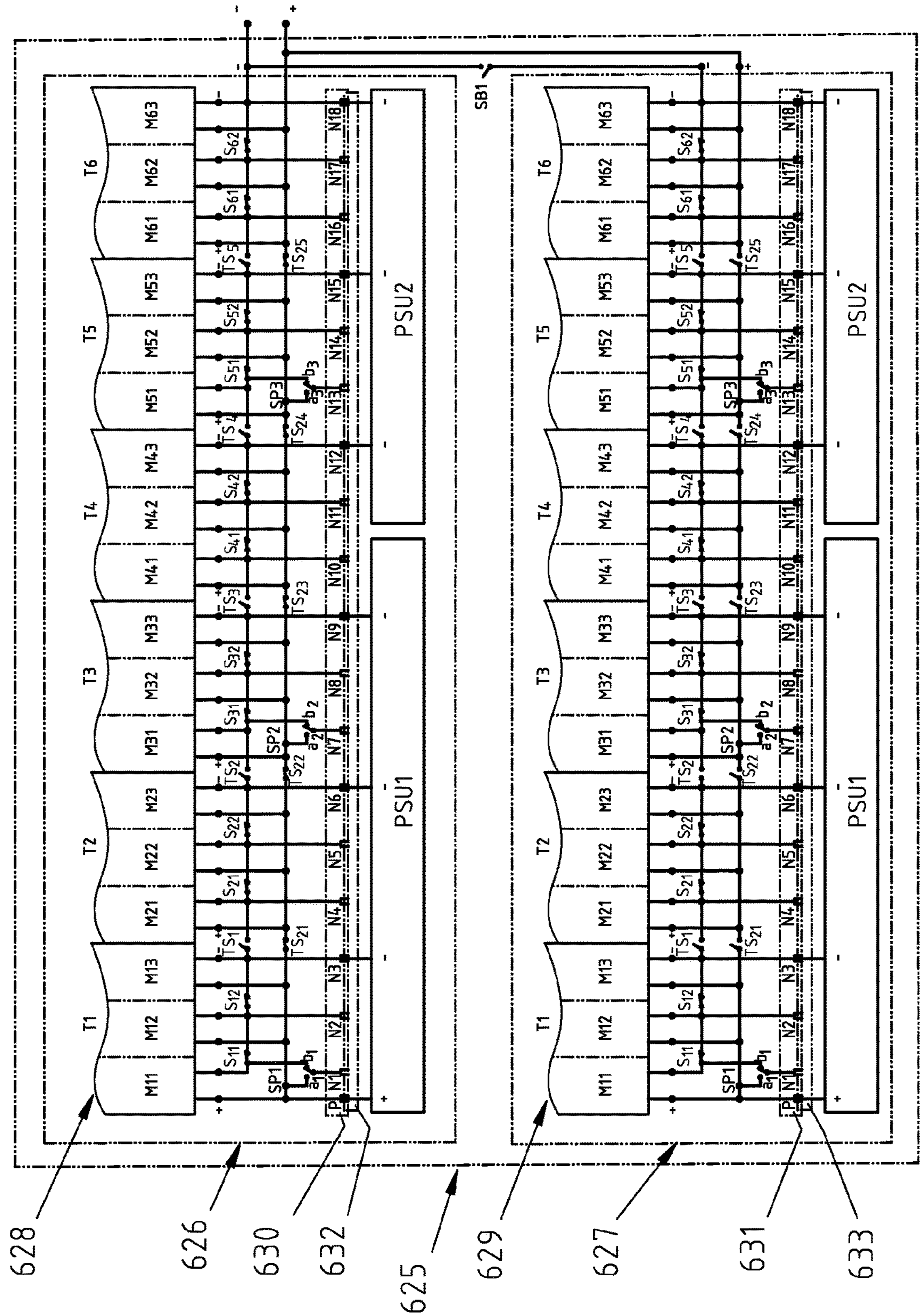
FIG. 107 shows a wiring diagram for recharging mode of an electric vehicle battery composed by two (6TP,3×6MP) batteries connected in parallel, each battery having a universal 20 contacts vehicle inlet, using an industrial regular recharging terminal station with two 3-phase AC at 380V and 50 Kw independent power supply units.
Figure 108:
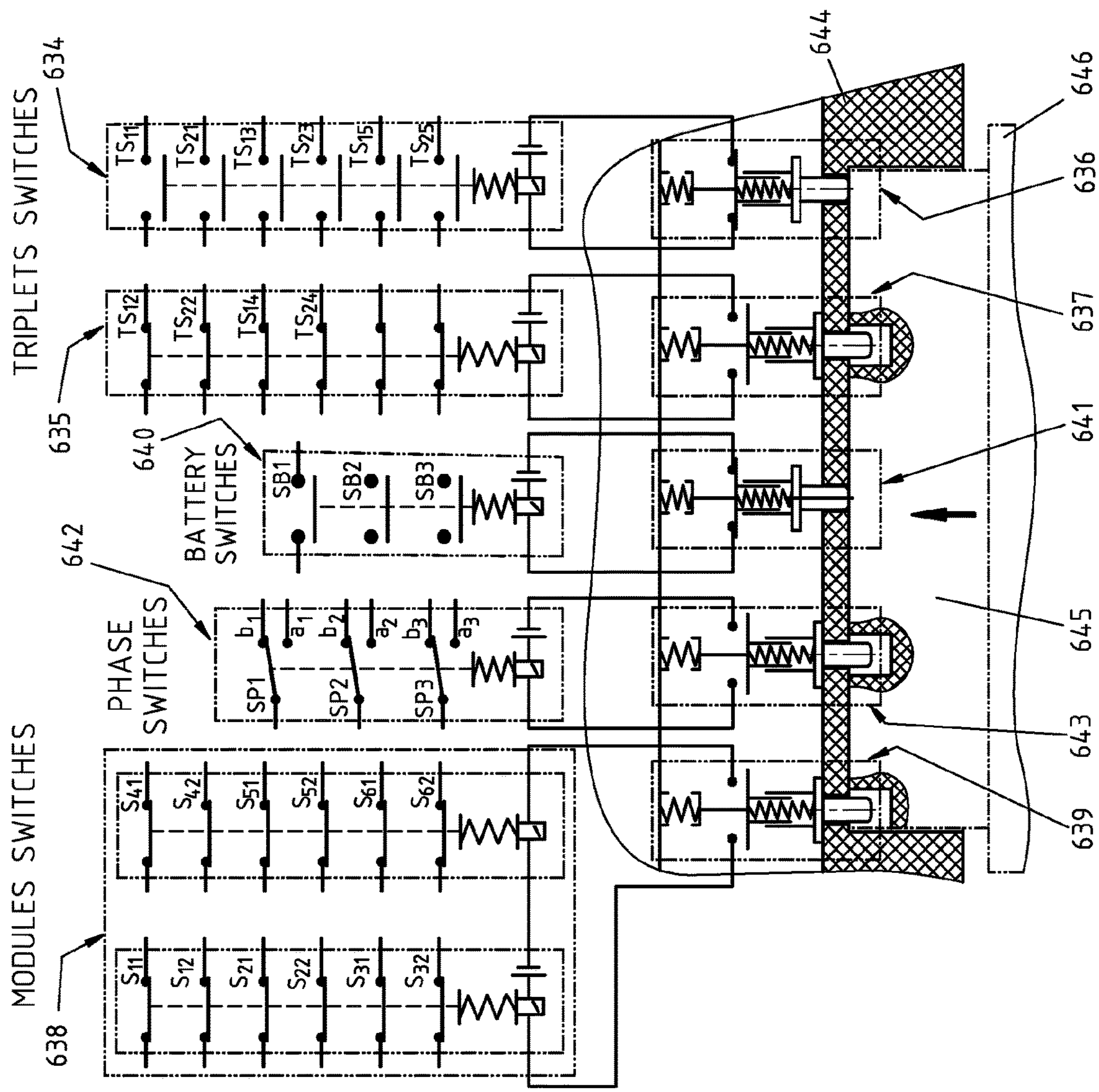
FIG. 108 shows the wiring diagram of an embodiment of the assemble of batteries composed by two (6TP,3×6MP) batteries connected in parallel, each battery having a universal 20 contacts universal vehicle inlet, using an industrial regular recharging terminal with two 3-phase AC at 380V and 50 Kw independent power supply units.
Figure 109:
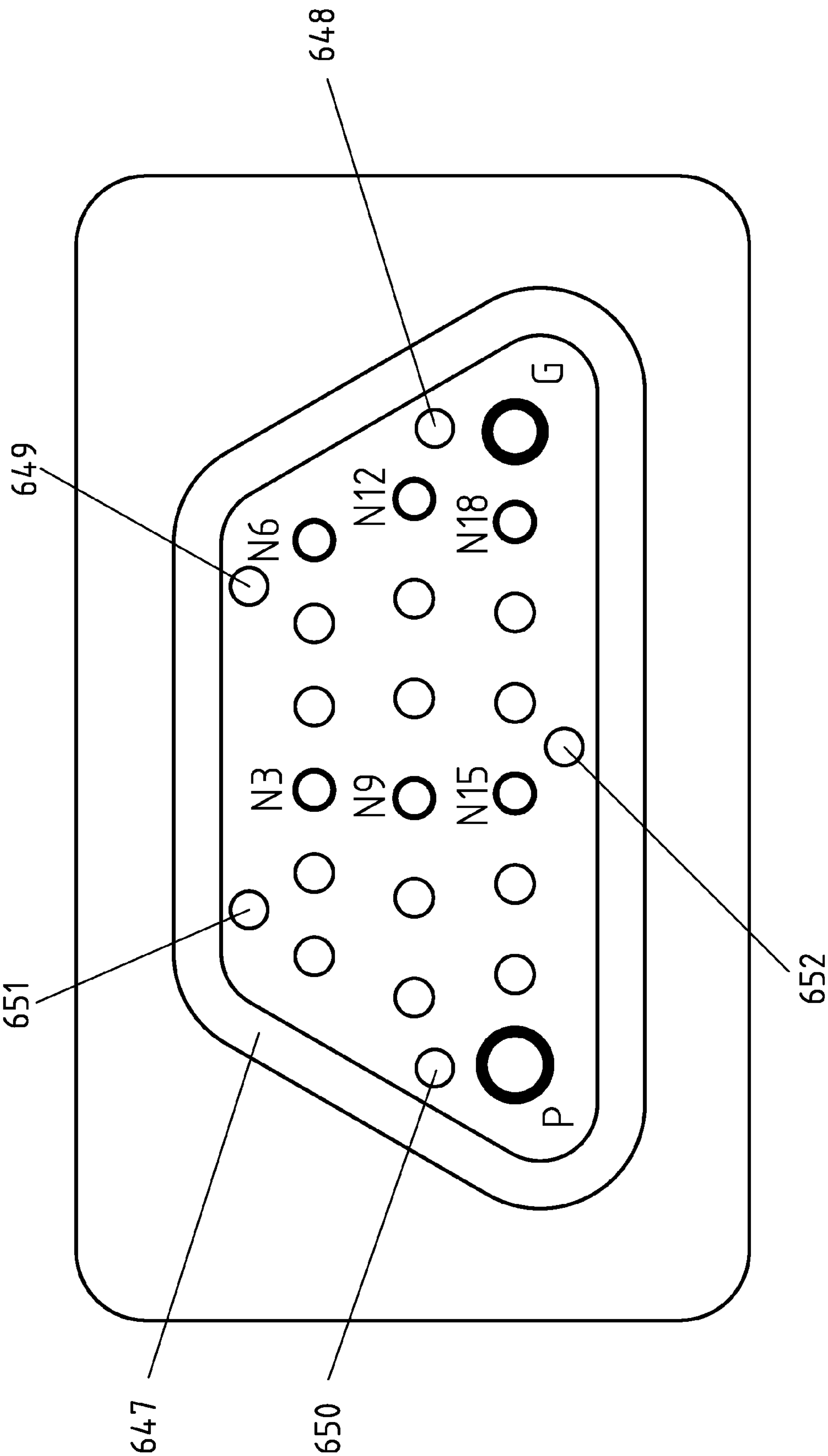
FIG. 109 presents a universal vehicle inlet, having 8 active the contacts and the 5 plungers of the command switches.
Figure 110:
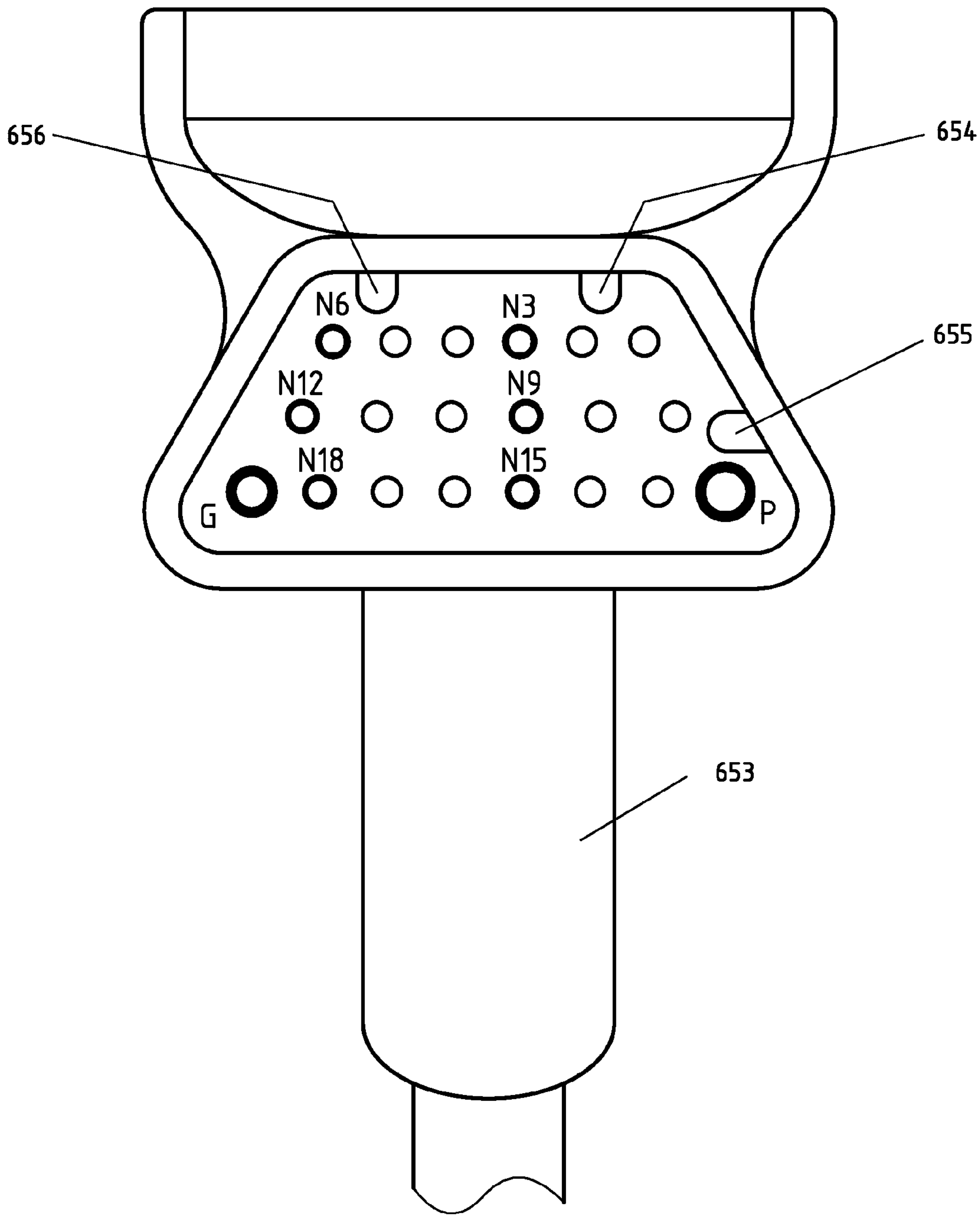
FIG. 110 shows an independent multi-contacts charger with its 8 active contacts and the three recesses.
Figure 111:
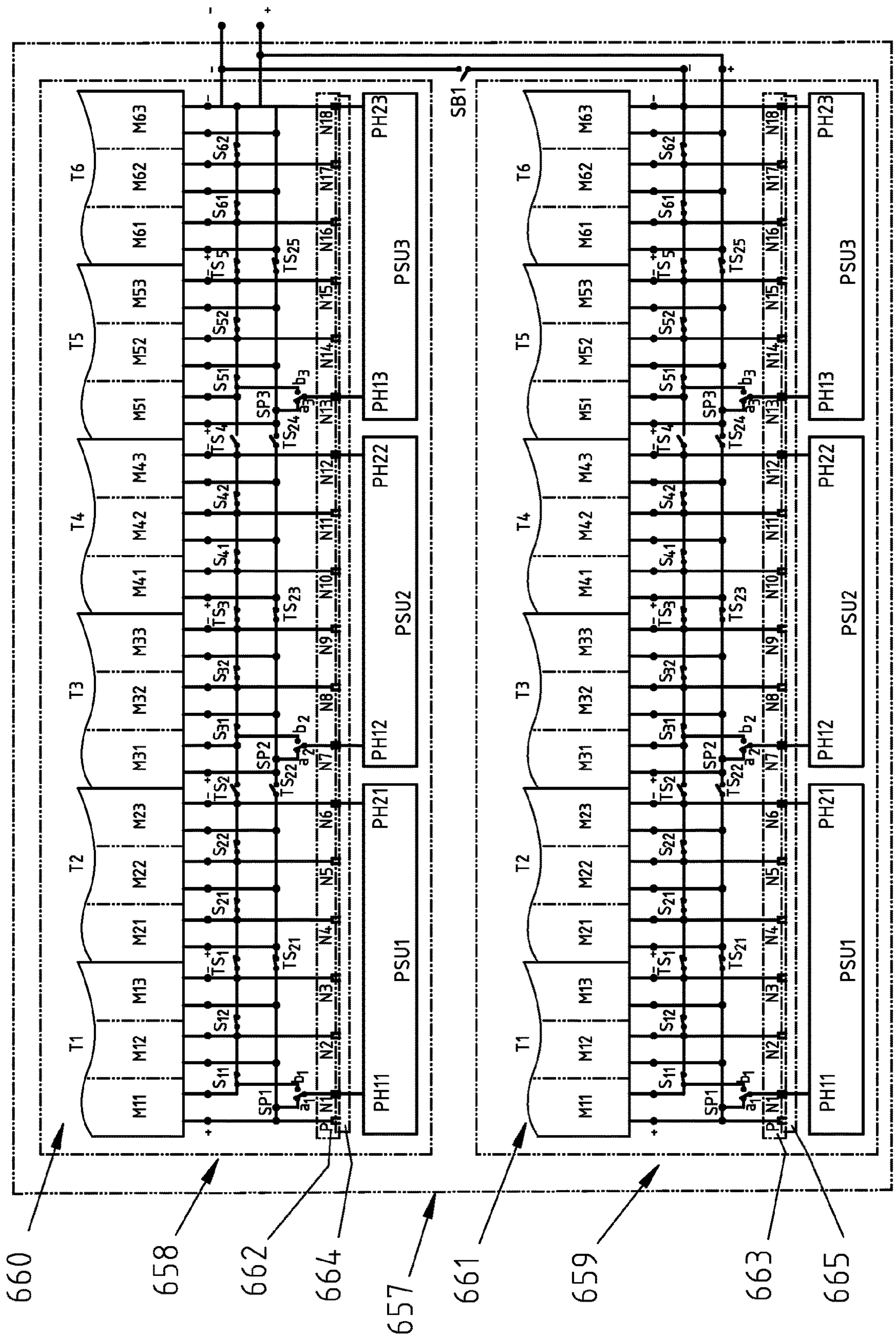
FIG. 111 shows a wiring diagram for recharging mode of an electric vehicle battery, composed by two (6TP,3×6MP) batteries connected in parallel, each battery having a 20 contacts universal vehicle inlet, each of them using a domestic fast recharging terminal with three 2-phase AC at 240V and 7 Kw independent power supply units.
Figure 112:
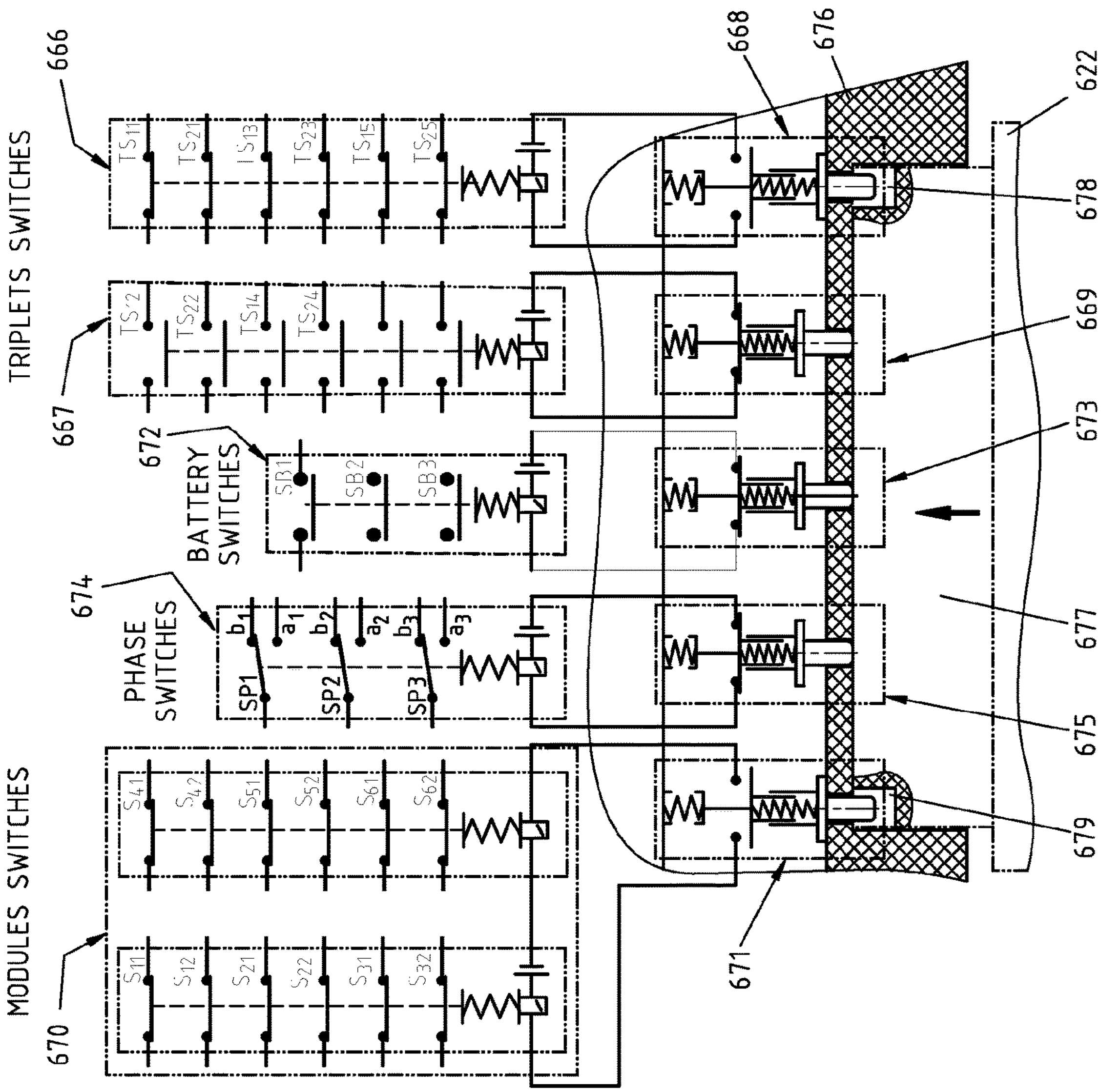
FIG. 112 shows the wiring diagram of an embodiment of the assemble of batteries composed by two (6TP,3×6MP) batteries connected in parallel, each battery having a 20 contacts universal vehicle inlet, each of them using a domestic fast recharging terminal with three 2-phase AC at 240V and 7 Kw independent power supply units, where are illustrated as well the triplets switches, the modules switches, the battery switches and the phase switches with their command switches.
Figure 113:
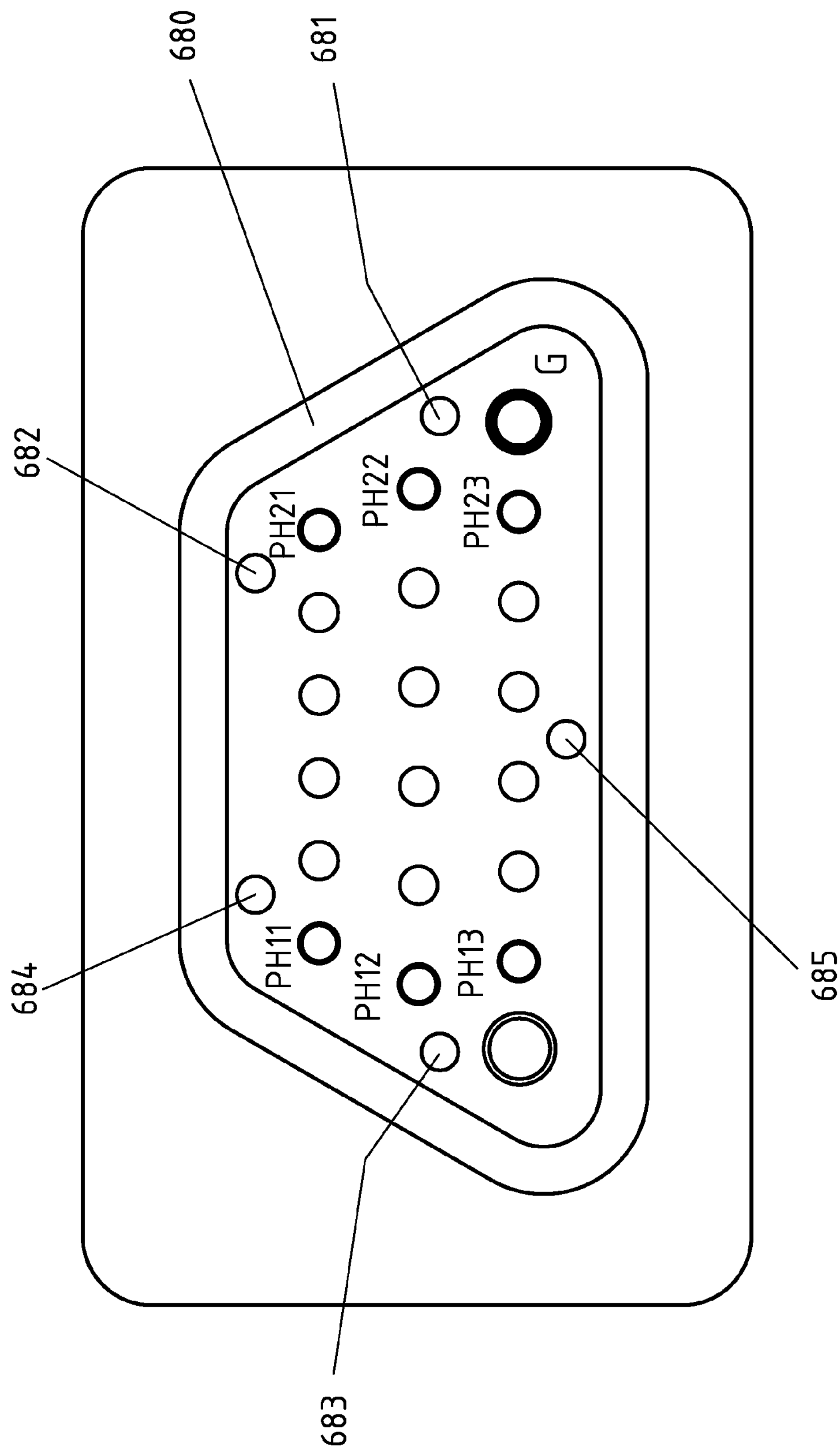
FIG. 113 presents a universal vehicle inlet having 7 active contacts and the 5 plunger of the command switches.
Figure 114:
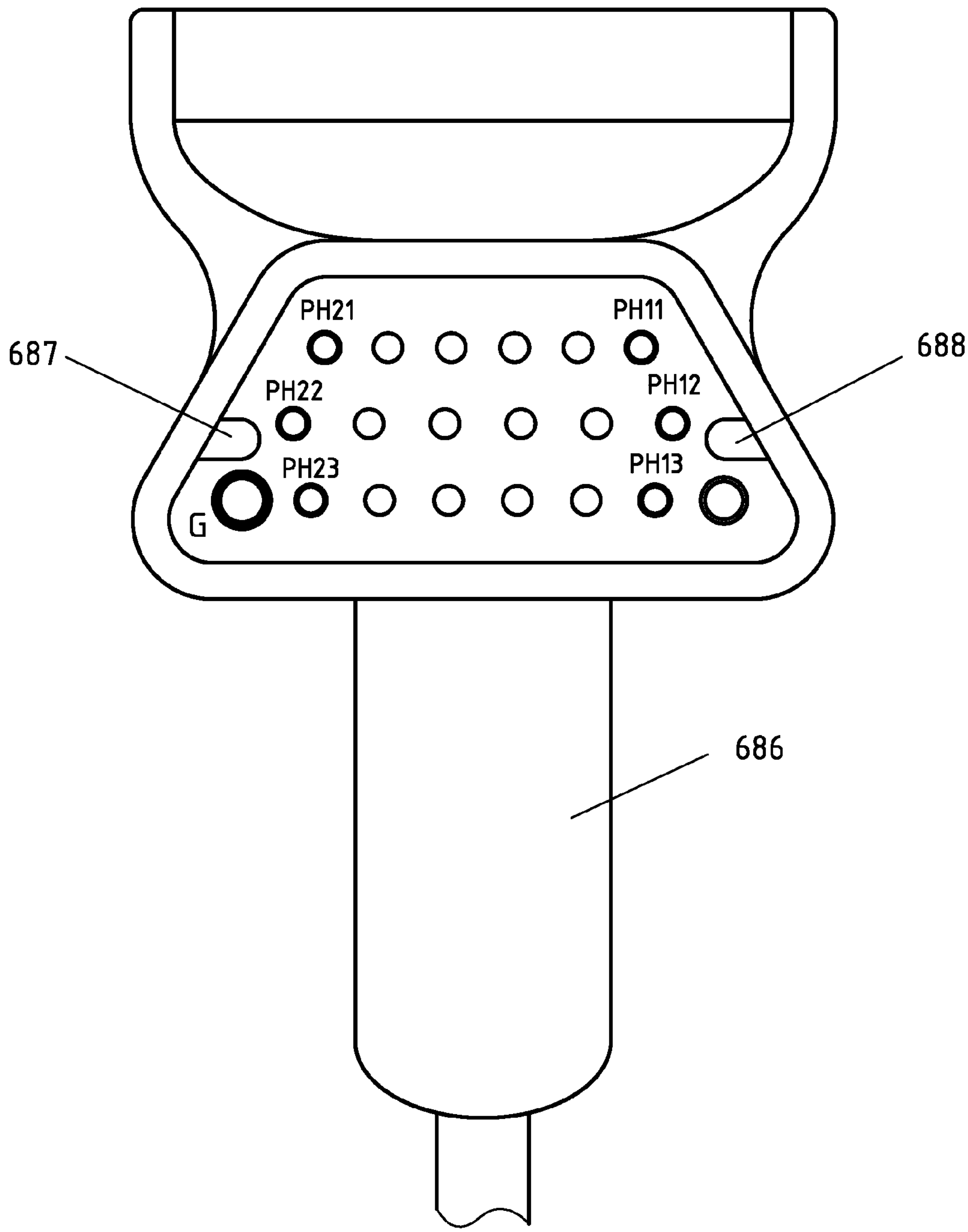
FIG. 114 shows a multi-contact charger with its 7 active contacts and the two recesses.
Figure 115:
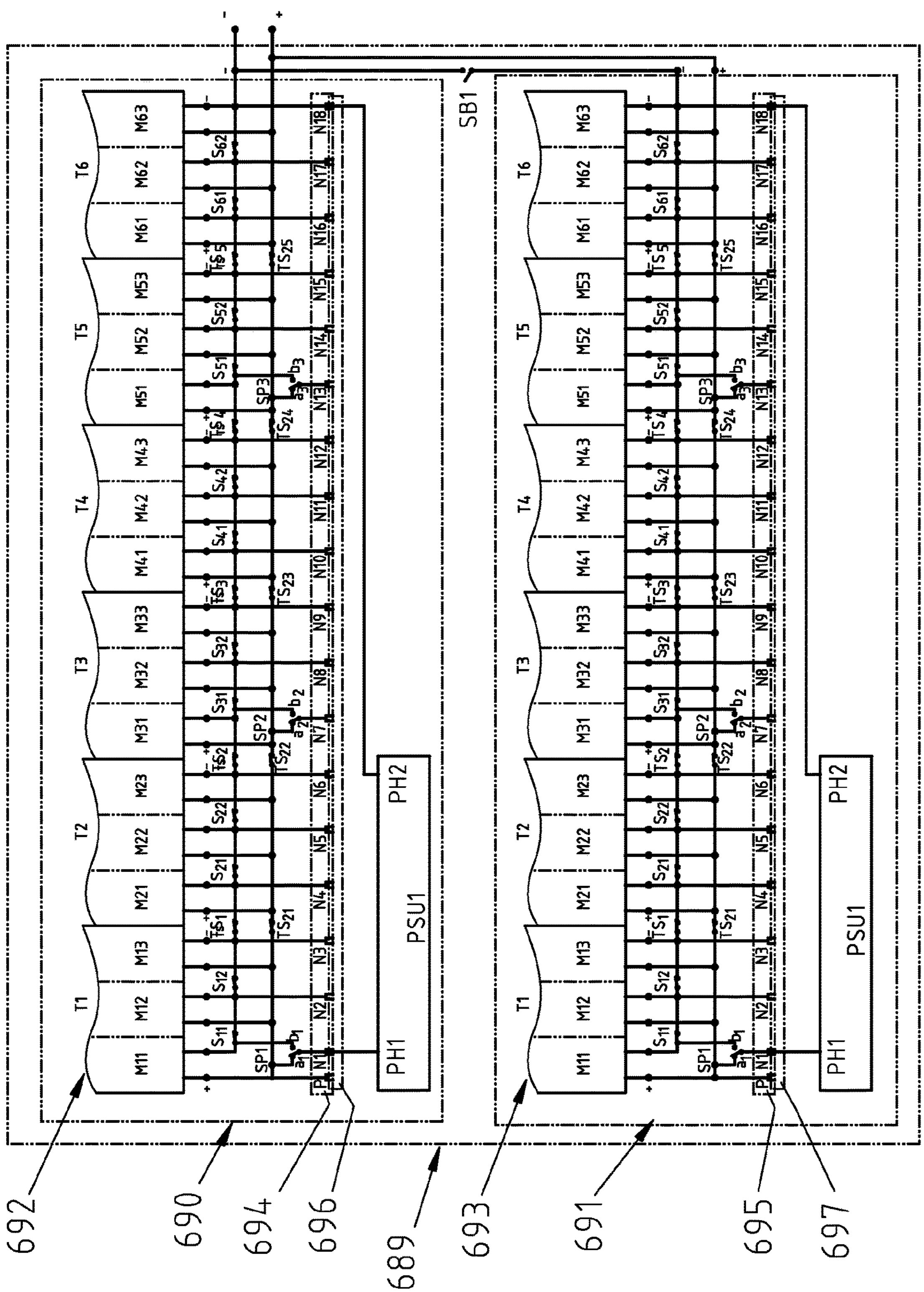
FIG. 115 shows a wiring diagram for recharging mode of an electric vehicle battery composed by two (6TP,3×6MP) batteries connected in parallel, each battery having a universal 20 contacts vehicle inlet, using a domestic fast recharging station with one single 2-phase AC at 240V and 7 Kw independent power supply unit.
Figure 116:
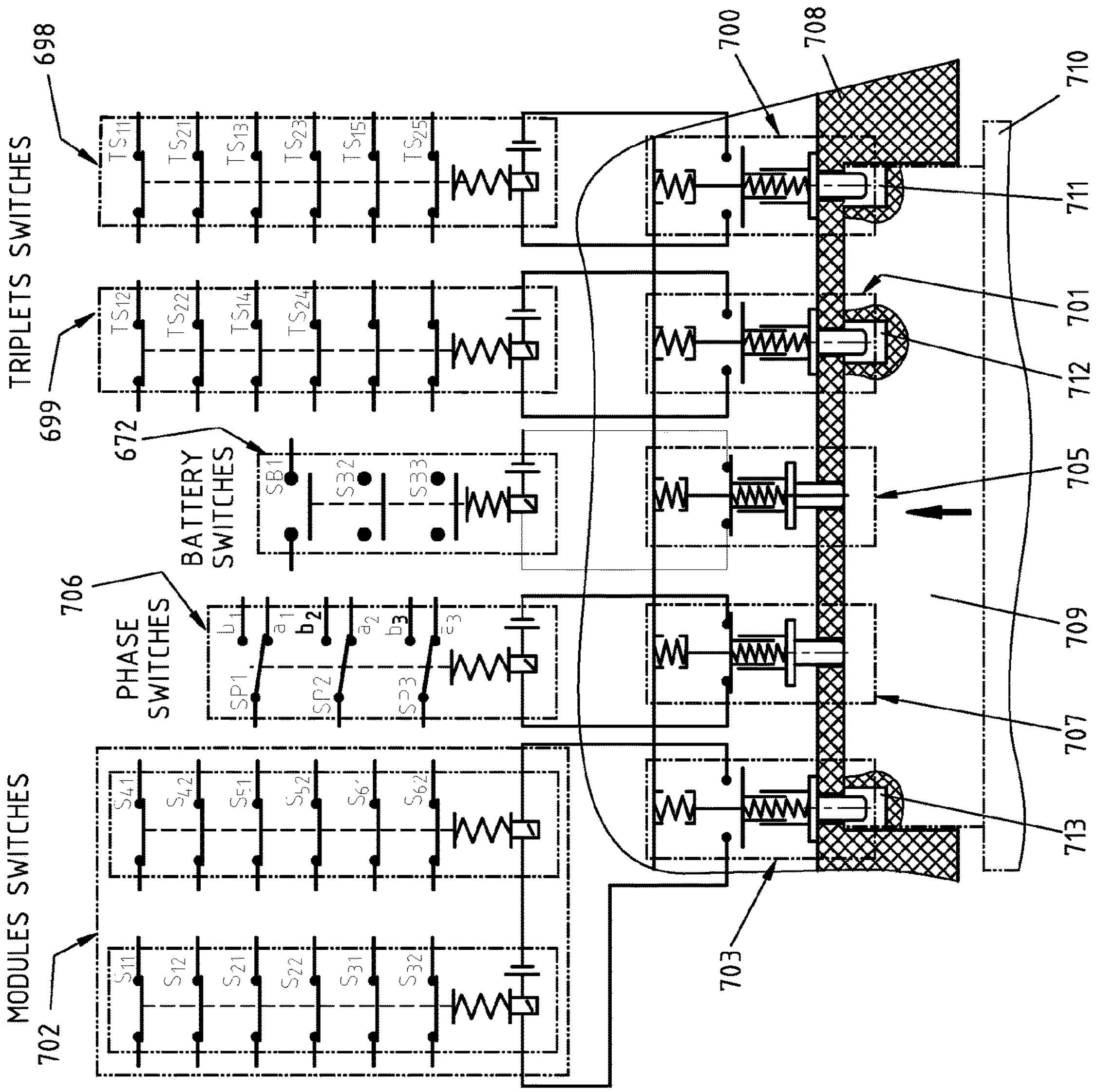
FIG. 116 shows a wiring diagram of an embodiment of the assemble of batteries composed by two (6TP,3×6MP) batteries connected in parallel, each battery having a 20 contacts universal vehicle inlet, using a domestic fast recharging terminal with one single 2-phase AC at 240V and 7 Kw independent power supply unit, where are illustrated the triplets switches, the modules switches, the battery switches and the phase switches with their command switches.
Figure 117:
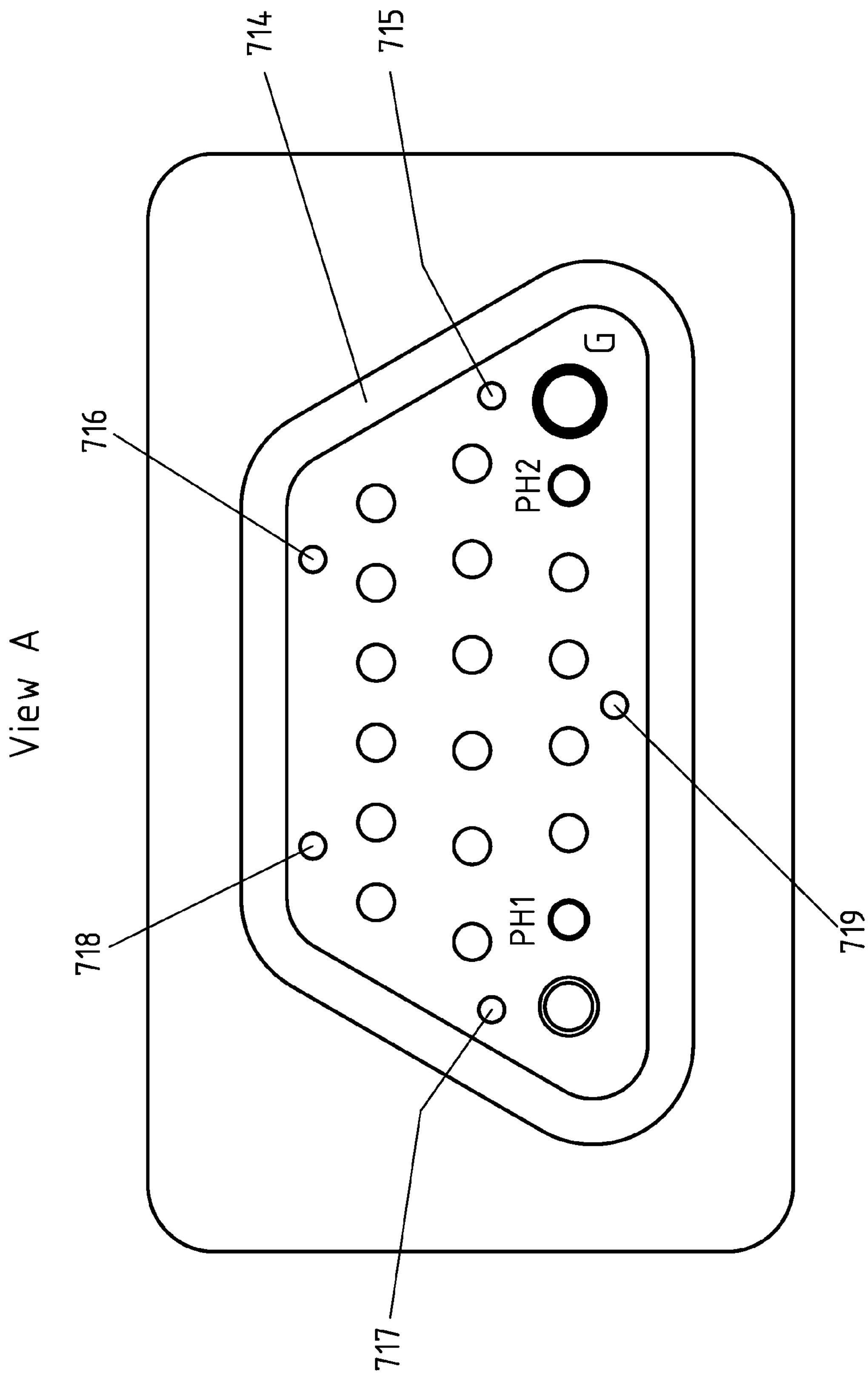
FIG. 117 presents a universal vehicle inlet having only 3 active contacts and the 5 plungers of the command switches.
Figure 118:
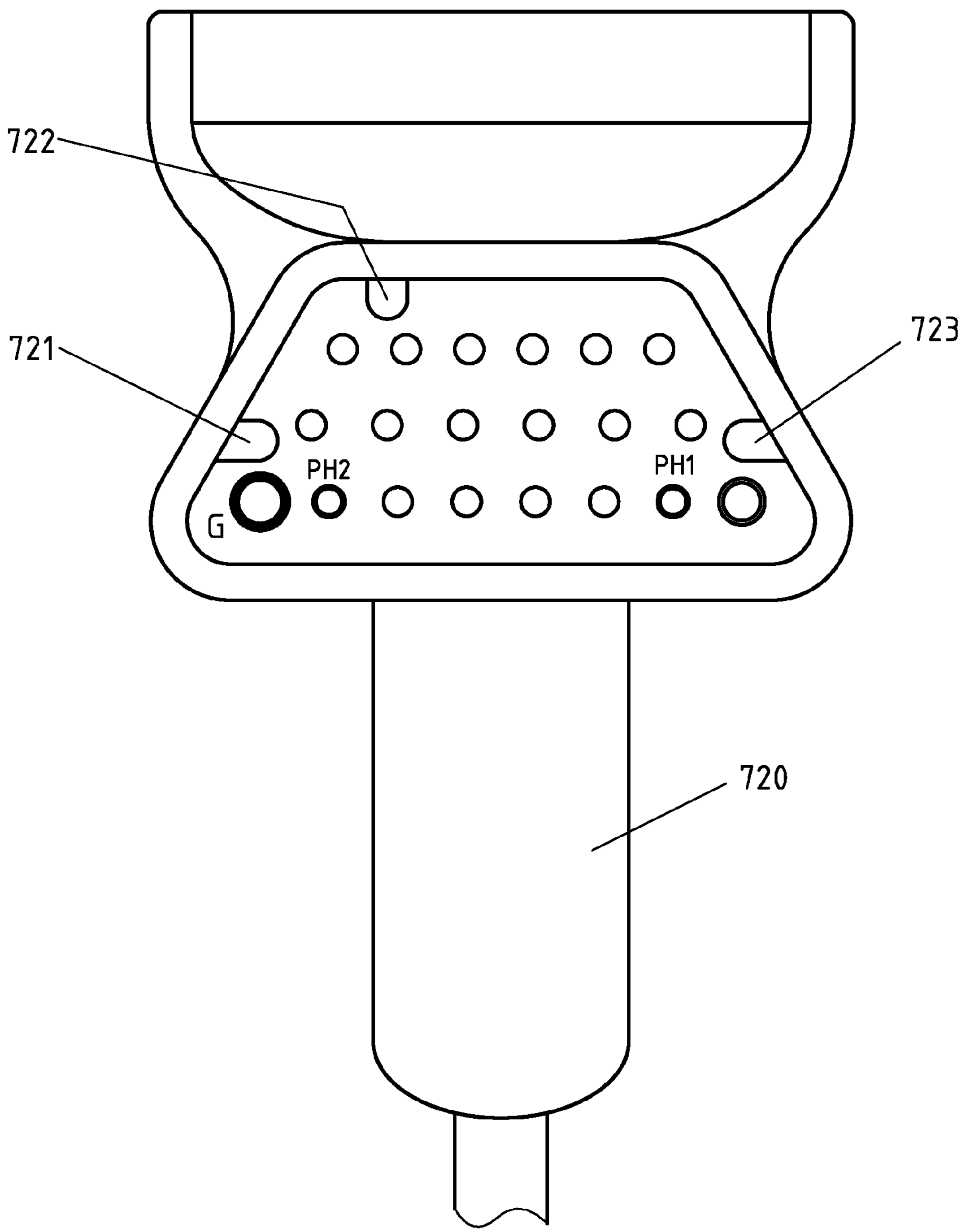
FIG. 118 shows an independent multi-contacts charger with its 3 active contacts and the three recesses.
Figure 119:
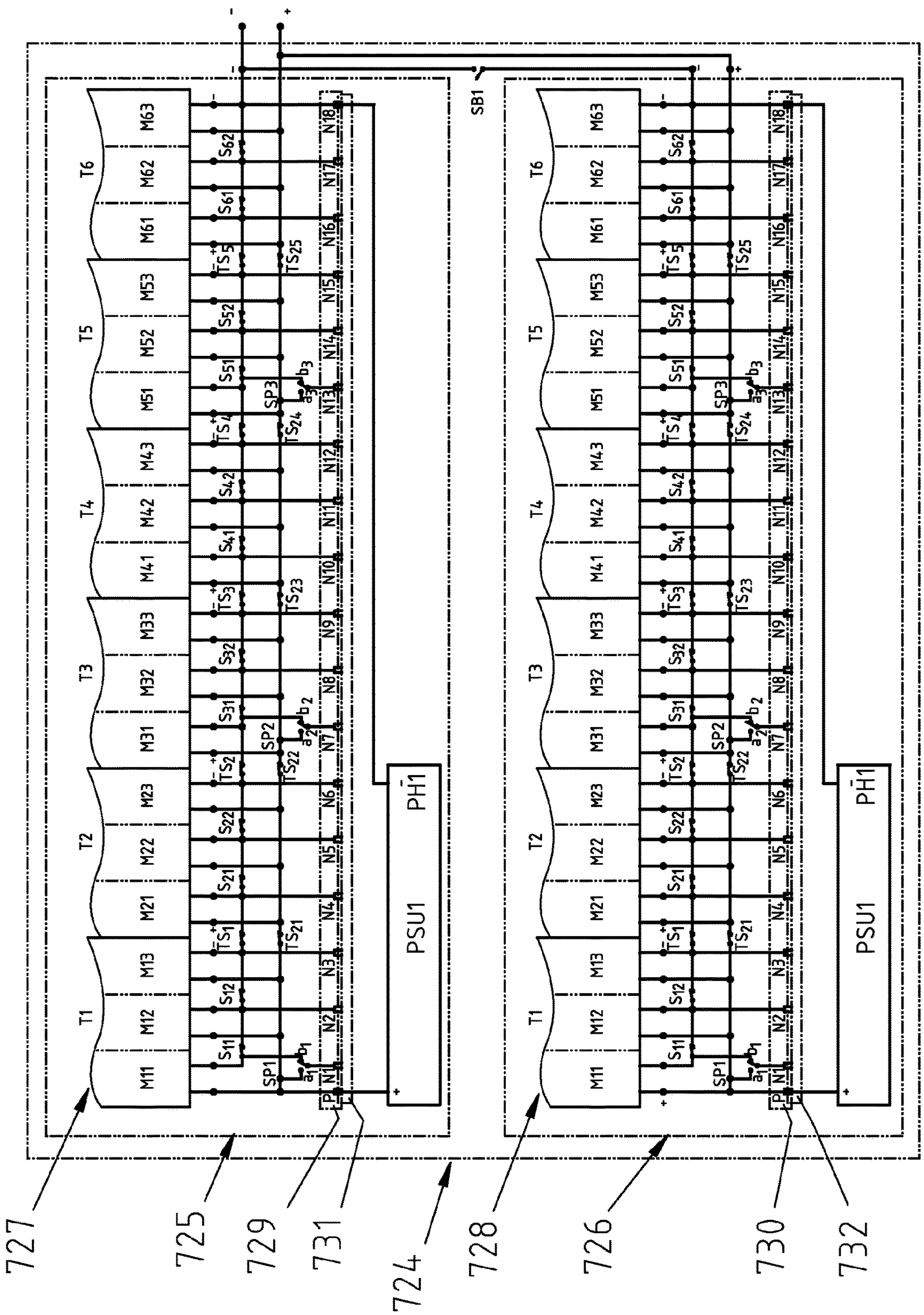

| | | | | | Active | Number | Figure Number with Parallel connection for modules and for triplets for a universal vehicle inlet | | | | |
|---|---|---|---|---|---|---|---|---|---|---|---|
| | | | PSU Code | Number | Contacts Number | of INLETS | Wiring diagram | | | Universal vehicle | Charger |
| Use | Type of Recharging | Type of PSU | AC#Ph, #V, #Kw | of PSU per Stand | per Charger | per vehicle | Supplying | Recharging | Command Switches | INLET Contacts | OUTLET Contacts |
| Industrial | Fast | 3 Phase | AC3, 380 V, | 6 | 20 | 2 | FIG. 103 | FIG. 104 | FIG. 105 | FIG. 102 | FIG. 106 |
| | Regular | | 50 Kw | 2 | 8 | 2 | | FIG. 107 | FIG. 108 | FIG. 109 | FIG. 110 |
| Domestic | Triple Fast | 2 Phase | AC2, 240 V, | 3 | 8 | 2 | | FIG. 111 | FIG. 112 | FIG. 113 | FIG. 114 |
| | Fast | | 7 Kw | 1 | 3 | 2 | | FIG. 115 | FIG. 116 | FIG. 117 | FIG. 118 |
| | Double 2 Phase | 2 Phase | AC2, 240 V, 3.6 Kw | 2 | 4 | 2 | | | | | |
| | Single 2 Phase | | | 1 | 3 | 2 | | | | | |
| | Double Mono Phase | Mono-phase | AC1, 120 V, 2.7 Kw | 2 | 4 | 2 | | | | | |
| | Single Mono Phase | | | 1 | 3 | 2 | | FIG. 119 | FIG. 120 | FIG. 121 | FIG. 122 |

The FIG. 105 shows the wiring diagram for the recharging mode of an embodiment of the assemble of batteries described in FIG. 104, where are illustrated the triplets switches 610 and 611, with their triplets command switches 612 and 613, the module switches 614 with their modules command switch 615, the battery switches 616 with their battery command switch 617 and the phase switches 618 with their phase command switch 619. All command switches are mounted on the universal vehicle inlet 620, which receives the independent multi-contacts charger outlet 621 when the independent multi-contacts charger 622 is installed into the universal vehicle inlet 620. As can be seen, for this particular case, only the phase command switch is not activated when the independent multi-contacts charger is pushed in. In FIG. 106 is shown the independent multi-contacts charger 623 with its contacts G, P, N1, N2 to N18 all active, and the recess 624 protecting the phase command switch. FIG. 107 shows a wiring diagram for recharging mode of an electric vehicle battery 625, composed by two battery assemblies 626 and 627, each of them comprising a (6TP,3×6MP) battery 628/629 connected in parallel, each battery having a 20 contacts universal vehicle inlet 630/631, using each of them a 20 contacts adequate independent multi-contacts charger 632/633 of an industrial regular recharging terminal with two 3-phase AC at 380V and 50 Kw independent power supply units SPU1 and SPU2. The contact SB1 of the battery switches is in open position in order to separate the two battery assemblies. The FIG. 108 shows the wiring diagram of an embodiment of the assemble of batteries described in FIG. 107 for the recharging mode, where are illustrated the triplets switches 634 and 635, with their triplets command switches 636 and 637, the modules switches 638 with their modules command switch 639, the battery switches 640 with their battery command switch 641 and the phase switches 642 with their phase command case, the independent multi-contacts charger outlet 645 has three recesses 637, 639 and 643, in order to not touch respective command switches. In FIG. 109 is presented the universal vehicle inlet 647 having active only the contacts G, P, N3, N6, N9, N12, N15 and N18. All the rest are not active (they are not connected to any electric circuit of the battery assembly). It can be seen the plunger of the triplets command switches 648 and 649, of the modules command switch 650, of the phase command switch 651 and of the battery command switch 652. In FIG. 110 is shown the independent multi-contacts charger 653 with its active contacts G, P, N3, N6, N9, N12, N15 and N18 and the three recesses 654, 655 and 656 protecting the command switch for one of the triplets switches (654), for the modules switches (655) and for the phase switches (656). FIG. 111 shows a wiring diagram for recharging mode of an electric vehicle battery 657, composed by two battery assemblies 658 and 659, each of them comprising a (6TP,3×6MP) battery 660/661 connected in parallel, each battery having a 20 contacts universal vehicle inlet 662/663, using each of them a 20 contacts adequate independent multi-contacts charger 664/665 of a domestic triple fast recharging station with three 2-phase AC at 240V and 7 Kw independent power supply units SPU1, SPU2 and SPU3. The contact SB1 of the battery switches is in open position in order to separate the two battery assemblies. The FIG. 112 shows the wiring diagram of an embodiment of the assemble of batteries described in FIG. 111 for the recharging mode, where are illustrated the triplets switches 666 and, 667 with their triplets command switches 668 and 669, the modules switches 670 with their modules command switch 671, the battery switches 672 with their battery command switch 673 and the phase switches 674 with their phase command switch 675. All command switches are mounted on the universal vehicle inlet 676, which receives the independent multi-contacts charger outlet 677 when the multi-contact charger 678 is installed into the universal vehicle inlet 676. As can be seen, for this particular case, when the independent multi-contacts charger is pushed in, are activated the triplets command switch 667, the battery command switch 672 and the phase command switch 674, but, are not activated the triplets command switch 666 and the modules command switch 670. In this particular case, the independent multi-contacts charger outlet 677 has two recesses 678 and 679, in order to not touch respective command switches. In FIG. 113 is presented the universal vehicle inlet 680 having active only the contacts G, PH11, PH21, PH12, PH22, PH13 and PH23. All the rest are not active (they are not connected to any electric circuit of the battery assembly). It can be seen the plunger of triplets command switches 681 and 682, of the modules command switch 683, of the phase command switch 684 and of the battery command switch 685. In FIG. 114 is shown the independent multi-contacts charger 686 with its active contacts G, PH11, PH21, PH12, PH22, PH13 and PH23 and the two recesses 687 and 688 protecting the command switch for one of the triplets switches and for the modules switches. FIG. 115 shows a wiring diagram for recharging mode of an electric vehicle battery 689, composed by two battery assemblies 690 and 691, each of them comprising a (6TP,3×6MP) battery 692/693 connected in parallel, each battery having a 20 contacts universal vehicle inlet 694/695, using each of them a 20 contacts adequate independent multi-contacts charger 696/697 of a domestic fast recharging station with one single 2-phase AC at 240V and 7 Kw independent power supply unit SPU1. The contact SB1 of the battery switches is in open position in order to separate the two battery assemblies. The FIG. 116 shows the wiring diagram of an embodiment of the assemble of batteries described in FIG. 115 for the recharging mode, where are illustrated the triplets switches 698 and 699, with their triplets command switches 700 and 701, the modules switches 702 with their modules command switch 703, the battery switches 704 with their battery command switch 705 and the phase switches 706 with their phase command switch 707. All command switches are mounted on the universal vehicle inlet 708, which receives the multi-contact charger outlet 709 when the independent multi-contacts charger 710 is installed into the universal vehicle inlet 708. As can be seen, for this particular case, when the independent multi-contacts charger is pushed in, are activated the battery command switch 704 and the phase command switch 706, but, are not activated the triplets command switches 698 and 699 and the modules command switch 702. In this particular case, the independent multi-contacts charger outlet 709 has three recesses 711, 712 and 713, in order to not touch respective command switches. In FIG. 117 is presented the universal vehicle inlet 714 having active only the contacts G, PH1 and PH2. All the rest are not active (they are not connected to any electric circuit of the battery assembly). It can be seen the plunger of triplets command switches 715 and 716, of the modules command switch 717, of the phase command switch 718 and of the battery command switch 719. In FIG. 118 is shown the independent multi-contacts charger 720 with its active contacts G, PH1 and PH2 and the three recesses 721, 722 and 723 protecting both triplets command switches and the modules command switch. FIG. 119 shows a wiring diagram for recharging mode of an electric vehicle battery 724, composed by two battery assemblies 725 and 726, each of them comprising a (6TP,3×6MP) battery 727/728 connected in parallel, each battery having a 20 contacts universal vehicle inlet 729/730, using each of them a 20 contacts adequate independent multi-contacts charger 731/732 of a domestic single mono-phase recharging station with one single mono phase AC at 120V and 2.7 Kw independent power supply unit SPU1. The contact SB1 of the battery switches is in open position in order to separate the two battery assemblies. The FIG. 120 shows the wiring diagram of an embodiment of the assemble of batteries described in FIG. 119 for the recharging mode, where are illustrated the triplets switches 733 and 734, with their triplets command switches 735 and 736, the modules switches 737 with their modules command switch 738, the battery switches 739 with their battery command switch 740 and the phase switches 741 with their phase command switch 742. All command switches are mounted on the universal vehicle inlet 743, which receives the independent multi-contacts charger outlet 744 when the independent multi-contacts charger is installed into the universal vehicle inlet 743. As can be seen, for this particular case, when the independent multi-contacts charger is pushed in, is activated only the battery command switch 739, but, are not activated the triplets command switches 733, and 734, the phase command switch 741 and the modules command switch 737. In this particular case, the multi-contact charger outlet 744 has four recesses 745, 746, 747 and 748, in order to not touch respective command switches. In FIG. 121 is presented the universal vehicle inlet 749 having active only the contacts G, P and PH1. All the rest are not active (they are not connected to any electric circuit of the battery assembly). It can be seen the plunger of the triplets command switches 750 and 751, of the modules command switch 752, of the phase command switch 753 and of the battery command switch 754. In FIG. 122 is shown the independent multi-contacts charger with its active contacts G, P and PH1 and the four recesses 755, 756, 757 and 758 protecting the both triplets command switches, the phase command switch, and the modules command switch. Only the battery switches will be activated.

In Table 4 is presented a variety of type of batteries having a different number of modules (12, 15 and 18), connected in parallel or series. For each version is shown the type and number of switches for triplets and for independent battery modules. As can be seen the invention allows a huge variety of solutions and for each embodiment there is the possibility to use the universal vehicle inlet in order to remove all the actual barriers, making possible the generalization of the electric transportation. For domestic use, the single mono-phase battery recharging equipment is like in FIG. 123, where the charger 759 is connected to the independent power supply unit 760, plugged in by an electric plug 761 into a 120V outlet 762. In order to recharge simultaneously a vehicle having two inlets, two chargers like described in FIG. 123 may be used, plugging in the two plugs of the recharging station in a double 120V outlet like shown in FIG. 124. In FIG. 125 is presented a fast battery recharging equipment, where the charger 763 is connected to an independent power supply unit 764, which supplies 240V at 7 Kw being connected by the plug 765 to an AC 2 phase 240V outlet 766. In order to fast recharge simultaneously a vehicle having two inlets, two chargers like described in FIG. 125 may be used, plugging in the two plugs in a double outlet like shown in FIG. 126.

Depending on the size of the equipment and on the type of the battery (on-board or off-board), there are two options to design the battery recharging system: integrated and non-integrated system. The battery recharging systems presented in Table 1 to Table 4 are on-board non-integrated design, each component is detached one another, being connected by cables. This design is more appropriated for the electric vehicles and large equipments. For small size equipments, like cordless powered tools, bikes, etc., the off board integrated version is the best option.

In FIG. 127 to FIG. 138 are illustrated embodiments of integrated battery recharging system for small battery applications, like bikes and cordless powered tools. In these applications, the independent power supply units are plug into a multi-contact electrical bar like in FIG. 127 and FIG. 128 (767/768, for four/six AC 1 phase 120V units) or like in FIG. 129 (769, for four AC 2 phase 240V units).

In FIG. 130 is shown an embodiment of the integrated battery recharging system ensemble 770 in recharging mode, for four AC 1 phase 120V units, connected to a four contacts electrical bar 771, comprising the battery assembly 772, connected to the integrated recharging terminal 773,

TABLE 4

| Type of Battery per INLET Code | Triplets Number | Triplets Series | Triplets Parallel | Triplets Switches Number | Triplets Switches Type | Modules Total Number | Modules Series | Modules Parallel | Modules Switches Number | Modules Switches Type |
|---|---|---|---|---|---|---|---|---|---|---|
| (6TS, 3x6MS) | 6 | 6 | | 5 | Changeover | 18 | 3x6 | | 2x6 | Changeover |
| (6TS, 3x6MP) | | | | | | | | 3x6 | 2x6 | Ordinary |
| (6TP, 3x6MS) | | | 6 | 5 | Ordinary | | 3x6 | | 2x6 | Changeover |
| (6TP, 3x6MP) | | | | | | | | 3x6 | 2x6 | Ordinary |
| (6TP, | | | | | | | 3x3 | 3x3 | 2x3 | Changeover |
| 3x3MS 3X3MP) | | | | | | | | | 2x3 | Ordinary |
| (3TS 3TP, 3x6MS) | | 3 | 3 | 3 | Changeover | | 3x6 | | 2x6 | Changeover |
| | | | | 2 | Ordinary | | | | | |
| (3TS 3TP, 3x6MP) | | | | 3 | Changeover | | | 3x6 | 2x6 | Ordinary |
| | | | | 2 | Ordinary | | | | | |
| (3TS 3TP, | | | | 3 | Changeover | | 3x3 | | 2x3 | Changeover |
| 3x3MS 3x3MP) | | | | 2 | Ordinary | | | 3x3 | 2x3 | Ordinary |
| (5TS, 3x5MS) | 5 | 5 | | 4 | Changeover | 15 | 3x5 | | 2x5 | Changeover |
| (5TS, 3x5MP) | | | 5 | 4 | Ordinary | | | 3x5 | 2x5 | Ordinary |
| (4TS, 3x4MS) | 4 | 4 | | 3 | Changeover | 12 | 3x4 | | 2x4 | Changeover |
| (4TP, 3x4MP) | | | 4 | 3 | Ordinary | | | 3x4 | 2x4 | Ordinary |
| (2TS 2TP, | | 2 | | 2 | Changeover | | 3x2 | | 2x4 | Changeover |
| 3x2MS 3x2MP) | | | 2 | 1 | Ordinary | | | 3x2 | 2x4 | Ordinary |

inlet view, showing the null plug 777, the four negative plugs 778 of the four power units 779 and the two ground plugs 780/781, (only 780 plug being active, another one 781 being just a guide plug helping the inlet installation), fitting with the outlet of the four contacts electrical bar. FIG. 132 shows the integrated recharging station 782 with its recharging contact plate 783, having four pairs of elastic contacts 784 and the battery attaching elements 785, the four independent power supply units assembly 786 with its inlet 787. It is shown also the null plug 788, the four negative plugs 789 and the ground plug 790 and the guide plug 791. All these components are integrated by a recharging station box 792. FIG. 133 shows the battery assembly 793, comprising the four modules 794, the four pairs of electrical contacts 795, the attaching elements 796 and the battery box 797. FIG. 134 shows the embodiment of the battery assembly in supplying mode, where the battery assembly 798 is attached to the cordless powered equipment 799 via the attaching system 800 and the integrated supplying contact plate 801. FIG. 135 shows an embodiment of an equipment 802 integrated with an integrated supplying contact plate 803. On the integrated supplying contact plate 803 are illustrated the elastic contacts 804 and the battery attachment element 805. In FIG. 136 is shown an embodiment of the integrated battery recharging system ensemble 806 in recharging mode, for six AC 1 phase 120V units, connected to a six contacts electrical bar 807, via the integrated recharging terminal

808. In FIG. 137 is shown an embodiment of the integrated battery recharging system ensemble 809 in recharging mode, for four AC 2 phase 240V units, connected to a four contacts electrical bar 810, comprising the battery assembly 811, connected to the integrated recharging station 812, which includes an integrated recharging contact plate 813, the four independent power supply units 814, and the integrated recharging contact plate inlet 815, all integrated by the power station box 816. The integrated recharging power station inlet 815 comprises the four pairs of plugs 817/818 for phase 1 and for phase 2, of the four independent power supply units 814 and the two ground plugs 819/820, (only 819 plug being active, an other one 820 being just a guide plug helping the inlet installation), fitting with the outlet of the four contacts electrical bar 810. FIG. 138 is a view of the recharging power station inlet 821, showing the four pairs of plugs 822/823 for phase 1 and for phase 2, of the four AC 2 phase 240V independent power supply units, the ground contact 824 and the guiding pin 825.

In FIG. 139 to FIG. 143 are illustrated the wiring diagrams of the embodiments of integrated battery recharging system for small battery applications, described here above. FIG. 139 is a wiring diagram of a four modules off-board battery assembly 826, recharged as illustrated in FIG. 130, connected in parallel, shown in recharging mode, using an integrated recharging contact plate 827, four independent power supply units 828, having a recharging terminal inlet 829 fitting into a four contacts electrical bar. In the recharging mode, each module is connected directly to a AC 1 phase 120V independent power supply unit, using a single null plug 830 and four negative plugs 831. As can be seen, all four modules ML1, ML2, ML3 and ML4 with their terminals are integrated in a single piece 826, by a battery box. The contact plate 827, the four independent power supply units 828 and the recharging terminal inlet 829 are integrated into a single piece by a recharging terminal box. FIG. 140 shows the four modules off-board battery assembly 832, in supplying mode, being connected in parallel and connected to the equipment 833 via an integrated supplying contact plate 834. FIG. 141 shows the four modules off-board battery assembly 835, in supplying mode, being connected in series and connected to the equipment 836 via an integrated supplying contact plate 837. FIG. 142 is a wiring diagram of a six modules off-board battery assembly 838, recharged as illustrated in FIG. 130, connected in parallel, shown in recharging mode, using an integrated recharging contact plate 839, six independent power supply units 840, having a recharging terminal inlet 841 fitting into a six contacts electrical bar. In the recharging mode, each module is connected directly to a AC 1 phase 120V independent power supply unit, using a single null plug 842 and six negative plugs 843. As can be seen, all six modules MD1, MD2, MD3, MD4, MD5 and MD6 with their terminals 844 are integrated in a single piece 838, by a battery box. The contact plate 839, the six independent power supply units 840 and the recharging terminal inlet 841 are integrated into a single piece by a recharging terminal box. FIG. 143 shows the six modules off-board battery assembly 845, in supplying mode, being connected in series and connected to the equipment 846 via an integrated supplying contact plate 847.

In conclusion the advantage of this invention is the fact that in general it gives the possibility to reduce drastically the battery recharging time for any electric equipment and in particular, for the electric vehicles it makes possible to have autonomous and user friendly electric vehicles, comparable to the actual IC vehicles. By using a plurality of independent power supply units for each recharging terminal, the cost of recharging stations drops by eliminating a good number of recharging terminals and by drastic reduction of the land occupied by a power station. Introducing a universal vehicle inlet gives to all manufacturers the opportunity to develop their own battery assembly, the best for their specific requirements, without any limitation on the battery recharging equipment—industrial and/or domestic. Another advantage of the invention consists in the fact that this principle may be apply very easy to both new and old electric vehicles. In order to reach the unlimited millage for the electric vehicles, by using the principle described herein for the batteries and for the recharging terminals, this very performable equipment consisting in a plurality of independent power supply units with three phase AC having the voltage up to 500 V and the power up to 50 KW, the target of less than 3 minutes per battery recharge time for an autonomy of about 400 km is possible to achieve. At that moment, the electric vehicles conquer the world.

This principle and design may be used for on-board and for off-board battery recharging as discussed here above, in any technical field, especially where a short battery recharging time is required, for example: for electric vehicles, for electric golf cars, for electric bikes, for electric motorcycles, for all cordless powered tools and equipment, etc.

Although the above description relates to specific preferred embodiments as preferred embodiment as presently contemplated by the inventor, it will be understood that the invention in its broad aspect includes mechanical and functional equivalents of the elements described and illustrated, which are within its spirit and scope as defined by the appended claims.

I claim:

1. A fast rechargeable battery assembly and a battery recharging equipment configured to recharge a battery in a very short period of time, for on-board battery configuration, comprising:

an assembly of rechargeable batteries, configured to store electric energy and to provide power to a consumer, comprising a plurality of batteries and a unique main battery terminal connected to the said consumer, each battery of the said plurality of batteries configured to provide power by a main battery terminal when it works in supplying mode, and to receive electricity via a multi-contacts equipment battery inlet when it works in recharging mode, each said battery being split in a plurality of independent battery modules, each of the said independent battery modules comprising an independent module inlet and an independent module terminal;

a battery recharging equipment configured to provide power to each said battery, comprising a plurality of independent power supply units, configured to provide power to the said plurality of independent battery modules of the said battery, comprising a supply unit inlet connected to a grid and a supply unit terminal connected to an independent recharging terminal, where the said independent recharging terminal is configured to distribute power to the said plurality of batteries via a plurality of independent multi-contacts chargers, each one of the said independent multi-contacts chargers having an independent multi-contacts chargers outlet configured to fit into the said equipment battery inlets;

a plurality of independent consumer inlets connected to the said unique main battery terminal, configured to provide power to each motor of the said consumer and to the electric and electronic system of the said consumer;

a plurality of contact plates, one for each said battery, configured to connect in recharging mode each independent battery module of the said battery to one of the said plurality of independent power supply units, via the said independent multi-contacts charger and the said equipment battery inlet, and to connect in supplying mode each independent battery module of said battery to the said main battery terminal, via a battery control equipment, configured to control and ensure the right connections between the said plurality of independent battery modules of the same said battery, in recharging and in supplying mode, comprising a plurality of modules switches configured to connect the said plurality of independent battery modules in parallel, and a plurality of modules changeover switches configured to connect the said plurality of independent battery modules in series;

a battery assembly control equipment configured to control and ensure the right connections between the said plurality of batteries of one said assembly of rechargeable batteries, in recharging and in supplying mode, comprising a plurality of battery switches configured to connect the said plurality of batteries in parallel, and a plurality of battery changeover switches configured to connect the said plurality of batteries in series;

a recharging control equipment configured to control and ensure the right connections between the said plurality of independent battery modules of the same said battery, and the said independent power supply units configured in different shapes, in recharging and in supplying mode, comprising a plurality of phase switches;

a battery assembly command equipment configured to command the said battery assembly control equipment, in recharging and in supplying mode, comprising a battery command switch installed on each of the said equipment battery inlets, activated by the said independent multi-contacts charger, when the said independent multi-contacts charger outlet is plugged into the said equipment battery inlet;

a battery command equipment configured to command the said battery control equipment in recharging and in supplying mode, being installed on each of the said equipment battery inlet, comprising a modules command switch, a triplets command switch, a phase command switch, all activated by the said independent multi-contacts charger, when the said independent multi-contacts charger outlet is plugged into the said equipment battery inlet.

2. The fast rechargeable battery assembly and the battery recharging equipment described in claim 1, wherein each contact plate of the said plurality of contact plates is configured to work with one battery of the said plurality of batteries and incorporates the said battery control equipment related to the said battery working with the said contact plate.

3. The fast rechargeable battery assembly and the battery recharging equipment described in claim 1, wherein the said battery recharging equipment is configured for domestic use comprising:

a plurality of two phase AC independent power supply units;

a domestic independent recharging terminal configured for a two phase AC;

a domestic independent multi-contacts chargers, configured to provide the electricity supplied by the said plurality of two phase AC independent power supply units to the said assembly of rechargeable batteries, and to fit with the said equipment battery inlet, comprising a positive contact, a ground contact and a plurality of negative contacts equals two times the number of the said independent power supply units, including a domestic independent multi-contacts charger outlet configured to activate only the command switches required to recharge a specific configuration of the said battery and the said battery assembly.

4. The fast rechargeable battery assembly and the battery recharging equipment described in claim 1, wherein the said battery recharging equipment is configured for domestic use comprising:

a plurality of mono phase AC independent power supply units;

a domestic independent recharging terminal configured for a mono phase AC;

a domestic independent mono phase multi-contacts chargers, configured to provide the electricity supplied by the said plurality of mono phase AC independent power supply units to the said assembly of rechargeable batteries, and to fit with the said equipment battery inlet, comprising a positive contact, a ground contact and a plurality of negative contacts equals one time the number of the said independent power supply units, including a domestic independent mono phase multi-contacts charger outlet configured to activate only the command switches required to recharge a specific configuration of the said battery and the said battery assembly.

5. The fast rechargeable battery assembly and the battery recharging equipment described in claim 1, wherein the said equipment battery inlet is a universal vehicle inlet, configured to fit with different configuration of the said independent multi-contacts charger for industrial and domestic use.

6. The fast rechargeable battery assembly and the battery recharging equipment described in claim 1, wherein the said battery recharging equipment is configured for industrial use comprising:

a plurality of three phase AC independent power supply units, configured to connect each phase of the said three phase AC independent power supply unit to one of the said independent battery module, each three phase AC independent power supply unit recharging simultaneously a triplet composed by three said independent battery modules, one module for each of the three phases;

an industrial independent recharging terminal configured for a three phase AC;

the plurality of industrial independent multi-contacts chargers, configured to provide the electricity supplied by the said plurality of three phase AC independent power supply units to the said assembly of rechargeable batteries, comprising a positive contact, a ground contact and a plurality of negative contacts equals three times the number of the said independent power supply units, including an industrial independent multi-contacts charger outlet configured to activate only the command switches required to recharge a specific configuration of the said battery and the said battery assembly, when the said independent multi-contacts charger outlet is plugged into the said equipment battery inlet;

a plurality of communication screens.

7. The fast rechargeable battery assembly and the battery recharging equipment described in claim 6, wherein the said plurality of three phase AC independent power supply units are 3-phase AC at 380V and 50 Kw.

* * * * *